(12) United States Patent
Wiemers et al.

(10) Patent No.: US 8,790,517 B2
(45) Date of Patent: Jul. 29, 2014

(54) MOBILE STATION AND METHODS FOR DIAGNOSING AND MODELING SITE SPECIFIC FULL-SCALE EFFLUENT TREATMENT FACILITY REQUIREMENTS

(75) Inventors: Reginald A. Wiemers, Littleton, CO (US); Robert Kohlheb, Cserszegtomaj (HU); Bardia B. Khalili, Littleton, CO (US); Gyorgy Lipovszki, Budapest (HU); Peter H. Zahn, Littleton, CO (US)

(73) Assignee: Rockwater Resource, LLC, Denver, CO (US)

( * ) Notice: Subject to any disclaimer, the term of this patent is extended or adjusted under 35 U.S.C. 154(b) by 256 days.

(21) Appl. No.: 13/066,097

(22) Filed: Apr. 6, 2011

(65) Prior Publication Data

US 2011/0257788 A1  Oct. 20, 2011

Related U.S. Application Data

(60) Division of application No. 11/888,512, and a continuation-in-part of application No. 11/888,512, filed on Aug. 1, 2007, now abandoned.

(51) Int. Cl.
*C02F 9/00* (2006.01)
*C02F 9/02* (2006.01)
*G05B 13/04* (2006.01)

(52) U.S. Cl.
USPC ........... 210/739; 210/663; 210/143; 210/241; 210/806; 700/29; 700/30; 700/31; 703/9; 703/12

(58) Field of Classification Search
USPC ........ 210/85, 96.1, 96.2, 103, 134, 139, 143, 210/182, 188, 192, 202, 203, 241, 259, 260, 210/739, 746, 663, 806; 700/28–31, 273; 703/6, 7, 9, 12; 706/25, 33
See application file for complete search history.

(56) References Cited

U.S. PATENT DOCUMENTS

| 4,383,920 A | 5/1983 | Muller et al. |
| 4,999,116 A | 3/1991 | Bowers |
| 5,238,574 A | 8/1993 | Kawashima et al. |
| 5,244,579 A | 9/1993 | Horner et al. |

(Continued)

FOREIGN PATENT DOCUMENTS

GB  2284906  6/1995

*Primary Examiner* — Joseph Drodge
(74) *Attorney, Agent, or Firm* — Harold A. Burdick

(57) ABSTRACT

A mobile station and methods are disclosed for diagnosing and modeling site specific effluent treatment facility requirements to arrive at a treatment regimen and/or proposed commercial plant model idealized for the particular water/site requirements. The station includes a mobile platform having power intake, effluent intake and fluid outflow facilities and first and second suites of selectably actuatable effluent pretreatment apparatus. An effluent polishing treatment array is housed at the station and includes at least one of nanofiltration, reverse osmosis and ion-exchange stages. A suite of selectively actuatable post-treatment apparatus is housed at the station. Controls are connected at the station for process control, monitoring and data accumulation. A plurality of improved water treatment technologies is also disclosed. The modeling methods include steps for analyzing raw effluent to be treated, providing a field of raw effluent condition entry values and a field of treated effluent condition goals entry values, and utilizing said fields to determine an initial treatment model including a selection of, and use parameters for, treatment technologies from the plurality of down-scaled treatment technologies at the facility, the model dynamically and continuously modifiable during treatment modeling.

24 Claims, 71 Drawing Sheets

(56) References Cited

U.S. PATENT DOCUMENTS

| | | | |
|---|---|---|---|
| 5,268,300 A * | 12/1993 | Latura et al. | 436/53 |
| 5,320,755 A | 6/1994 | Hagqvist et al. | |
| 5,403,475 A | 4/1995 | Allen | |
| 5,460,723 A | 10/1995 | Bourbigot et al. | |
| 5,547,584 A | 8/1996 | Capehart | |
| 5,558,775 A | 9/1996 | Busch, Jr. | |
| 5,607,593 A | 3/1997 | Cote et al. | |
| 5,616,250 A | 4/1997 | Johnson et al. | |
| 5,632,892 A | 5/1997 | Klein | |
| 5,647,973 A | 7/1997 | Desaulniers | |
| 5,741,416 A | 4/1998 | Tempest, Jr. | |
| 5,774,633 A | 6/1998 | Baba et al. | |
| 5,943,662 A * | 8/1999 | Baba et al. | 706/23 |
| 5,963,724 A * | 10/1999 | Mantooth et al. | 703/14 |
| 5,972,216 A | 10/1999 | Acernese et al. | |
| 6,110,375 A | 8/2000 | Bacchus et al. | |
| 6,120,688 A | 9/2000 | Daly et al. | |
| 6,193,893 B1 | 2/2001 | Mazzei et al. | |
| 6,228,255 B1 | 5/2001 | Peterson et al. | |
| 6,311,095 B1 | 10/2001 | Brown | |
| 6,325,916 B1 | 12/2001 | Lambert et al. | |
| 6,358,398 B1 | 3/2002 | Halldorson et al. | |
| 6,375,847 B1 | 4/2002 | Hartmann | |
| 6,408,227 B1 * | 6/2002 | Singhvi et al. | 700/266 |
| 6,464,884 B1 | 10/2002 | Gadgil | |
| 6,607,668 B2 | 8/2003 | Rela | |
| 6,740,245 B2 | 5/2004 | Johnson | |
| 6,805,806 B2 | 10/2004 | Arnaud | |
| 6,853,920 B2 * | 2/2005 | Hsiung et al. | 702/1 |
| 6,960,301 B2 | 11/2005 | Bradley | |
| 7,031,778 B2 * | 4/2006 | Hsiung et al. | 700/29 |
| 8,216,517 B2 * | 7/2012 | Prasad et al. | 422/79 |
| 8,496,810 B2 * | 7/2013 | Forrest | 210/162 |
| 2002/0033363 A1 | 3/2002 | Hasegawa | |
| 2004/0026335 A1 | 2/2004 | Fields | |
| 2004/0104153 A1 | 6/2004 | Yang | |
| 2005/0075852 A1 * | 4/2005 | Lindberg | 703/9 |
| 2008/0314807 A1 * | 12/2008 | Junghanns et al. | 210/85 |
| 2011/0131017 A1 * | 6/2011 | Cheng et al. | 703/2 |

* cited by examiner

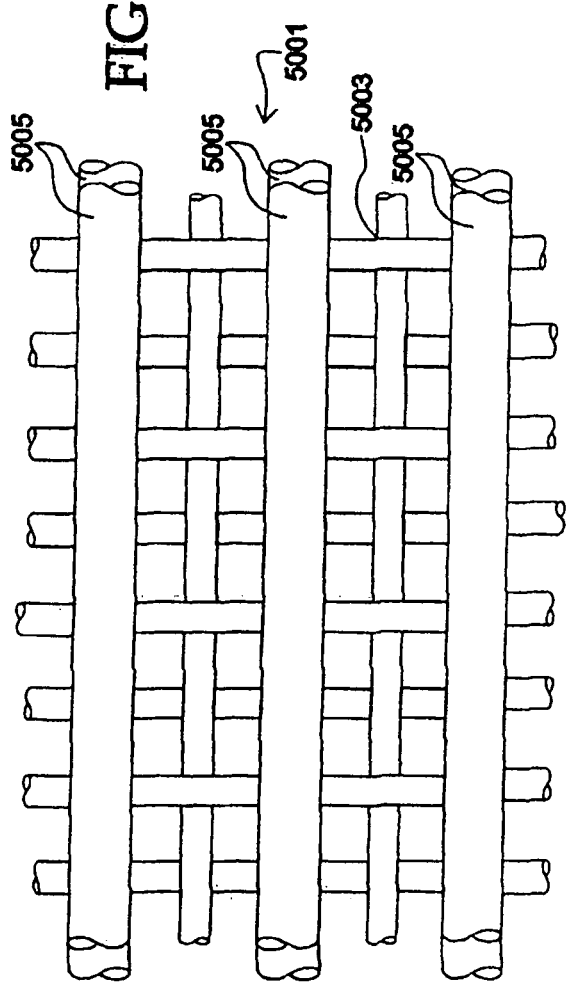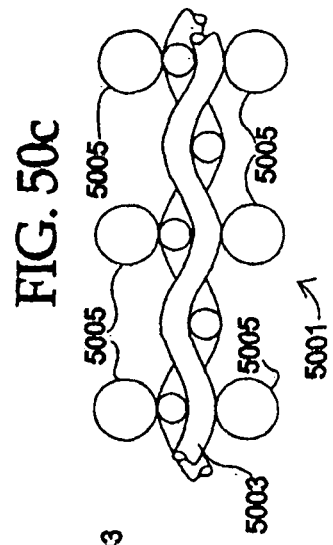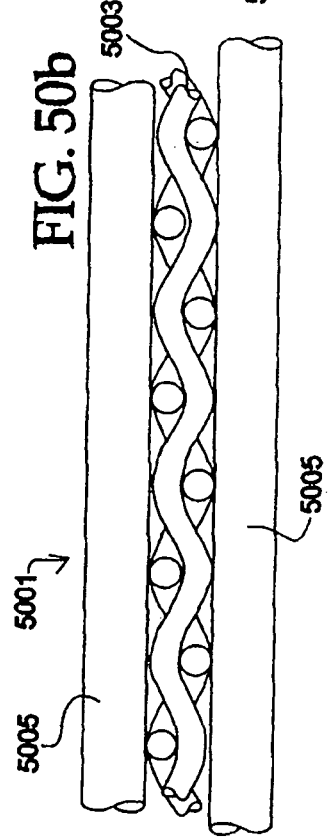

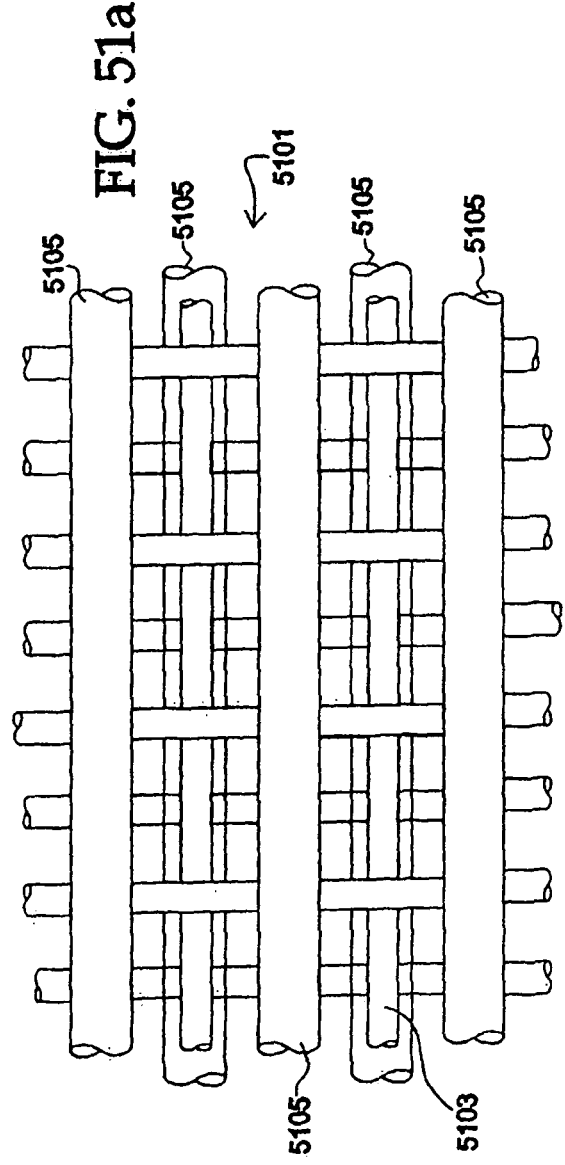
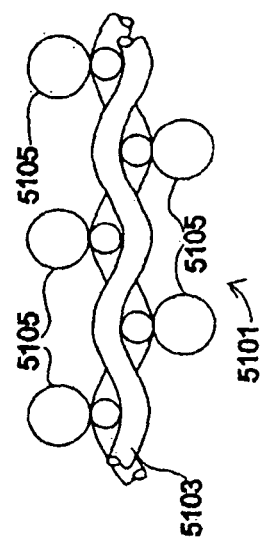
FIG. 51a
FIG. 51b

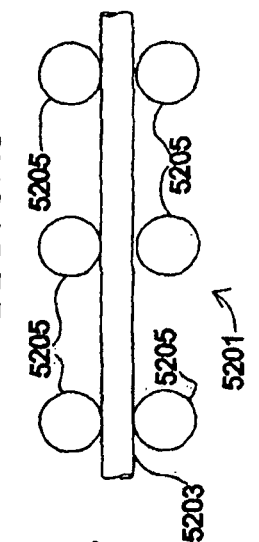
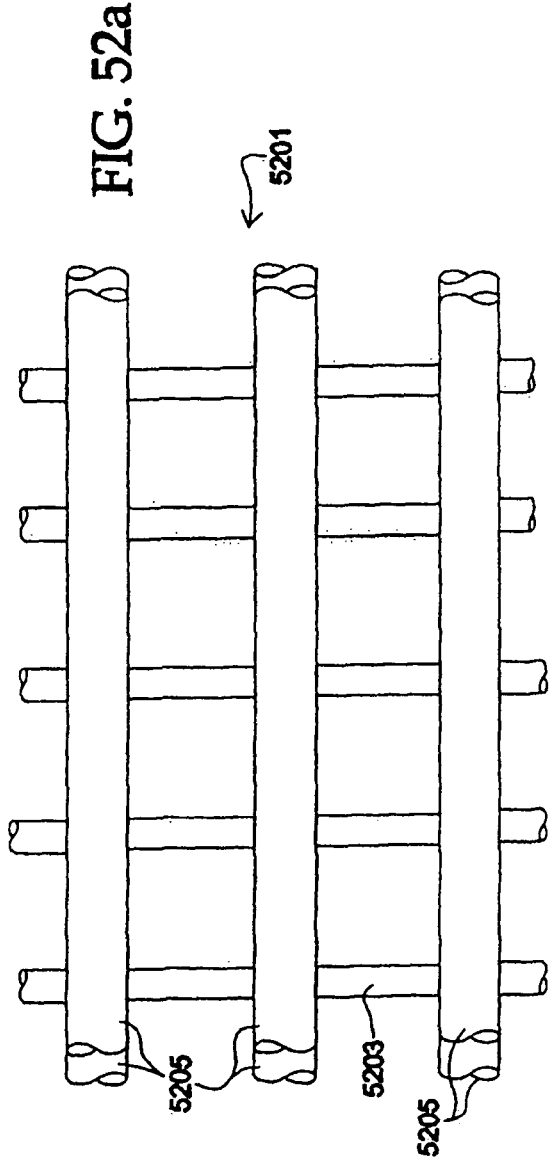
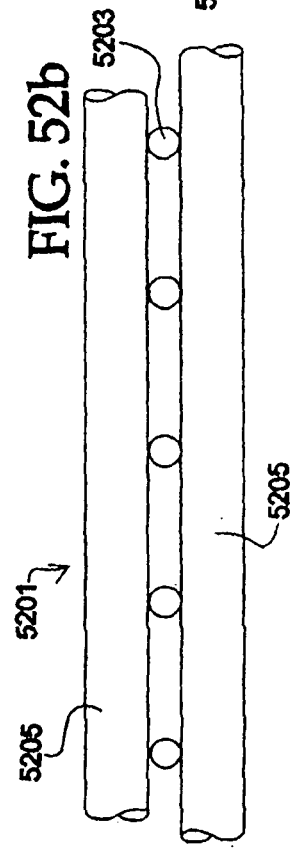
FIG. 52a
FIG. 52b
FIG. 52c

MOBILE STATION AND METHODS FOR DIAGNOSING AND MODELING SITE SPECIFIC FULL-SCALE EFFLUENT TREATMENT FACILITY REQUIREMENTS

RELATED APPLICATION

This application is a Divisional and Continuation-in-part application of U.S. patent application Ser. No. 11/888,512 filed on Aug. 1, 2007 now abandoned by Wiemers et al. and entitled "MOBILE STATION FOR DIAGNOSING AND MODELING SITE SPECIFIC EFFLUENT TREATMENT FACILITY REQUIREMENTS".

FIELD OF THE INVENTION

This invention relates to effluent treatment, and, more particularly, relates to facilities and methods for modeling and evaluating particularized water treatment and water treatment facility requirements, regimens and costs.

BACKGROUND OF THE INVENTION

Most industrial and municipal processes require water treatment facilities to treat effluents returned to the environment. Such facilities typically represent a significant investment by the business/community, and the performance of the facility (or failure thereof) can seriously impact ongoing operations financially and in terms of operational continuity.

Moreover, not all effluent treatment requires the same technologies. Industrial effluents (such as is found at coal bed methane facilities or oil production sites, for example) all have different particulate, pollutant and/or biomass content inherent to both the industrial processes as well as the particular water and soil conditions found at the site. Municipal requirements would likewise vary depending on desired end-of-pipe quality and use (and again depending on the feed water present at the site). Given the expense of full-scale water treatment technology deployment, it would be foolish to plan and build a facility with treatment stages not needed to address the particular problems to be encountered and outcomes desired at the particular treatment site. Thus, accurate site specific evaluation of particular water treatment site requirements and treatment alternatives in advance of treatment plant construction is desirable.

Mobile water treatment facilities have been heretofore suggested and/or utilized to establish water treatment for particular circumstances (see, for example, U.S. Pat. Nos. 5,972,216, 6,464,884, 4,383,920 and 5,547,584 and U.S. Patent Publication No. 2002/0033363). These facilities, however, are typically end use facilities and employ a predetermined set of water treatment regimen. Likewise, transportable mechanisms for previously established water treatment requirements and/or utilizing particular water treatment mechanisms such as reverse osmosis have been heretofore suggested and/or utilized (see, for example, U.S. Pat. Nos. 5,244,579, 5,632, 892, 6,120,688, 5,741,416, and 6,228,255, as well as U.S. Patent Publication No. 2004/0104153). Such mechanisms tend to be limited both in application and adaptability.

At present, treatment plant design and upscaling is based on laboratory/bench scale test tools for small and low risk medium-sized plants, and traditional pilot test tools for higher risk medium-sized and larger treatment plants. Laboratory/bench scale test tools serves only as an orientation test. A successful laboratory/bench scale test will generally demonstrate technical treatment feasibility only. Presently known pilot test tools are often quite limited in scope and are typically based initially on laboratory/bench scale tests, with ongoing pilot design refinement essentially requiring pilot plant redesign for each iteration. In essence, a correctly designed pilot study attempts to duplicate the operating conditions of a proposed full-scale treatment system as closely as possible with suitable components. Higher levels of pilot refinement are thus mostly limited by cost considerations.

Therefore, stations and methods directed to evaluating effluent treatment requirements and plant design options at proposed treatment sites that may vary considerably in terms of effluent conditions and desired treatment outcomes could still be utilized. Moreover, improved treatment technologies adapted to this and other uses can always be utilized given the criticality of provision and maintenance of clean water.

SUMMARY OF THE INVENTION

This invention provides a mobile station and methods for diagnosing, modeling and executing design estimates related to site-specific effluent (primarily raw, waste and/or process water) treatment facility requirements and construction. The station and methods are adaptable and applicable to a wide variety of effluents, and establish real time end of pipe information providing accurate site specific evaluation of particular water treatment facility operational requirements and treatment alternatives in advance of treatment plant construction. Thus full-scale plant operation, reliability, size and cost can be reliably gauged utilizing this invention, thereby reducing financial risk and improving operational continuity over heretofore known and utilized water treatment planning and implementation techniques.

Utilizing the station and methods of this invention, water is diagnosed and processed through the station at a particular treatment site, and data is collected to arrive at a commercial plant design idealized for the particular water/site requirements. The station includes both off the shelf components and components representing other aspects of this invention, and include, for example, means for methane removal, heavy metal oxidization and removal, biomass mitigation, coagulation and removal of solids and colloidal material, membrane treatments, aeration and other post-treatments.

The station employs a four stage evaluation and water treatment regime including initial and ongoing diagnostics/evaluation, pre-treatment suite, polishing treatment array (effluent, or water, polishing, as used herein, refers to primary effluent treatment to a highly developed predetermined state, and includes membrane and/or ion-exchange treatment technologies), and post-treatment suite. The station and design process is quick, cost effective, accurate and relatively simple to deploy. The methods employ mobile station site set-up, evaluation and water treatment to establish end-of-pipe information on operation, reliability, size and cost for deployment of a fully functional permanent treatment plant for the site.

The mobile station includes a mobile platform having power intake, effluent intake and fluid outflow facilities. A first suite of selectably actuatable effluent pre-treatment apparatus is housed by the mobile platform and connected with the effluent intake facility. A second suite of selectably actuatable effluent pre-treatment apparatus is operationally associated with the first suite of pre-treatment apparatus. An effluent polishing treatment array housed by the mobile platform is connected with the suite of pre-treatment apparatus, and a suite of selectably actuatable effluent post-treatment apparatus is connected with the polishing treatment array and the fluid outflow facility of the mobile platform.

Controls are connectable with the power intake facility and various components housed at the mobile platform for process control, testing and data accumulation, and to report a site specific effluent treatment regimen and effluent treatment facility model.

The methods of this invention aid in the diagnosing and modeling of site specific water treatment facility requirements to arrive at a proposed commercial plant model idealized for the particular water/site requirements. The methods include the steps of analyzing feed water to be treated at the site and establishing a preliminary treatment model. A treatment regimen is selected from a plurality of available treatment technologies and the feed water is then treated on site at a temporary facility having the plurality of treatment technologies available thereat in accord with the model. Data is compiled at the facility related to feed water treatment and treatment efficacy is reported. When treatment goals are not met by the preliminary treatment model, a revised treatment model is established. When treatment goals are met by any one of the models, the proposed commercial plant model is established.

More particularly, the methods of this invention are utilized for diagnosing and modeling site specific effluent treatment facility requirements at a mobile facility to arrive at least at one proposed full-scale plant model optimized for the particular effluent and treatment site requirements and for full-scale plant treatment goals. The mobile facility is preferably positioned at the treatment site and has a plurality of available down-scaled treatment technologies and a plurality of evaluation instrumentation therein. Raw effluent is analyzed to provide a field of raw effluent condition entry values. Treatment goals are determined for the raw effluent to provide a field of treated effluent condition entry values. Both of the fields include substantially the same entries.

The fields are utilized to determine an initial treatment model including a selection of, and use parameters for, treatment technologies from the plurality of available down-scaled treatment technologies at the facility, as well as to reject use of other treatment technologies available at the facility. Raw effluent is then treated in accord with the model and model efficacy is evaluated at the facility.

Selected ones of the evaluation instrumentation at the facility are used to continuously provide data regarding effluent treatment related to a subset of the fields, the data and the subset of related entry values of the fields used to determine when treatment goals are not met by the initial treatment model and to continuously establish revised models during ongoing effluent treatment. When treatment goals are met by any one of the models, a proposed full-scale plant mode 1 is established.

It is therefore an object of this invention to provide mobile stations and methods for diagnosing and modeling site specific effluent treatment facility requirements.

It is another object of this invention to provide mobile stations and methods for diagnosing, modeling and executing design estimates related to site-specific raw, waste or process water treatment facility requirements and construction.

It is another object of this invention to provide effluent treatment stations and methods that are adaptable and applicable to a wide variety of effluents, and provide accurate site specific evaluation of particular water treatment site requirements and treatment alternatives in advance of treatment plant construction.

It is still another object of this invention to provide mobile facilities and methods for diagnosing and processing water at a particular treatment site, and collecting data therefrom to arrive at a proposed commercial plant design idealized for the particular water/site requirements.

It is yet another object of this invention to provide a station for diagnosing and modeling site specific effluent treatment facility requirements that employs a four stage evaluation and water treatment regime including diagnostics/evaluation, pre-treatment suite, polishing treatment array, and post-treatment suite.

It is another object of this invention to provide a mobile station and methods for diagnosing and modeling site specific effluent treatment facility requirements wherein the design station and processes are quick, cost effective, accurate and relatively simple to deploy.

It is still another object of this invention to provide a method for diagnosing and modeling site specific effluent treatment facility requirements at a mobile facility positioned at the treatment site and having a plurality of available down-scaled treatment technologies and a plurality of evaluation instrumentation therein to arrive at least at one proposed full-scale plant model optimized for the particular effluent and treatment site requirements and for full-scale plant treatment goals that utilize the steps of analyzing raw effluent to be treated at the site to provide a field of raw effluent condition entry values, determining treatment goals for the raw effluent to provide a field of treated effluent condition entry values, both of the fields including substantially the same entries, utilizing the fields to determine an initial treatment model including a selection of, and use parameters for, treatment technologies from the plurality of available down-scaled treatment technologies at the facility, utilizing the fields to initially reject use of a selection of other treatment technologies from the plurality of available down-scaled treatment technologies at the facility, and treating raw effluent in accord with the model and evaluating model efficacy at the facility.

It is yet another object of this invention to provide a method for diagnosing and modeling site specific effluent treatment facility requirements at a mobile facility having a plurality of down-scaled treatment technologies and a plurality of evaluation instrumentation therein to arrive at least at one proposed full-scale plant model optimized for the particular effluent and treatment site requirements and for full-scale plant treatment goals that includes the steps of analyzing raw effluent to be treated at the site to provide a field of raw effluent condition entry values, determining treatment goals for the raw effluent to provide a field of treated effluent condition entry values, both of the fields including substantially the same entries, utilizing the fields to determine an initial treatment model including a selection of, and use parameters for, treatment technologies from the plurality of down-scaled treatment technologies at the facility, treating raw effluent at the facility in accord with the model, utilizing selected ones of the evaluation instrumentation at the facility to continuously provide data regarding raw effluent treatment related to a subset of the entry values of the fields, determining from the data and from the subset of the entry values of the fields when treatment goals are not met by the initial treatment model and continuously establishing revised models during ongoing effluent treatment, and, when treatment goals are met by any one of the models, establishing a proposed full-scale plant model.

It is still another object of this invention to provide a method for diagnosing and modeling site specific water treatment facility requirements to arrive at a proposed commercial plant model optimized for the particular water/site requirements that includes the steps of obtaining an analysis of feed water to be treated at the site, locating a temporary facility at the site, the facility having a plurality of available treatment technologies located therein, establishing a preliminary treatment model at the facility based on the analysis and treatment goals, selecting a treatment regimen utilizing selected ones of the plurality of available treatment technologies at the facility and in accord with the treatment model, treating the feed water at the facility in accord with the regimen, compiling data at the facility related to feed water treatment and reporting treatment efficacy, determining at the facility when treatment goals are not met by the preliminary treatment model and establishing a revised model and regimen, and, when treatment goals are met by any one of the models, establishing the proposed commercial plant model.

It is yet another object of this invention to provide a method for diagnosing and modeling site specific water treatment facility requirements to arrive at a proposed commercial plant model optimized for the particular water/site requirements, the method including the steps of analyzing feed water to be treated at the site, establishing a preliminary treatment model, selecting a sequential treatment regimen from a plurality of available treatment technologies in accord with the treatment model, treating feed water on site in accord with the model at a temporary facility having the plurality of treatment technologies available thereat, compiling data at the facility related to feed water treatment and reporting treatment efficacy, when treatment goals are not met by the preliminary treatment model, establishing a revised model, and when treatment goals are met by any one of the models, establishing the proposed commercial plant model.

It is yet another object of this invention to provide a mobile station for diagnosing and modeling site specific effluent treatment facility requirements including a mobile platform having power intake, effluent intake and fluid outflow facilities, a first suite of selectably actuatable effluent pre-treatment apparatus housed by the mobile platform and connected with the effluent intake facility of the mobile platform, an effluent polishing treatment array housed by the mobile platform and connected with the suite of pre-treatment apparatus, a suite of selectably actuatable effluent post-treatment apparatus housed by the mobile platform and connected with the polishing treatment array and the fluid outflow facility of the mobile platform, and control means connectable with the power intake facility of the mobile platform for process control and data accumulation to thereby optimize a site specific effluent treatment regimen and establish a site specific effluent treatment facility model.

With these and other objects in view, which will become apparent to one skilled in the art as the description proceeds, this invention resides in the novel construction, combination, and arrangement of parts and methods substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIGS. 50a through 50c show a first embodiment of a spacer arrangement for use in axial vibratory membrane separation modules;

FIGS. 51a and 51b illustrate a second embodiment of the spacer arrangement for axial vibratory membrane separation modules;

FIGS. 52a through 52c show a third embodiment of the spacer technology for axial vibratory membrane separation modules;

DESCRIPTION OF THE INVENTION

Figure 1:
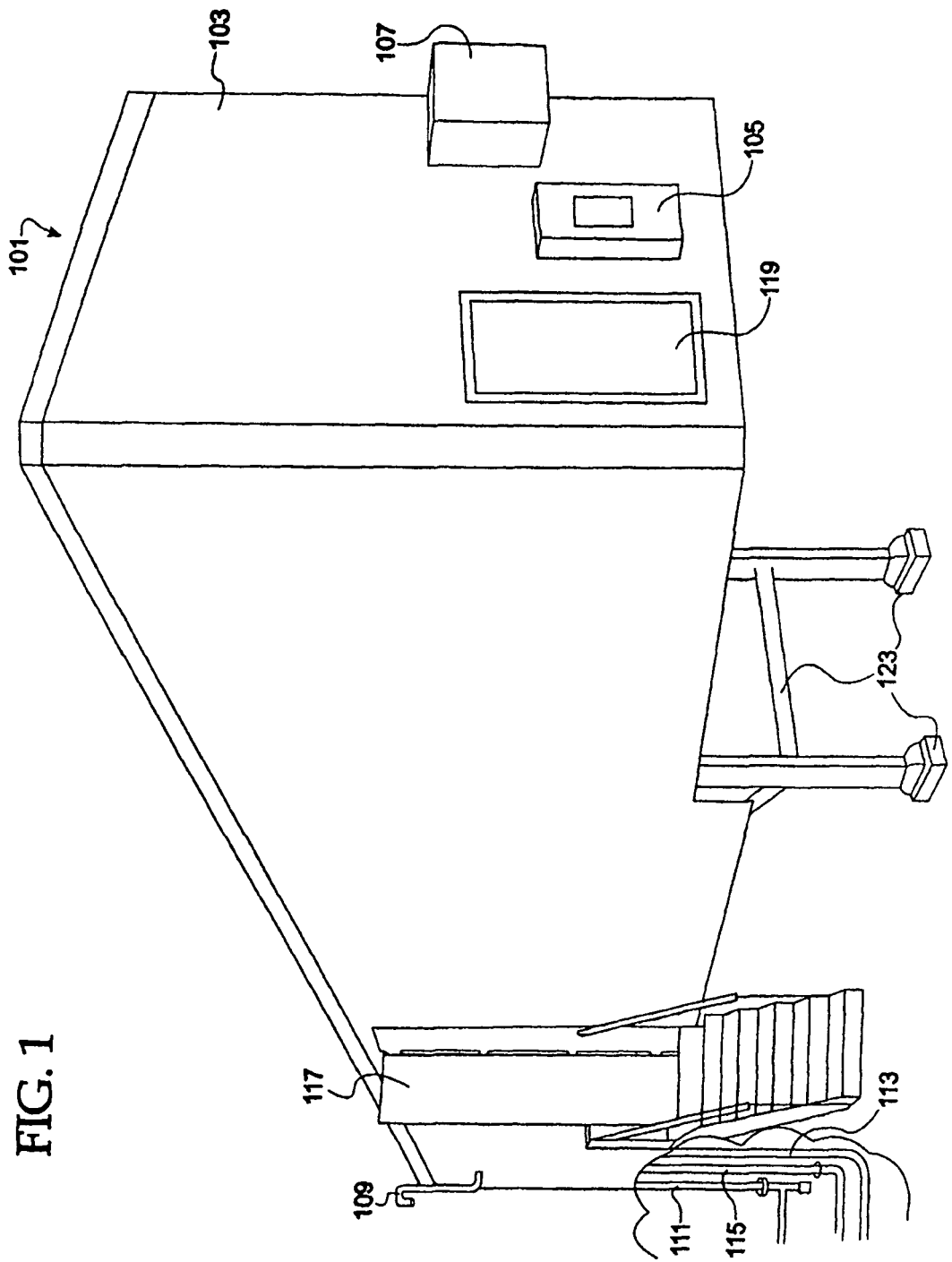
FIG. 1 is a perspective view showing the exterior of the mobile effluent evaluation and treatment station of this invention.

FIG. 1 shows the trailerized mobile diagnostic and treatment modeling pilot station 101 of this invention. The station is housed in compact tractor towed trailer 103 (for example 8' by 48'). The treatment facilities occupy an area of approximately 8' by 30' in the trailer (240 square feet), the remaining 18 feet utilizable for other functions such as a lab/office and shop space. The height of the station is approximately 8 feet. Trailer 103 includes power intake and communications access panels 105 and 107, respectively, vacuum exhaust 109, and effluent connection ports 111, 113 and 115 (effluent feed intake (a 1.5 inch line), treated fluid outflow (a 1" line) and recirculated return, respectively). Primary and emergency access structures 117 and 119, respectively, provide for access to the station.

Mobile station 101 is configured for diagnosing and modeling site specific effluent treatment facility requirements, and is thus primarily for use as a temporary facility for water quality analysis, treatment modeling, selective contaminated water processing. Data accumulated at a particular treatment site is then utilized to arrive at a proposed commercial water treatment plant model idealized, or optimized, for the particular water/site requirements. Station 101 includes down-scaled tools for water treatment of many different technological types, only some of which would be deployed in any given plant (when design is up-scaled) but which are made available in station 101 to assure modeling flexibility across many raw water types and many treatment goals (in terms of output water quality, plant efficiency and plant/operational costs). This redundancy of technological tools and tool application interrelationship flexibility is more fully detailed hereinbelow.

Station 101 incorporates 19 major treatment stages, or steps, as discussed hereinafter, as well as diagnostic, testing and control equipment. A field generator, where required (see FIGS. 2 and 3, generator facility 121), must provide for a maximum load of 220 amps. The stations normal load is 165 amps, 230 VAC. The minimum generator power requirement is 60 kW.

The 19 major treatment stages, or steps, at mobile pilot station 101 represent all technologies which can be practically applied in a given effluent treatment environment (for example, CBM-produced water treatment) in order to allow selective combination of treatment options to provide real time operating fluid treatment diagnosis subject to local process control. In this manner, and utilizing programs and methods of this invention, optimized site specific water treatment regimes and plant performance can be gauged at the site, with upscaling of parameters provided for full-size commercial plant design modeling and associated design and/or treatment cost estimate development (on site and/or remotely by communication link).

Figure 2:
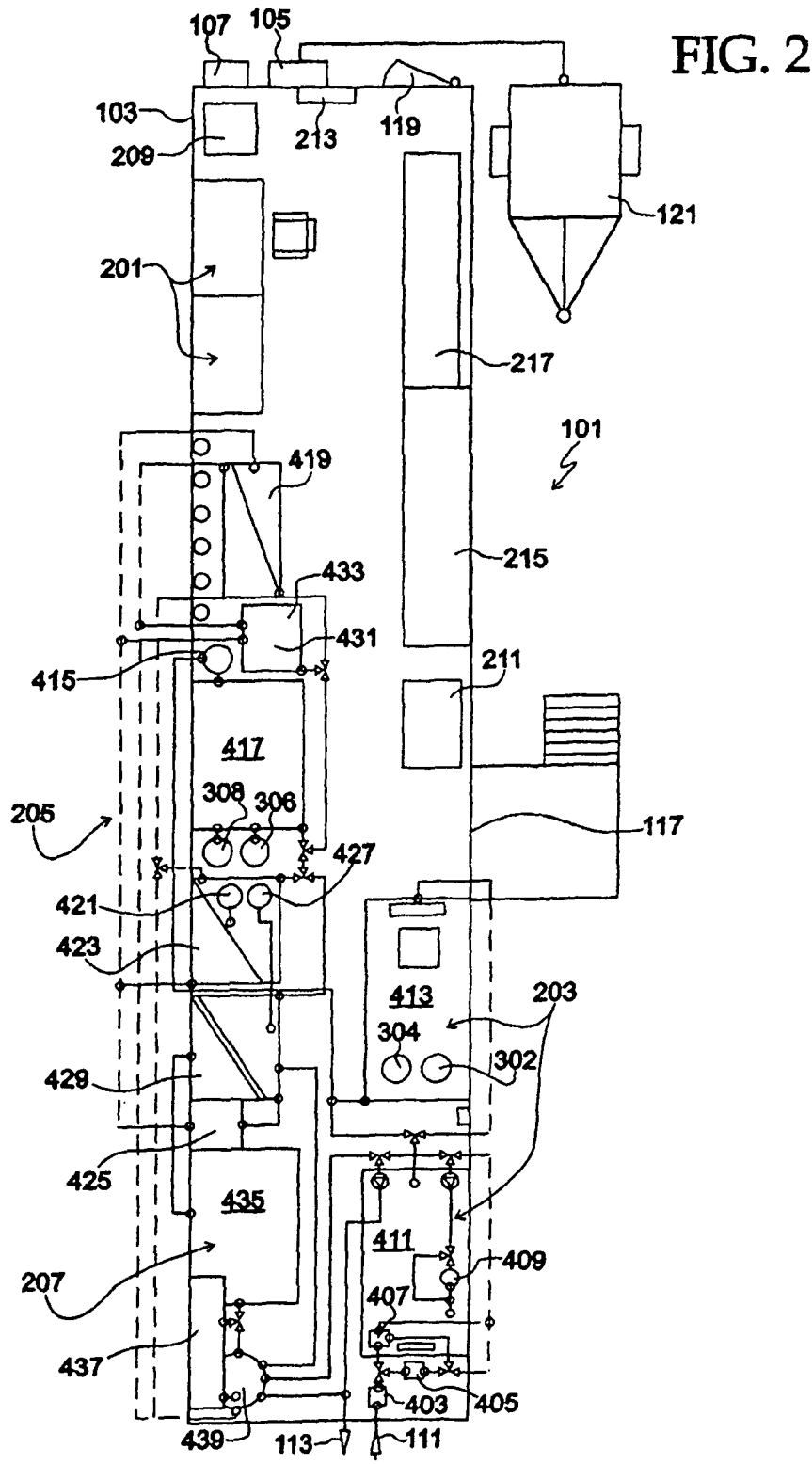
FIG. 2 is a diagrammatic floor plan of the station of FIG. 1.
Figure 3:
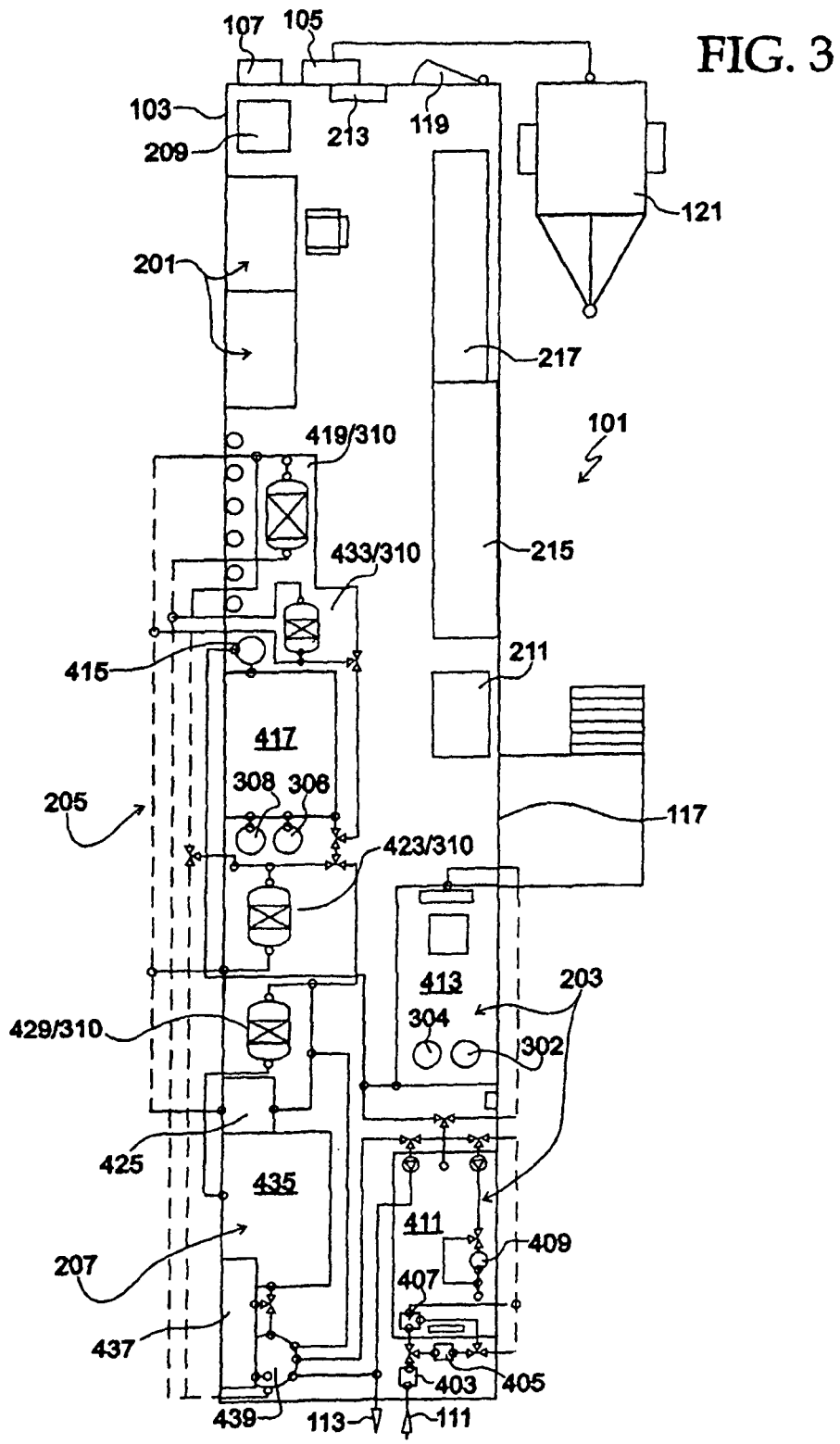
FIG. 3 is an alternative diagrammatic floor plan of the station of this invention showing a different configuration of treatment options.

Turning to FIGS. 2 and 3, there are four major phases of planning and treatment in station 101 that together enable establishment of a full-scale plant design. These phases are diagnostic and evaluative (both initial and ongoing) 201, centralized control managing testing, processes and data accumulation, at least one pre-treatment suite (preferably two suites) of water treatment apparatus 203, a polishing treatment array (primary water treatment phase) which may include ion-exchange and/or membrane treatment systems 205, and a post-treatment suite of water treatment apparatus 207.

As utilized herein, a full-scale (or full size) plant design refers to full-scale effluent treatment facilities of the types used for municipal and industrial fluid (water) treatment. Industrial full-scale plants are found at chemical, pharmaceutical and oil production/extraction operations. Full-scale plant throughput is typically greater than 1,000 BPD (barrels per day), with effluent intake line sizes from 3 to 12 inches.

In addition, station 101 includes an isolation transformer 209, master control panel 211 (housing various switching and the like for motor controlled valves, motors, pumps and other units), power control switch panel 213, membrane testing station and work bench 215 and mechanical services and storage area 217.

The trailerized station is typically sited inside a lined pit and is leveled utilizing blocks and/or support legs 123 (FIG. 1). The lined pit provides positive containment for spilled fluids in case of catastrophic failure and includes a dewatering pump. Station 101 typically is operated in a semi-wet environment, and free running fluids may accumulate from sources such as sampling points, fluid testing locales, equipment change locations, repair, preventive maintenance and cleaning operations, operational condensation and the like. In many cases, such fluids must be contained. It is therefore best when siting station 101 to also locate a spill pan beneath station 101.

Primary fluid transfer is provided and controlled by two electrical solenoid valves for feed and return fluids, each having manual override capability. The solenoid valves are of the normally closed category, so that, in case an event requiring emergency shutdown occurs, no fluid is transferred into or out from station 101.

Figure 4:
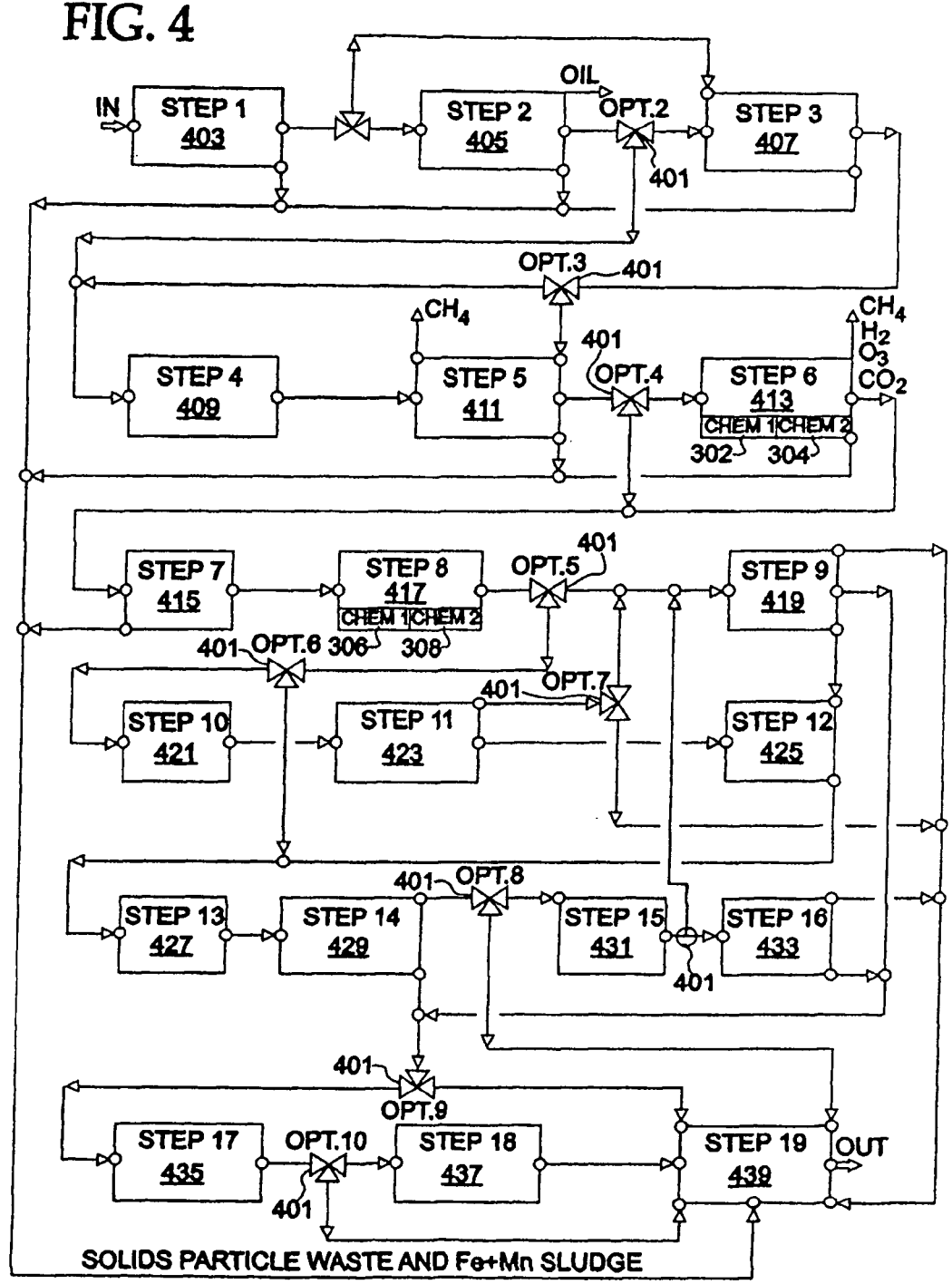
FIG. 4 is a block diagram illustrating the phased functions of the station of FIG. 1.
Figure 6A:
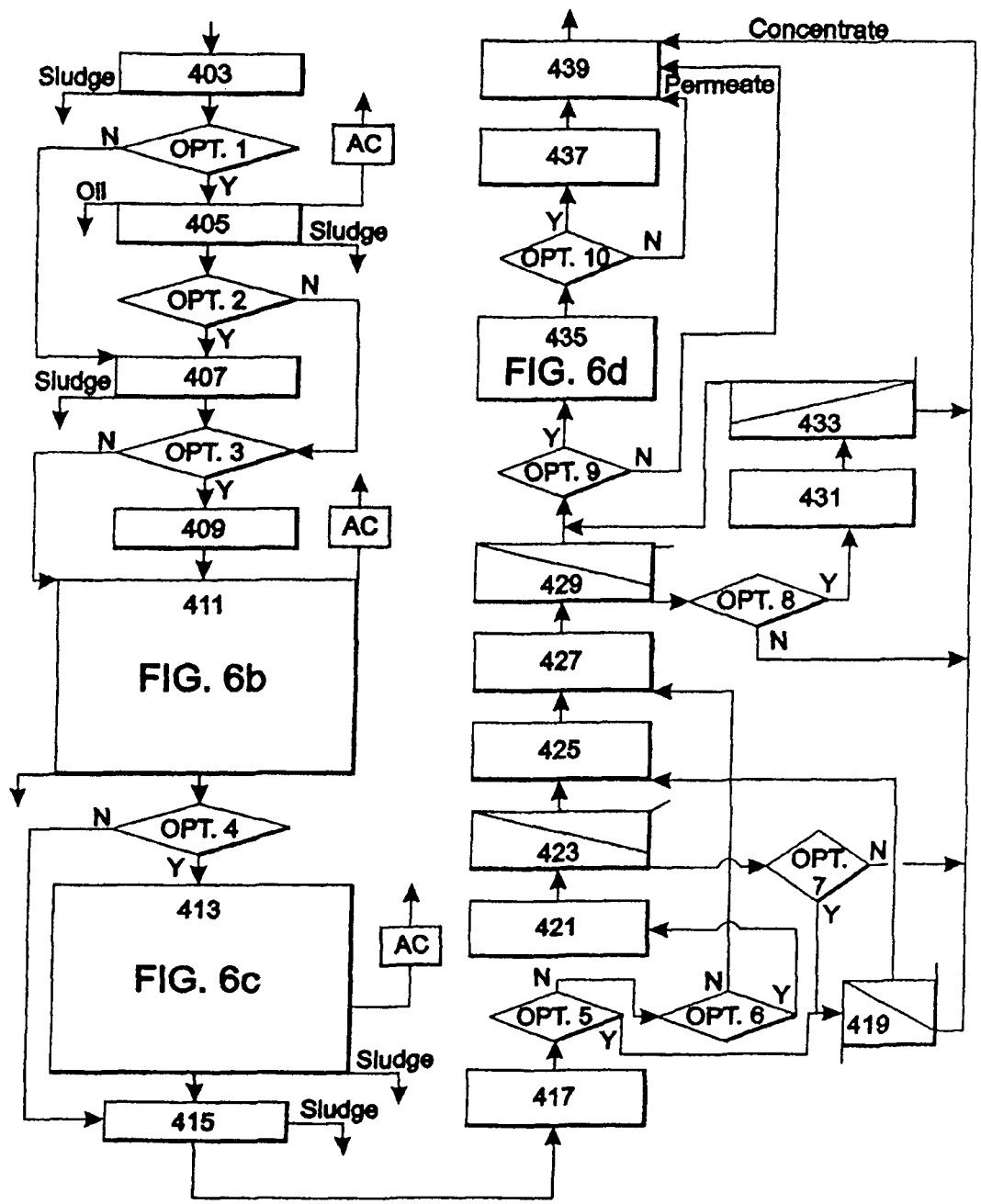
FIGS. 6a through 6d are flow charts illustrating treatment option selection and implementation in the station of FIG. 1.

FIG. 4 shows the interrelationship of the 19 treatment steps contained by station 101 (location of some of which may also be seen in FIG. 2 or 3). The option numbers located at three-way valves 401 refer to automated or override manual flow control options for different treatment regimes (discussed further with reference to FIG. 6a). Stage 403 (step 1) is a dual strainer receiving feed effluent and removing particulates down to about 500 μm (for example, the model 120 dual strainer produced by Plenty Products, Inc.). Stage 405 (step 2) provides oil separation from the feed flow utilizing a separator (for example, a Highland Tank & Mfg. Co. R-HTC Oil/Water Separator with Petro-Screen and parallel corrugated plate coalescers). Stage 407 (step 3) is an automatic backflush filter providing particle removal down to the 100 μm range or better (a TEKLEEN self cleaning bell filter setup with GB6 electric controller by Automatic Filters, Inc., or similar filter setups by Amiad Filtration Systems, could be utilized for example).

Stage 409 (step 4) provides inline direct feed effluent (water) heating. Feed water heating is required in many treatment settings due to seasonal operations, and further benefits many downpipe treatment options by breaking feed water alkalinity, enhancing $CH_4$ gas removal, ensuring proper membrane (where present) permeate flux for an overall constant permeate flow yield, and the like. Either of two types of inline heating systems may be utilized, as more fully detailed below.

Stage 411 (step 5) is a first suite of pre-treatment apparatus including eight apparatus (all eight are preferred, but fewer could be provided in some applications). These apparatus provide, as more fully detailed below, on-line diffusive effect (ODE) membrane aeration, fluid density reduction, modified vacuum tower or cascade series waterfall degassing, air stone degassing, modified venturi gas evacuation, fine filtration, lamella plate clarification, and sludge chamber concentration.

Stage 413 (step 6) is a second suite of pre-treatment apparatus including ten apparatus (all ten are preferred, but fewer could be provided in some applications). As more fully detailed herein below, the ten apparatus provide pH adjustment (via injection pump 302 of FIGS. 2 through 4), chemical dosing (via injection pump 304 of FIGS. 2 through 4), ODE/IDI (inline diffusive ionization) membrane aeration, ionized air/gas treatment, electrocoagulation, dissolved air/gas flotation, vacuum introduced cyclone separation, vacuum degassing, lamella plate clarification, and sludge chamber concentration.

Stage 415 (step 7) provides a bag filter and/or belt filter assembly (for example, fabric filtration systems sold by SERFILCO) for filtration down to about the 1 μm range. Stage 417 (step 8) is a homogenizing and buffer tank with pH adjustment and chemical dosing (at injection pumps 306 and 308, respectively). Stage 419 (step 9) is the first of the polishing treatment array (stages 419 through 433, steps 9 through 16), and may include any of several membrane treatment apparatus (as shown in FIG. 2) in accord with this invention as more fully detailed hereinafter providing nanofiltration, microfiltration, ultrafiltration, and/or known ion-exchange treatment technology (as shown in FIG. 3 at 310). Stage 419, as is apparent, is an option for up-concentrating effluent to increase overall flow yield.

Stage 421 (step 10) provides antifouling and antiscaling chemical treatment to prevent fouling and scaling of membranes by keeping low molecular weight components in solution (foremost of which are divalent and multivalent cations). Known variable speed tubing pumps could be utilized for insertion. Stage 423 (step 11) provides filtration for removal of low molecular weight components (Al, Fe, Mg and Mn, for example) and/or colloidals utilizing membrane treatment filtration (nano-, micro-, and/or ultra-filtration; see FIG. 2) and/or ion-exchange treatment (FIG. 3). Stage 425 (step 12) provides a buffer tank for step 14 for process flow control (for example a Snyder horizontal leg tank by Harrington). Stage 427 (step 13) provides antiscaling chemical treatment addressing monovalent and a few divalent cations and anions (Ba, Ca, Na, Sr, $CO_3F$, $HCO_3$, and $SO_4$ for example). Again, known variable speed tubing pumps could be utilized for insertion.

Stage 429 (step 14) addresses removal of low molecular weight components (salts, for example) utilizing reverse osmosis membrane treatment (FIG. 2), ion-exchange treatment (FIG. 3) and/or plate distiller treatment. Stage 431 (step 15) is a high pressure buffer tank providing flow control for step 9 and/or 16. Stage 433 (step 16) provides up-concentration of concentrate flow from stage 429 to further increase flow yield, and may utilize reverse osmosis membrane treatment (FIG. 2), ion-exchange treatment (FIG. 3) and/or high efficiency electrodialysis technology (for example, a HEED assembly by EET Corporation), a hybrid process including both electrodialysis and reverse osmosis approaches.

Stage 435 (step 17) is a suite of four post-treatment apparatus as more fully detailed herein below, and including activated carbon filtration for gas absorption (Ametic filter chambers by Harrington, for example), sodium absorption ratio compensation, utilizing a dolomite filter for example, UV treatment (for example, an SP or SL series unit from Aquafine Corporation), and membrane aeration for $O_2$, saturation (preferably utilizing an ODE system in accord with yet another aspect of this invention).

Stage 437 (step 18) provides bio-monitoring utilizing an 10 gallon aquarium with the operating volume passing through either a sterilizer or other aquarium device to prevent in situ bio-contamination from waste and nutrients. The sterilizer or other device must match the maximum produced permeate flow of at the rate of approximately one gallon per minute for real time bio-monitoring. Since the sterilized water from station 101 is always being mixed with unsterilized water, it is not possible to completely purify it, but a sterilized percentage exceeding 99.9% is acceptable for the bio-monitoring step sensitivity. Stage 439 (step 19) conventionally provides waste collection and purified feed return.

Regarding the ion-exchange treatment alternative at stages 419, 423, 429, and 433 (steps 9, 11, 14 and 16), this process is a well known water treatment process for removing ions from solution by exchanging cations or anions between the dissolved phase and counter ions on a matrix such as organic zeolite, in which $Ca_2^+$ ions in solution displace $Na^+$ ions in the zeolite, montmorillonite (a colloidal bentonite clay) or synthetically produced organic resins, for example.

An organic ion exchange resin is composed of high molecular-weight polyelectrolytes that can exchange their mobile ions for ions of similar charge from the surrounding medium. Each resin has a distinct number of mobile sites that set the maximum quantity of exchanges per unit of resin. Ion exchange reactions are stoichiometric and reversible.

Commercially available ion-exchange treatment technology, such as those from Hidrofilt Kft, can be utilized alone as an alternative to the hereinafter detailed membrane treatment technology or may supplement specific membrane technology. The implementation of ion-exchange technology depends on the specific application and project economics (the less complex and labor-intensive state of the art ion exchange technology may be used as a single polishing step instead of membrane treatment where cost is a factor and desired treatment outcomes warrant the tradeoff).

In some settings, primarily depending on the intended use of the purified water, complete deionization (replacement of all cations by the hydrogen ion as well as replacement of all anions by the hydroxide ion) may be required. In such case, commercial cation- and anion-exchange technology will be employed as a polishing treatment step alone or in addition to membrane treatment (again depending on the end-of-pipe outcomes desired). For example, a feed water with total dissolved solids of less than about 500 mg/L is ideally suited for ion exchange technology in combination with reverse osmosis membrane treatment. In other words, after membrane treatment at step 14 (429), the produced permeate is fed into a strongly acidic cation exchanger followed by a strongly basic anion exchanger (substituting for both steps 15 and 16). Such systems are commercially available from KINETICO, REMCO ENGINEERING and others.

Figure 5:
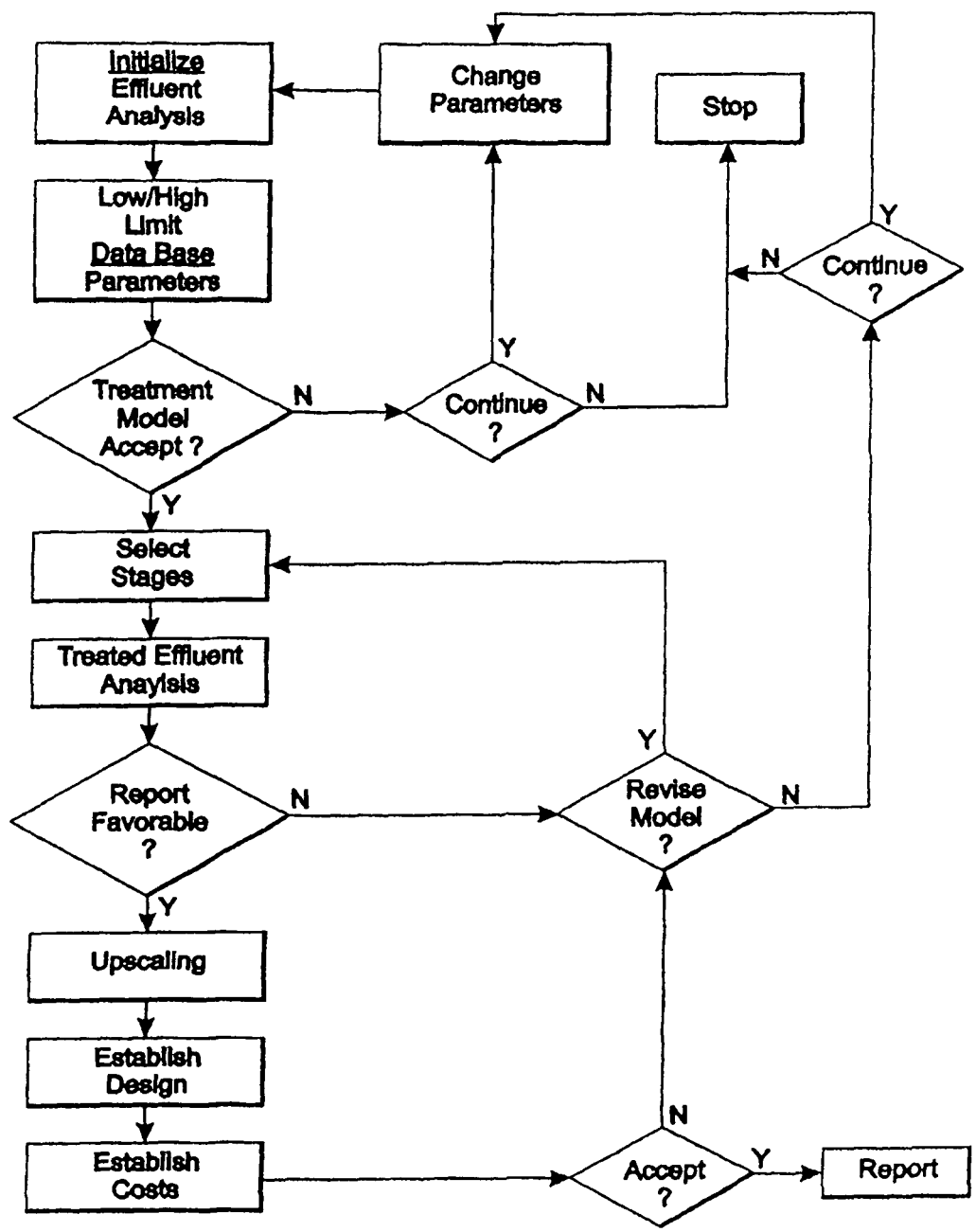
FIG. 5 is a flow chart showing overall process controls utilized by the station of FIG. 1.

Turning now to FIG. 5 summarily illustrating the method of operation of station 101 under process control, after initialization of the system the effluent to be treated is subjected to testing along a variety of parameters discussed hereinafter. A low/high limit data base is utilized together with selected treatment outcomes (parameters) to establish a treatment model. If the model is acceptable, treatment stages (as discussed above) are selected and implemented at station 101. If the model is unacceptable for any reason, the process may be halted or treatment parameters altered and effluent testing conducted accordingly (retesting may be omitted in most cases unless new parameters require different testing combinations).

Ongoing testing at various junctures in the staged processing of feed water is input into the system to gauge effectiveness of effluent treatment stages selected. If treatment reporting is unfavorable, the treatment model may be revised in accord with testing, or treatment parameters may be changed and the process restarted. If treatment reporting is favorable, the selected model and stages are upscaled to commercial plant proportions, and plant design, plant costs and/or treatment cost outputs are reported. If the report is acceptable, it is finalized. If not acceptable (for economic or other reasons), model revision or parameter changes may be undertaken.

FIGS. 6 (*a* through *d*) further illustrate treatment option selection and implementation in station 101. The process options (Opt. 1 though 10) correspond to the same options in FIG. 4 made by operation of the various valves 401. In FIG. 6*a*, "AC" refers to activated carbon venting. After straining, the first control option allows omission of oil separation step 405. Option 2 allows automatic back flush filter 407 to be omitted from the treatment chain. Option 3 directs treatment flow to either pre-treatment suite 411 or heater 409. Option 4 allows omission of pre-treatment suite 413, while valve option 5 directs flow selectively to treatment apparatus 419. Option 6 allows omission of chemical dosing step 421, treatment step 423 and buffer tank 425 in the processing chain. Option 7 selects either upconcentrating of concentrate from treatment step 423 at treatment 419 or omission thereof, and option 8 selects whether or not to upconcentrate concentrate from treatment step 429 at steps 431 and 433. Option 9 allows omission of post-treatment suite 435 and biomonitoring 437, while option 10 selects for omission of only the biomonitoring step.

Figure 6B:
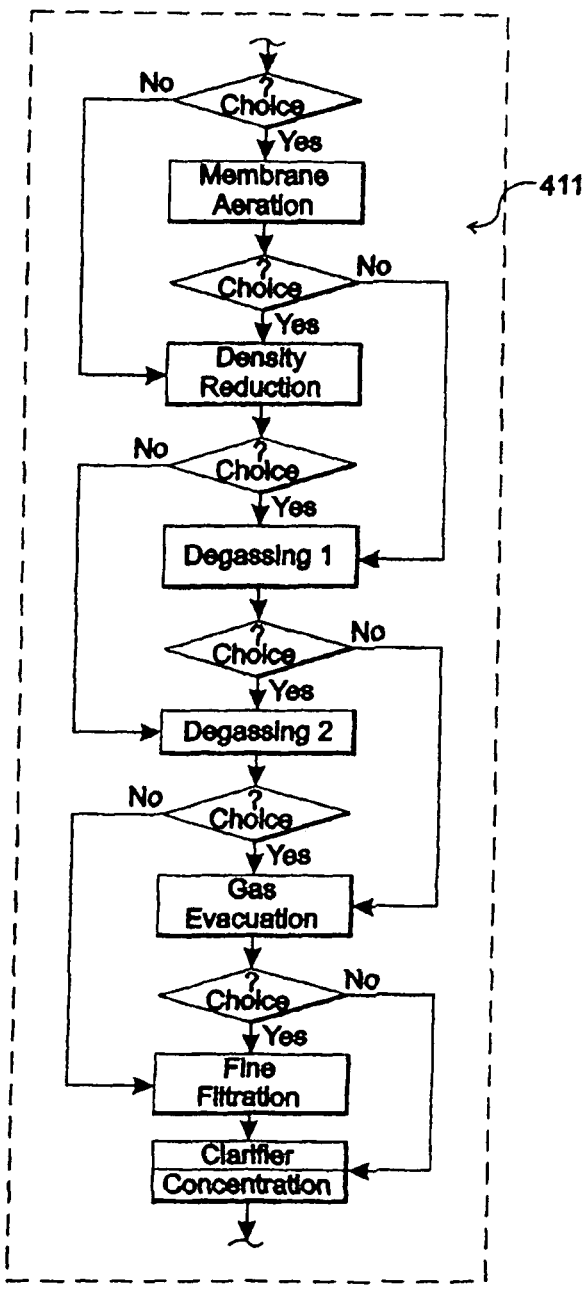
Figure 6C:
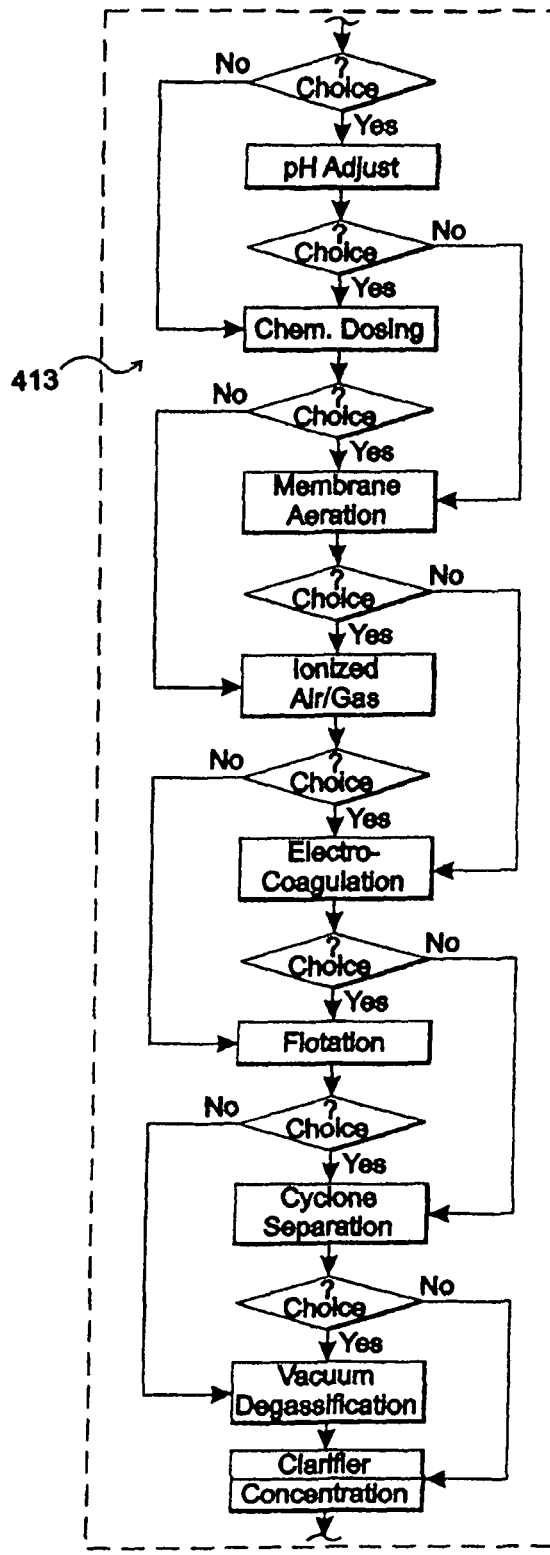
Figure 6D:
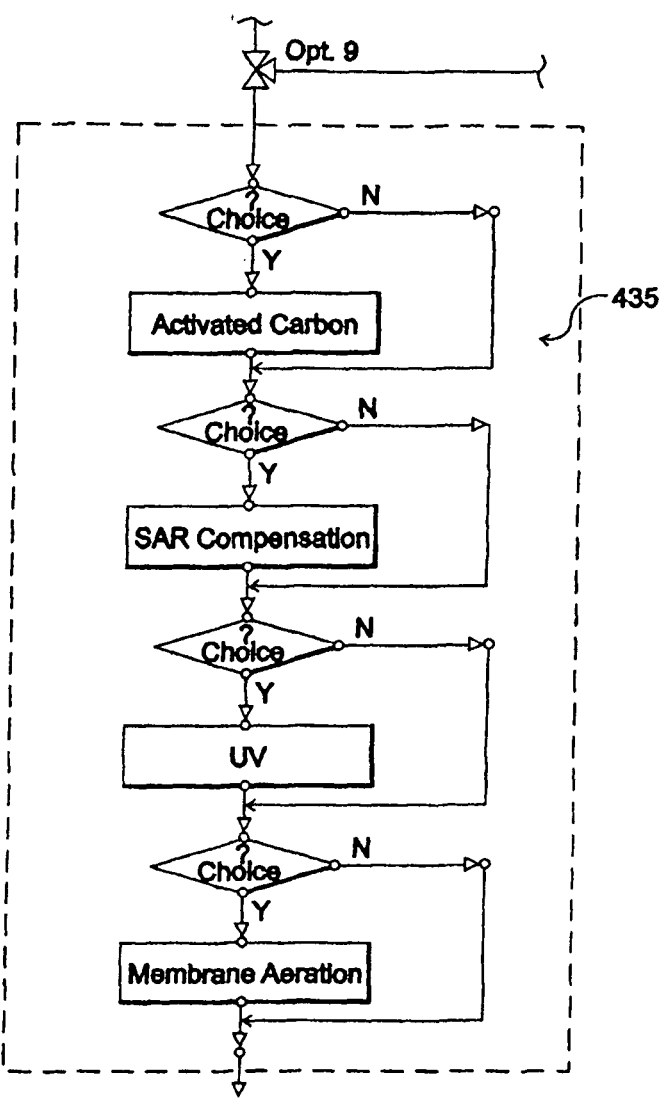

In FIGS. 6*b* and 6*c*, control functions of the plurality of treatment apparatus of first and second pre-treatment suite stages 411 and 413 are illustrated. Each choice allows omission of the immediately following treatment apparatus step and choice. FIG. 6*d* illustrates that each of the treatment apparatus options of post-treatment suite stage 435 may be bypassed (as may the suite itself).

Figure 7:
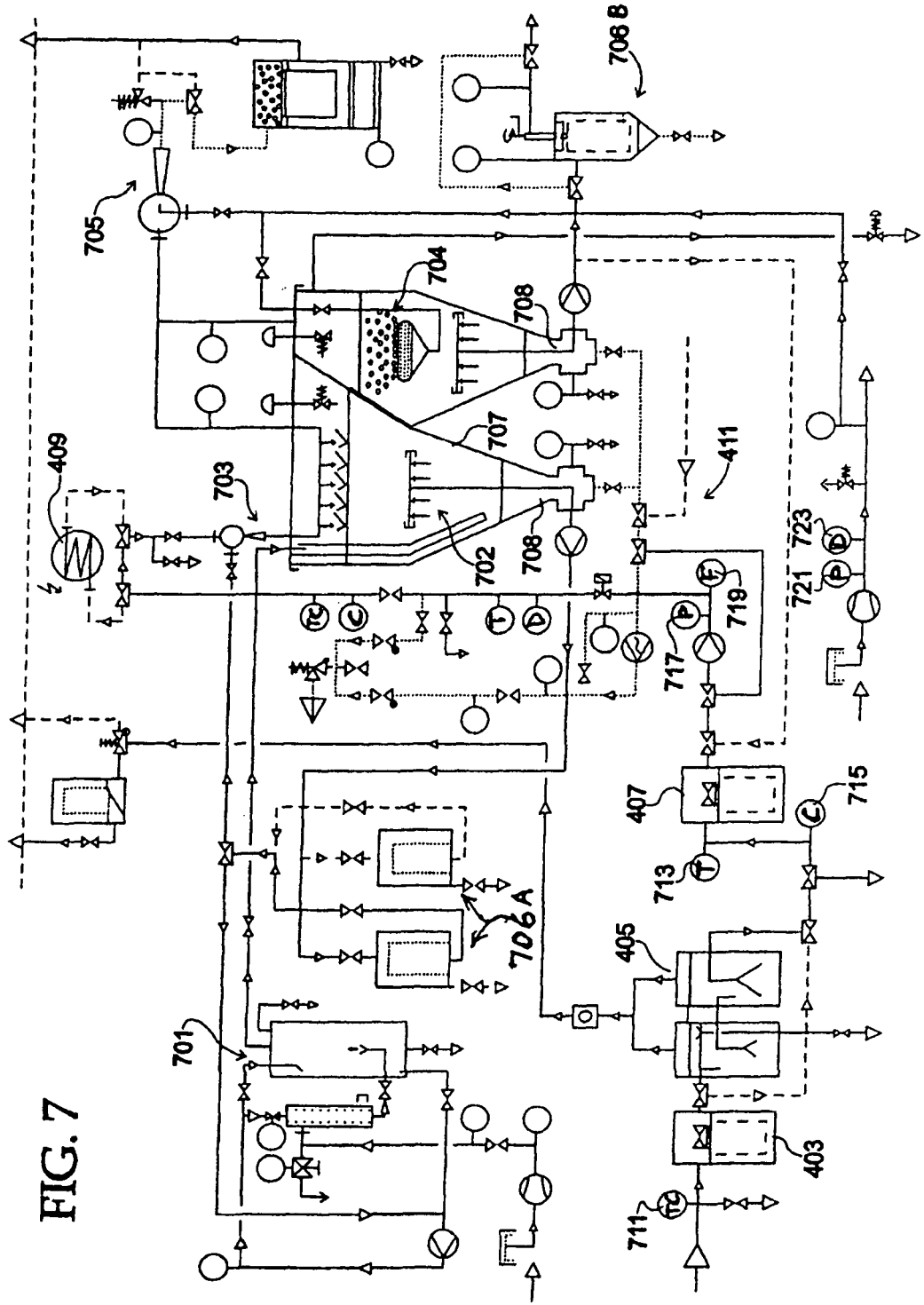
FIG. 7 is a diagram illustrating pre-treatment sampling/testing locations for real time fluid testing and reporting to program control.
Figure 8:
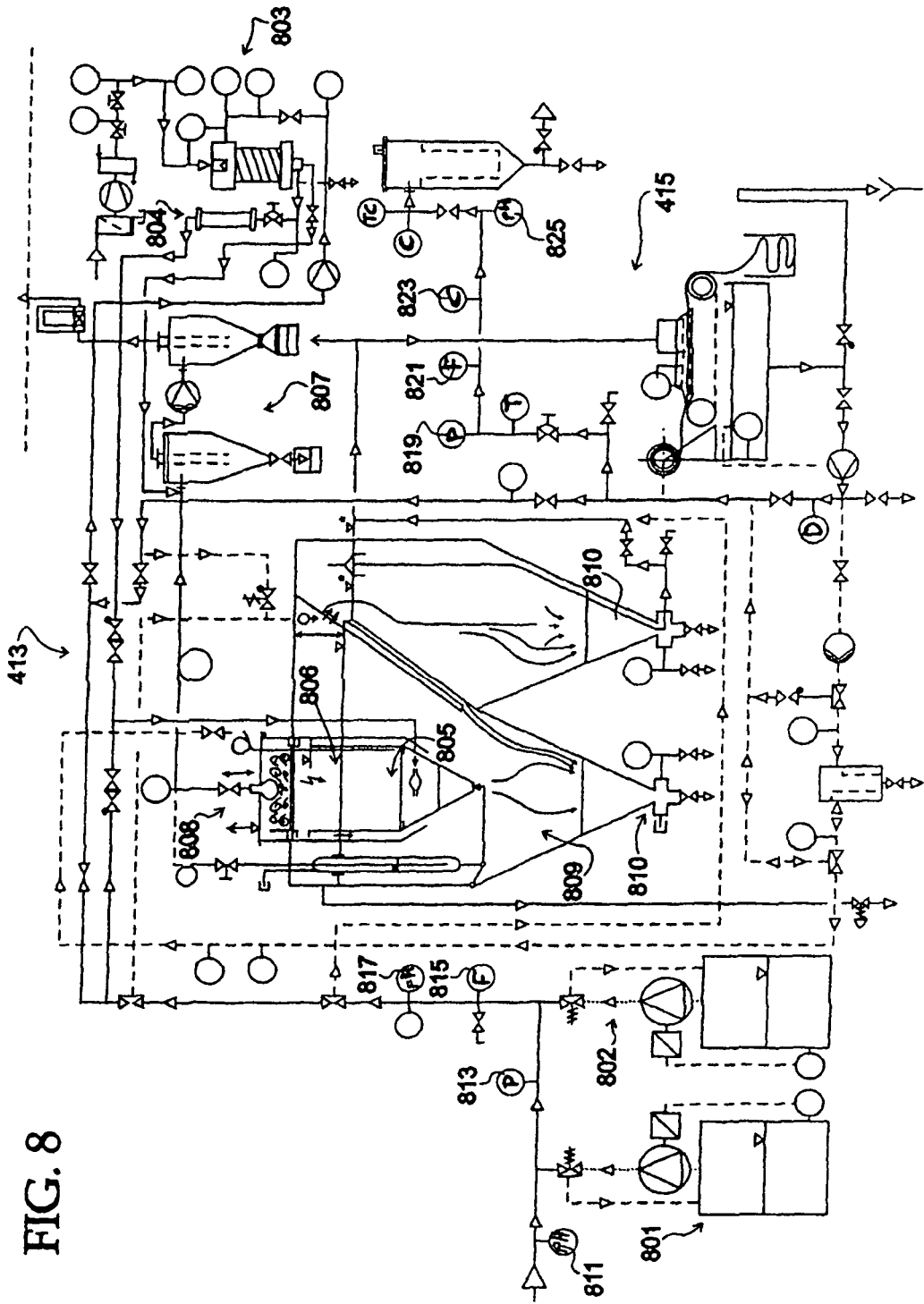
FIG. 8 is a diagram illustrating other pre-treatment sampling/testing locations for real time fluid testing and reporting.
Figure 9:
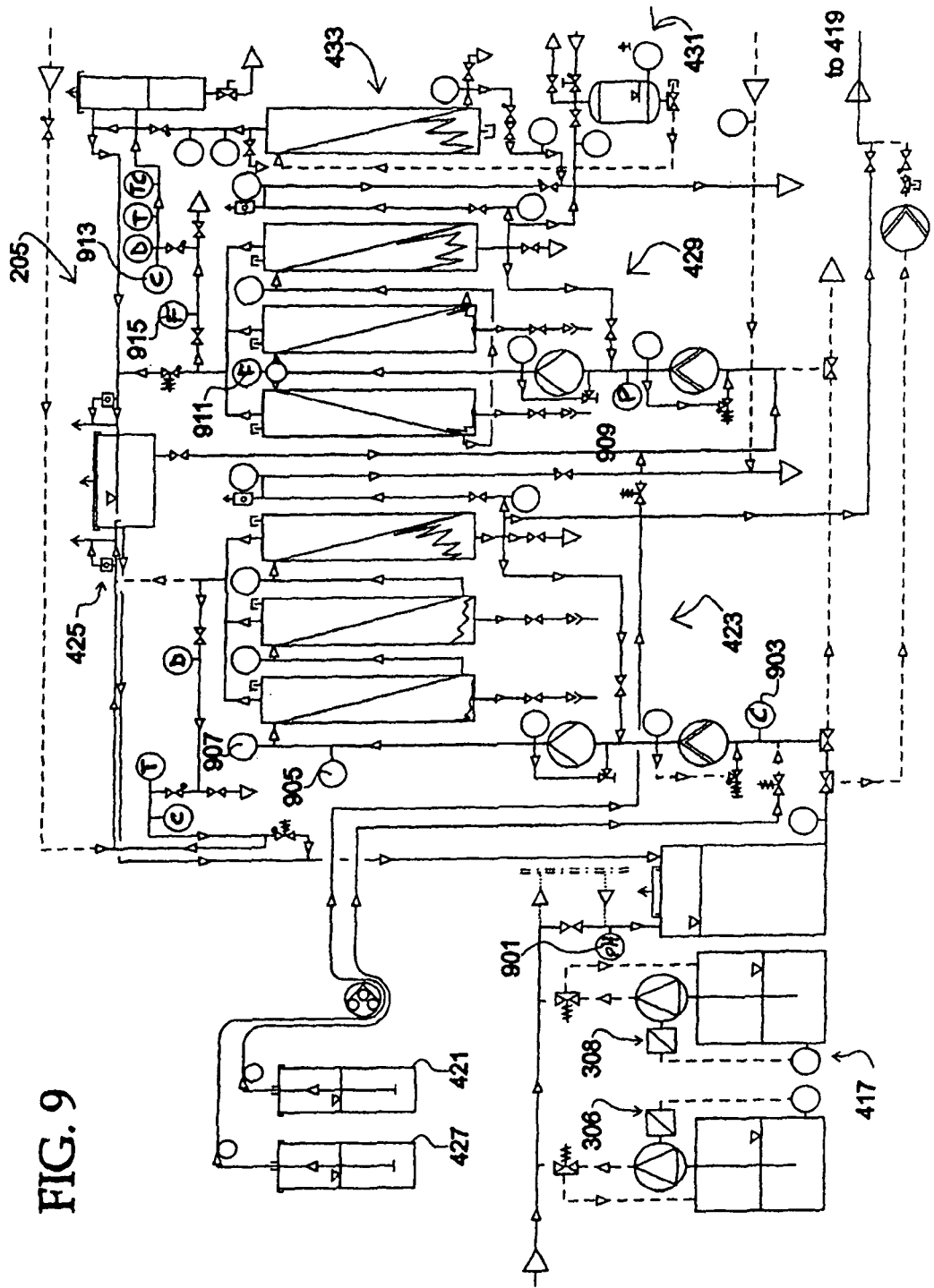
FIG. 9 is a diagram illustrating primary (effluent polishing) treatment sampling/testing locations for real time fluid testing and reporting.
Figure 10:
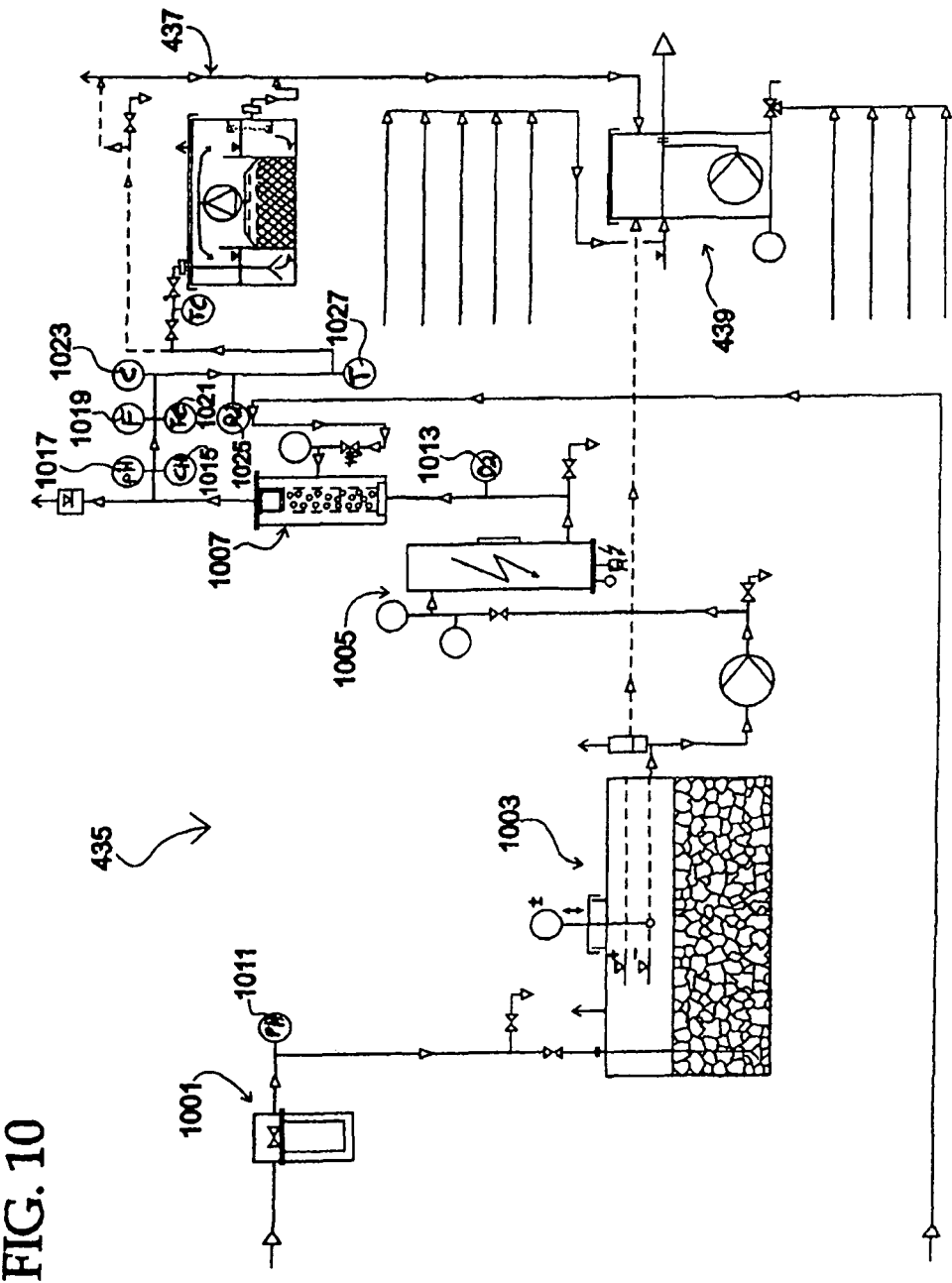
FIG. 10 is a diagram illustrating post-treatment sampling/testing locations for real time fluid testing and reporting.

FIG. 7 illustrates elements of pre-treatment suite 411 and testing nodes (in line sampling stations for performing process treatment testing and data output to computer control) utilized for process and treated effluence analysis automation. FIGS. 8, 9 and 10 show similar features in pre-treatment suite 413, treatment array 205 and post-treatment suite 435, respectively. In FIG. 7, seven of the eight pretreatment apparatus of suite 411 are shown. These include ODE membrane aeration apparatus 701, deironator 702 (for fluid density reduction), modified vacuum tower degasification apparatus 703, air stone degassing apparatus 704, venturi gas evacuation apparatus 705, fine filtration apparatus 706 (backflush fine filters 706A and an edge filter arrangement 706B), and lamella plate clarification apparatus 707 (including primary and secondary tanks each having a sludge chamber concentration portion 708 therein). In addition seven test nodes 711 through 723 are shown.

FIG. 8 shows nine of the ten apparatus of pre-treatment suite 413 (the ionized air/gas treatment is not identified). These include pH and chemical dosing apparatus 801 and 802, respectively, ODE/IDI membrane aeration apparatus 803, electrocoagulation apparatus 805, dissolved air/gas flotation 806, vacuum introduced cyclone separation apparatus 807, vacuum degassing 808, lamella plate clarification 809 and sludge concentration output 810. Additionally, eight testing nodes 811 through 825 are shown.

The primary function of the Pre-Treatment suite 413 is the removal or significant reduction (exceeding 90%) of colloidal matter with total suspended solids, such as polysaccharides or other slimy matter, less than about 75 nm. In addition, removal or significant reduction (by 80 to 90%) of fats, grease, oils and emulsions, and heavy metals (such as barium, strontium and others) by 60 to 99% is achievable. Finally, removal of entrained and produced gas by vacuum down to residual levels is achieved.

FIG. 9 shows the array 205 of FIG. 2 (utilizing a membrane treatment array). Eight testing nodes 901 through 915 are also illustrated. FIG. 10 shows all four apparatus included in post-treatment suite 435. These include activated carbon filter 1001, sodium absorption ratio compensation apparatus 1003, UV disinfection apparatus 1005 and membrane aeration apparatus 1007. Nine testing nodes 1011 through 1027 are also shown.

There are nine different testing instruments utilized at the 32 testing nodes in the suites 411, 413, and 435 and treatment array 205. These include instruments for measuring: total organic carbon (TOC, at nodes 711 and 1023); turbidity (at nodes 713 and 1027); pH (at nodes 811, 817, 825, 901, 1011, and 1015); dissolved oxygen (at nodes 1013 and 1025); liquid flow (at nodes 719, 815, 821, 907, 911, and 1017); gas flow (at node 723); conductivity (at nodes 715, 823, 903, 913, 915, and 1019); pressure (at nodes 717, 721, 813, 819, 905 and 909); and $CH_4$ (at node 1021). Additional testing nodes (as well as testing instruments of different kinds) could be applied with this system and programmed accordingly, as may be appreciated.

Instrument drivers and data storage are housed and channeled at a standard PC or other computer, on LAN (Local Area Network covering the whole station 101). A standard Ethernet Hub or Switch is utilized as is an Internet access (hard wire or wireless) for remote monitoring and operation where required.

The various measuring instruments employed are relatively standard devices. Raw feed water into station 101 will often contain high concentrations of total organic carbon ("TOC") contamination, also known as the total oxidizable carbon. If left unchecked, said TOC contamination may cause fouling in reverse osmosis membranes and tend to support biological activity in the whole water treatment facility. TOC measurement is used industry-wide as the standard process for determining organic carbon contamination and to measure the effect of the employed TOC reduction process. Real time effect values of the TOC reduction processes utilized in station 101 is indicated, monitored, registered, stored (and recalled) as nonvolatile memory for either process evaluation or plant sizing data. To obtain said TOC reduction process effect values, two separate TOC instruments are employed, the first measuring incoming TOC and the second measuring the outgoing TOC whereby the dimensionless TOC reduction process effect values are obtained.

The instruments for measuring organic contaminants utilize chemical or UV oxidizing of the contaminants to create carbon dioxide. The conductivity increase or the change in the reading of an infrared detector are then measured to yield a measure of the amount of carbon bound in entrained organic material (reported in units of ppm as carbon). Typical TOC measuring analyzers are made by SHIMADZU, HACH and others. Preferred water TOC level measurement should be capable of a range from a minimum of 10 ppm to a maximum of 150 ppm.

Turbidity refers to the suspension of fine colloidal particles that do not readily settle out of solution and that can result in water cloudiness. Turbidity is measured by a Nepholometer measuring the relative amount of light able to pass through a solution, and is reported as NTU (Nephelometric Turbidity Units). Turbidity measurement is used as a substitute for gravimetric solids measurement in the monitoring and controlling of various water treatment processes. In station 101, this measurement serves as an on-line indicator for the rate of reverse osmosis membrane fouling. Typical reverse osmosis elements list a maximum of 1.0 NTU for the feed water. As turbidity readings exceed 1.0 they are indicative of a greater tendency for membrane fouling. Optionally, turbidity measurements can also be used as an analytical tool to evaluate the changing abilities of different pre-treatment steps to remove potential membrane foulants. Instruments made by HACH (GLI Accu 4 Low Range Process Turbidimeter) are preferred.

The pH of water is a means of expressing its acidity or basicity. The measurement of pH is a method of expressing hydrogen ion concentration logarithmically with the pH value being the negative logarithm (base 10) of the hydrogen ion concentration. Measurement of pH is important to water analysis, as the pH will dramatically affect the solubility of a number of slight soluble salts present in the various feed waters. pH is important in defining the alkalinity equilibrium levels of carbon dioxide, bicarbonate, carbonate and hydroxide ions. The concentrate pH is typically higher than the feed due to the higher concentration of bicarbonate/carbonate ions relative to the concentration of carbon dioxide.

Furthermore, the pH of a cleaning solution is an indicator of one of the most important mechanisms available for cleaning most membrane foulants and scale. Acidic solutions are effective at removing scale. The removal of foulants that originated from suspended solids or biological activity is performed with alkaline solution. Its high concentration of negatively charged hydroxide ions can break up and solubilize organic fats and oil that may be present. It can also disperse remaining solids since many of these tend to also have negative charge characteristics. Lowering the feed pH with acid results in a lower LSI (Langlier Saturation Index) value, which reduces the scaling potential for calcium carbonate. Feed and concentrate (reject) pH can also affect the solubility and fouling potential of silica, aluminum, organics and oil. Variations in feed pH can also affect the rejection of ions. For example, fluoride, boron and silica rejection are lower when the pH becomes more acidic.

A typical pH measurement system always consists of four parts: a pH sensing electrode; an amplifier that translates the signal (4 to 20 mA) into something the controller unit can read; a reference electrode; and on-line implementation. Each part of the system plays a critical role in the on-line measurement process. Any reputable brand of on-line pH indication, registration and controlling system could be utilized herein, for example the systems provided by SIGNET Analytical Instruments.

Dissolved oxygen (DO) refers to the amount of oxygen in a unit volume of water (mg/L or ppm). Finished processed water discharged as augmentation water into a stream or river needs oxygenation to sustain aquatic life. It is generally considered that DO levels of at least 4-5 ppm are sufficient for most aquatic life, however good waters average about 9.0 ppm. The total dissolved gaseous oxygen (O2) concentration in water should not exceed 110%. Concentrations above this level can be harmful to aquatic life forms.

Station 101 employs an on-line dissolved oxygen measuring, monitoring and controlling system for providing real-time operational information as well as permanent records for administrative agency compliance. The DO system consists of a preamplified DO sensor. Its active electronics, located directly in the sensor, process the sensitive sensor signal on-site. A control signal regulates compressed air flow supply through various aerator membranes at station 101, whereas a scaled signal in either mg/L or ppm units is displayed on the control monitor. A potentiostatic three-electrode system for measuring DO is preferred in this application (for example, systems by WTW).

Since the liquid in all standard process phases is conductive in ranges exceeding 5 µS/cm, this system uses only electromagnetic flowmeters for in-line liquid flow indication, monitoring and registration. These flowmeters are very accurate, the pressure drop across the meter being the same as it is through an equivalent length of pipe because there are no moving parts or obstruction to flow. The instrument can be attached directly to a flow tube or mounted remotely and connected to the tube by a shielded cable. Any reputable electromagnetic flow indication, monitoring and registration system can be used (for instance, the FMG-401H flowmeter provided by OMEGA).

Traditional thermal-type mass flowmeters for air/gas measurements are utilized in station 101 (for example, an SRL inline style thermal mass flow indication, monitoring and registration system by SAGE METERING, INC.)

Conductivity is a measurement of the ability of water to transmit electricity due to the presence of dissolved ions. Conductivity measurement is a method for determining the level of ions in a water, but does not identify the ion. Because the electrical current is transported by the ions in solution, the conductivity increases as the concentration of ions increases, thus conductivity increases as water dissolves ionic species. The basic unit of conductivity is the siemens (S). Since cell geometry affects conductivity values, standardized measurements are expressed in specific conductivity units (S/cm) to compensate for variations in electrode dimensions.

Conductivity measurements are used to obtain the data necessary to determine TDS (Total Dissolved Solids) values. Furthermore, the in-line conductivity measurements are utilized in the operational software with a conversion factor to convert water conductivity into total dissolved salts. This data can then be used in software to calculate a present salt rejection based on conductivity in the membrane processes. There is generally a direct relationship between conductivity and the concentration of ions in a solution. Any reputable conductivity indication, monitoring and registration system can be utilized (for example, CDCN-80 systems by OMEGA).

Pressure is the driving force in mobile test station 101. The software system for monitoring and data logging requires pressure sensors (transmitters are preferred) with current outputs of 4 to 20 mA. A pressure transmitter is simply a pressure transducer with some extra electronics to transmit the signal. Uses include monitoring the pressure drop in a membrane system for monitoring and energy requirement calculations. Pressure indication, monitoring and registration systems provided by OMEGA'S PXO1C1 series provide 4 to 20 mA output, very high accuracy pressure transmitters with ¼ NPT pressure connections.

$CH_4$ measuring is preferably conducted with a Method 25 GC system by GenTech Scientific, Inc. This on-line instrument includes an FID detector, built in air compressor and backflush gas sampling valve for determination of methane/non-methane hydrocarbons.

Figure 11:
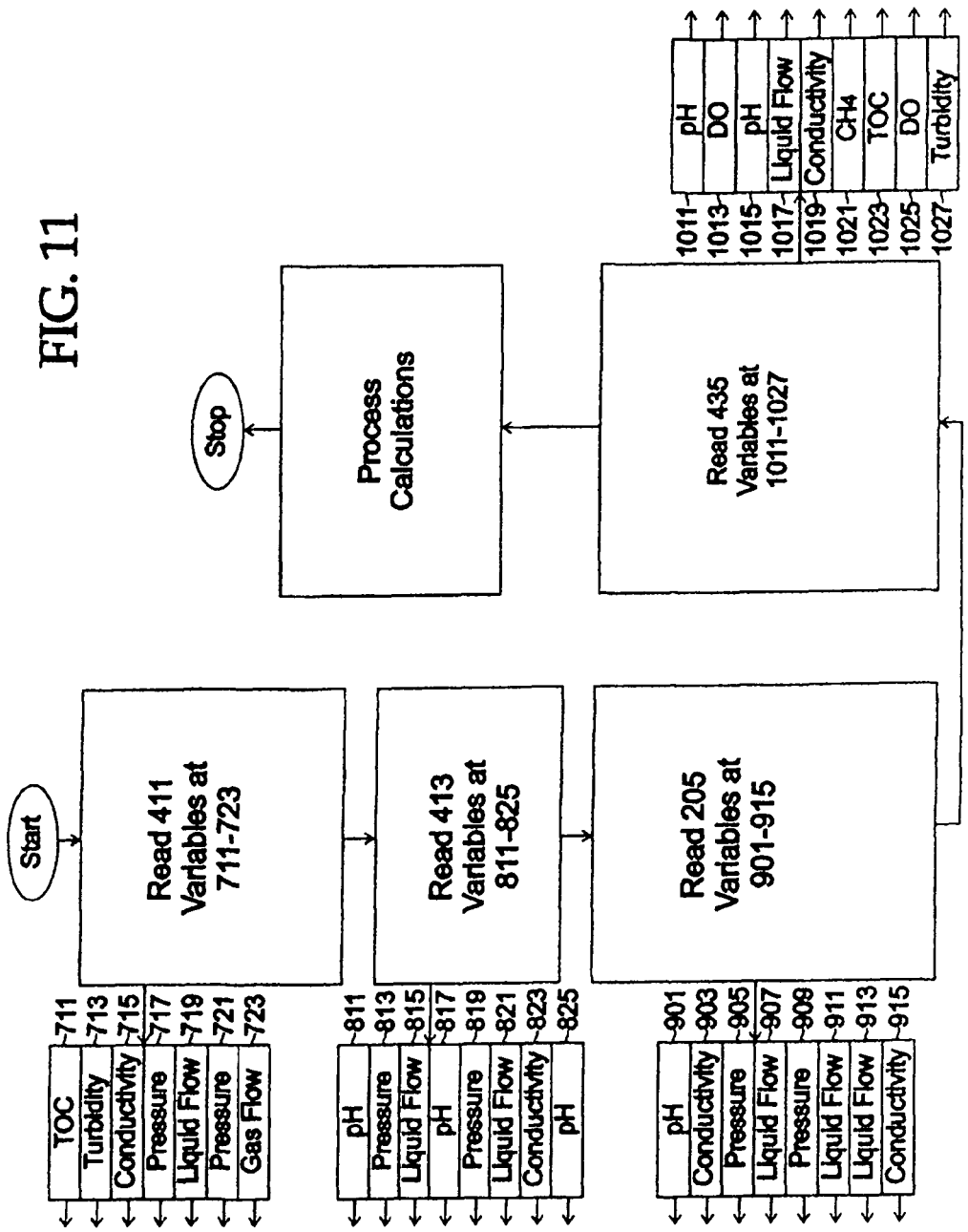
FIG. 11 is a block diagram illustrating a portion of the control program.
Figure 12:
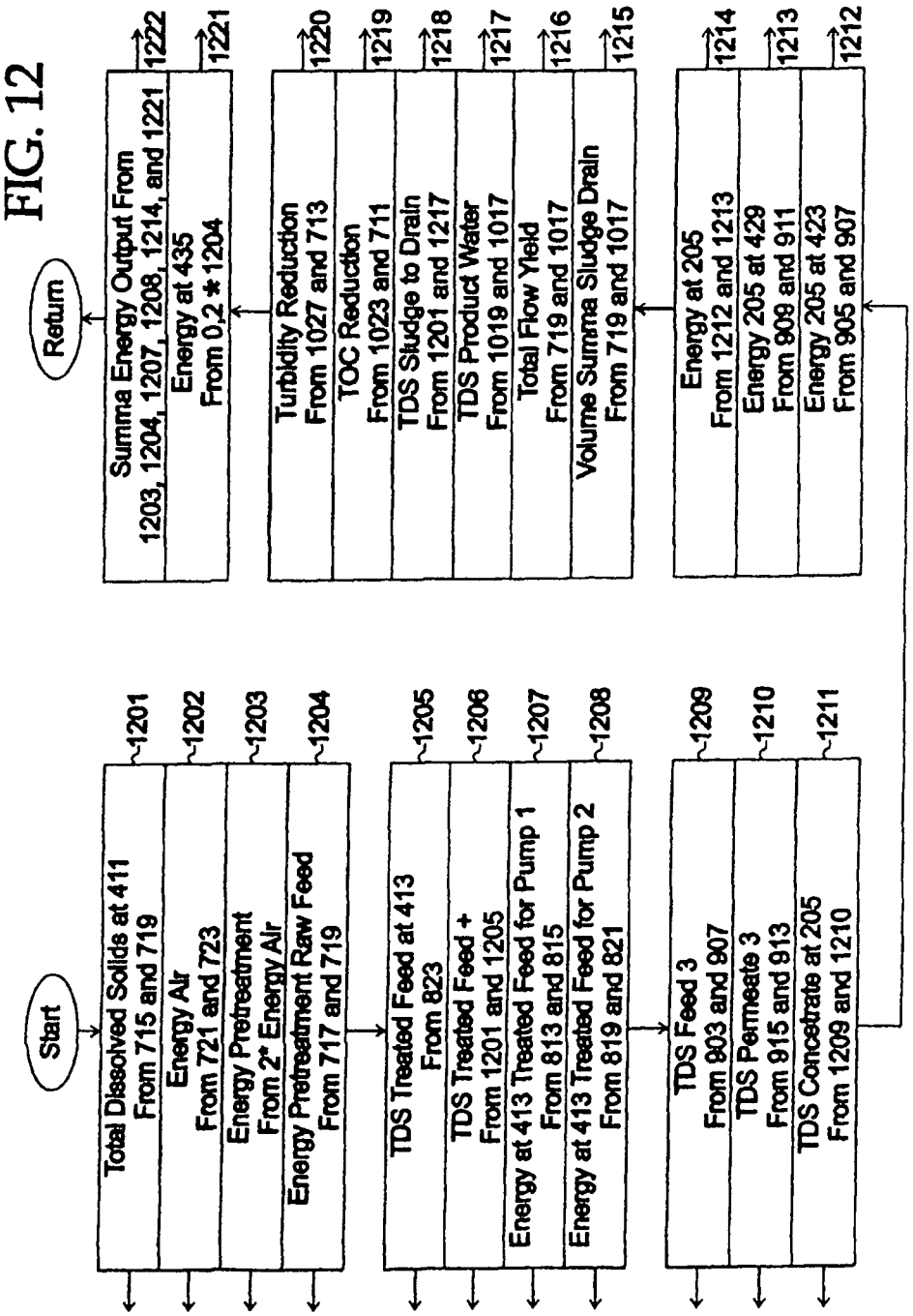
FIG. 12 is a block diagram illustrating process calculations output related to the portion of the control program shown in FIG. 11.

Turning now to FIGS. 11 and 12, the program control and program process calculations are described. In general, while not shown, to use the program the program directory must be accessed and the water system program file opened. The program starts with a main screen having selectable subdirectories for the four sections 411, 413, 205 and 435 corresponding to various treatment options therein. The structure is as shown in FIG. 11. By selecting a desired subdirectory at the main screen control screens related to pre-treatment suites 411 or 413, polishing array 205 or post-treatment suite 435 can be viewed and operated. Real time instrument generated and/or manual data input or readout can be obtained at the different screens.

On a selected subdirectory screen values can be changed in the data fields. A detailed help file is available at the main screen or subdirectory screens. Once all data fields are filled, a "CALCULATION" selection at the main screen is enabled. Selecting the CALCULATION operation leads to the outputs identified in FIG. 12. A report screen of the calculated results together with upscaling reports follows.

Detail regarding the various apparatus in station 101 for performing steps 1 through 19 (stages 403 through 439 in FIGS. 4 and 6a) follows hereinbelow, with greater attention paid the numerous additional aspects of this invention as shown in FIGS. 13 through 50.

At stage 409, either of two types of inline heating systems may be utilized. Commercially available inline electric water heaters set up for continuous operation may be utilized. These heater, due to limited heat transfer capability, must be supplemented by a gas-fired tank heating system in an outside supply tank.

Figure 13:
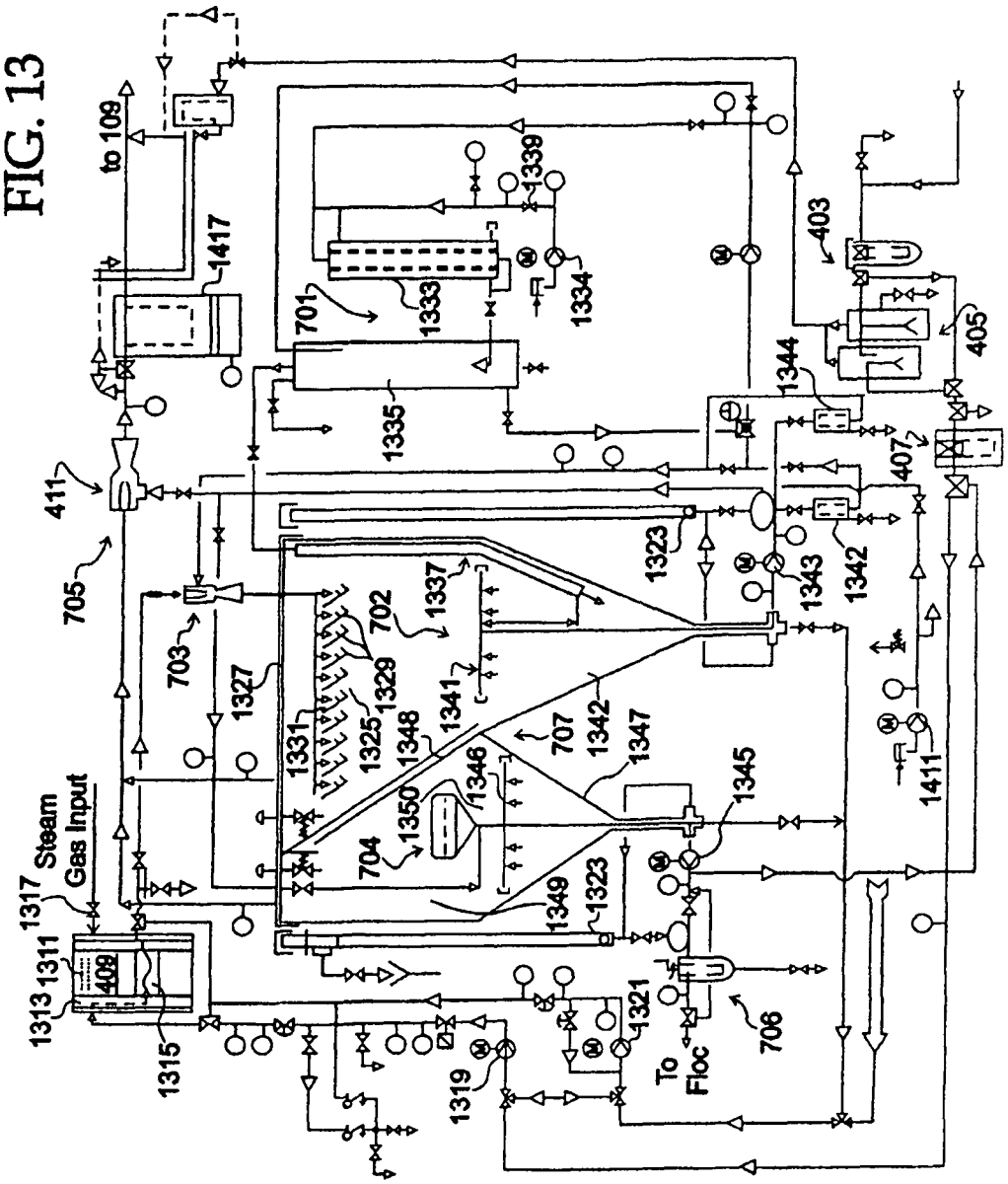
FIG. 13 is a diagram primarily illustrating portions of the first pre-treatment suite of the station of this invention.

Thus, the preferred method of water heating in the station of this invention, in accord with an additional aspect of this invention, is an inline steam heating system for direct raw feed water heating which either does not require a gas-fired heater in the outside tank system or requires considerably less heating energy from the outside tank heater as shown in FIG. 13. This inline direct feed water steam heating system works in a steam diffusion mode where pressurized injected steam diffuses from an outer jacket 1311 through a tubular porous sintered ceramic, glass, stainless steel PVDF or PTFE membrane body 1313 into the feed water, which flows inside of the membrane. Also located inside of the membrane is a stainless steel static inline mixing element 1315 to provide a rapid homogenizing effect, whereby the mixing energy is derived from the mixers pressure drop.

The heating system is comprised of a gas-fired steam boiler system (this system resides both within and outside station 101, most of which is not shown) to produce a maximum steam flow of 25 KG/H, at a pressure of 150 psi., a pressure reducing valve with pressure indicators, a positioner control valve (from Burkert, for example), a steam flow control shut-off valve 1317, steam check valves (including one pressure indicator), a membrane steam contactor assembly (utilizing, for example, a Penberthy Steam Jet heater), and associated pipe spools. The membrane assembly is a stainless steel unit consisting of eight major components (intake flange with steam injection connection, end flange, two reducer bushings, outer pipe housing 1311, porous steam diffuser membrane 1313 (made of sintered metal, ceramic, glass or other materials), static inline mixer 1315, two high temperature seals, and four assembly stud bolts, lock washers and nuts.

The center piece is static inline mixer 1315 which sits inside of membrane 1313. The membrane itself is located inside the outer pipe housing. The smaller membrane diameter in conjunction with the larger pipe housing diameter provides the necessary ring room around the membrane, for the three dimensional diffusive steam transfer through the membrane into the feed water. These parts are end sealed by the seals, centered by the intake flange and end flange, and held together by the fasteners. The reducer bushings provide the connection between the smaller water lines and larger flanges of the membrane contactor assembly.

FIG. 13 also illustrates a second configuration of the pre-treatments suite stages 701 through 707 (sludge accumulation, concentration and return is not shown). Feed and return pumps 1319 and 1321 are the primary effluent pumps in the system. Several level sight glasses 1323 are deployed for operator oversight.

The primary function of stages 403, 405, 407 and pre-treatment suite 411 is the removal or significant reduction (exceeding 90%) of materials having total suspended solids (TSS) down to 100 μm, Fe and Mn precipitation of exceeding 80%, $CH_4$ gas stripping exceeding 90%, and mineralization of the organic contaminants exceeding 50%. The mechanical processes shown in the FIGURES include screen filtration, scraping edge and/or automatic backflush filtration. The physical treatment processes include membrane aeration, adsorption, desorption, precipitation, and sedimentation. The chemical treatment processes provided include absorption and oxidation.

Referring to FIG. 13, incoming raw feed water is blended in venturi water contactor 703 with oversaturated recirculation water. Venturi water contactor 703 provides homogenization of the raw feed water with the aerated recirculation water, and provides an environment for contacts between the suspended particles by fluid motion (orthokinetic flocculation). Agitation of suspension by increasing collision frequency promotes faster aggregation than does Brownian motion alone. Orthokinetic flocculation nearly always takes place in turbulent flow, in some form of shear conditions as can be provided by means, for example, of a cyclonic disperser.

The homogenized discharge from contactor 703 is fed through spray degassing sparger system 1325, the spray providing a preliminary degassing effect. Spray degasser sparger 1325 is mounted beneath a sealed lid 1327, and protrudes in the otherwise unused dead volume of lamella separator 707 above the clarification area. 55° inclined corrugated baffle plates 1329 of an inline cascade series waterfall 1331. The aerated gaseous spray is thus broken down into thin film layers and entrained fine droplets as it flows down surfaces creating a large thin contact area for gas and water.

The vacuum provided by the modified gas evacuator 705 is used for supplying the operating vacuum and pressure differential to induce gas release from solution, and to provide the motive force to evacuate the degassed loading of free $CH_4$ gas or other gasses from the degassing portion of the enclosed pre-treatment tank system at 707.

Because of droplet surface tension, a higher pressure is present in the aerated droplets which are entrained in the thin film layers on the plates (a lower bubble point). Therefore, to enhance degassing efficiency, optional to the corrugated plate degassing system, feed water heating at heater 409 is provided.

Figure 14:
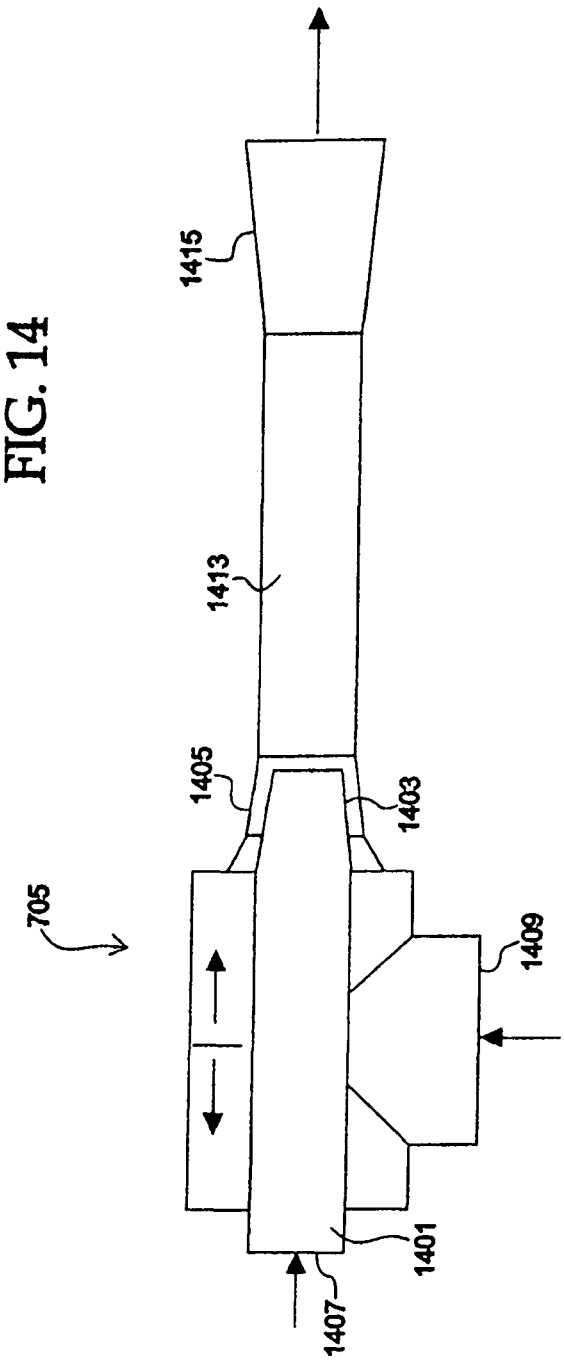
FIG. 14 is a sectional illustration of a gas liberator used in the first pre-treatment suite.

FIG. 14 illustrates a preferred embodiment of modified venturi gas liberator 705. The unit includes suction chamber 1401 with a 21° nozzle 1403 in cone 1405. Gas ($CH_4$) is drawn into chamber 1401 through inlet 1407 by pressurized air introduced at inlet 1409 from rotary vane blower 1411 (FIG. 13) through venturi cone 1405. Parallel section 1413 is connected at nozzle/cone 1403/1405 leading to 6° discharge diffuser 1415 discharging the $CH_4$ and air combination (to outlet stack 109 either directly or through adsorption filtration unit 1417—see FIG. 13).

ODE membrane aeration stage 701 shown in FIG. 13 provides oxidation for Fe and Mn contamination in the feed water, and preferably includes tubular or capillary membrane bundles. Feed water flows inside of tubular bundle or capillar membranes bundle 1333, whereat compressor 1334 supplies a continuous flow of volume and pressure controlled compressed atmospheric air at a pressure greater than water pressure. Feed water flows under minimal pressure inside of the tubular micro-filtration membrane 1333 and is continuously aerated from the outside of the membrane to the inside. Obstruction or clogging of the membrane pores from the feed water is thus avoided. Controls employed at stage 701 allow a minimum required power input to facilitate either the deironation or degasification process or both. The liquid and air flow volumes as well as their pressure readings are recorded by the onboard diagnostic systems and are scaled to determine full-size plant requirements. Since testings are done on-site, altitude and corresponding oxygen saturation levels are accounted for automatically.

The aerated feed water enters air bubble reactor 1335 and, after exiting at the top, is diffused at diffuser 1337 below the water surface lamella tank 707. If only deironation and/or manganese reduction needs to be done, no bubbles need to be present in reactor 1335. In such case, if air bubbles are shown in bubble reactor 1335, air flow is throttled back at valve 1339. An oxygen meter aids control of valve 1339 operation, and data output provides a permanent record for diagnostic purposes and full-scale plant design.

A suction sparger 1341 is located on top the sludge chamber 1342. Thus, elevated suction for circulation pump 1343 minimizes recirculation of precipitated and sedimentated matter. Sparger 1341 has an elongated head to prevent suction channeling, while at the same time providing a positive suction head for recirculation pump 1343. Pump 1343 discharge feeds first through a selective inline filtration systems 1344. Two outlet streams result, the adjustable larger stream providing the motive fluid force for venturi water contactor 703 and the smaller stream being recirculated through membrane aeration stage 701.

The sedimentation process of precipitated iron and manganese as well as other suspended solid particles in sludge chamber 1342 goes through three phases: sedimentation of particles without interference with each other; transfer zone with interference; and compression, the particles forming a cohesive sludge layer.

Membrane aeration apparatus 701 and 803 at suites 411 and 413 respectively are advantageous in that a highly controllable, diffusive, mass transfer generating a large number of small and well-distributed bubbles with a large combined surface area, is more effective than a small number of large and not well-distributed bubbles with a small combined surface area, for instance generated by a less controllable venturi mass transfer technology. This diffusive mass transfer of air and/or ionized air or gas is a more economical technology compared to heretofore known approaches for mass transfer of ionized air/gas into a suspension.

Fluid density reduction at apparatus 702 creates an environment for increased turbulent micro bubble ascension, accelerating the degassing process, thereby requiring less degasser separation area for modified vacuum tower degassing at stage 703. In addition, the decreased density of the feed water provides reduced carrying capacity for heavier suspended solids thus expediting descent and sedimentation.

Standard air stone degasser technology is employed at apparatus 704 to efficiently aerate fluid at lamella separator 707 in clarifier section 1349. This is done to facilitate the release or reduction of entrained carry-over gas through the integrated lamella separator 707 in the event of critically high $CH_4$ gas loading. Likewise, fine filtration at apparatus 706 in the range of 100 μm is provided by commercially available self-cleaning automatically operating filtration units such as the standard edge filter unit from WFT or TEKILEEN's Minitwist series low-flow fully automatic self-cleaning filtration system. Fine filtration apparatus 706 is configured to filter the clarifier 707 fluid/effluent. The clarified fluid is pumped from the clarifier buffer tank compartment 1350 by means of filter pump 1345. Filter pump 1345 is gravity-fed through suction sparger 1346, located in the elevated section of the clarifier's small sludge chamber 1347 to avoid the suction intake of entrained air produced by air stone apparatus 704 and precipitated, as well as sedimentated, matter from small sludge chamber 1347.

Regarding lamella unit 707, a two in one tank design is employed wherein a large clarifier, development and degassing tank section with attached large sludge chamber is separated from a small clarifier catch and buffer tank with attached small sludge chamber by integrated lamella separator 1348. Self-sealing lid 1327 is activated by the controlled operating vacuum. The design of the integrated lamella separator 1348 into clarifier tank system 707 provides additional clarification area without increasing the working volume of the clarifier, thus providing a reduced footprint. Sludge return is fed into low shear return pump 1321 and could be (with appropriate valve control) re-circulated through the venturi water contactor 703 before collection.

Figure 15:
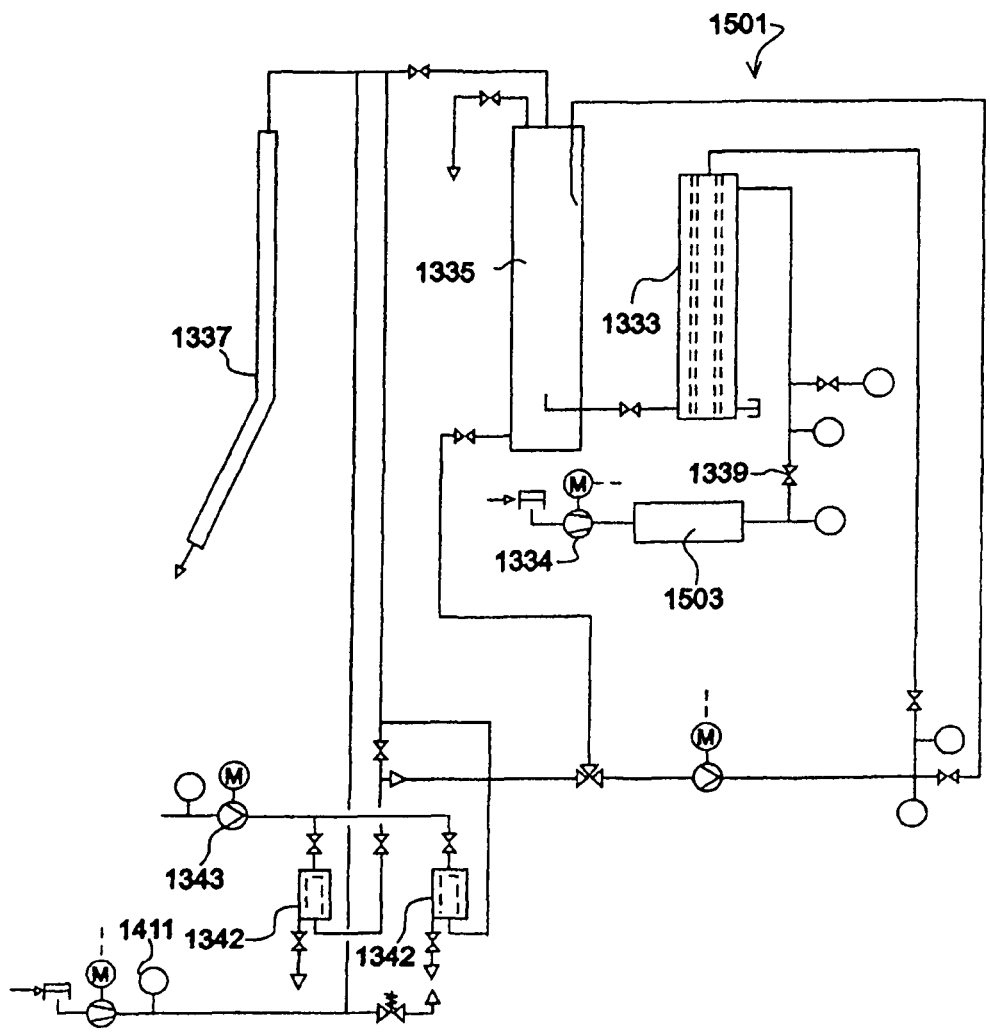
FIG. 15 is a diagram illustrating a second embodiment of one of the components utilized in the first pre-treatment suite of the station of this invention.

Turning to FIG. 15, another embodiment 1501 of ODE membrane aeration stage 701 is shown. As in the embodiment shown in FIG. 13, this embodiment includes tubular bundle or capillar membranes bundle 1333, with compressor 1334 supplying a continuous flow of volume and pressure controlled compressed atmospheric air. Aerated feed water enters air bubble reactor 1335 and, after exiting at the top, is diffused at diffuser 1337. Air flow is controlled a variable valve 1339. However, between compressor 1334 and bundle 1333, the air is ionized at ionized gas generator 1503 for decontamination of membrane bundle 1333.

With reference to FIGS. 16 through 23, various embodiments of components of second pre-treatment suite 413 are discussed (see also FIG. 8). Regarding both ionized air/gas generation apparatus 804 and membrane aeration apparatus 803, in accordance with another aspect of this invention, improved ion treatment and reactor technologies, applications and methods of use are described. This aspect of the invention relates to effluent treatment utilizing ionized air or gas and membrane aeration, and has its objects, among others, enhanced ionized gas transfer through known membrane aeration technology providing energy efficiency over conventional venturi technology. Using this technology, ionized gas transfer into feed water is further enhanced by means of a static-in-line mixing comprising, for example, a progressive single coil system or an electrically charged dual coil system made from conductive but non-sacrificial material such as synthetic graphite.

As will be seen, an integrated coil mixing system is conveniently located between a portion of the outer membrane side and the inner reactor wall of the liquid side. A gas ionization chamber is an integrated part of the membrane support body. A radioactive energy source for gas ionization may be utilized, and is directly connected to the ionization chamber thus minimizing occurrences of recombination of ion pairs prior to their diffusive transfer into the liquid phase. Transparency of the reactor's housing and coil support body allows for visual inspection of the microbubble column and is controllable through means of associated valving conveniently located on a reactor mounting panel. The reactor's ionized air input is monitored and controlled by means of an in-line oxygen sensor and controller unit. The feed quality is monitored and controlled by means of conductivity meters at the incoming feed and the outgoing treated water lines.

In order to affect a reasonable fallout rate of contaminants in the water after electro-coagulation, it is necessary to add a chemical polymer prior to the electro-coagulation cell. If no chemical is added, fallout rates are unacceptably long. For a full size plant, this adds a burdensome financial component with respect to chemical costs and plant footprint. Slow fallout rates translate into large tanks for increased retention times.

Ionized air is a well recognized and employed technology in the field of air purification. By creating a large number of negatively charged oxygen ions and positively charged nitrogen ion, the ions then released into the air where they attach themselves to floating particulate matter of opposing charge, heavier particles are created through charge neutralization thus allowing them to fall to the ground effectively reducing airborne contaminants. The following teaches similar approaches at apparatus 803 and 804 of pre-treatment suite 413 for agglomerating, or coagulating, waterborne contaminants which are otherwise too small or incorrectly charged for easy removal.

Most waterborne contaminants in particulate form are charged. The charge can be positive or negative, although most particles in certain post industrial effluents (such as coal bed methane water) develop a negative charge. When the particulate matter freely floats in water, they are continuously being repelled by each other, this repelling action making the particles difficult to agglomerate to form a more easily removable mass.

By introducing a stream of negatively and positively charged ions into the water, one can effectively neutralize the particles specific charges thus allowing them to be brought into intimate contact to form more easily precipitated matter. Once the interparticle repulsive forces have been neutralized, the fallout rate in and after processing by electro-coagulation apparatus 805 will be enhanced and chemical treatment needs will be eliminated or drastically reduced. This process might also speed up and enhance the iron and manganese precipitation process as well. Finally, these ions are also very disinfective to harmful biologic components present in some feed waters presented for treatment and its holding tanks.

Figure 16:
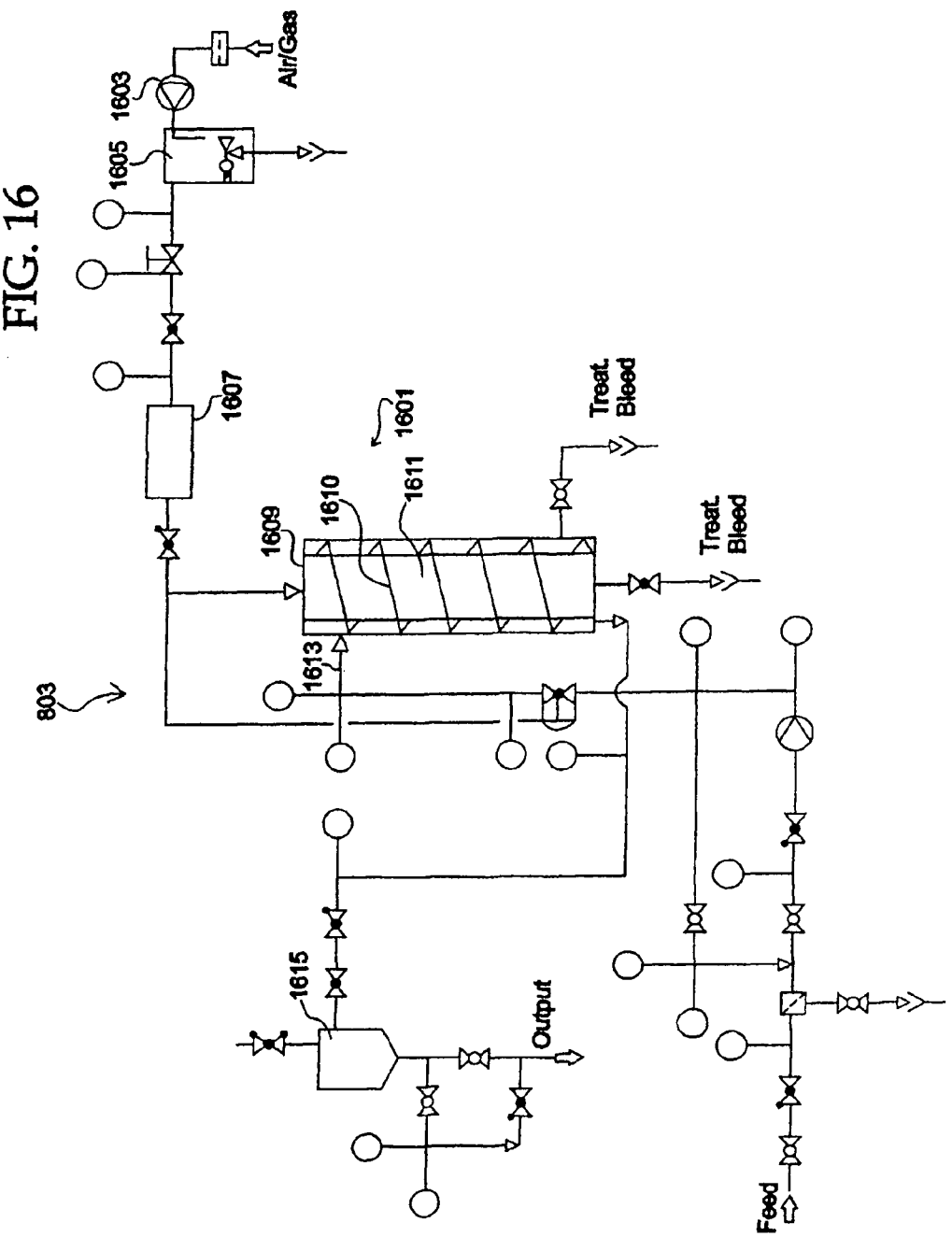
FIG. 16 is a diagram illustrating a first embodiment of a membrane aeration apparatus used in the second pre-treatment suite of the station of this invention.

FIG. 16 shows a first embodiment 1601 of membrane aeration apparatus 803 of second pre-treatment suite 413. Air is received at compressor 1603 and separation vessel 1605. Output from vessel 1605 is exposed at VUV/UV unit 1607 (an annular incoherent exciter UV source with inward directed, coaxial, radiation geometry for UV radiation in the 130-160 nm range), the air and/or plasma-gas being fed through a perforated membrane support body 1609 equipped with coiled feed grooves having spring 1610 thereat. Support body 1609 carries membrane sleeve 1611 with the active membrane side facing outwardly. Membrane sleeve 1611 is sealed on both ends of cylindrical support body 1609. Hydrophobe, anti-adhesive, semi-permeable membranes are employed for this ODE/IDI process (any flat commercially available flat sheet membrane can be used). The entering air and/or plasma-gas through the passive membrane side of membrane sleeve 1611 have a slightly higher pressure than the outside liquid pressure on the active membrane side, thereby avoiding the initiation of a filtration process.

Liquid is fed at input 1613 around support body 1609 and over and around the active membrane side of sleeve 1611 along grooves 1610 in a coiled manner. This provides a well distributed, non-plugging turbulent flow regime over the net active membrane area which also enhances blending and particle collisions. Spring 1610 of the coiled feed path is a preferably a PTFE coated 300 series stainless steel spring or a PVC spring. Spring 1610 securely rests in a matching groove inside of a clear PVC outer housing body (not shown). Unit treated water output passes through separation vessel 1615 before output to subsequent treatment apparatus.

The higher air and/or plasma-gas pressure provides adequate sealing action between the active membrane side and the coiled feed path. The thickness of the coiled feed path in relation to membrane sleeve 1611 diameter is in the range of 1:5 to 1:500. Coil feed path length in relation to sleeve 1611 length is in the range of 2:1 to 200:1. As maybe appreciated membrane cost savings are realized while ease of membrane exchange or replacement and large membrane area are provided. Visual inspection of bubble generation is allowed through the clear outer housing body enabling better bubble control. Embodiment 1601 maximizes efficiency due to integrated non-plugging inline mixing (no added static inline mixing device is needed) and compact design.

Figure 17:
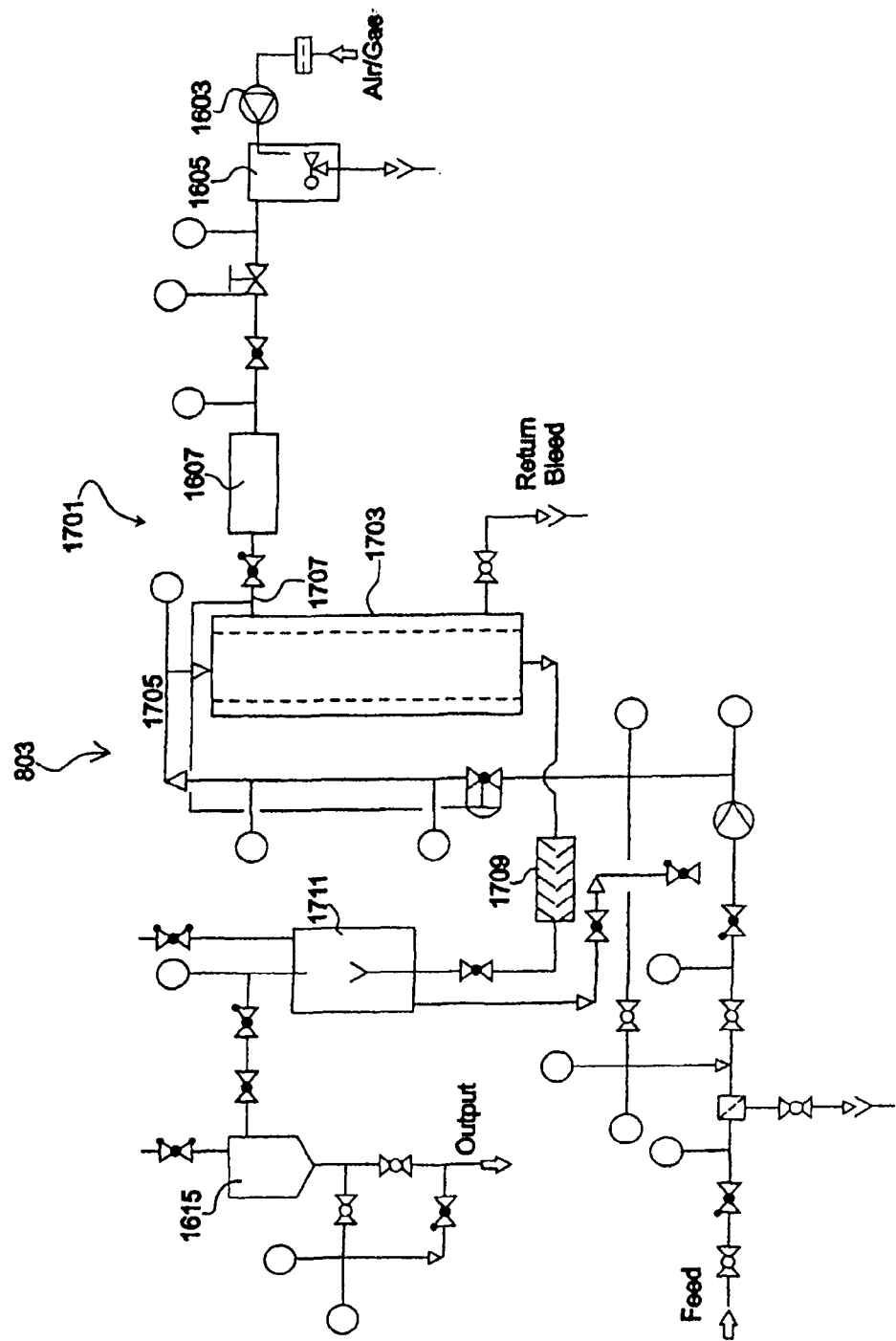
FIG. 17 is a diagram illustrating a second embodiment of a membrane aeration apparatus used in the second pre-treatment suite.

FIG. 17 shows a second embodiment 1701 of membrane aeration apparatus 803 of second pre-treatment suite 413 (similar elements retaining numbering from prior occurrence). In this second ODE variation, tubular or capillary membrane bundles are employed at aerator unit 1703. Pretreated feed water flows through input 1705 inside the tubular or capillary membranes, again at a lower pressure than from the outside applied air and/or plasma-gas received at the unit at input 1707. Flow from unit 1703 is received at in-line static mixer 1709 and bubble development control column 1711 prior to output.

The air and/or plasma-gas diffuse with only a slightly higher pressure above the liquid pressure through the semipermeable tubular or capillary membrane without initiation of the filtration process. Feed water is continuously aerated and/or gassed with plasma-gas through the tubular or capillary semi-permeable membrane from the passive outside to the active inside thus reducing obstruction or clogging of the membrane pores. The membrane inside diameter is in the range of 1 to 10 mm. The membrane wall thickness range is between 0.1 and 1 mm. Preferred membrane materials (for this, the previous and the following aeration apparatus embodiments) are PVDF, PP, PE, HPE, PTFE and PFA.

Figure 18:
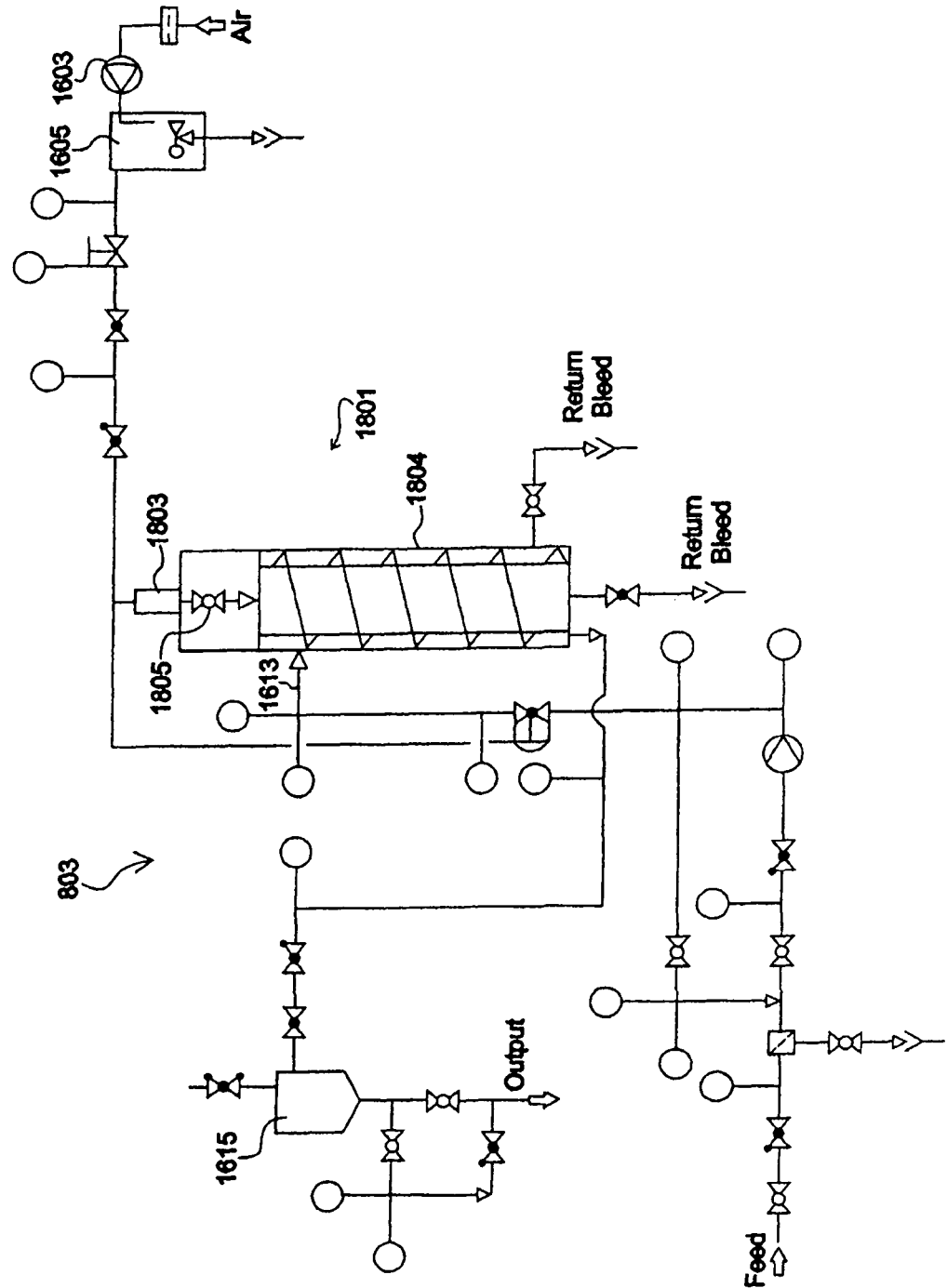
FIG. 18 is a diagram illustrating a third embodiment of a membrane aeration apparatus used in the second pre-treatment suite.

FIG. 18 shows a third embodiment 1801 of membrane aeration apparatus 803 based on inline diffusive ionization (IDI). Similar elements retain their numbering from prior occurrences. UV-based treatment processes for air and water have long been commercially available. Where economically acceptable this kind of equipment can be readily configured for use with ODE technology (as shown in FIGS. 16 and 17).

Most manufactures of UV-based technology do not offer industrial hardened units in the proper wavelength range for post-industrial applications such as oilfield use. Pulsed UV is still a rarity in the far UV range of 130 to 160 nm. The available UV equipment is expensive, has low UV bulb life, and has high energy consumption requirements.

The IDI implementation of this invention integrates a proven and readily available polonium origin particle emitter 1803 (for example, from NDR, Inc.) with a modified ODE contact reactor 1804 having a compact and industrial hardened design. Particle emitter 1803 is used to create a highly ionized stream of air/gas through ball valve 1805 into reactor 1804 for infusing a liquid through the reactor membrane, the number of free electrons approximately equal to the number of positive ions (known as plasma gas).

Emitter 1803 uses the naturally occurring radio isotope Polonium 210 as the internal energy source for emitting unstable nuclei of Po210 atoms in the form of $\alpha$-particles (in essence an inert helium atom (4/2 He) stripped of its electrons). The ejection energy is high enough to cause the ionization of $O_2$ molecules of the air (5.3 million electron volts). $\alpha$-particles carry a positive charge of low density, and, in collision with atoms in air, knock electrons out of oxygen and nitrogen atoms. This ability to scatter electrons and send them to other molecules leaves positive nitrogen and oxygen molecules and forms negative ions. In this way, the collisions produce positive and negative ion pairs that result in an inherently balanced ion output from the nuclear ionizer emitter 1803. Each $\alpha$-particle produces about 134,000 ion pairs, and there are $2.2 \times 10^{12}$ $\alpha$-particles emitted per minute per curie.

These positive and negative pairs like all air ions, no matter how they are produced, will recombine. Since the ions must reach the feed water to neutralize the feed water contaminants before they neutralize each other, a compressed air/gas stream is used to diffusively aerate the ionized air or gas through the hydrophobic membrane of reactor 1804 to reach contaminants in the feed water. Because a radioactive source is used, no electrical usage is required. Since the radioactive emission cannot be influenced by either physical or chemical means, it is not necessary to employ highly transparent and reflective reactor materials such as those employed in air ionization with UV technology.

Emitter 1803 can be built directly into contact reactor 1804, which is not possible with UV or Corona discharge means. This shortens the time necessary for transmission in the system. OH-radicals last only 10 milliseconds in water, and only 1 second in air. Since these lifetimes in air are so brief, it becomes imperative to produce the radical and subject it to the water stream in as short a time frame as possible. Contact mixing efficiency is further enhanced by means of a progressive flow path which is coiled around the reactor membrane (as discussed hereinabove). Generally, the fluence (ionized air dosage) decreases as the feed water flow rate increases because the residence time in the contact reactor is inversely proportional to the feed water flow rate. However, the dependence is non-linear because at higher flow rates the radial mixing efficiency of the static inline progressive coil mixing element increases. The gas primarily will consist of $H_2O$ as water vapor in the air, $O_2$ and $N_2$ from the air. To control the amount of $H_2O$ in the feed gas, as with the other embodiments, the gas passes through separator 1605.

Figure 19:
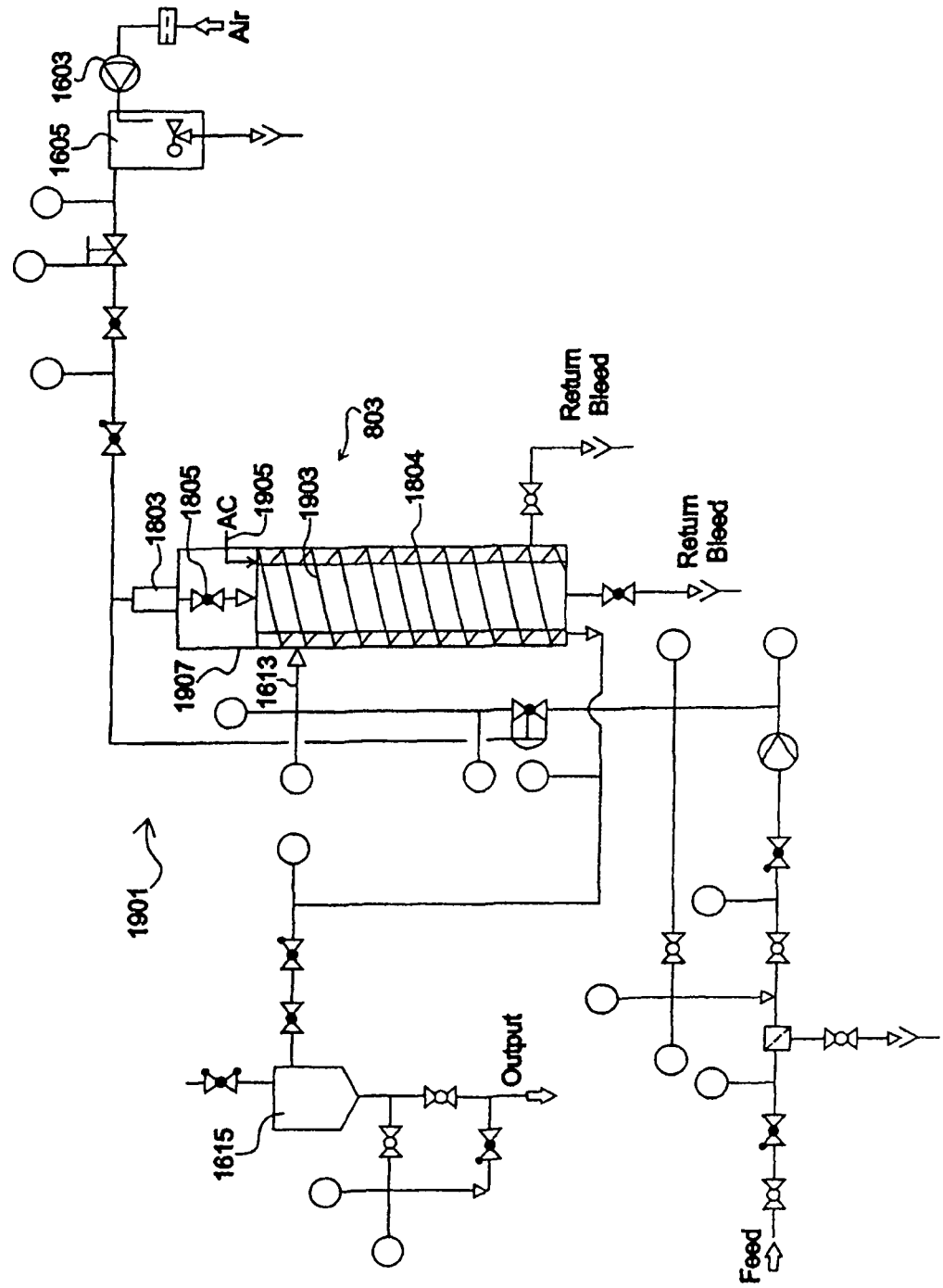
FIG. 19 is a diagram illustrating a fourth embodiment of a membrane aeration apparatus used in the second pre-treatment suite.

FIG. 19 shows a fourth embodiment 1901 of membrane aeration apparatus 803 of second pre-treatment suite 413 (similar elements retaining numbering from prior occurrence). Here, the radial mixing is enhanced through means of an electrically charged Dualplex-start-Coil-System (DSC) mixing system. The DSC consists of two independent, non-touching coils 1903 with an even pitch spacing twisted around the membrane. The coils are situated in the space between the outside diameter of the membrane and the inside diameter of the grooved support body. These coils are made of non-sacrificial, but conductive material, for instance synthetic graphite or graphite coated support material.

The proper non-touching spacing between the two coils is provided and secured through a thinwalled duplex-start grooved support body, made of clear nonconductive PVC. The duplex-starts in the support body are offset to each other (i.e., turned by 180°). Pitch of each coil and groove of one inch, providing a pitch distance of half an inch between the two independent coils, suggest good performance for most applications. The coils are screwed into the support body concurrently and the support body is inserted as a cartridge into a reactor glass body tube. The outer support body diameter is sealed against the body tube (using O-rings, for example).

AC power is received at connector 1905 connected to coils 1903 at a vessel cap 1907. The vessel cap in configured to provide for electrical connection away from the liquid phase. In essence this embodiment operates similar to an electrocoagulation system with non-sacrificial electrodes, the electrically charged mixing coils 1903 representing the electrodes and the pitch spacing representing the electrode C-C distance. The operating current of the system is preferably 4 amps with a frequency converter setting of between 1 and 10 hertz.

While shown utilizing the emitter 1803 of the third embodiment, this embodiment can be employed also with photo (UV) initiated air ionization technology. If radioactive initiated air ionization is employed, the positively charged α-particles will deflect towards the negatively charged electrical field. The frequency controlled alternating deflection of the α-particles takes place primarily within the upper portion of the ionization chamber. This alternating deflection provides additional collision potentials with the continual incoming large number of neutral air molecules, thus slowing the recombination of positive and negative ion pairs prior to exposure to the contaminated effluent.

The alternating current flow provides an enhanced distribution environment for the diffusively aerated ionized air/gas for balancing the surface charge of particles in the feed water solution thus removing or reducing the electrical repulsive charge on the particles. This hydrodynamic mixing energy, provided through the differential pressure of the flow altering coil system, generates a turbulent fluid motion environment for interparticle contacts, sometimes called orthokinetik flocculation. The interparticle contacts of charge neutralized materials (for example, colloids) now destabilizes out of the dispersion, followed by collision of destabilized particles to form aggregates. The aggregation of these particles into larger more easily settled aggregates is necessary for efficiency enhancement of following processes where separation by precipitation, sedimentation and flotation takes place.

Figure 20:
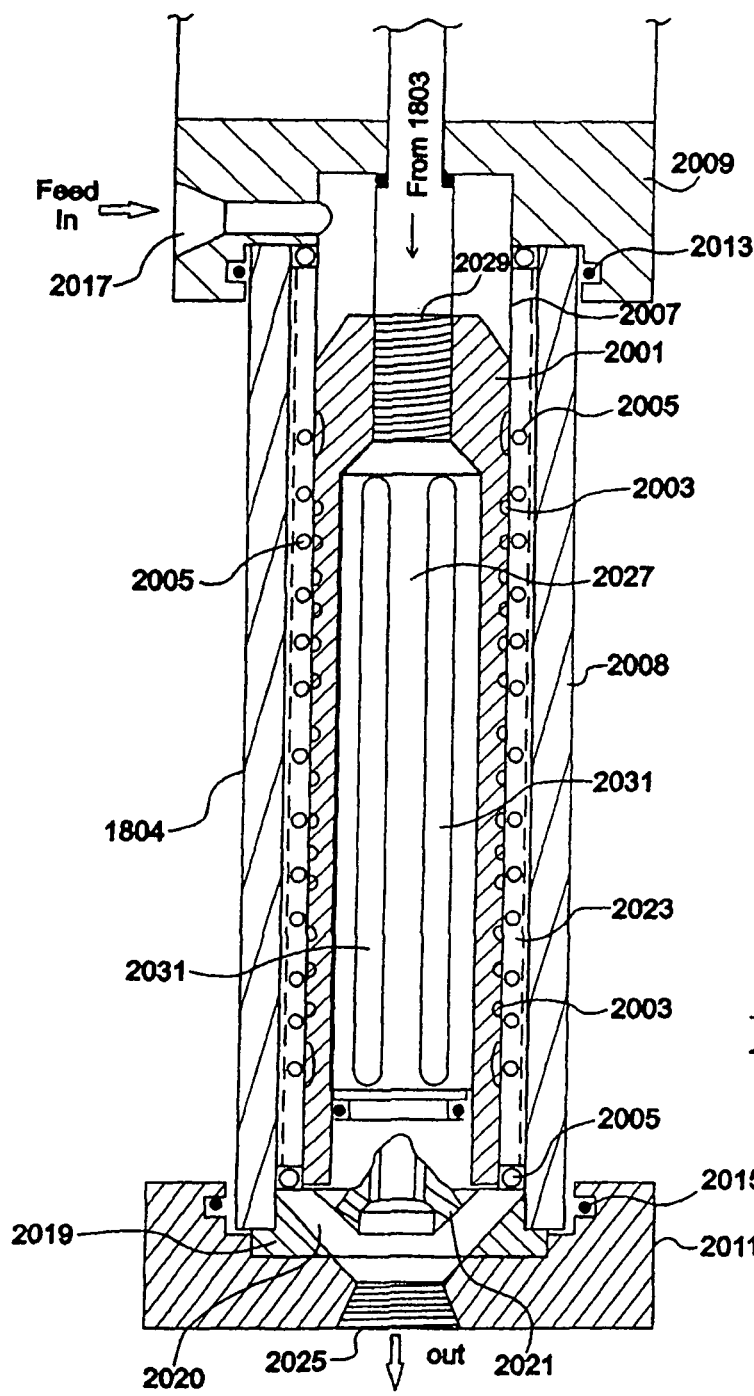
FIG. 20 is a sectional illustration of a membrane aeration apparatus of the second pre-treatment suite.

Reactor unit 1804 is shown in FIG. 20 (though many of the features thereof are similar to others of the reactors units shown in FIGS. 16, 18 and 19. The unit includes perforated membrane support body 2001 equipped with coiled gas feed grooves 2003 having positive pitch. Gain twist mixing coil 2005 facilitates fluid flow and secures hydrophobic membrane sleeve 2007 on support body 2001, the active membrane side facing outwardly. Membrane sleeve 2007 is sealed on both ends of cylindrical support body 2001.

This assembly is received in clear reactor sight glass/outer body 2008, upper and Lower caps 2009 and 2011 applied and sealed thereat by O-rings 2013 and 2015, respectively. Feed inlet port 2017 is defined in cap 2009 and retainer and transfer plug 2019 is received between cap 2011 and outer body 2008 for, in combination with a series of included fluid transfer holes 2020 adjacent to conical end 2021 of support body 2019, channeling flow at flow channel 2023 to outlet port 2025 defined in cap 2011. The compressed stream of ionized air/gas received from emitter 1803 is received into support body expansion chamber 2027 through port 2029. Slots 2031 are formed around support body 2001 for less obstructed ionized air transfer through membrane sleeve 2007 into the aqueous flow.

In unit 1804, the ionization of the induced air and the diffusive transfer of the ionized air through the reactor membrane into the feed water start in the upper portion of the reactor chamber, into the starting point of turbulence. The turbulence is generated by means of the progressive flow path coiled around the reactor membrane. The gain twist coil path provides a high energy efficient collision environment for the ionically destabilized particles in the feed water to form aggregates. The key to the high energy efficiency of the progressive gain twist static inline mixing coil lies in the fact that it substantially operates as a plug flow device. All material passing through it receives the same blending experience. The same amount of energy or foot pounds of work per gallon has been expended on all the incoming feed water. None is overblended and none is under-blended.

All embodiments shown in FIGS. 16 and 18 through 20 are much more effective than conventional venturi technology for the ionized air-liquid-solids systems. The diffusive ODE/IDI technology provides a defined three-dimensional diffusive phase contact transfer environment with the medium. Since conventional venturi type blending does not provide such a defined phase contact area, the phase contact within the molecular and micron range takes place by undefined chance rather than design and, therefore, lacks effectiveness by comparison.

Furthermore, the conventional venturi contactor works with a relative low pressure differential and, therefore, a low vacuum suction for air and/or ionized gas. In contrast, the higher and variable pressure operating membrane technology herein diffuses more air for bubble generation and/or ionized gas effectively into the feed medium. While recirculation can be provided, ODE/IDI systems of this invention are effective in a once through on the fly treatment. With the integration of the ODE/IDI units of this invention a reduction of operating costs through energy savings and capital cost for reactor construction are realized, and a smaller station foot print is enabled.

Figure 21:
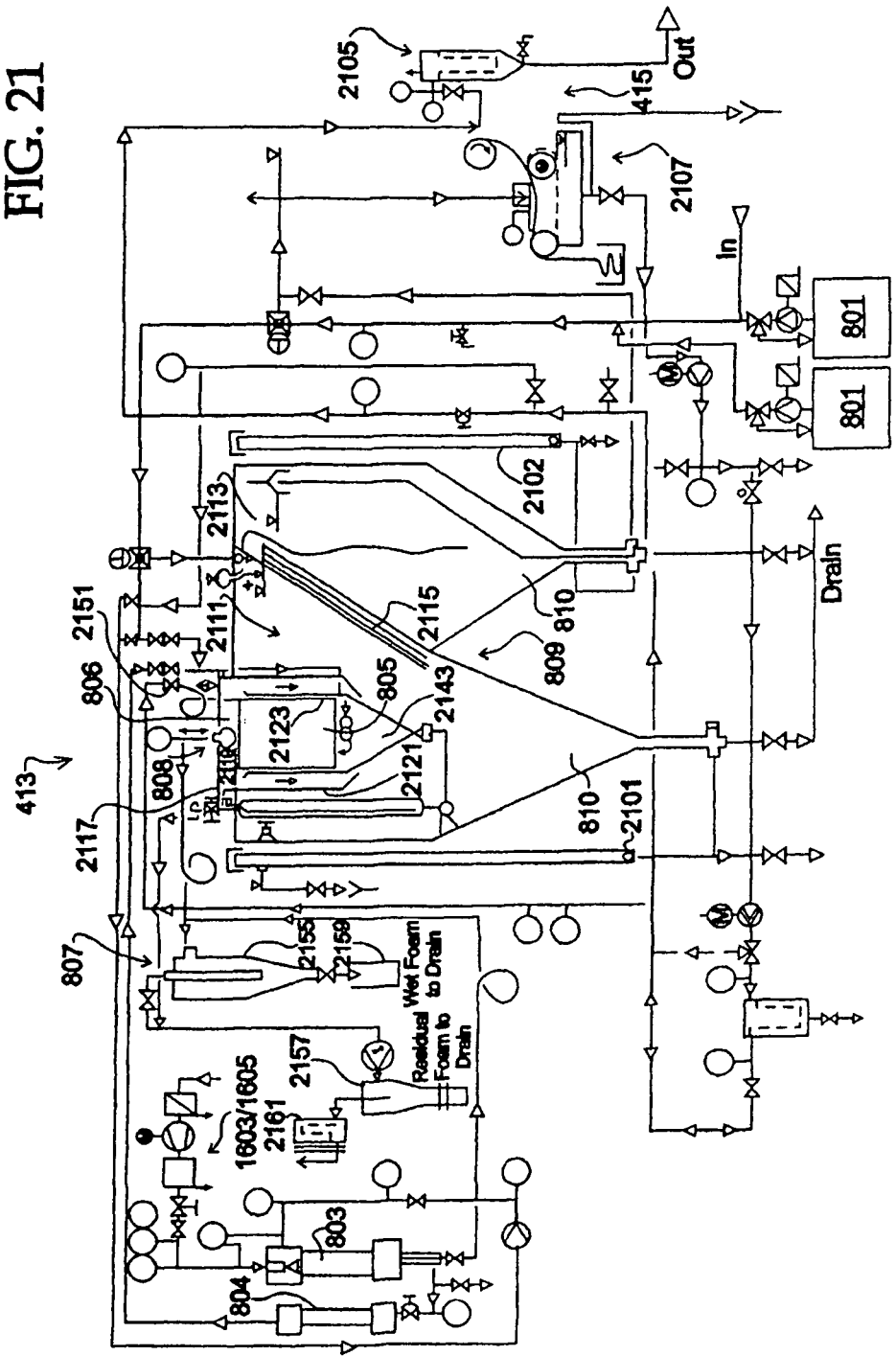
FIG. 21 is a diagram illustrating other components utilized in the second pre-treatment suite.
Figure 22:
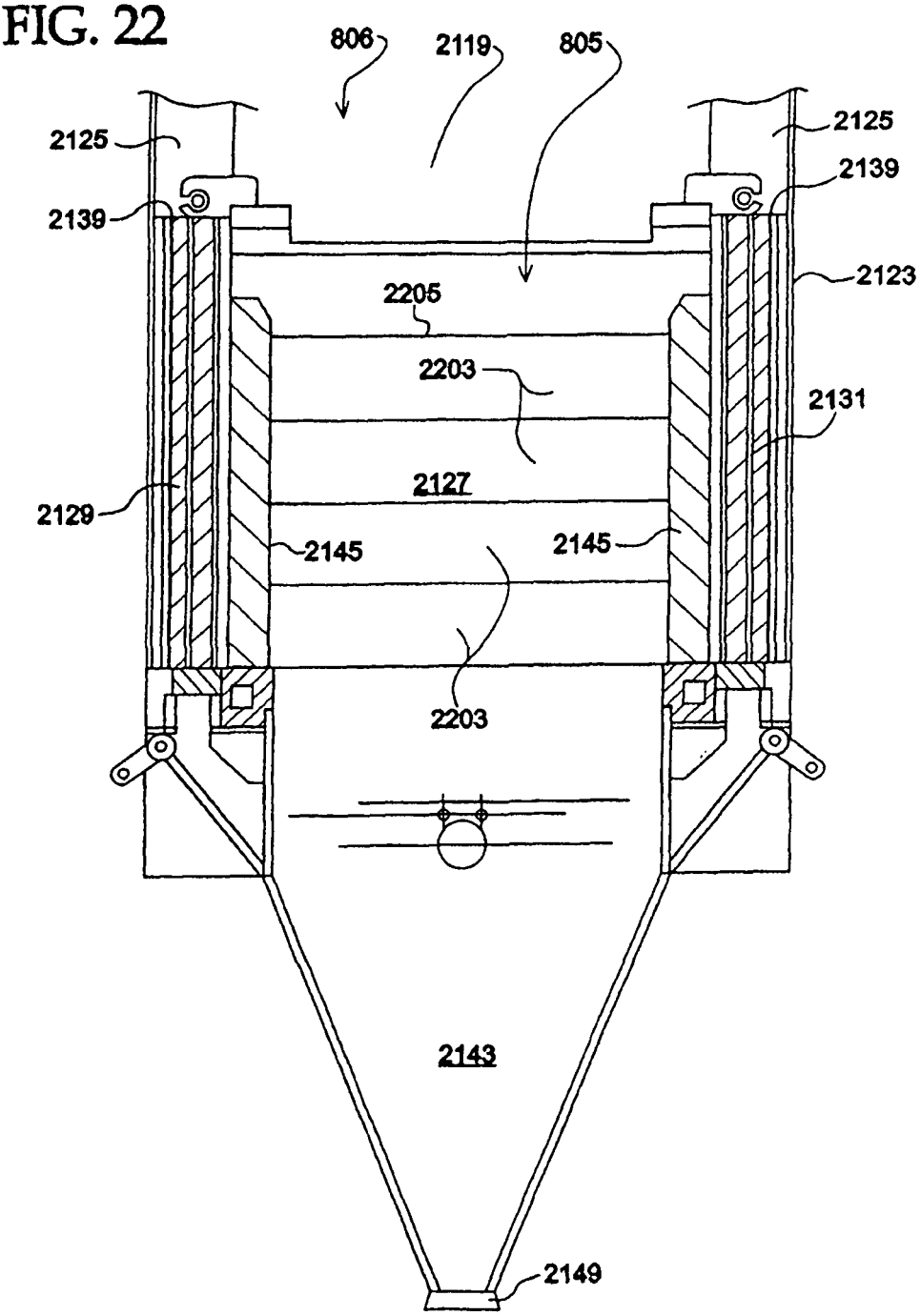
FIG. 22 is a sectional illustration of an electrocoagulation unit utilizable in the second pre-treatment suite.
Figure 23:
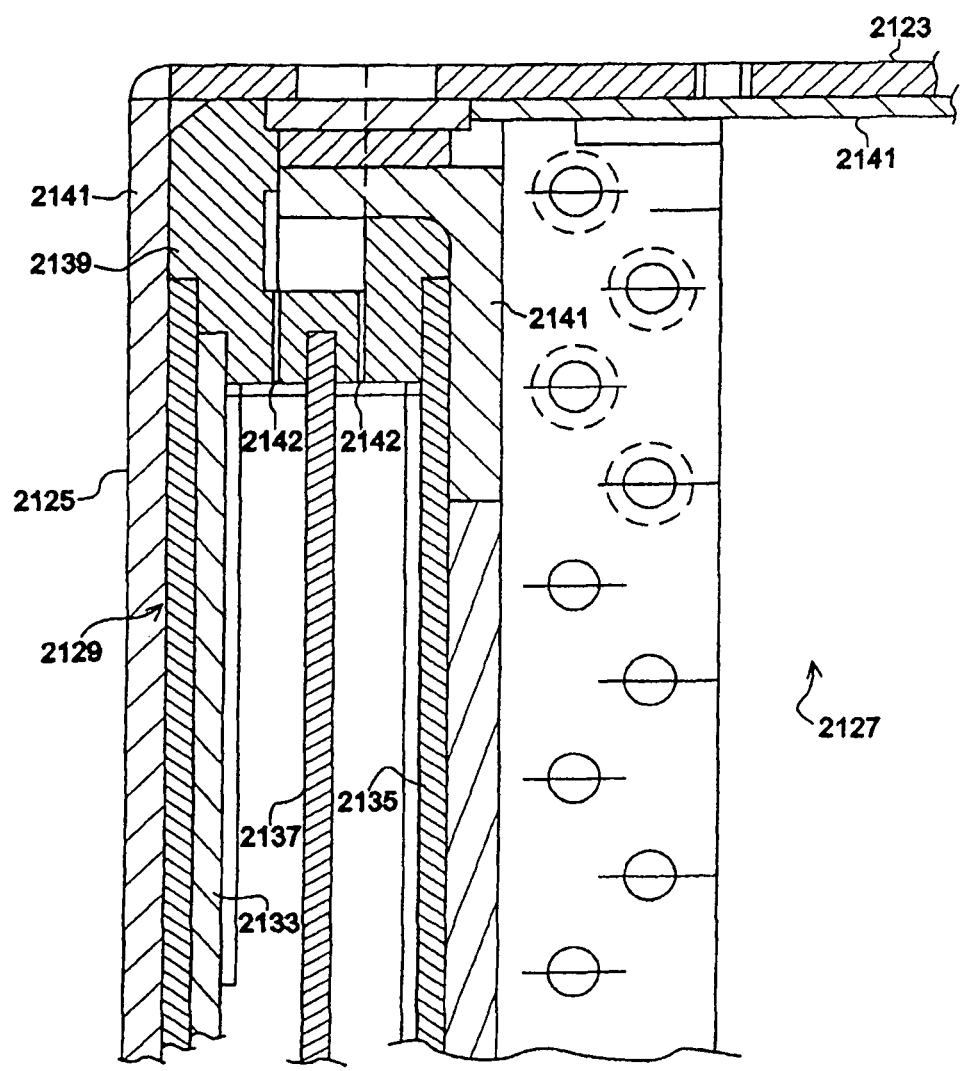
FIG. 23 is a partial sectional illustration of the housing of the unit of FIG. 22.

FIGS. 21 through 23 show various other apparatus of second pre-treatment suite 413, FIG. 21 illustrating a particular arrangement of suite 413 including the ten apparatus 801 through 810 heretofore identified configured with selected piping, flow control and instrumentation configuration. IDI inline ionizer unit 804 may be any known alpha ionizer such as the STATICMASTER series form NRD and related instrumentation. Level sight glasses 2101 and 2102 allow convenient on-site process inspection. Output from suite 413 proceeds to stage 415 (step 7) including bag filter system 2105 and belt filter system 2107.

In accordance with another aspect of this invention, FIG. 21 through 23 and the following description illustrate the electrocoagulation apparatus and configuration in station 101 of this invention. Electrocoagulation apparatus 805 operates conventionally but includes a number of unconventional features. In addition, apparatus 805 is positioned in tank 2111 (the larger of the two tanks 2111 and 2113 separated by separator plate 2115) of lamella plate clarifier apparatus 809. Electrocoagulation operates by the splitting off of ions from sacrificial or non-sacrificial electrodes in apparatus 805 into the water presented for treatment to destabilize suspended, emulsified or dissolved contaminants in the water by introduction of an electrical current. The water acts as an electric conductor in which current is carried, thus forming a hydroxide compound. The most common sacrificial electrodes utilized in such apparatus are made of iron or aluminum, the most common non-sacrificial electrodes being made of synthetic carbon (or graphite).

Present electrocoagulation art does not adequately address the mechanisms of flotation, sedimentation and the circulation effect of coagulant aggregation in the early stages as bridging flocs. In the electrocoagulation process, the partially lighter aggregated coagulants are transported to the liquid surface by their attachment onto the ascending electrolytic gas bubbles. The remaining, predominantly heavier, aggregated coagulants bridge to heavier, larger flocs and precipitate out into a sediment layer.

Treatment analysis in advance of establishment of the treatment regimen determines the necessary mass quantity of matter that needs to be deposited by the sacrificial electrodes. For diagnostic real time capability, the electrocoagulation reactor described hereinafter may be equipped with selective multiple electrolytic cell choices (14 cells, for example) in the primary reactor chamber.

In accordance with this aspect of the invention, the following relates to electrical apparatus for electrolytic flotation and electrochemical dosing referred to as electrocoagulation, and apparatus, configurations and methods for treating contaminated waters for selective pre-treatment and/or cleaning of the waters. Electrocoagulation presents a cost-effective alternative to traditional methods for treatment of certain polluted waters or as a method for the pre-treatment of suspensions, emulsions and light sludges prior treatment with membrane technology, for instance clean up involving gas, dissolved and suspended solids removal from a hydraulic system where chemical or electrochemical dosing, coagulation, electroflotation, flocculation and sedimentation would be employed.

Apparatus 805 of this invention allows for a variety of electrode materials to be implemented within one active electrode plate area for numerous electrolytic treatment applications. The apparatus is compact and portable for easy delivery and hookup at station 101 and is used in conjunction with the other station apparatus for blending air, plasma-gas and/or dissolved metal salts with the feed water. As shown in FIG. 21, a plurality of pumps for controlling the feed water flow and a plurality of conveniently located valves, regulators and pump controls for automated or manual control of the various functions of the apparatus 805 are provided. Apparatus 805 is integrated directly with dissolved air flotation apparatus 806 in clarifier apparatus 809, and is further enhanced by integration with vacuum apparatus to accelerate the electroflotation of the floc-foam layer to the liquid surface of electrocoagulation reactor (together referred to herein as "electrolytic dissolved air flotation"—EDAF—treatment).

The EDAF treatment approach utilizes a modified plate electrocoagulation reactor design. Because electrocoagulation reactor 805 is an integrated part of clarifier tank 2111 of lamella apparatus 809, shear-free sludge transfer in a compact single unit structure is provided. Vacuum enhanced electroflotation is provided through the employment of an enclosed vacuum hood 2117 above flotation chamber 2119 of flotation apparatus 806, to speed up the flotation process and as well remove unwanted created or entrained gases via vacuum degassing apparatus 808.

Vacuum hood 2117 is adjustable for proximity and vacuum lift capability to optimize the electroflotation effect as well as floc-foam surface layer removal at cyclone separator apparatus 807. Hood 2117 is mounted on outer housing 2121 holding inner reactor assembly 2123 of electrocoagulation apparatus 805. Inner assembly 2123 (FIG. 22) is defined by four corner posts 2125 (FIG. 23) together establishing primary reaction chamber 2127 and secondary reaction chambers 2129 and 2131 adjacent the primary chamber. The secondary chambers provide additional electrocoagulation treatment stages to optimize the overall electrocoagulation treatment on an as needed basis. Each secondary chamber includes an anode, cathode and bipolar electrode 2133, 2135 and 2137, respectively, held in corner post 2139 for insulating the secondary chambers as well as forming supports for insulating walls 2141 of the primary chamber. A small jet of previously clarified process water received through conduits 2142 washes electrode 2137

Conical sludge chamber 2143 is formed below primary reaction chamber 2127 and vacuum/flotation chamber 2119 of flotation apparatus 806 is formed below chamber 2127.

Primary electrode plates (either sacrificial or, preferably, non-sacrificial) are held at a plurality of electrode positioners 2145 at opposed chamber walls. This electrode framework allows rapid electrode interchangeability and/or electrode set ups specially adapted to site circumstances. For example, a composite electrode setup with electrodes of different materials combined within a single electrode stack could be utilized for treatment of complex feed waters. Bipolar electrodes 2137 of secondary chambers 2129 and 2131 are readily accessible for maintenance purposes.

Integrated sludge chamber 2143 provides buoyancy and/or electromechanically actuated sludge transfer via a sludge cone valve 2149. Sludge is transferred from sludge chamber 2143 into the fluid bed of the sludge holding/disposal chamber 810 at lamella clarifier tank 2111 of clarifier apparatus 809, thus minimizing a shear introducing gradient to the delicate floc structure within the sedimentated electrocoagulation sludge. This eliminates or greatly reduces the need for expensive floc polymers and/or coagulants as well as reducing energy requirements for the floc rebuilding process. A compound sludge chamber angle of repose of 35° for hydroxide sludge is employed thus, in conjunction with a matching sludge cone release valve, preventing sludge build up within the chamber and expediting sludge release.

A variable discharge head and distribution system may be employed to minimize surface floc-foam layer carry over from the primary chamber and provide suitable discharge distribution geometry into secondary electrocoagulation chamber(s), thus minimizing channeling and ensuring effective electrocoagulation treatment in the secondary electrocoagulation. Secondary electrocoagulation flow control may be provided through discharge disks and dampener adjustment to ascertain proper flow distribution, retention time and minimize channeling, providing an effective secondary and efficient overall electrocoagulation treatment.

Multiple flat bar electrodes 2203 forming multiple electrode stacks 2205 (only one shown in FIG. 22) are employed. These standard vertical stacks consist of electrode bars 2203 arranged one on top of another. Horizontal stacks 2205 may be arranged with electrode bars 2203 in a side by side arrangement (instead on atop one another) and secured by a top contactor clip which also provides current transfer from one stack 2205 to the next. The vertical multi-flat bar stack 2205 arrangement is more suitable to maximize sacrificial electrode life. The sacrifice of electrode material is more pronounced on the leading edge/area of the ascending feed water flow in a downward or upward directed parabolic shape. The leading edge problem can be minimized by substituting the bottom bar with a nonmetallic, but conductive synthetic graphite bar. If unacceptable, a new sacrificial bottom bar needs to be added from time to time between whole stack replacements.

The vertical multi-flat bar option provides a mechanism for active electrode area reduction without sacrificing reactor retention time by insertion of dielectric/nonconductive plate area (PVC or CPVC) into the vertical stack electrode structure in place of active electrode bar(s). This allows varying of the active surface area to volume ratio to find the optimum ratio for a particular application. This variable ratio option is an important feature in establishing scale-up of this parameter.

Required electrical field strength (dependent upon concentration levels and contaminant types in the feed water) can be manipulated by varying electrode C-C spacing for treatment optimization. Primary electrocoagulation facilities at 2127 are powered with a variably applied amperage in the range of 0.1 to 60 amps. With electrode bars set in series connection mode, the same current flows through all the electrodes and voltage is allowed to vary as electrocoagulation treatment progresses over time.

A crossflow electrode flushing capability option through valve 2151 is preferably provided to create a turbulent flow regime with the ascending water flow in primary electrocoagulation reactor chamber 2127 and with the descending flow within the secondary electrocoagulation reactor chambers 2129 and 2131. Flow direction of flush water jetting is staggered crosswise and perpendicular to the electrocoagulation process water flow over the electrode plates. The directed turbulent flow continually washes the sides of the electrodes and prevents or significantly retards the build-up of impermeable oxide layers (passive) on the cathode as well as deterioration of the anode due to oxidation. This can be done instead of polarity switching or, in a fine regulated mode, in addition to polarity switching in severe scaling situations or in applications that contain heavy amounts of grease or oils.

A small jet of previously clarified and pressurized process water flow is constantly or time sequentially introduced into the electrocoagulation process water flow through a plurality small (1/32", for example) holes drilled into electrode positioners 2145 at primary electrocoagulation reactor chamber 2127. Secondary electrocoagulation reactor chambers 2129 and 2131 have a plurality of similar holes 2142 drilled into spaces at insulating corner post 2139 between and close to the electrodes.

The three phase separation and removal areas of electrocoagulation reactor apparatus 805 operates as a standard parallel electrode unit (in a fluidized bed configuration a different arrangement would be applied). In phase one, light flotation solids in the floc-foam, gas ($H_2$ and $O_2$), and oil and grease layers are separated at the liquid surface and removed by the adjustable vacuum at vacuum chamber 2119. In phase two, the semi-clarified effluent of the primary electrocoagulation treated water is separated from underneath the floc-foam surface layer at chamber 2127 and is removed or transferred through adjustable disk head control devices into the secondary electrocoagulation reactor chambers 2129/2131. It is here either optionally treated or directly discharged into the settling portion of the lamella clarifier tank 2111 to develop clarity prior to discharge from the lamella separator 2115 overflow into the clear flow catch tank 2113. In phase 3, the solids precipitate out into integrated primary electrocoagulation sludge chamber 2143, proceeding through the normal sedimentation process mechanics.

When operating electrocoagulation apparatus 805 with non-sacrificial electrodes, for instances with electrically conductive synthetic graphite electrodes, the necessary positively charged ions for maintaining the electrocoagulation process are partially provided by the feed water itself. The remaining part of the required positively charged ions are added in form of metallic ions such as $Al+$, $Ca+$, $Fe+$ and $Mg+$ salts. For an enhanced electron migration, the electrocoagulation process should be operated within the acidic range through chemical dosing with hydrochloric (HCl), sulfuric ($HS_2O_4$) or phosphoric acid ($H_3PO_4$). Utilization of synthetic graphite electrodes avoids the consumption, replacement and operating down-time associated with conventional sacrificial electrodes, and reduces energy and maintenance costs. Moreover, metallic salts are less expensive than the refined, finished, sawcut and otherwise machined or fabricated sacrificial metal electrode plates.

To facilitate feed into chamber 2127, a longitudinal tube turns for net feed area adjustment inside of the stationary 1¼" base pipe, a defined net opening slot area distributing the whole feed through the whole length of primary electrocoagulation reactor chamber 2127. To facilitate discharge from inner reactor assembly 2123, discharge weir disk orifices are preferably provided for flow control from chamber 2127 or into secondary chambers 2129 and/or 2131. To prevent surface foam carry over into the secondary electrocoagulation treatment chambers, a positive head above the center of these orifices needs to be maintained at all times.

Through simple contact plunger manipulation at an easily accessible multinode terminal bar or bars adjacent the electrodes (either manual or automated contact manipulation could be deployed), electrocoagulation reactor operating circuitry can be arranged for different modes of operation. For parallel operation, contact plungers are provided at each electrode node at a terminal bar. This arrangement of the electrocoagulation reactor circuitry provides parallel connection using monopolar electrodes. In this mode, the electric current is divided between all of the electrodes in relation to the resistance of the individual cells. The same voltage is present in all of the contact plungers. Varying the current controls the rate of electrochemical activity For series operation, one contact plunger remains active at the terminal bar furthest from the source power connections. Insulated jumpers connect the nodes. In this mode of operation the contactor terminal bar provides series connection for the monopolar electrodes in the electrocoagulation reactor. In series cell arrangements, a higher potential difference is required for a given current to flow, because of higher cumulative resistance. The same current would, however, flow through all the electrodes. Varying the voltage controls the rate of electrochemical activity.

In a parallel, bipolar configuration (as shown in the secondary chambers 2129 and 2131, but which could be applied primarily), one contact plunger at both contactor terminal bars remains, the one furthest from the source power connections. Only the monopolar anode and cathode electrodes are connected to the electrical power connections. In this mode, bipolar electrodes with cells in parallel are used. The bipolar electrodes are placed between the two parallel anode/cathode electrodes without any electrical connections. When an electric current is passed through the two electrodes, the neutral sides of the conductive plate of the bipolar electrodes will be transformed to charged sides, which have opposite charge compared to the parallel side beside it. This cell arrangement provides, where applicable, a desirable testing platform for a full-scale unit application. Its simple set-up and maintenance can lower the overall electrocoagulation operating cost.

A mixed parallel and series configuration could be provided, providing individual mixed cell circuitry configurations. For instance, in a fourteen cell reactor, half the cells could be connected in a series circuitry and the remaining seven cells connected in parallel, either as monopolar, bipolar or in mixed mode. This option can be used as a diagnostic tool when different amperages are needed for different electrode materials within the primary electrocoagulation reactor for specific treatment situations.

These parallel or series power connection choices are implemented by spring loaded contactor bars with integrated connection interchangeability (plungers). DC or AC operating power options with variable current density controls are implementable for control of electrochemical dosing and electrolytic bubble density production for sacrificial electrodes, as well as regulating the required transport current for the required added positively charged ions when nonmetallic and non-sacrificial electrodes are employed.

Controlled polarity switching for DC power implementations is provided to prevent or minimize oxide build up as well as hydrogen polarization. A vector frequency controller for the AC power option provides for frequency control below 90 Hertz to prevent disaggregation of agglomerated particles. To accommodate rapid changes of electrodes and/or customization of electrode setups, main power distribution through removable, quick release, swing away main contactor bars, providing as well for rapid change from parallel to series power connection, is utilized.

Regarding pre-treatment suite stages 411 and 413, zeta potential is an important part of the electrokinetic phenomena of interaction between particles in suspension. The zeta potential is the electrokinetic potential of a suspended particle as determined by its electrophoretic mobility. This electric potential causes colloidal particles to repel each other and stay in suspension. The zeta potential is a measurement of the overall charge characteristic of the suspended particles in the water. Whereby the kind and magnitude of the electrical charge depends on the surface potential of the particles, or the zeta potential. A negative zeta potential indicates that the water contains free negatively charged suspended solids (common in many treatment feed waters) that are stabilized and therefore more likely to stay in solution.

A neutral zeta potential indicates that the suspended solids do not carry a charge to assist in their electrical repulsion of each other. They are more likely to destabilize and coagulate into larger particulate groups and fall out of solution, and therefore being removed as part of the pre-treatment. The importance of the zeta potential rests on the fact that it can be measured experimentally and in many cases serves as a good approximation of the unmeasurable surface potential of the colloidal particle, since there is a fairly immobile layer of counter ions that sticks tightly to the surface of the particle. Treatment diagnostics herein thus uses the zeta potential measurement to gauge coagulant requirements (if any), and can be adapted for automated adjustment of an injected cationic (positively charged) coagulant such as reverse osmosis Quest 6000, which could be used in pre-treatment stage 411, to achieve a neutral zeta potential upstream of pre-treatment stage 413. Thus utilized, suspended solids would be more likely to fall out of solution into 2111 of clarifier 809.

Vacuum introduced cyclone separation apparatus 807 of suite 413 (FIG. 21) utilizes a conventional cyclone unit or units 2155 and 2157 connected for vacuum inducement apparatus 808 and hood 2119 and outlet for foam collection through filters 2159 and 2161, respectively. Filtration stage 415 (step 7) makes use conventional know bag filter systems 2105 and or belt filtration systems 2107 (such as the Roll-A-Filter or Lazy Filter fabric media systems produced by SERFILCO. Homogenizing and buffer tank for pH and chemical adjustment a stage 417 (step 8), and buffer tanks at stages 425 and 431 (steps 12 and 15), make use of a standard, commercially available tank designs (for example, polyethelene tanks by LMI or SNYDER of adequate capacity, and with or without containment basins). Chemical metering pumps 306, 308 and the pumps used at stages 421 and 427 (steps 10 and 13) could be either of two types (automated and/or manually operated). Primary chemical injection pumps are solenoid-driven, dual manual controlled diaphragm metering pumps having four-function valves for control of anti-siphon, back pressure, priming, and pressure relief all in one could be used (the metering pumps and controls by LMI Milton Roy, for Example).

Secondary chemical injection pumping employs dual channel peristaltic pumps for antiscalant injection, for example upstream of nanofiltration and reverse osmosis membrane systems described below (V-TECH—3000 at stage 421 or 4000 at stage 427—through Masterflex pumps from Cole-Parmer Instrument Company, for example, could be utilized).

Membrane treatment and other treatment systems utilized at 205, including stages 419 through 433 (steps 8 through 16), may be realized by deployment of various types of apparatus and systems, particularly at steps 9, 11, 14 and 16 (steps 8, 10, 12, 13 and 15 are primarily directed to homogenization and process buffering and/or chemical metering, and have been addressed hereinabove). Ion-exchange treatment and HEED systems utilizable herein have already been addressed. In addition V-SEP series L/P systems, while not preferred, could be utilized at stages 419, 423, 429 and 433 for analytics as well as filtration and reverse osmosis filter installations.

At stage 419, high frequency nanofiltration systems as discussed hereinbelow could be employed (other filter types could be used as discussed herein). However, in accordance with another aspect of this invention, FIG. 24 through 27 illustrate an axial vibratory membrane separation apparatus and methods for forward osmosis. This aspect of the invention relates to low amplitude, axial vibratory membrane separation apparatus (both filtration and reverse osmosis filtration) called quaking recycle membrane separation technology employed with forward osmosis technology. Forward osmosis technology is employed to supplement the quaking membrane filtration and/or reverse osmosis technology, the hybrid application incorporated into an integrated apparatus (high frequency forward nanofiltration or high frequency forward reverse osmosis apparatus, for example).

Heretofore known forward osmosis technology uses the osmotic pressure differential across a membrane, rather than the hydraulic pressure differential, for filtration. The osmotic pressure differential is provided by a recyclable solute composed of a mixture of salts, the thermally recyclable salt solution called "draw solution". Draw solutions typically used include ammonium bicarbonate ($NH_4HCO_3$), ammonium carbonate ($NH_4$)$_2CO_3$, ammonium carbamate $NH_4NH_2CO_2$; ($H_4NO$)($CONH_2$; $H_2N$—CO—O—$NH_4$), and can preferably include magnetoferritin in solution. The concentration of solutes in the thermally recyclable draw is required to have a higher osmotic pressure than the osmotic pressure of the concentration of solutes in the feed water (often brackish). Common spiral-wound membranes have not been heretofore utilized for forward osmosis because a liquid stream cannot be forced to flow on the support side (permeate side) inside the envelope, where the porous polymer layer further increases the internal concentration polarization. The apparatus of this aspect of the invention employs tubular or hollow fiber membrane modules, rather than spiral-wound membrane elements.

The hybrid quaking membrane plus forward osmosis process and apparatus of this invention secure permeate continuity of the present art forward osmosis technology (generating extreme turbulence on both sides of the forward osmosis membrane (feed side and draw side) to support permeate continuity), provide nondestructive, vibratory membrane separation for commercially available forward osmosis membranes, and reduce the potential tendencies of concentration polarization, scaling and fouling of forward osmosis membranes.

Turning to FIGS. 24 to 27, the hybrid quaking membrane plus forward osmosis process and apparatus is illustrated with the quaking membrane assembly at 2401 and recycle and reconcentrating closed loop system at 2501. In the combined apparatus, self-supported, semi-permeable or hollow fiber tubular membrane 2403 is used as a forward osmosis membrane operating in a quaking membrane process. Such tubular and hollow fiber membranes have no thick support layer as in spiral-wound, flat sheet, asymmetric membranes, thus minimizing internal concentration polarization. Membranes of this type are commercially available.

The quaking membrane process is low amplitude and high quaking frequency, generating low shear energy and therefore a gentle and non-damaging treatment to the epoxy potting compound of tubular or hollow fiber membrane 2403. The quaking energy significantly lower already low external concentration polarization, and has a positive effect on internal concentration polarization as well. Sufficient turbulence is generated on both sides of tubular or hollow fiber membrane 2403 (external and internal) for securing continuation of increased flux performance required by the forward osmosis process. The process thus yields a higher permeate production with less concentrate for disposal and requires less up front pre-treatment for the feed, while using less energy compared to conventional reverse osmosis/nanofiltration technology because little or no hydraulic pressure is needed as a driving force for separation.

For a continuously operated forward osmosis process, it is necessary that the membrane module design allows liquids to flow freely on both sides of membrane elements. Cellulose triacetate is the preferred material used in membrane 2403 (TOYOBO Hollosep hollow fiber membranes, for example). Low pressurized, recirculating feed water flows inside of the hollow fiber tubes of the membrane module 2403 from low pressure feed recirculation pump 2405. The gravity-assisted feed flow is induced at the top of the axial vibrating, hollow fiber module 2403.

Figure 25:
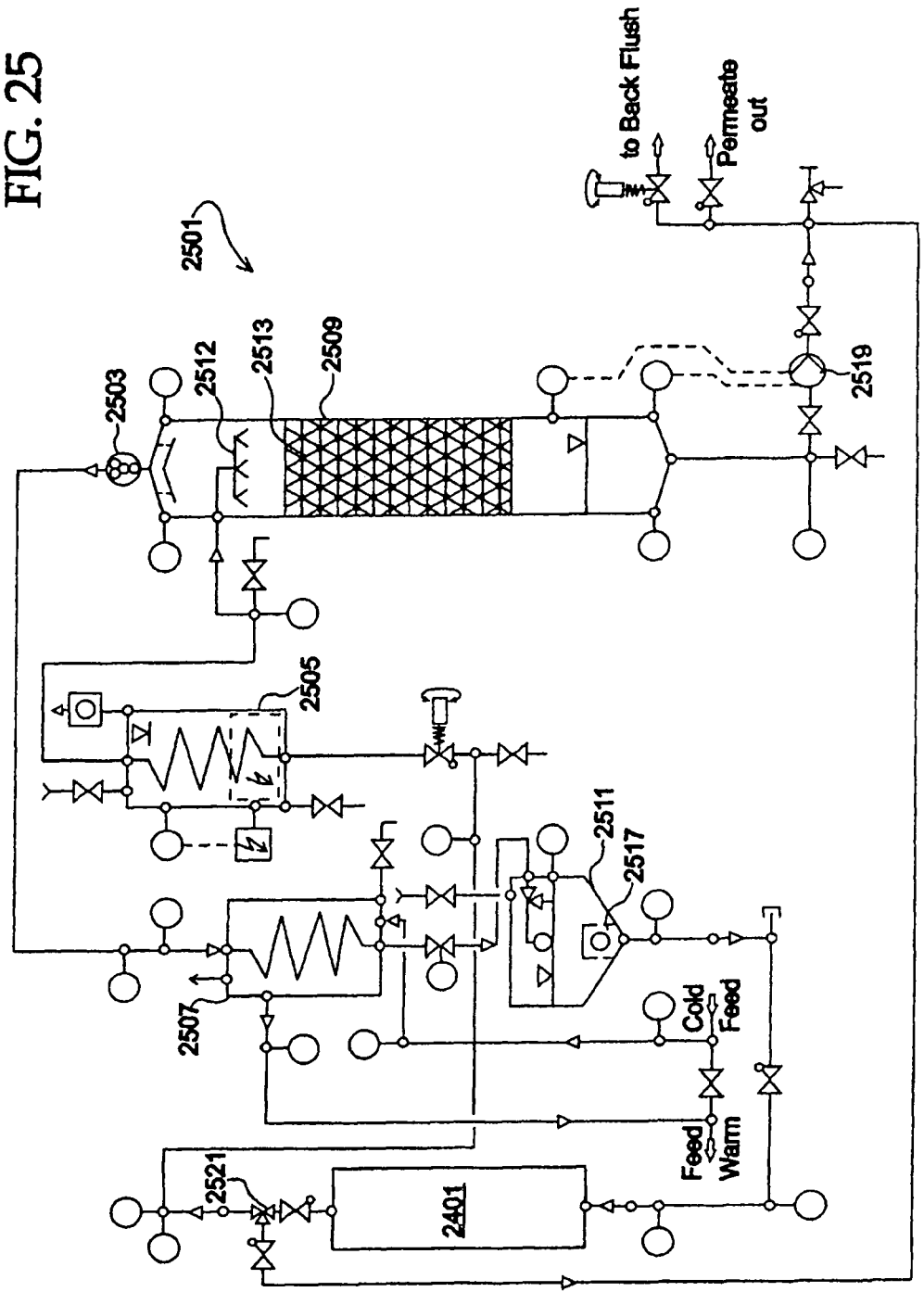
FIG. 25 is a diagram illustrating a second membrane technology of this invention utilizable in steps directed to the primary treatment of effluents.

Quaking membrane module 2403 can either be operated in a vertical or inclined position, quaking membrane movement is provided by means of quake generator such as high pressure diaphragm pump 2407. The low pressurized, draw solution flows counter currently to the feed on the outside of the hollow fiber tubes. The draw enters at the bottom of membrane module 2403 and exits at the top. Forced draw circulation flow is provided by vacuum and compressor pump 2503 (FIG. 25). The concentration of the draw solution is diluted as the high osmotic pressure of the solution draws water through the semi-permeable membrane from the feed medium of lesser osmotic pressure. This, in turn, requires a reconcentration of the draw solution for the continuous desalination process.

The diluted draw solution is thermally recycled and reconcentrated in a closed loop system, which yields potable water. The closed loop system consists of two heat exchangers 2505 and 2507, a stripper column 2509, and buffer tank 2511. In the closed loop, the draw solution diluted with water is first lightly heated to 30° to 50° C. in heat exchanger 2505. The heated draw exits heat exchanger 2505 from the top and is siphoned into stripper column 2509. Stripper column 2509 packing includes either raschig rings or berl saddles. Stripping takes place the column, the packing providing the necessary increased area and turbulence to achieve a desired draw solution conversion from a liquid to a vapor phase with the nonvolatile water precipitating out of the draw solution.

The lightly heated, liquefied and diluted influent (consisting of water and its soluble light volatile draw components) is distributed (at spray head 2512, for example) at the top of packed column bed 2513, flowing down through the bed where the large transfer area and the vacuum assistance of pump 2503 allows the volatile components of the diluted draw to convert into an effluent vapor phase in the upper column portion and yielding potable water dilution water from the lower column portion (the treatment product of this apparatus). Vacuum and compressor pump 2503 is configured to handle a large vapor volume on its suction side and compressing the vapor on its pressure side, and transfers the pressurized vapor from stripper column 2509 into the top of second heat exchanger 2507 for compression heat removal from the compressed vapor mixture. Cooling is provided by means of fresh cold feed water.

Figure 24:
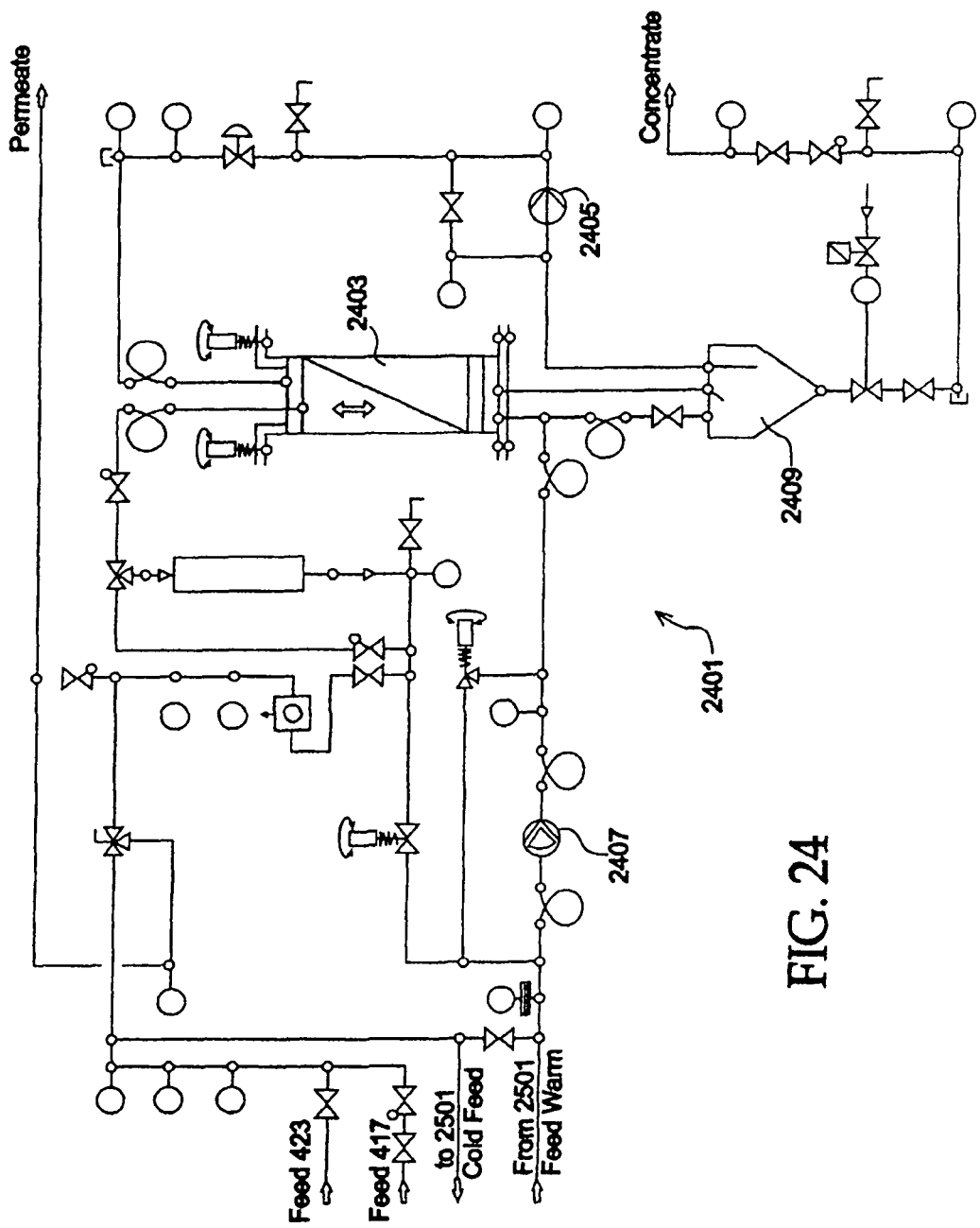
FIG. 24 is a diagram illustrating a first membrane technology of this invention utilizable in steps directed to the primary, polishing treatment of effluents.

The cooling the vapor phase yields a condensate of a highly concentrated solute mixture and thus generates a recycled draw solution of initial concentration strength. The vapor mixture condensate is discharged from exchanger 2507 into buffer tank 2511. Tank 2511 includes automatic aeration and de-aeration device 2517 to avoid the passage of residual vapor into hollow fiber module 2403. Treated water is transferred out of column 2509 by centrifugal-vacuum pump 2519 while retentate particle separation is achieved via hydrocyclone separator 2409 (FIG. 24). The upper module suction provides motive force to the recycled draw solution for flowing continuously from the lower permeate suction connection of module 2403 upwards and towards the upper permeate discharge connection, while the feed flows counter current to the draw downwards inside of hollow fiber module 2403.

The apparatus of FIGS. 24 and 25 is adapted for use not only with commercially available semi-permeable tubular and/or hollow fiber membranes modules, but also for forward osmosis specialized spiral-wound membranes when and if they become commercially available. The apparatus and processes can be used in station 101, and also in applications for any brackish water treatment, higher contaminated CBM water treatment, overflow treatment of biological, defecated, municipal waste water for irrigation, cleaning processes for airplane and other public transportation wash water recycling, processing of bilge water, processing of wash water for combat vehicles after active and practice missions, and waste water processing for the pharmaceutical and chemical industry.

The quaking membrane coupled with the forward osmosis process allows a substantial concentration upgrading at stage 419 at a significantly reduced energy requirement compared to conventional membrane separation processes, and could be employed as well at stages 423, 429 and/or 433. Depending on the application, quaking membrane technology provides high recovery relative to conventional nanofiltration and/or reverse osmosis technology. Reduced scaling and fouling tendencies of the apparatus and processes reduce costs associated with pre-treatment stages used in conventional nanofiltration and reverse osmosis technology.

Quaking frequency is variable in the range of 1 to 100 Hz depending on configuration. Quake amplitude has a relatively wide adjustable range of 0.2 to 2.0 mm. Quaking membrane movement can be generated either by any of electrical, hydraulic or mechanical means through an adjustable high frequency generator. Electrical means can include electromagnetic linear reciprocating membrane motion apparatus through a frequency-controlled, modified linear motion motor assembly wherein frequency and amplitude can be adjusted dynamically over a greater range (from 1 to 100 Hz.—see FIGS. 26 and 27).

Figures 26A, 26B:
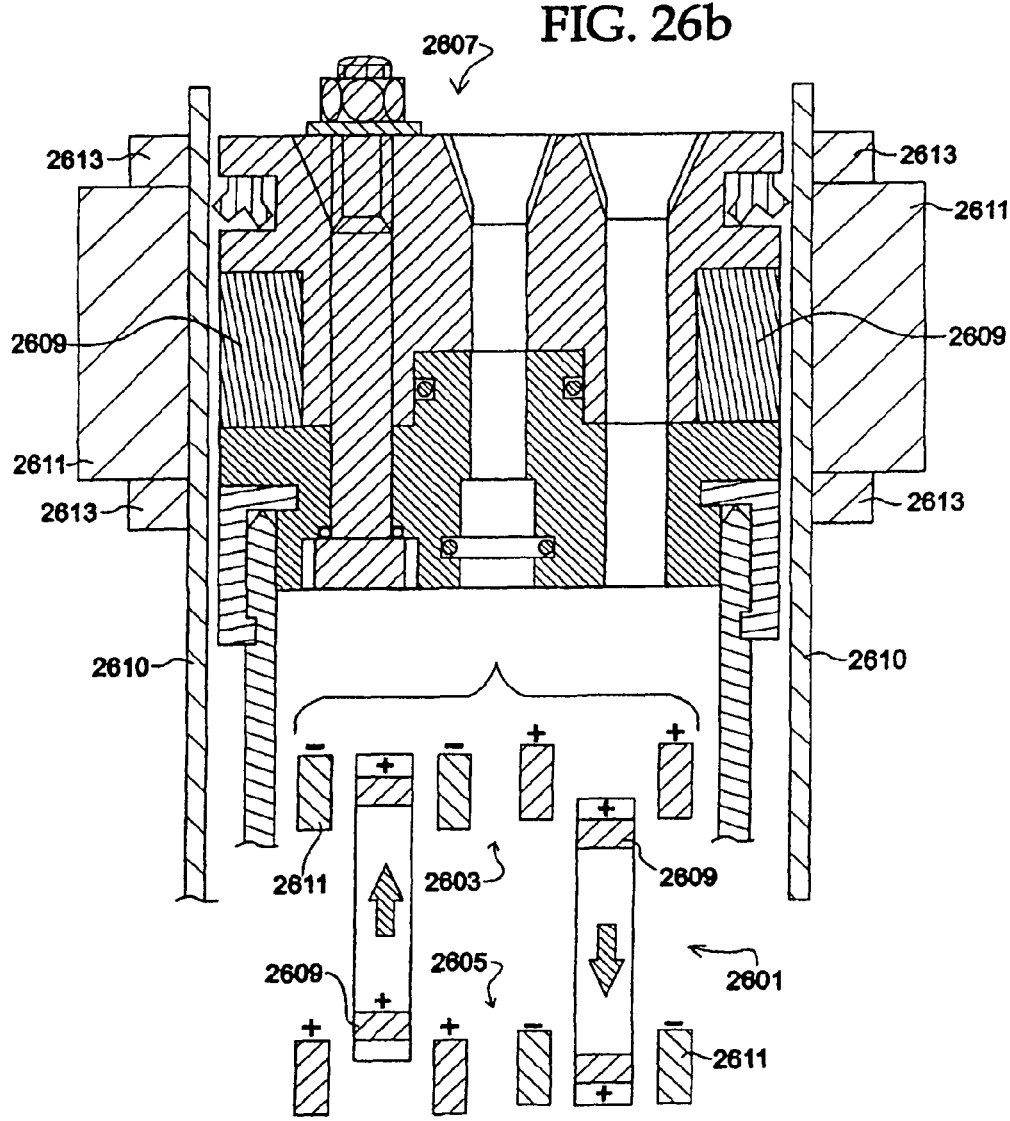
FIGS. 26a and 26b are illustrations of coil structures utilizable in the technology of FIGS. 24 and 25.

Modified motor assembly 2601 is shown in FIGS. 26*a* and 26*b* having an upper stator coil section 2603 and lower stator coil section 2605, upper and lower (upper components only being shown in FIG. 26*b*) fluid transferring end pieces 2407 being equipped with encapsulated, high-energy neodymium, iron-boron, reciprocating permanent magnet sleeves 2409. The nonmagnetic outer housing 2410 having with upper and a lower stator 2411 and retainers 2413. The stators contain the electromagnetic coils, which utilizes 3-phase direct drive, brushless technology. The stator's length and diameter set the force level, while the sleeve length determines the amplitude height.

Motor 2601 uses a dual synchronous design wherein two stators and two permanent magnet sleeves are spaced over the entire length of the membrane. These dual linear motors are operated synchronously thus providing positive linear reciprocating motion over the entire length of the membrane. Quaking membrane cartridge at 2403 floats and is supported between an upper recoil spring system and the lower support structure spring system (both at 2403), thus isolating membrane cartridge movement therebetween. Spring rate is adjustable for equalization of the stator coil force requirement between upper and lower stator coils 2411, with force requirements based on the chosen operational quaking frequency and amplitude.

As can be appreciated, the membrane cartridge rides up and down between two resilient spring isolation systems within a stationary (housing also at 2403), whereas the motive reciprocating forces are provided by means of dual synchronously operating linear motor assembly 2601. The two spring systems are configured to be adjustable for vibration transmissibility and damping efficiency (the spring system's ability to dissipate oscillatory energy and thus not transfer the energy to the entire quaking membrane module 2403).

Figure 27:
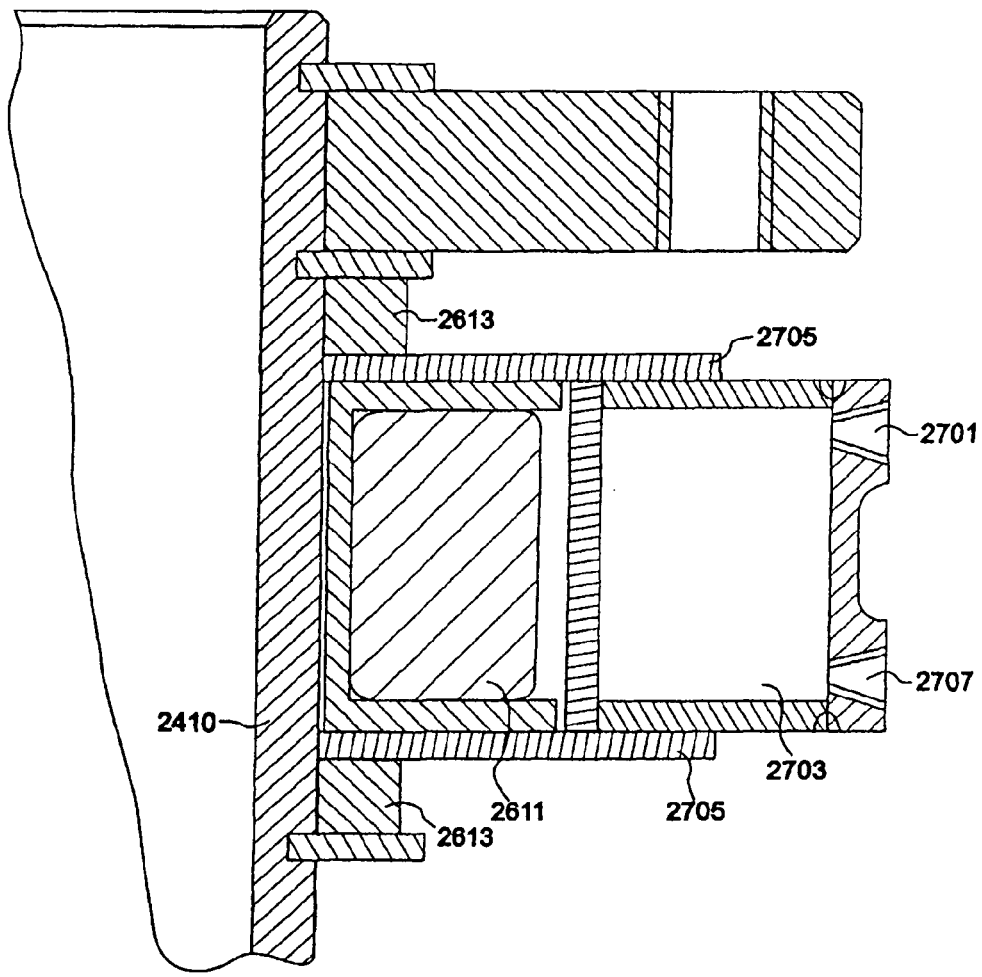
FIG. 27 is a detailed view illustrating coil cooling utilizable in the technology of FIGS. 24 through 26.

The modified linear motor assembly 2601 is essentially an electric motor that has its stator configured and positioned so that, instead of producing rotation, it produces a linear force along its length. As shown in FIG. 27 stator coil cooling can be accomplished utilizing a cold feed water stream (for example, from the same cold feed stream feeding heat exchanger 2507) fed by appropriate piping to port 2701 of ring-shaped cooler 2703 mounted between retainer disks 2705 adjacent to stator coil 2411. Feed at port 2701 is constantly replenished and recycled out at port 2707 connected at heat exchanger 2505.

Feedback in the forward osmosis system can be bypassed, if operations in quaking membrane mode only is preferred, by simple valving preventing re-osmosis of clean permeate. Three-way ball valve 2521 functions as a selector valve for quaking membrane plus forward osmosis mode operations or quaking membrane mode operations only.

Figure 28:
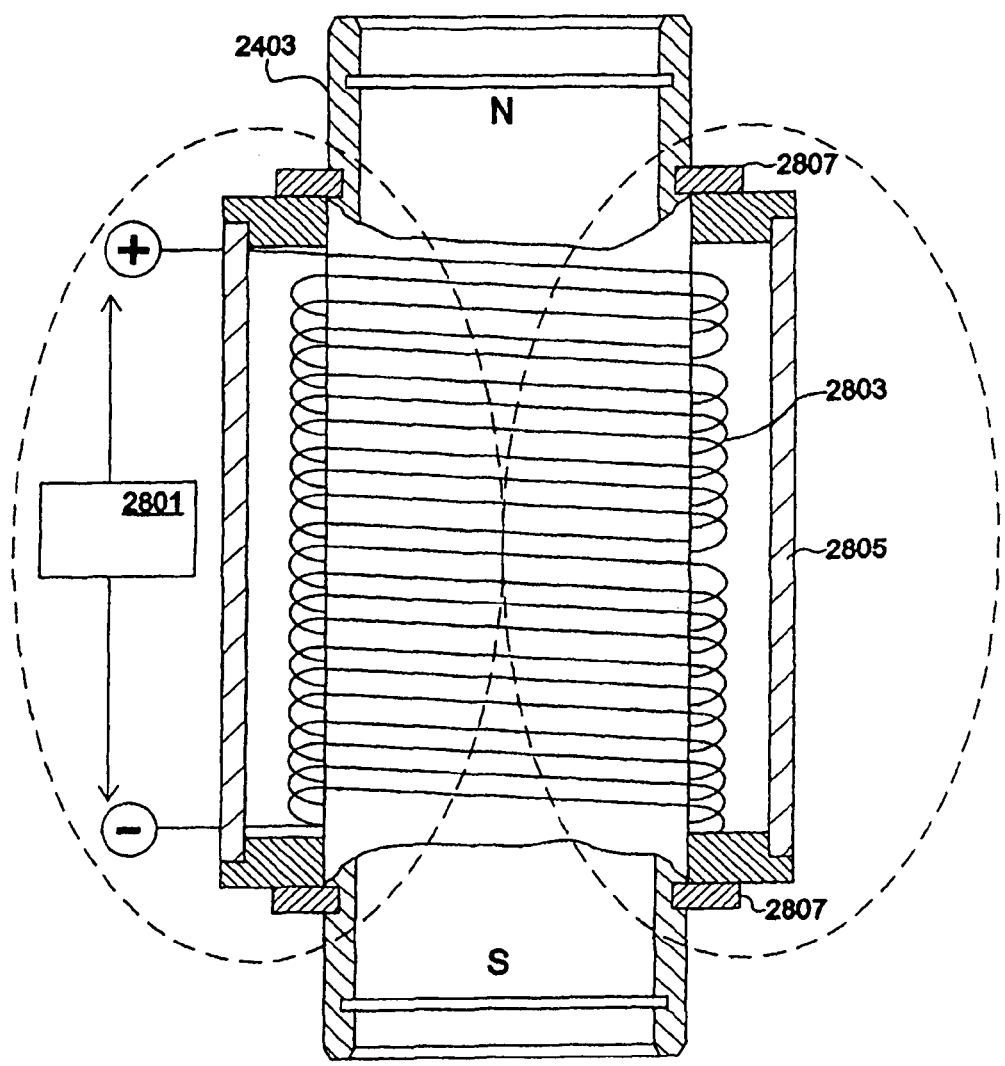
FIG. 28 is a diagram illustrating apparatus for internal concentration polarization control in the technology of FIGS. 24 through 26.

Osmotic pressure differential in the foregoing quaking membrane forward osmosis apparatus and methods is preferable provided by a magnetically recyclable solute composed of magnetic mixture of soluble salts. The use of magnetoferritin is known but requires removal from the aqueous stream by means of electromagnetic separation. To minimize problems associated therewith and with the problem of concentration polarization, FIG. 28 shows an ultrasonically active draw solution dispersion system in accord with yet another aspect of this invention.

Alternating electrical energy from ultrasonic generator 2801 is converted to an alternating magnetic field at coil 2803 in protective housing 2805 held around the outer housing of membrane module 2403 by retaining disks 2807. Coil 2803 extends substantially the entire length of module 2403. Generator 2801 is adjustable. The oscillating magnetic field induces hydrodynamic dispersion forces (turbulence) at ultrasonic frequencies in the ultrasonically active draw solution including magnetoferritin. The turbulence is at the internal boundary layer of the membrane thus minimizing internal concentration polarization. External concentration polarization is controlled by using a low pressure magnetically coupled centrifugal feed pump with an elevated output rate for producing external feed flow turbulence.

Figure 29:
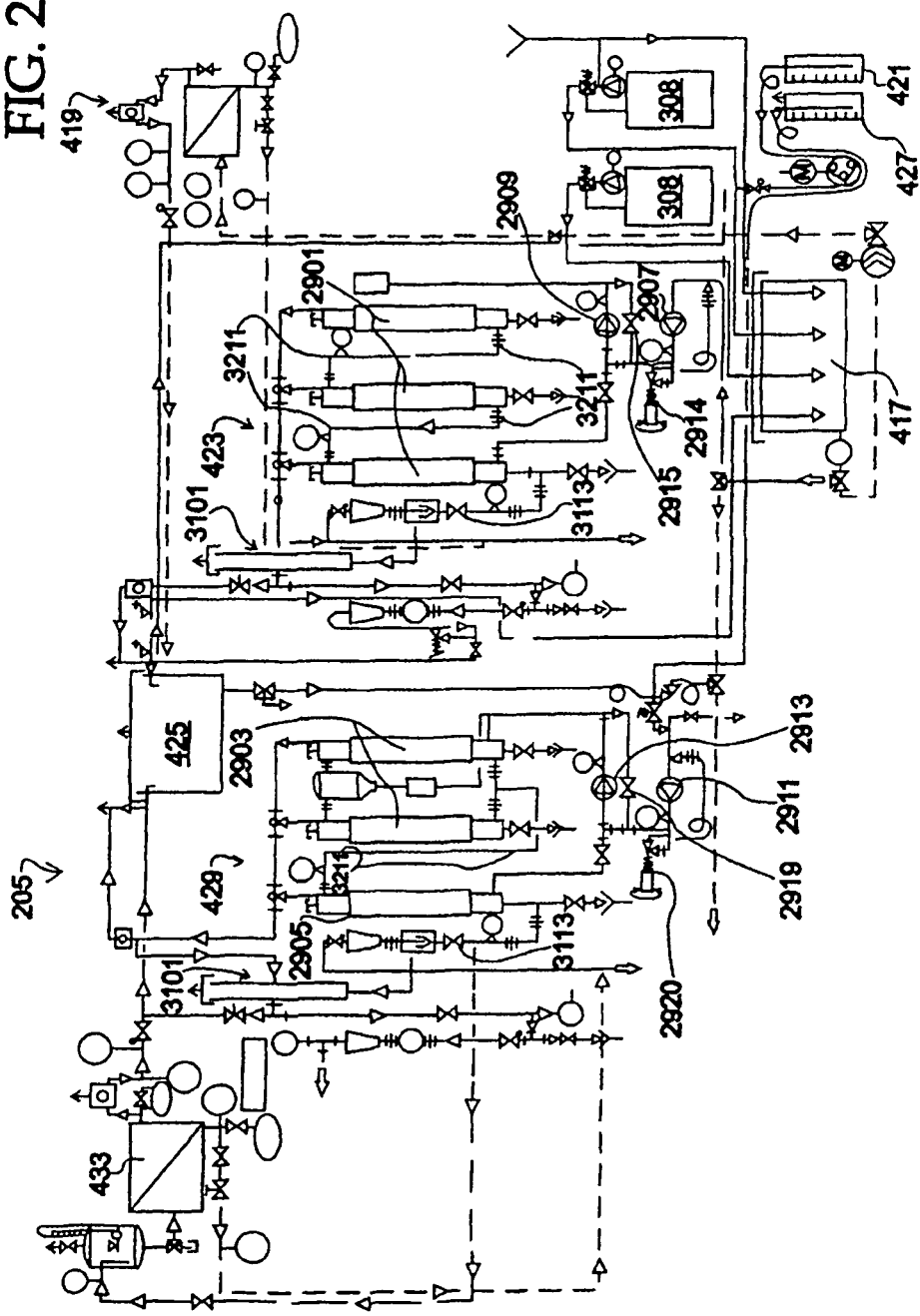
FIG. 29 is a diagram illustrating one membrane deployment option utilizable in the primary treatment steps in the station of this invention.

FIG. 29 shows one arrangement of components in a polishing treatment array 205 using membrane treatment systems especially concentrating on the integration of the membrane treatment systems of stages 423 (step 11 using the filtration membrane treatment option) and 429 (step 14 using the reverse osmosis membrane treatment option). These two stages implementing membrane processes separate dissolved solids from the pre-treated water. The selection of specific membranes and spacer material are based on test results (for example, from on-site three-dimensional test cells such as those shown in U.S. Pat. No. 6,059,970). The systems are set to operate at moderately to high pressures and typically employ high speed gravity assisted geometries with selected variable crossflow capabilities.

Filtration membrane implementation of stage 423 is a multistage configuration, operating in series. The array includes, for example, three pressure vessels 2901 each having a single membrane. The primary function of filtration membrane treatment is the removal of the finest colloidal matter of various sizes depending of filter size (utilizing microfiltration, ultrafiltration and/or nanofiltration. The separated colloidal matter is removed with the nanofiltration concentrate. The produced nanofiltration permeate serves as feed the next membrane and, ultimately, for reverse osmosis implementation of stage 429.

The primary function of the microfiltration treatment is matter removal in the 2-0.2 μm range (suspended solids such as particles, bacteria, vira, clay, and the like). Ultrafiltration treatment is primarily utilized for removal of macro molecules, proteins, polysaccharides, oil and grease, colloidal silicia acid, viruses, and the like in the 0.1-0.01 μm size range. Nanofiltration treatment is for removal of high molecular weight components such as mono-, di- and oligosaccharides polyvalent negative ions and finest colloidal matter in the size range of 0.01-0.001 μm.

The reverse osmosis implemented array of stage 429 includes, for example, two stages, with two membranes 2903 operating in parallel in the first stage feeding a third membrane 2905 in the second stage. As shown, each stage thus implemented has its own pressure pump and crossflow pump 2907, 2909 and 2911 and 2913, respectively. Nanofiltration stage 423 has a maximum operating pressure of 35 bar (508 psi), and a crossflow pump maximum rating of 50 gpm at a maximum of 60 psi in a 750 psi environment. Reverse osmosis stage 429 has a maximum operating pressure of 70 bar (1015 psi), and a crossflow pump rating of maximum rating of 10 gpm at a maximum of 45 psi in a 1,200 psi environment. System operating pressure is regulated through bypass regulators 2914 and 2920.

The primary function of reverse osmosis treatment is the removal of high molecular weight components as well as low molecular weight components such as sodium chloride, glucose, amino acids and the like, in the 0.001-0.0001 μm size range. All filtration as stages 423 and/or 429 may employ either of two types of membranes. Standard spirally wound membranes are used for less demanding applications, such as produced coal bed methane site water. For the more demanding applications, such as the treatment of certain types of frac-flowback water with oil in water emulsions, ceramic AL, Ti, Zr or Si carbide membranes are utilized (such as those available from Aaflow, APV, IBMEM, Tami, Veolia and others). For the sake of simplicity, this disclosure will focus on spirally wound types hereinafter.

As an alternative or in addition to reverse osmosis treatment at stage 429, ion exchange treatments as discussed hereinabove (at FIG. 3, numbers 419, 423, 429 and 433) could be employed at this stage. As a further alternative (or further in addition), distillation units known commercially could be utilized at this stage (Aqua Chem Seawater Plate Distillers, SPD13-25, for example, could be utilized).

At this time, the most economical ready-made nanofiltration membrane shape is a flat membrane sheet in a spiral wound membrane element. A spiral wound element consists of multiple membrane pockets (for example 4-16 pockets), the spiral wound pockets terminating into a centralized collecting pipe. Special parallel polypropylene spacers of 80 mil thickness are preferred and complete the membrane (spiral wound nanofiltration membrane elements from Nadir with a practical neutral surface voltage (zeta potential), for example).

The nanofiltration special spacing materials (spacers) are especially effective in applications with high suspended solids (colloidal) concentration. Since the primary purpose of the nanofiltration in station 101 is to remove all suspended solids rather than dissolved solids (such as salts), these types of spacers with their larger spacing between the membrane surfaces are preferred. A smaller membrane spacer for other applications could be use (for example, having 33 mil diamond spacer).

Alternatively, to maintain maximum processing flexibility at stage 423, low and ultra-low pressure reverse osmosis membranes could be used (where total dissolved salts are an issue). If nanofiltration membranes are employed, crossflow pump 2909 output flow must be turned down at bypass valve 2915 for a lesser brine to permeate ratio to achieve a more desirable permeate quality.

Reverse osmosis and/or HEED assembly buffer tank and at stages 425 and 431 can be any suitable tank and containment basin (for example, a three leg tank by SNYDER). Stage 427 (step 13) is interposed to reduce sealants in reverse osmosis processes. Bicarbonate ($HCO_3$) is present in many post production waters presented for treatment (such as CBM water, for example). Many produced CBM waters are near saturation in dissolved bicarbonate. When these waters are concentrated in a reverse osmosis system, calcium carbonate will be one of the first salts to precipitate. Calcium Carbonate scaling potential can be estimated using stability index calculations.

Prevention of calcium carbonate precipitation in the nanofiltration or reverse osmosis systems of station 101 is aided by injection of sulfuric acid at pump 306 into a homogenizing buffer tank at stage 417 to condition nanofiltration and/or reverse osmosis feed water. This will convert much of the bicarbonate to carbonic acid and dissolved carbon dioxide as well as increase the solubility of calcium carbonate due to the lower pH. In estimating the acid concentrations for pH adjustment, the rule of thumb is that lowering the feedwater pH to between 6.0 and 6.5 will reduce the bicarbonate concentration by about 80%. For most CBM waters and typical pilot program nanofiltration and/or reverse osmosis permeate recoveries, an 80% reduction of bicarbonate will be sufficient to prevent calcium precipitation.

By inline injection of a fouling and scaling inhibitor (such as VITECH 3000) at stage 421 into the nanofiltration feed stream, colloidal and scale crystal growth is slowed, colloidal formation inhibited, and the crystalline shape of the scale crystal is modified. By inline injection of a scaling inhibitor (such as VITECH 4000) at stage 427 into the reverse osmosis feed stream, scale crystal growth is slowed and crystalline shape is modified. It should be realized that scaling by other salt types can occur simultaneously (for instance, $BaSO_4$).

Therefore, it is necessary for the hybrid dosing to catch the remaining scaling causing salts with an antiscaling medium. Common scale inhibitors consist of molecules that contain carboxylic or phosphate functional groups. Lower molecular weight polyacrylate molecules contain multiple carboxylic functional groups.

At reverse osmosis implementation of stage 429, membranes 2903 and 2905 are preferably spiral wound polyamide skin layer composite membranes with a zeta potential of approximately −7 mV and a polysulfone support layer and standard 31 mil diamond spacers (since prefiltered feed water will be used). Optionally, seawater polyamide membranes with a spacer thickness of 27 mil could be utilized. The polyamide thin layer membranes are constructed with an aromatic polyamide extruded onto a less dense polysulfone substrate. The optional seawater membrane elements use a denser polyamide membrane layer with better rejection characteristics.

Polyamide membranes are sensitive to oxidizing agents such as free chlorine or iodine. This requires that chlorine or iodine present in the feedwater be removed by a reducing agent (such as sodium bisulfite in the case of chlorine injected upstream of the reverse osmosis modules). To avoid fouling in such case, a non-oxidizing biocide like BUSAN (150 to 1500 ppm) can be continuously injected in-line with the reverse osmosis feed stream. This mixture which kills bacteria, fungi and algae is compatible with the membrane material as well as the other injection chemicals used.

A number of parameters can affect reverse osmosis permeate flowrate at stage 429 (or stage 425 if used there also). These include water temperature, salt concentration and membrane pressure as the feed water flows through the system. Since station 101 is not specifically adapted to a particular water presented for treatment, stage 429 is preferably configured work within a minimum and maximum range of 1,000 ppm to 20,000 ppm TDS, as well as a temperature range of 40° to 80° F. The system's maximum design pressure is around 1,000 psig.

Higher pressures result in higher permeate flowrates and better salt rejection characteristics. Higher pressures also require more power and can result in higher membrane fouling rates and reduced membrane life expectancy. These considerations are important considerations for programming at steps related to upsizing (to full size plant). In addition, higher pressure operation may require stainless steel, fiberglass/epoxy or carbon fiber/epoxy membrane housings and piping material to handle the higher pressure. To maximize flexibility for different water treatment applications, station 101 preferably includes reverse osmosis systems configured for high pressure operating capabilities.

Membrane 2903 housings are arranged vertically rather than horizontally, and all are top fed. This operating geometry provides gravitational assistance to the high speed crossflow turbulence. Crossflow (recirculation flow) is provided by pump 2913 and flow controlled by bypass valve 2919. System pressure is controlled by pressure regulator 2920. Pressure pump 2911 operates at a maximum flowrate of 2.65 GPM at a maximum 1,029 psi.

Station 101 employs high speed gravity assisted geometries in their system design. Thus, membrane systems are working with an unconventional high crossflow velocity, and the membrane housings are geometrically arranged in a vertical top feed position. Therefore, it allows the feed water crossing the membrane with the assist of gravity, whereby the chosen array minimizes the pressure differential across the membrane system. This differential would otherwise take away from the net driving pressure at the tail end of the individual membrane system.

A portion of the concentrate is recycled back to the overall membrane system feed to increase recovery beyond the 75% it may have already achieved. For example, by recycling only ⅕ of the concentrate back to the feed, recovery can be increased to an 80% permeate recovery. This results into a 20% reduction of disposable concentrate production. The concentrate recirculation (retentate) flow rate for the pilot unit operation is provided through the crossflow pumps 2909 for the nanofiltration at stage 423 and 2913 for the reverse osmosis at stage 429.

In order to provide the desired high crossflow velocity over the membranes, and in accord with another aspect of this invention, separate high flow, low pressure crossflow pumps are utilized. Since pressure pumps 2907 and 2911 of the membrane system cannot fulfill these requirements, separate low pressure but high flow crossflow pumps operating in a high pressure environment with flowrate adjustment capability are needed. These pumps are magnetically driven with no seals and are equipped with high pressure stainless steel housings to contain a feed pressure of up to 1200 psi. The relatively small, low energy, high pressure feed pumps provide the system operating pressure. The feed pressure and flow rate is preferably regulated by a vector drive.

Through this arrangement, the feed achieves sufficient pressure through the high pressure feed pumps for membrane separation. These high flow crossflow pumps provide sufficient turbulence and hydrodynamic shear to flush down and clean out the membrane flow channels of contaminated matter to minimize any fouling/scaling potential of the specific membrane system. The low operating pressure of the crossflow pump does not create excessive pressure even when operated at full flow capacity. Crossflow meters are preferably utilized to measure, control, and obtain optimum crossflow and crossflow velocity to achieve sufficient turbulence to minimize fouling/scaling potential. Turbine meters with magnetic pickups and transmitter/read-out units are preferred. The preferred pumps here are magnetically driven centrifugal pumps.

The high flowrate is needed to cover a large crossflow rate range. The flowrate is easily adjustable through a valve controlled by-pass.

Figure 30:
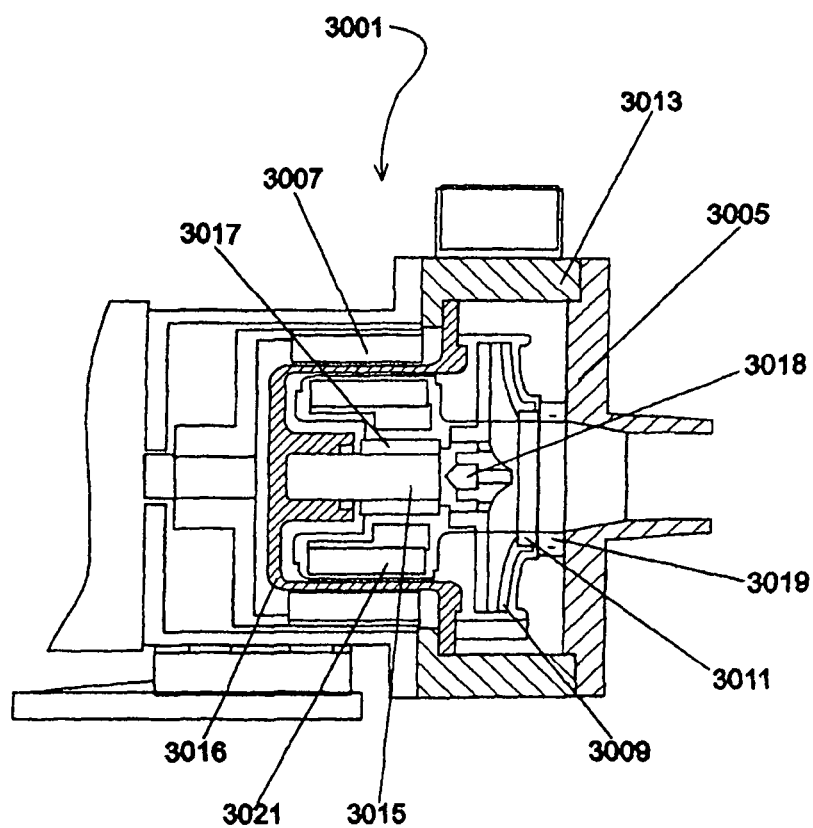
FIG. 30 is a sectional illustration of a crossflow pump of this invention utilized in various membrane separation technology.

Turning to FIG. 30, the preferred magnetically driven centrifugal pump 3001 (used, for example, for pumps 2909 and/or 2913) of this aspect of the invention is illustrated, such pumps being heretofore commercially unavailable that can operate in a high pressure environment (over 500 psi for the nanofiltration, and in excess of 1,000 psi for reverse osmosis). All high pressure parts are manufactured from compatible nonmagnetic stainless steel series 316 or 312, 316L or Hastelloy C4 (casing sections 3005, 3013 and 3016, for example). Nonmagnetic stainless steel is required to contain the high operating system pressure, to offer corrosion resistance in a chloride rich environment and to allow a magnetic field transfer, from drive magnet 3007 to magnet capsule 3021, to facilitate the no touch magnetic coupling process.

Another novel element of the pump design herein is use of off-the-shelf plastic low pressure internal pump parts (for example, impeller 3009, mouth ring 3011, spindle 3015, rear thrust 3018, front thrust 3019 and magnet capsule 3021). Since pump shavings from plastic impellers have been known to foul the lead end elements of membrane systems, an optional discharge screen downstream of the pump is recommended. A chemically resistant coating such as Ceramic, PVDF, PP, PE, HPE, PTFE or PFA is utilized to prevent pitting and is applied to the inside of high pressure pump components.

The magnetic pump is otherwise of convention design. Ceramic spindle 3015 is mounted rigidly on one end onto stationary, high pressure resisting rear casing 3016 which is made from non-magnetic stainless alloy. Main bearing 3017 rotates on the protruding end of spindle 3015, bearing 3017 press fitted into magnet capsule 3021 which is counter-rotationally twist-locked onto impeller 3009. Pointed conical rear thrust 3018 is mounted on impeller 3009 and limits rearward movement of magnet capsule 3021 and impeller 3009. Thrust 3018 rides against the front face of stationary spindle 3015 thus limiting the rear thrust. Likewise, front thrust of magnet capsule 3021 and impeller 3009 is limited by impeller mounted mouth ring 3011 riding against the front face of stationary front thrust 3019. The feed medium itself provides lubrication between moving and stationary thrust contact areas.

Figure 31:
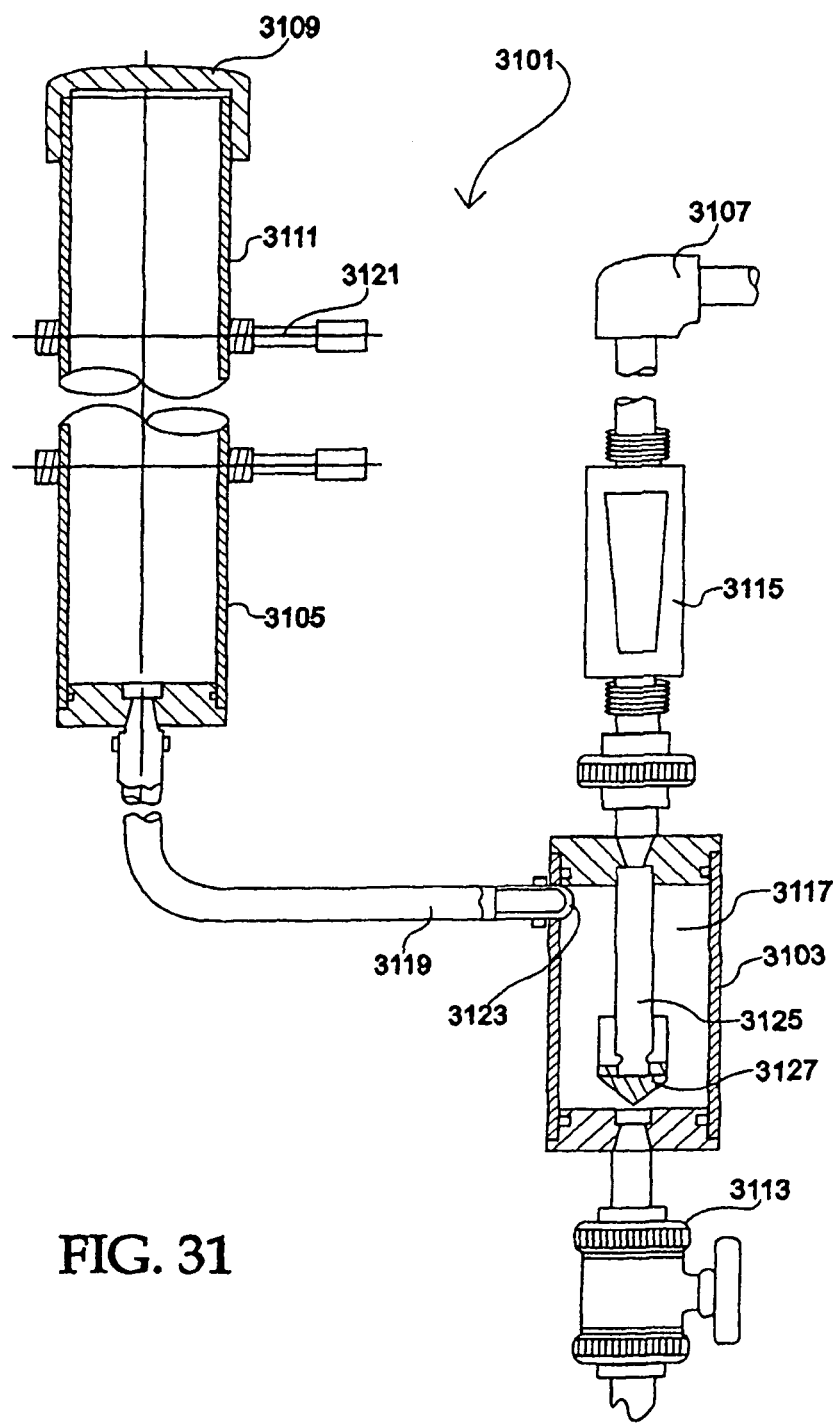
FIG. 31 is a sectional illustration of an improved degasser column used with the membrane systems of this invention.

In accordance with another aspect of this invention, in-line degasser and degasser column assemblies 3101 are shown in FIGS. 29 and 31. Assemblies 3101 are specifically adapted for air and/or $CO_2$ removal or reduction in the produced membrane permeate flow stages 423 and 429 in order to improve flow rates and flow data acquisition in the permeate production process. The design, use and application of these assemblies are an improvement over prior art designs and methods. Assemblies 3101 condition flow of produced permeate by air/gas removal prior to processing through flow instrumentation and recording devices for the generation of real time liquid flow data without error producing air or gas content. Assemblies 3101 are adaptable in any setting where enhanced flow process stabilization is required in a liquid system with entrained and unwanted air or gas and where in-line degassing is needed for flowmeter applications. No packing material is needed for optimum surface area contact between the water and the air as is used in conventional tall column forced-draft degassifier designs.

Assemblies 3101 include inline degasser 3103 and attached degasser column 3105, and has no moving parts. Head back pressure control can be adjustable by height adjustment of elbow 3107 relative to the top of column 3105 (at cap 3109). Visual inspection of ongoing degassification processes can be monitored through clear column tube 3111. Ball-valve 3113 controls flow to degasser 3103 of assembly 3101, flowmeter 3115 following degasser 3103. Gas supersaturated concentrate flows into the bottom of expansion chamber 3117 of degasser 3103 providing atmospheric pressure release through top connected hose 3119. Hose 3119 is connected at the other end to degasser column 3105.

Vertical adjustment of column 3105 provides proper back-head, back-pressure control, the column's horizontal swivel capability at cantilever arm 3121 providing dead leg free hose transfer. Head is adjusted to match individual concentrate draw-off by keeping enough column head on column 3105, which is open to the atmosphere. As a result, a spilling out of concentrate flow is avoided. Through controlled release of back-pressure, concentrate discharge gas pressure is lowered in expansion chamber 3117.

The in-rushing expanding $CO_2$ bubbles towards the lower pressure level of upper expansion chamber outlet 3123. The rising bubbles accelerate during their ascent due to the simultaneous decline of available head pressure in assembly 3101. Since the ascending bubbles are shielded from entering the lower water transfer openings in pipe riser 3125 by shield 3127, only the descending, saturated but bubble-free water enters the transfer openings. The now transformed water from the supersaturated to the saturated stage is calm enough to allow for meaningful flowmeter readings and control.

Figure 32:
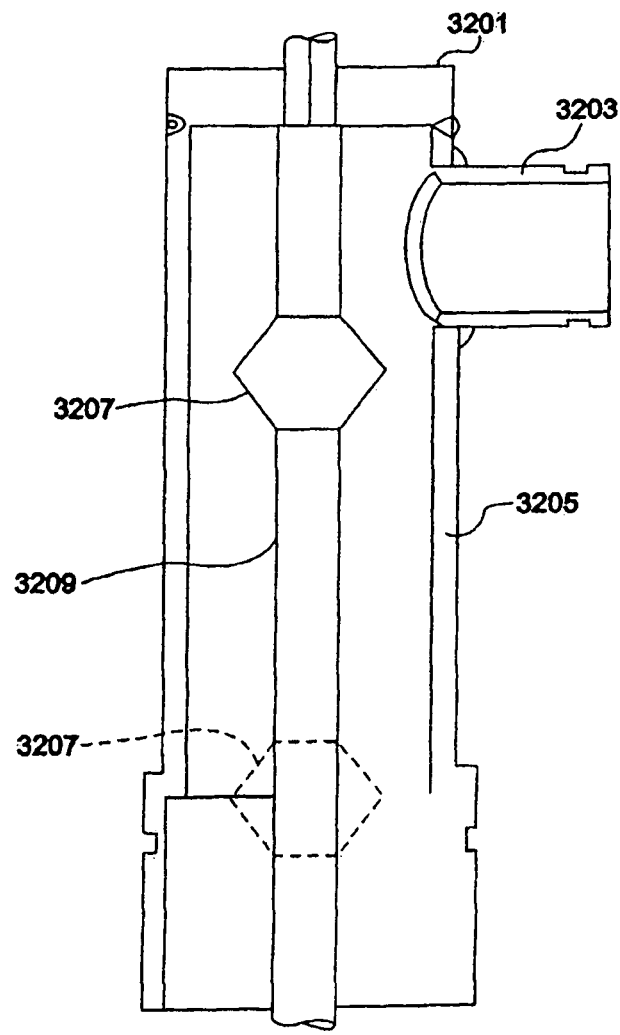
FIG. 32 is a flow distributor and discharge equalizer deployed, for example, with the membrane systems of this invention.

Flow distributor and discharge equalizer 3201 in accord with another aspect of this invention is shown in FIG. 32. The method of use of equalizer 3201 is novelly adapted to use with high speed crossflow membrane systems operating in a gravity assisted mode. Equalizer 3201 is hydrodynamically designed for flow direction from a horizontal entry flow at port 3203 to a vertical flow in housing 3205, and a flow directional change back from a vertical flow to a horizontal side exit flow to enhance operation of the vertically mounted high speed membrane systems.

Flow altering distribution cones 3207 at product tube extension 3209 provide favorable hydromechanical loading and unloading for spirally wound membranes by distributing the in-rushing high crossflow of high operating pressure more evenly into the leading portion of the vertically arranged membranes. Since favorable membrane hydromechanics extends useful membrane life expectancy, cost savings are realized.

Equalizers 3201 are mounted in place of long sweeping mounting elbows usually used for top entry and bottom exit of conventional high speed, vertical membrane system designs (at 3211, for example, in FIG. 29, other utilization nodes being identifiable in the drawings). This improved hydrodynamic design adapted for side entry operation is a practical method for reducing overall height and footprint requirements of a vertically mounted, high speed membrane system.

Figure 33A:
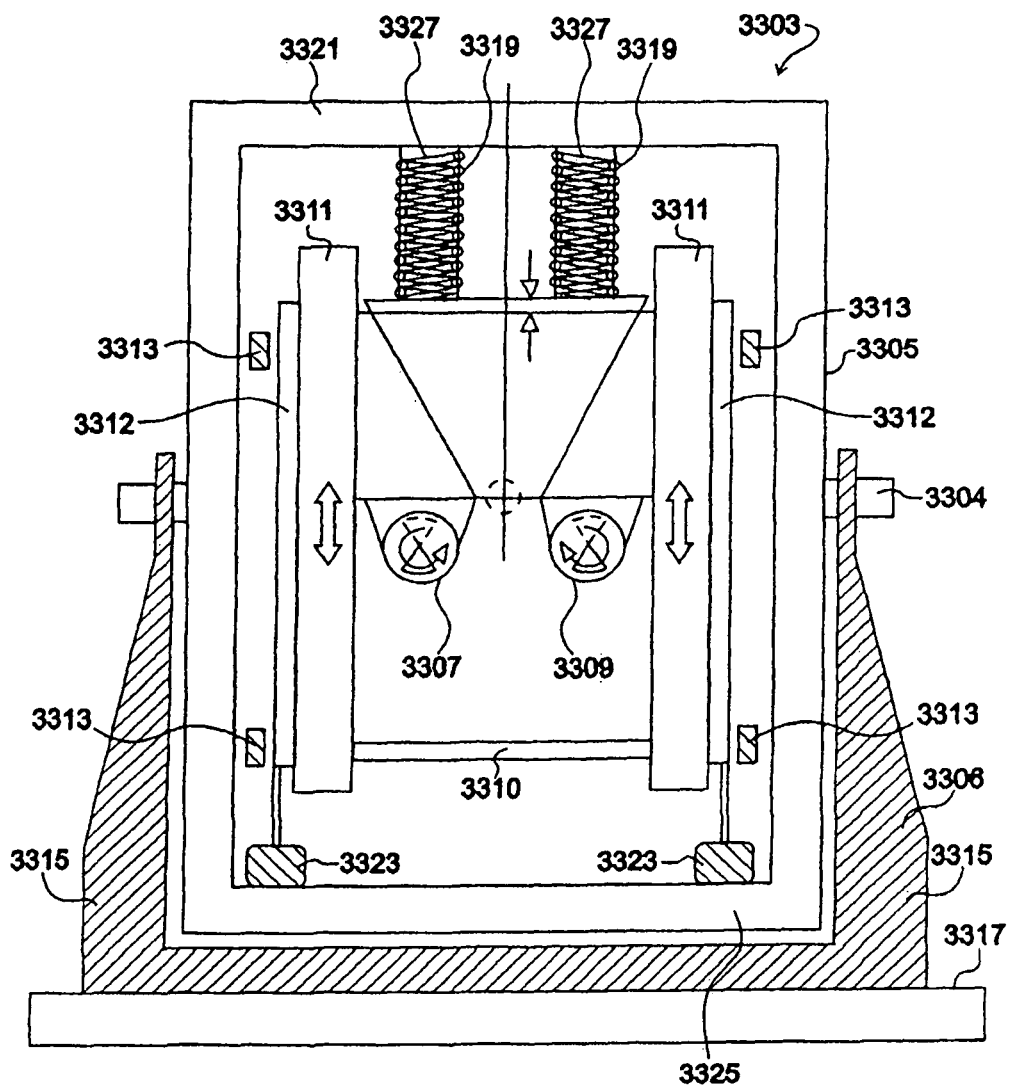
FIGS. 33a and 33b are diagrams illustrating a high frequency oscillating membrane system utilizable in primary treatment steps in the station of this invention.
Figure 33B:
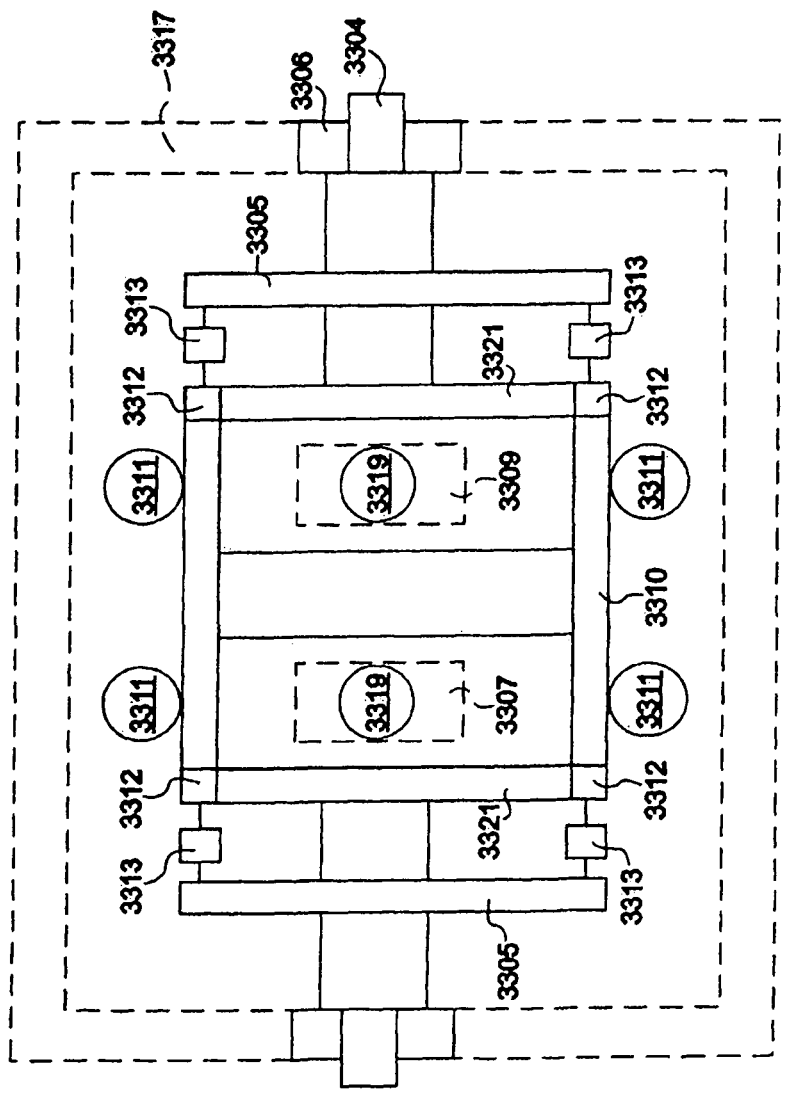
Figure 34:
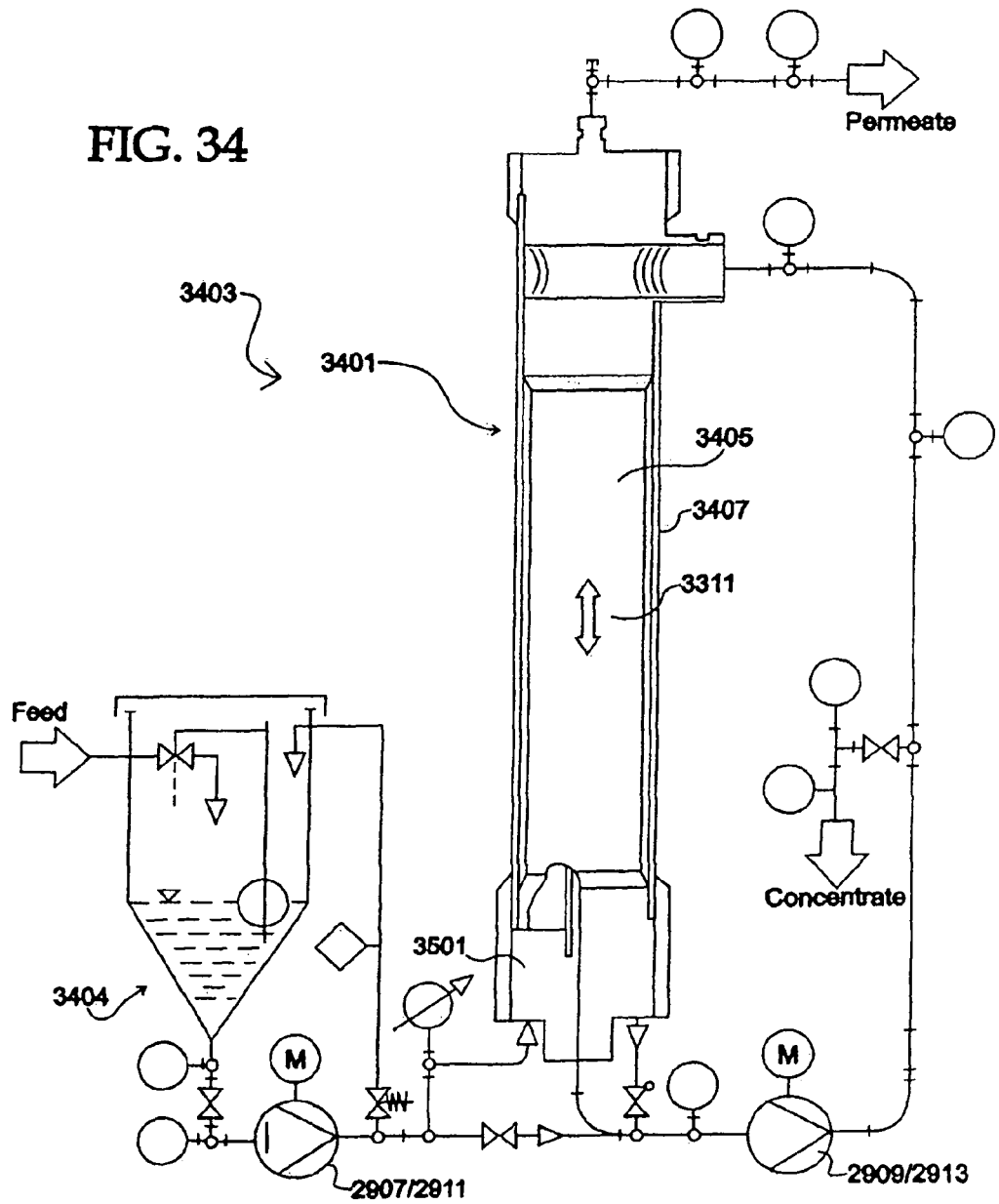
FIG. 34 is a sectional diagram illustrating a second embodiment of the high frequency oscillating membrane system.

In accordance with another aspect of this invention, a first embodiment of a high frequency membrane separation apparatus and method utilizable with membrane systems of this invention is shown in FIGS. 33*a* and 33*b*. This invention relates to apparatus and methods for fluid filtering utilizing membrane separation (for example nanofiltration and/or reverse osmosis filtration) that combines vibratory shear techniques with adjustable crossflow techniques. This and further embodiments of the high frequency membrane separation apparatus and methods (set forth hereinafter) are particularly well adapted to treatment stages 419, 423, 429 and/or 433 when membrane treatment options are applied (generically referred to hereinafter as membrane treatment systems).

High frequency membrane separation herein refers to vibrating, oscillatory motion of the membrane support structure. Vibration direction is perpendicular to the floor of station 101 for gravity assisted membrane separation systems. The vibration curve is preferably a regular curve, which corresponds mathematically to a zero centered sine or cosine, a sinusoidal or simple harmonic. The amplitude is preferably steady and frequency high.

This hybrid does not depend solely on vibratory induced shearing forces to prevent fouling and thus does not require total shut down of the membrane separation process during preventive maintenance on the vibrators. The shear wave produced by axial vertical membrane vibration causes solids and foulants to be lifted off membrane surfaces and remixed with retentate flowing through the parallel or tunnel spacer or other specially designed spacers of spirally wound elements or through flow channels of tubular or capillar membrane elements. Movement continuity is maintained through the adjustable crossflow, reducing further additional membrane fouling tendency.

This hybrid approach using adjustable crossflow and high shear processing exposes membrane surfaces for maximum flux (volume of permeate per unit area and time) that is typically higher than the flux of conventional vibratory membrane technology alone. In the conventional vibratory membrane design, each membrane module requires its own vibratory energy source. Only a single vibratory engine 3303 is utilized for a multi-membrane module design herein (up to thirty-two 2.5", sixteen 4" or eight 8" membrane modules).

To suit operating environments such as those at station 101, where height restrictions and/or leveling problems are encountered, high frequency membrane separation apparatus of this invention can be operated at an incline using center pivot 3304 for adjustment of swivel framework 3305 (from standard vertical position to a maximum 15° incline orientation) in swivel support 3306. Unlike other vibratory membrane separation technology which employs horizontal vibratory torsional motion in the axis plane of abscissa (x), and which require use of proprietary one source only custom membrane modules, this approach is more flexible. Readily available, and thus less costly, conventional membrane modules can be used, and mounting of membrane modules in a vertical flow gravity assisted position with adjustable crossflow operation is accommodated.

This embodiment of the high frequency membrane separation apparatus uses twin motors connected at shaft/eccentric and weight assemblies 3307 and 3309 of the motors in vibratory engine 3303 to provide shear enhanced fouling reducing membrane separation (these vibrator motors are well known structures). The motors are preferably 3-phase 1800-3600 RPM induction motors delivering high speed synchronized centrifugal force, one motor rotating shaft/eccentric and weight 3307 counter-clockwise and the other rotating shaft/eccentric and weight 3309 in a clockwise direction.

The vibrator motors are capable of producing net centrifugal forces that change direction in space as the motor rotates. Such a force acts upward at one instant and downward a half-rotation later, thus producing a force that acts sinusoidal at a frequency that corresponds to shaft/eccentric/weight assemblies 3307/3309 rotation.

Adjustable eccentric weight provides variable force output (from 0% to 100%) at a synchronized mode of operation (i.e., the adjustable weights are aligned with each other at 90° for clockwise rotation and 270° for counter-clockwise rotation). A vibratory high-speed linear motion through center of gravity thus impacts swivel framework 3305 having the vibrating motors mounted on the inside thereof and the membrane modules mounted on the outside thereof.

Support box frame structure 3310 is preferably square tubing 2"×2" with a ⅛" wall. Frame structure 3310 carries membrane modules (hereinafter 3311, generally applied, for example, to modules 2901 or 2903/2905 of FIG. 29 or other membrane modules disclosed herein and related to the various nanofiltration and reverse osmosis options) and includes frame uprights 3312 mounted via rubber dampeners 3313 (preferably eight) at swivel framework 3305 (one upright per corner of the support structure). Swivel frame uprights 3315 of support 3306 are preferably made from fabricated ¼" steel material, and are connected to seismic absorbing mass at fabricated steel base frame 3317. Base frame 3317 is preferably at least partially filled with concrete to add mass.

Two springs 3319 are located in-line at the top of support structure box frame 3310 (supporting panel structure not shown) and between horizontal top frame members 3321 of the open swivel framework 3305. Dampeners 3323 are located adjacent to bottom frame member 3325 of swivel framework 3305. As compared to conventional springs, urethane springs/dampeners are preferred for their high load-carrying capability, longer life, abrasion resistance, low noise, and vibration damping and shock absorbency.

The springs themselves are cylindrical, and four connecting bolts 3327 fasten support structure 3310 to swivel framework 3305. The fine-threaded connecting bolts allow for vibratory amplitude adjustment in a range up to about 1". If combined with conventional coil springs, the vibratory amplitude adjustment range increases up to 1.5". Together with the adjustable frequency drive (or inverter drive), customization of axial vibratory linear motion for shear enhanced fouling reducing membrane separation is accommodated.

A second embodiment of the high frequency membrane separation apparatus and methods of this invention is shown in FIGS. 34 through 38. In the embodiment shown in FIG. 34, vibration is hydrodynamically controlled. This embodiment is specially applicable whenever a homogen disperse fluid substance with a lower concentration polarization layer has to be treated—for instance, organic and inorganic colloidal solution as well as fine disperse suspensions and higher concentrations of salt solutions (TDS 1,000-50,000 mg/L). Since high shear rates are not required in high frequency membrane separation apparatus 3401, apparatus 3401 can be configured to operated at a lower amplitude. System 3403 can operate efficiently at a lower amplitude.

Vibratory impulse energy is provided through the primary feed pump (for example, pumps 2907/2911 as shown in FIG. 29), no secondary vibratory energy source is required. Furthermore, only the membrane, fluid column (preferably prefiltered as taught herein, generally represented at 3404) and some associated internal components of apparatus 3401 are vibrated (not the entire unit including support mass). One feed pump 2907/2911 can serve one or many modules in parallel feed array.

Figure 38:
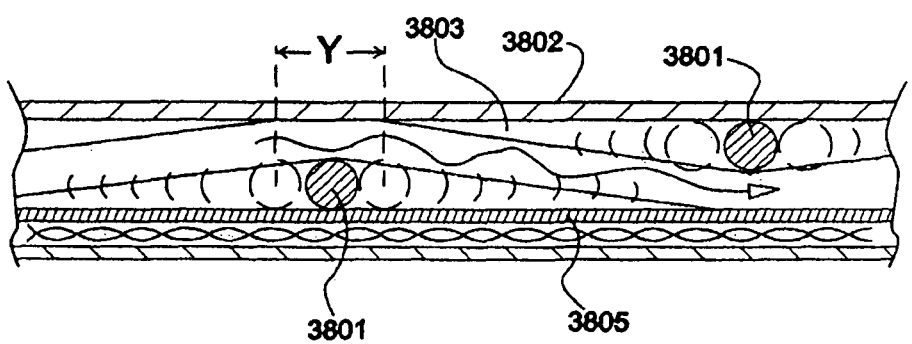
FIG. 38 is an illustration showing function of the spirally wound membrane elements of the oscillating membrane system of FIG. 35 (also employable in other oscillating systems shown herein)

In combination with heretofore described crossflow characteristics, hydrodynamic vibration herein provides axial vibration of amplitude "Y" to enhance the sinusoidal flow pattern between transverse spacer rods 3801 in membrane media 3802 (see FIG. 38). Vibration amplitude is controlled through stroke adjustment. The system operates with low vibratory energy waves which are scaled to provide effective agitation. Axial vibration with a maximum amplitude Y of only about 2 mm for a spirally wound membrane is sufficient to maintain proper permeate continuity. Apparatus 3401 provides sinusoidal meandering turbulent cleaning action by high frequency vibration up to 180 Hz in a tangential direction to the surface of the membranes (see FIG. 38).

Figure 35:
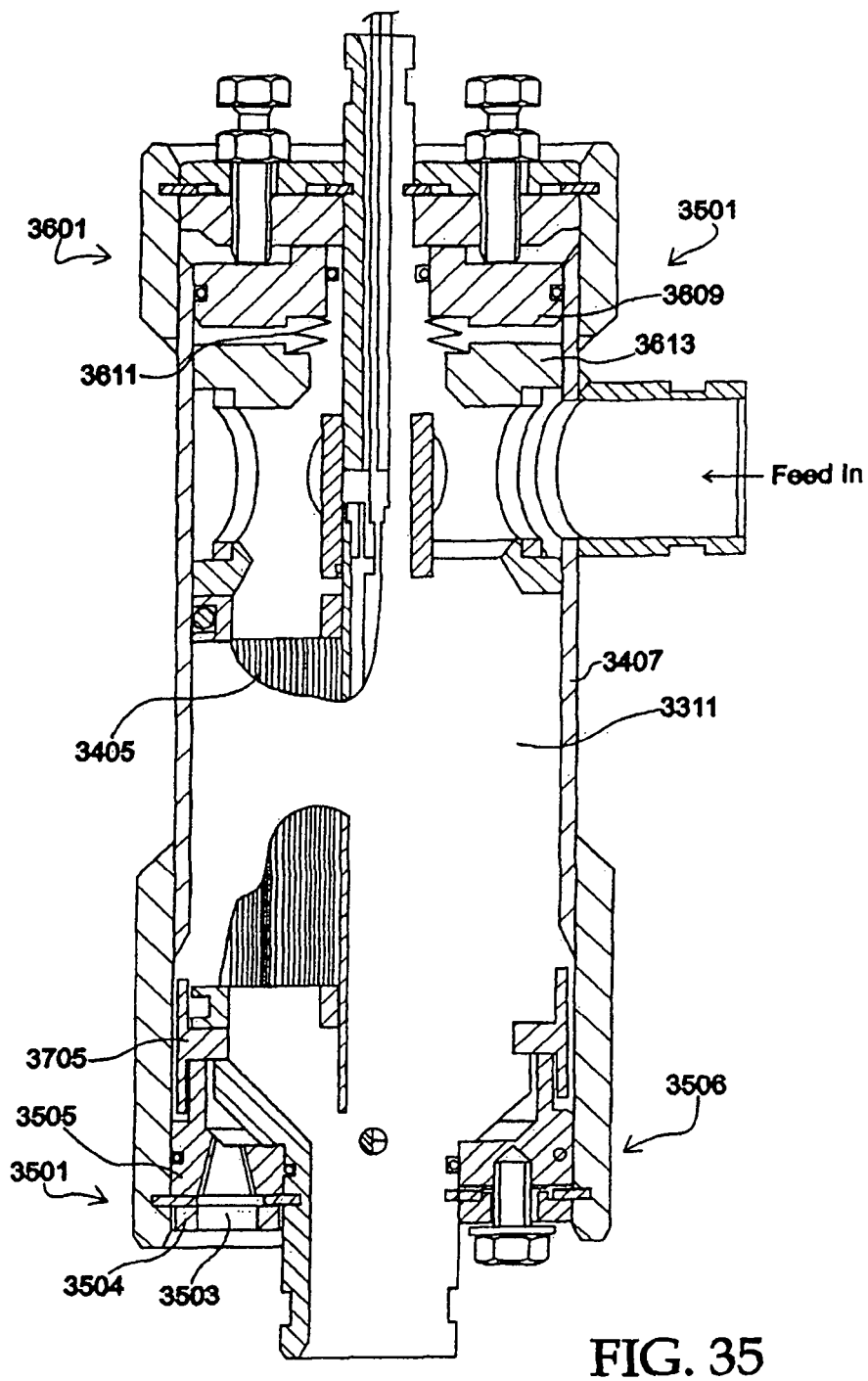
FIG. 35 is a partial sectional illustration of the oscillating membrane system of FIG. 34.
Figure 36:
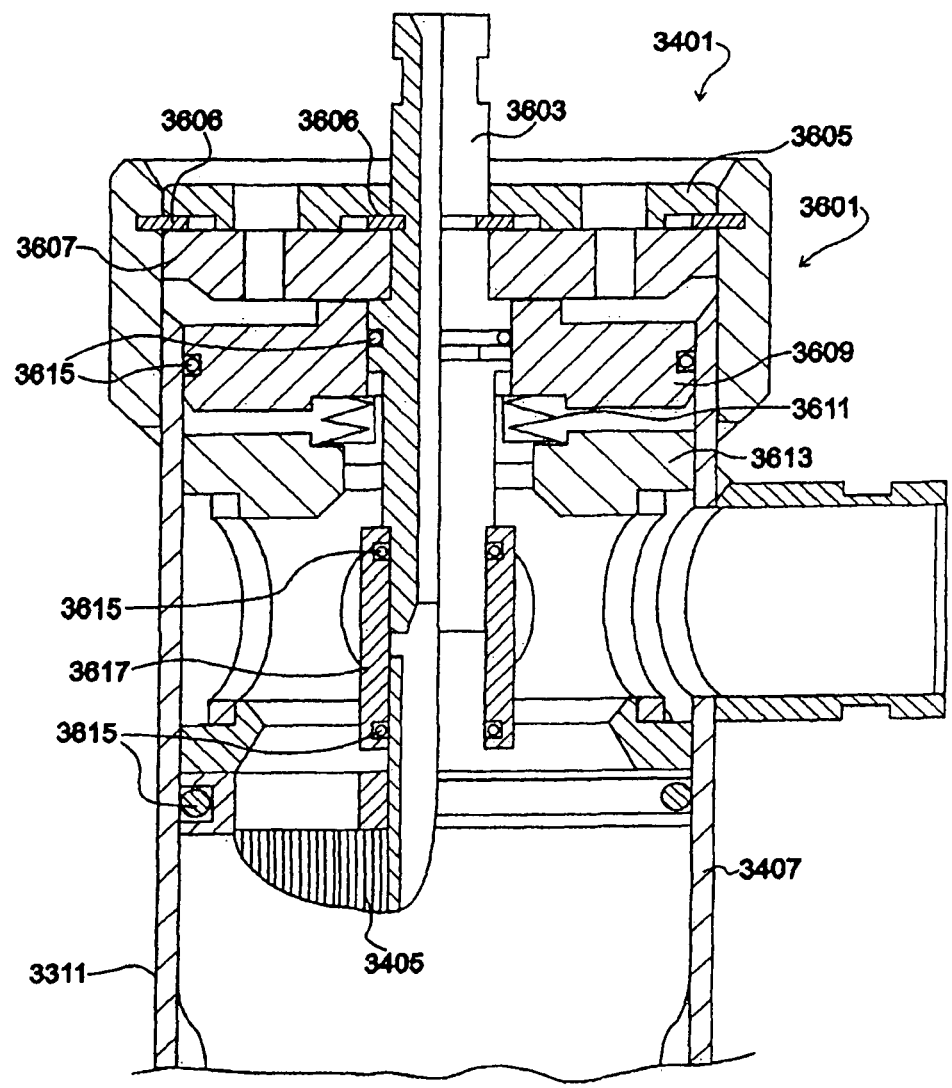
FIG. 36 is a detailed sectional illustration of the upper part of the oscillating membrane system of FIG. 35.
Figure 37:
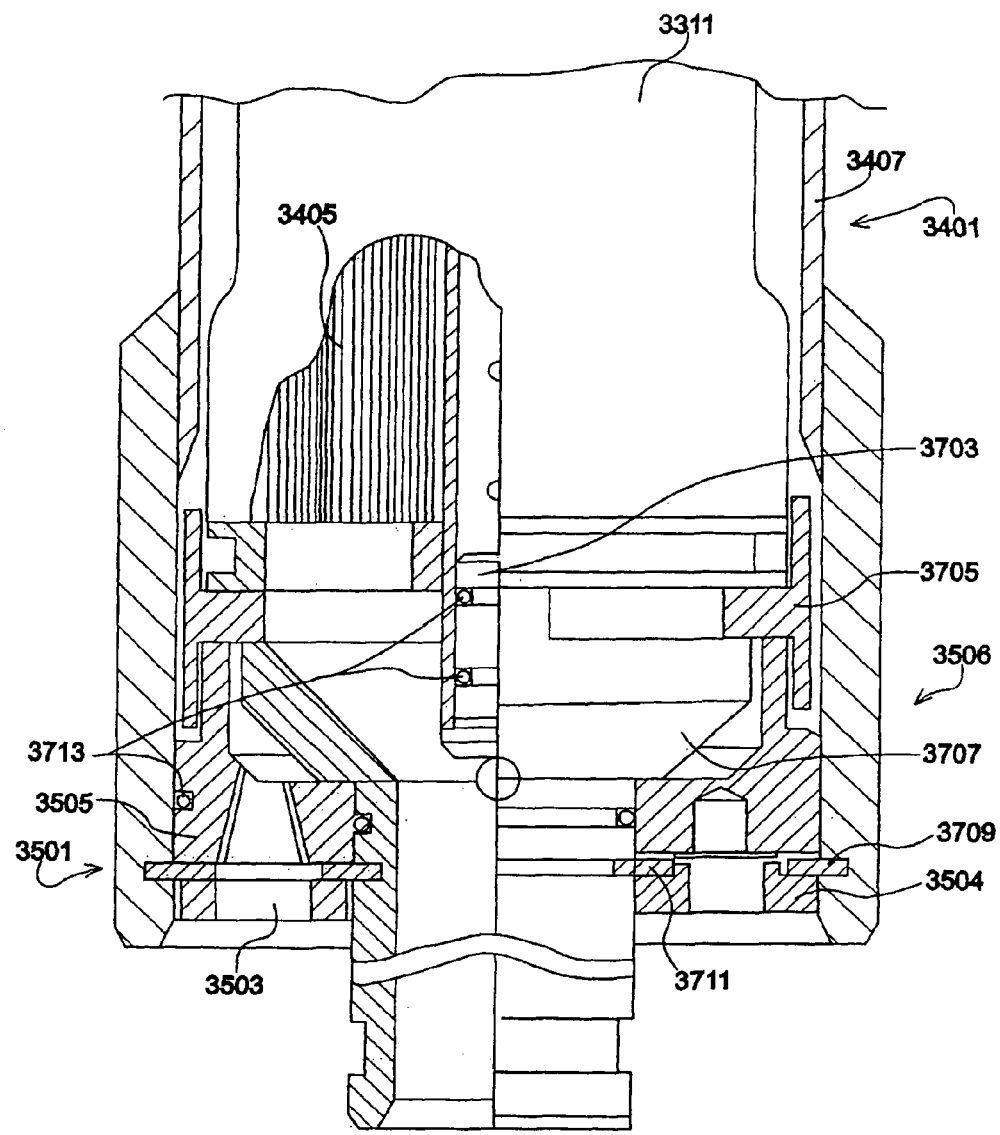
FIG. 37 is a detailed sectional illustration of the lower part of the oscillating membrane system of FIG. 35.

To effect the benefits of hybrid apparatus 3401 membrane element 3405 is oscillated within the membrane housing 3407 (see FIGS. 35 through 37). The bulk stream containing the returned suspended particles between the membrane leaves of spirally wound membrane elements (generally at 3803 in FIG. 38), and in the flow channels of tubular and/or capillary membrane elements, is continuously flushed out of the membrane module by means of the gravity assisted low crossflow. Since apparatus 3401 does not depend on crossflow induced turbulence, feed of a homogen fluid substance with a lower concentration polarization layer can be concentrated at a higher level.

Crossflow pressure can be maintained in a low range between 35 and 140 kPa (utilizing crossflow pump 2902/2913, for example) thus producing an adjustable low crossflow velocity in the range of 0.075 to 1 m/s and requiring low operating energy. Sufficiency of turbulence for anti-fouling/scaling is maintained by high frequency of the vibration. Produced are low vibratory energy waves scaled to provide a nonstagnant membrane area environment with effective sinusoidal meandering turbulence to the boundary layer 3805 area, settling of suspended particles thus inhibited.

Feed activated hydrodynamic impulse system 3501 is best illustrated in FIGS. 35 through 37. A pulsating high pressure water jet is receive from plunger pump 2907/2911 through inlet port 3503 through lower retainer ring 3504 and feed ring-room housing 3505 at lower section 3506. Housing 3407 holding filter module 3405 is ported as required for feed input and concentrate and permeate output and is constructed accordingly. Upper section 3601 (FIG. 36) includes permeate discharge connector 3603, upper retainer plate 3605, spring rings 3606, bolt retainer plate 3607, spring adjustment plate 3609 return spring 3611 and lantern ring 3613. Variously sized o-rings seals 3615 seal the unit. Membrane coupling 3617 couples connector 3603 to membrane 3405.

Lower section 3506 (FIG. 37) further includes permeate tube plug 3703, ring piston 3705, retentate discharge connector 3707, and spring rings 3709 and 3711. Again, various sized o-rings 3713 seal the apparatus. As can be appreciated the pulsating jet of received through port 3505 vibrates module 3405 at ring piston 3705 at the rate of pulsation. Reciprocation is limited and maintained by spring 3611 operating against ring 3613 (held in adjustment by adjustment plate 3609).

Figure 39:
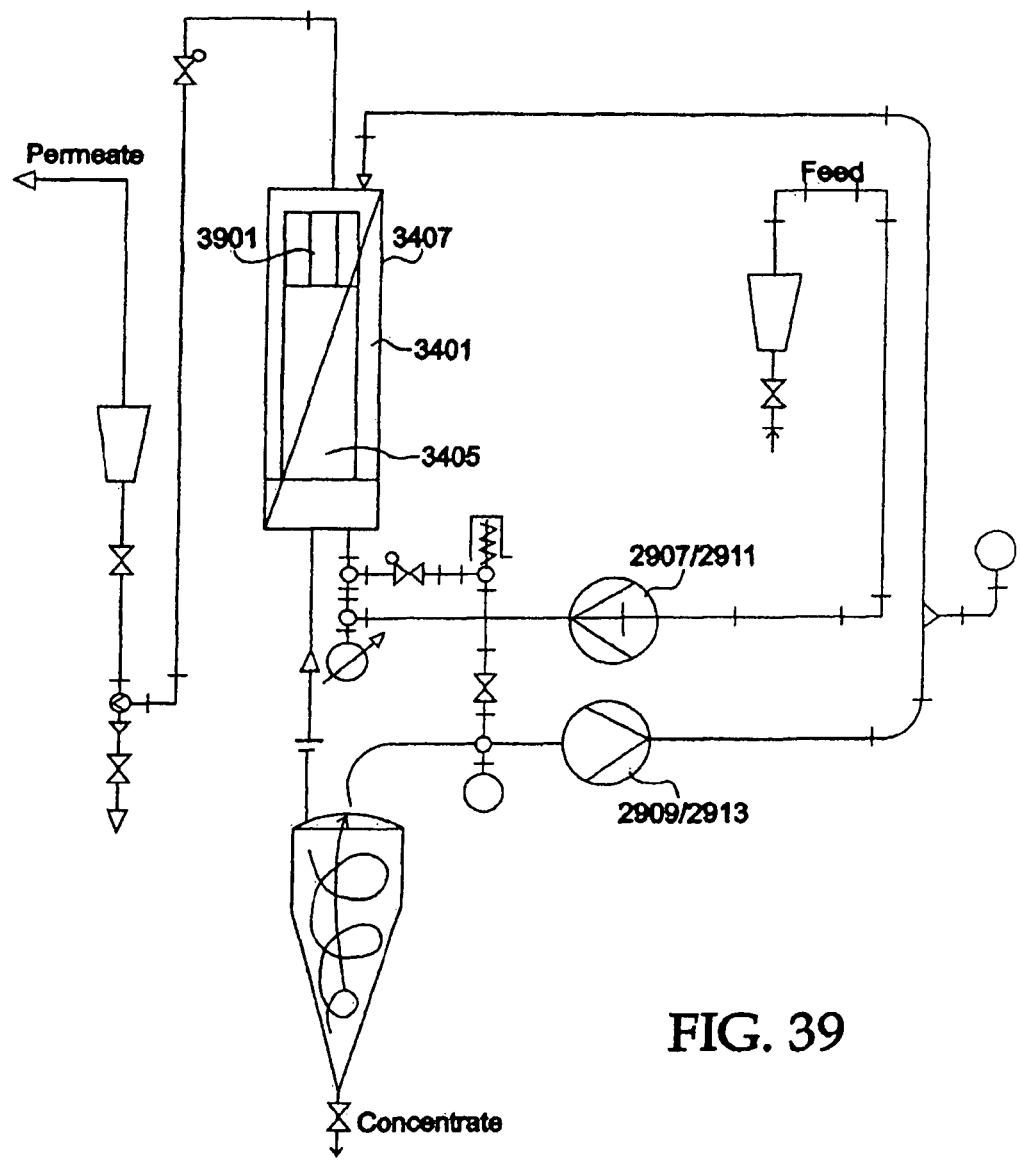
FIG. 39 is a diagram illustrating an alternative deployment of the oscillating membrane system of FIG. 35.
Figure 40:
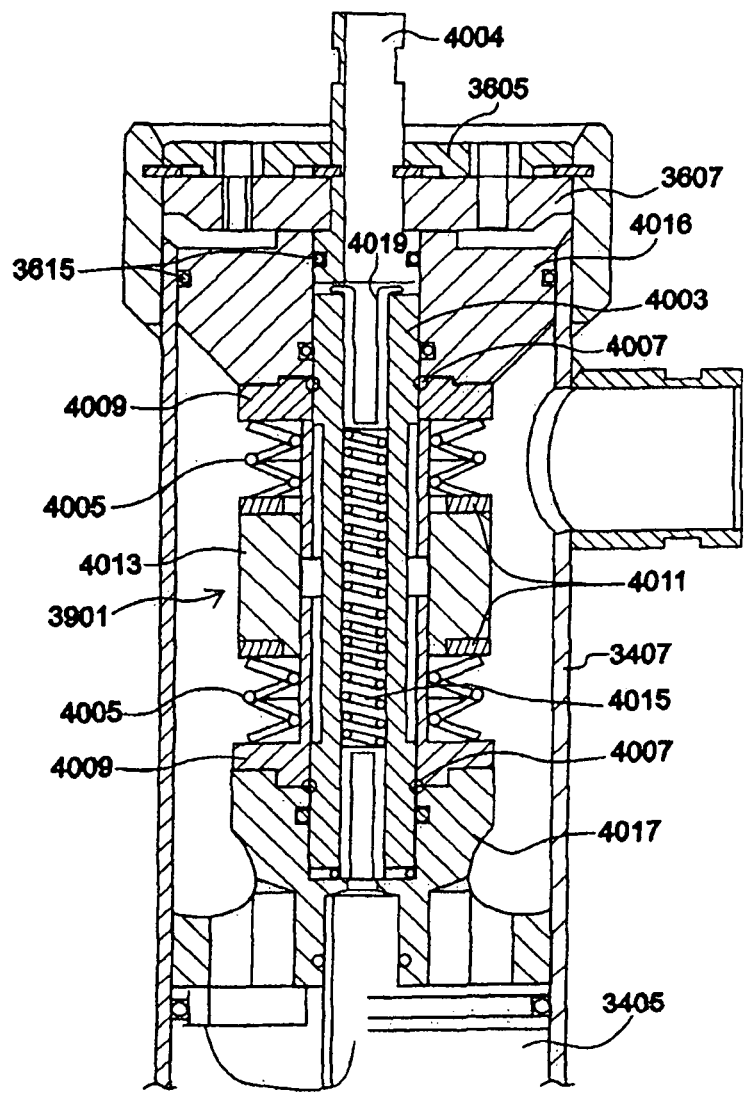
FIG. 40 is a sectional illustration of a vibratory seal arrangement for the oscillating membrane system of FIGS. 35 and 36.

Self contained, vibratory spring, seal and transfer conduit apparatus and methods, in accord with yet another aspect of this invention, are illustrated in FIGS. 39 and 40.

The self contained, vibratory spring, seal and transfer conduit apparatus and methods of this invention provide a flexible sealing connection between an oscillating and a stationary object by means of a fluid conveying elastomeric conduit connection. The flexible fluid conveying conduit is equipped with nonflexing end connectors to provide motionless sealing surfaces for the associated o-ring seals which are housed in the respective objects. As a result, positive nonreciprocating sealing in a dynamic operating environment is provided.

Self contained apparatus 3901 is adapted for (but not limited to) use with vibrating membrane technology of the type shown herein in FIG. 35 (and numbers therein common to both embodiments are carried forward). Apparatus 3901 is preloaded under tension by a polyurethane based permeate transfer conduit 4003 (also referred to herein as polyurethane spring conduit 4003). The material used has a durometer of about 60 A and has high rebound values (greater than 65%) sufficient to withstand high frequency vibrations. The materials is selected to have high load bearing properties in both tension and compression). All machine elements thus remain in alignment and remain stationary (relative to one another) thereby preserving sealing surfaces while the vibratory load is operating.

Springs (preferably Belleville or disc springs) 4005 generate a portion of the compressive force counter reacting the tension load of polyurethane spring conduit 4003. Pre-load retainers 4007 preferably stainless steel retainer rings or spring clips) contain and secure preload, connecting urethane spring conduit 4003 with the upper and lower load guides 4009. Springs 4005 are held between upper and lower load guides 4009 and center load guides 4011, load transfer spacer 4013 spanning center guides 4011 spacing the two spring columns (formed by a spring 4005 and one each of load guides 4009 and 4013). This arrangement equally distributes the low value tension and compression loads.

Spring 4015 further supports polyurethane spring conduit 4003. Conduit 4003 is mounted at the upper end with a modified plate 4016, abutting modified permeate discharge connector 4004, and at the lower end to a modified lantern ring 4017. Load transfer spacer 4013 has a length selected so that maximum urethane spring conduit 4003 deflection is less than 2%. Urethane spring manufacturers suggest a maximum deflection of 25% and a maximum cycle rate of 700 cycles per hour for intermittent operation. For continuous operations and a maximum deflection of 15%, a maximum cycle rate of 12,000 cycles per hour is suggested. Because apparatus such as apparatus 3901 has a cycle rate of between 216,000 and 648,000 cycles per hour, the deflection percentage needs to be significantly reduced.

Apparatus 3901 provides wear and leak-free operation for permeate fluid transfer between oscillating membrane element 3405 and its stationary housing 3407 components, thus effectively avoiding contamination of the produced permeate with feed water. Apparatus 3901 accommodates either high frequency membrane separation housing designs (side port entry and the top port entry) and serves as a return spring for apparatus 3401 as well as a permeate transfer conduit and seal unit. Modular design accommodates ease of maintenance.

On the lower side of apparatus 3901, lower spring 4005 column oscillates simultaneously with the module 3405, while at the upper side of apparatus 3901 upper spring 4005 column remains steadier so that the connecting end of conduit 4003 remains motionless in its sealing seat 4019. This is due to the return spring pressure acting upon the upper retainer which keeps the upper male connecting end securely in its sealing seat.

Figure 41:
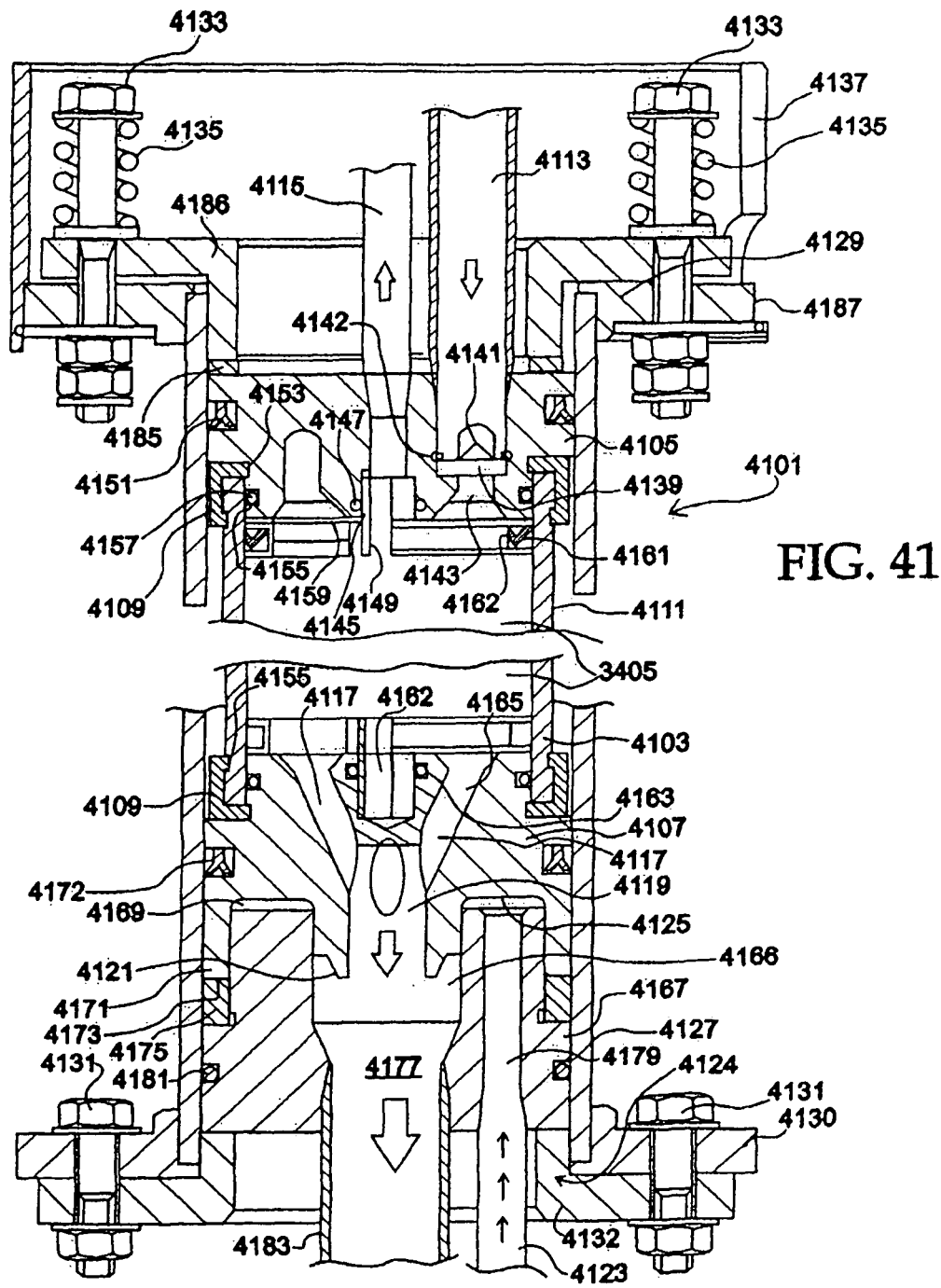
FIG. 41 is a sectional illustration of a high shear embodiment of the oscillating membrane system of FIGS. 34 through 39.
Figure 42:
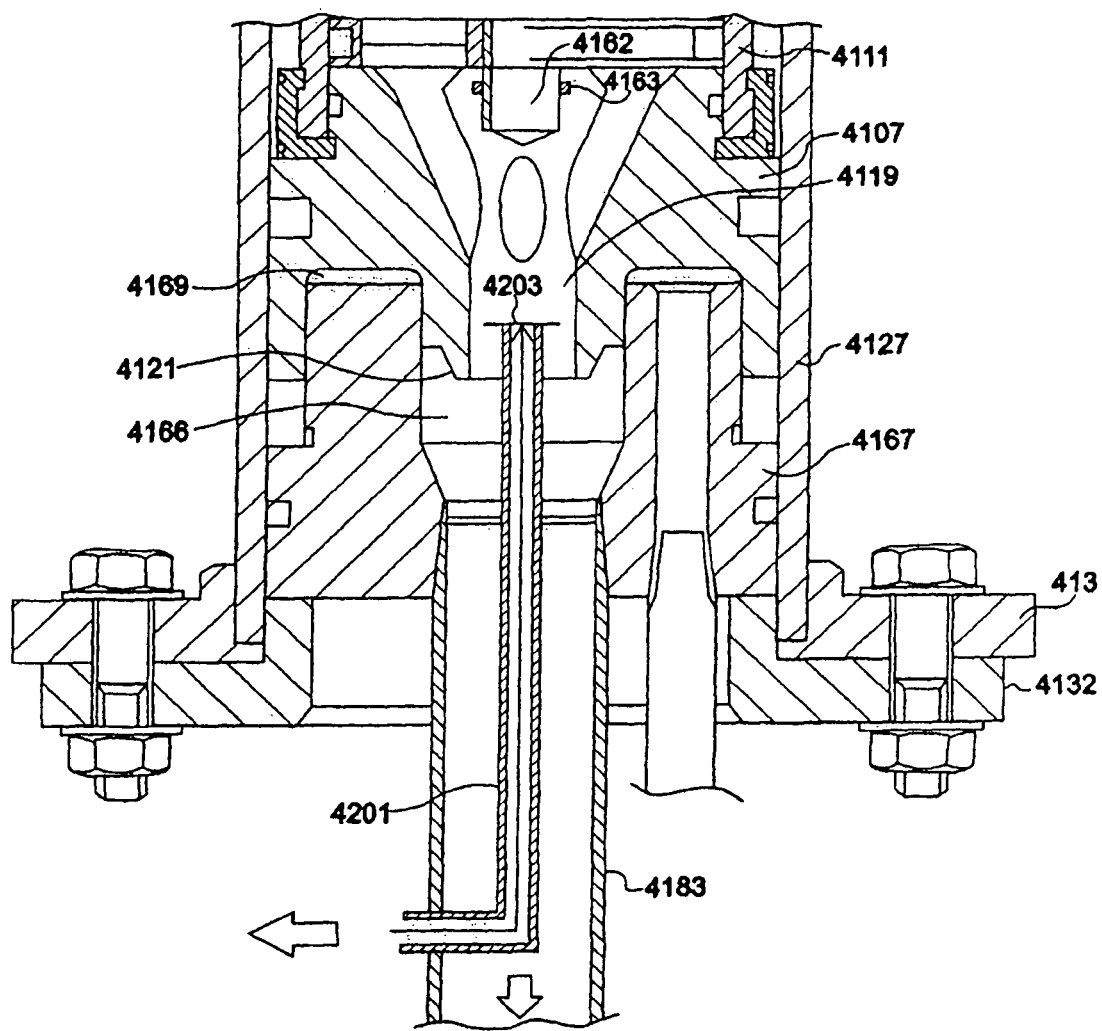
FIG. 42 is a sectional illustration of a draw-off utilizable in the high shear embodiment of FIG. 41.

In accordance with yet another aspect of this invention, FIGS. 41 and 42 illustrate a high shear and high amplitude internal membrane separation apparatus and methods. This invention relates to permeate continuity in water treatment processes. More particularly, the purpose of this aspect of the invention is to achieve high shear in such processes to increase permeate continuity while treating high load of colloidal and slimy matter (polysaccharide, etc.) in treatment station feed water.

Apparatus 4101 illustrated in FIG. 41 offers high shear operation for internally vibrating membrane separation systems of the types heretofore disclosed. This high shear option is provided by means of a high vibration amplitude in the range of 1/32" to 3/8". However, such high amplitude vibration could damage membrane element 3405. Thus, in accord with this invention, an all-surrounding membrane support tube 4103 with upper and lower connecting end pieces 4105 and 4107 which are rigidly coupled and locked to support tube 4103 by split tongue and groove rings 4109 are provided, thus converting membrane element 3405 into membrane cartridge 4111 having element 3405 therein. Membrane cartridge 4111 provides a backlash free, non-load bearing and non-force transmitting, hardened operating environment for membrane element 3405.

End pieces 4105 and 4107 also provide means for membrane fluid transfer. Upper end piece 4105 has two conduits 4113 for crossflow feed influent and 4115 for produced permeate effluent. Lower end piece 4107 has multiple inclined conduits 4117 (at least four conduits for smaller membranes) all merging into large retentate effluent conduit 4119 of venturi nozzle 4121. Nozzle 4121 has an outside cone angle of about 21° to support venturi function and enhance rapid transfer of the pulsating, make up feed flow at elevated operating frequencies. High pressure vibrating pulsating feed input 4123 through lower flange and injector body assembly 4124 is positioned to operate against surface 4125 of lower end piece 4107 to vibrate cartridge 4111.

Overall, a containment housing 4127 is welded to transfer flange assemblies 4129 (upper) and outer flange 4130 of assembly 4124, the lower flange assembly bolted together by bolt and nut sets 4131 through lower inner flange 4132 and outer flange 4130 of assembly 4124. Upper flange assembly is bolted together with bolt and nut sets 4133 having recoil springs 4135 thereover for recoil adjustment. Safety guard 4137 is mounted at the top of apparatus 4101 and includes a window for on-site amplitude inspection.

The structural integrity of the membrane element 3405 needs to be strong enough to sustain its own vibratory mass acceleration forces within its hardened enclosure. To provide maximum structural membrane element strength, the preferred spirally-wound membrane element design for all high frequency membrane separation applications in high shear mode includes fiberglassed outside for holding element 3405 together.

However, amplitudes greater than 3/8" are not recommended for the spirally-wound membrane elements under any circumstances since adhesive membrane joints fatigue prematurely at higher operating frequencies (60 Hz).

Apparatus 4101 allows operation of vibratory membrane implementations at higher shear at moderate frequency (20 to 60 Hz). Membrane cartridge 4111 is relatively light and vibrates internally at an adjustable up to a relatively high frequency within housing 4127 (rather than vibrating the entire heavy membrane module as is common in conventional vibratory membrane separation processes).

A primary application for this high shear option for high frequency membrane separation systems is the effluent treatment of dewatered electrocoagulation sludge. This is an important treatment step whenever a required electrocoagulation process generates sludge and the produced sludge requires dewatering prior to disposal. Any other application where an elevated shear energy requirement for treatment of a specific feed water is diagnosed would benefit from use of apparatus 4101.

A secondary application for this high shear option exists where electrocoagulation pre-treatment is abandoned in favor of standard nanofiltration treatment. This will produce a concentrate having colloidal loading too high for standard low shear high frequency membrane separation processes. Yet another application occasioned in any circumstance where limited disposal options are present in extreme high flow yield (high concentration factor) treatment setting.

End pieces 4105 and 4107 are preferably machined out of any suitable material such as metal alloys or engineering plastic materials (selected to keep the vibratory mass low). To minimize an unbalanced, one-sided, membrane feed flow channeling, antichanneling flow distribution plug 4139 having splash dome 4141 blocks direct throughflow and guides the feed flow into ring room flow distribution channel 4143 defined at end piece 4105. Splash dome plug 4139 rests on a shoulder in the lower section of feed conduit 4113 and is secured in its upper position by stainless steel retainer ring 4142. A flared fluid transfer opening from ring room 4143 faces towards the anti-telescoping device at the lead end of membrane element 3405.

Step bore 4145 in end piece 4105 seals (at o-ring 4147) the upper end of permeate collection tube 4149. The outside of upper end piece 4105 includes groove structures, the first to receive upper reciprocating groove ring seal 4151 to seal the upper portion of membrane cartridge 4111. A second high and shallow groove 4153 receives the overlapping split tongue ring 4109 (connectable at its other end in groove 4155 of tube 4103. The split tongue ring halves can be held together by dual spring rings or other suitable means. O-ring 4157 seal upper end piece 4105 and support tube 4103.

To take up axial slack and minimize movement of membrane element 3405 within its all-surrounding enclosure, shims can be added to flow distribution and screen plate 4159 sandwiched between upper end piece 4105 and the anti-telescoping device at the lead end of membrane element 3405. (and where applicable, at the permeate collection tube).

Membrane element backlash is thus virtually eliminated.

Plate 4159 provides the necessary pressure drop for proper crossflow feed distribution around the feed ring room. In conjunction with anti channeling flow distribution plug 4139, plate 4159 minimizes localized feed channeling, thus utilizing more efficiently the available membrane area for diffusive fluid transfer. Plate 4159 also acts as a crossflow pump discharge filter screen to catch any particles and foreign objects.

Support tube 4103 can be made from a thin-walled metal alloy a heavier walled, suitable plastic material in order to reduce the vibratory mass. Support tube 4103 is grooved at it bottom end (at 4155) to provide a connection sites for tongue and groove ring 4109 thereat. U-cup seal gasket 4161 is placed around the outside (in a concentrate seal holder 4162) of the lead end of the membrane element 3405. This gasket seals membrane element 3405 to external support tube 4103 and prevents the crossflow feed influent from bypassing the membrane element.

Downstream, membrane element 3405 is equipped with an anti-telescoping device that is connected to lower end piece 4107 by means of the extended lower end of its permeate collection tube 4162. Tube 4162 is sealed at o-ring 4163 at lower end piece 4107. Lower end piece 4107 itself is rigidly coupled and sealed to support tube 4103 in the same manner as upper end piece 4105. The top face of lower end piece 4107 is equipped with a tapered, shallow ring groove 4165. Groove 4165 collects and distributes concentrate/retentate fluid through multiple inclined fluid transfer conduits 4117 which are distributed around groove 4165.

Protruding venturi nozzle 4121, is fitted in inlet chamber 4166 which is defined by injector body 4167 of assembly 4124 protruding into lower end piece 4107 leaving a small ring room 4169 adjacent surface 4145 of end piece 4107 for the distribution of the high pressure, pulsating make up feed flow. Venturi nozzle 4121 has an effective sealing length equivalent to the maximum operating amplitude.

End piece 4107 has a dual purpose concentric guide shroud 4171 providing a close fit concentricity between the axially vibrating lower end piece 4107 and non-vibrating injector body 4167. Shroud 4171 defines a reasonable operating clearance between end piece 4107 and external housing 4127 to ensure proper operation of reciprocating seal 4172 sealing housing 4127 and vibrating membrane cartridge 4111 from potential fluid loss. Shroud 4171 also provides impact surface 4173 contacting amplitude regulating impact ring 4175. Ring 4175 is preferably made from polyether-based urethane (60 on the Shore A scale), providing shock deadening. Ring 4175 is configured and positioned for highly resilient operation providing quick recovery in high-frequency vibration applications (rebound values from 50 to 70%). Vibration amplitude ranges can be regulated by ring height selection. An increase in ring height increases the volume of the distribution ring room 4169 while reducing the effective height of the cylindrical shaped section of nozzle 4121.

In operation, the unchanged volume of the displacement stroke of high pressure piston pump (2907 or 2911, for example, in FIG. 29) first fills the volume of ring room 4169 with feed liquid before it starts to initiate an axial, upward movement of membrane cartridge 4111. Once the cartridge travel upwards and exceeds the reduced height of the outer diameter of nozzle 4121, a fluid transfer passage around nozzle 4121 (from ring room 4169 to chamber 4166) opens and passes the liquid which then flows by the 21° cone-shaped end of nozzle 4121 of lower end piece 4107. Consequently, the feed flow through this transfer passage is entrained and carried along by the venturi effect of the concentrate/retentate discharge and is subject to the priming suction of the crossflow recirculation pump (2909 or 2913, for example, in FIG. 29).

Injector body 4167 is also preferably a unitary structure, machined, for example, from either suitable metallic alloys or plastic material. Injector body 4167 has large conduit 4177 and smaller conduit 4179, conduit 4177 for transfer of concentrated retentate and the pulsating, make up feed influent to crossflow recirculation pump as discussed hereinabove. Conduit 4179 is the input for the vibration inducing feed. Injector body 4167 is sealed at outer housing 4127 with o-ring 4181. Camber 4166 tapers down at conduit 4177 to funnel the flow into recirculation suction connector pipe 4183 maintained through inner lower flange 4132.

Injector body 4167 is positioned and kept in place inside external housing 4127 by flange 4132. The weldment of flange 4130 and housing 4127 could be replaced by an integral structure such as a pipe spool. An upper impact and buffering ring 4185 (made from a polyurethane material) is located between upper end piece 4105 and upper inner flange 4186 of flange assembly 4129 (the weldment of flange 4187 of assembly 4129 to housing 4127 could also be replaced by an integral structure such as a pipe spool).

While not preferred, a potentially useful alternative draw off arrangement for apparatus 4101 as illustrated in FIG. 42 could be utilized. This arrangement provides secondary retentate conduit 4201 in conduit 4183 and through injector body 4167 and chamber 4166 defined by lower end piece 4107 so that its inlet 4203 resides above venturi nozzle 4121 in conduit 4119. In this way draw off received through cartridge 4111 can be at least partially segregated from mixed retentate and feed received during operations from ring room 4169.

Figure 43:
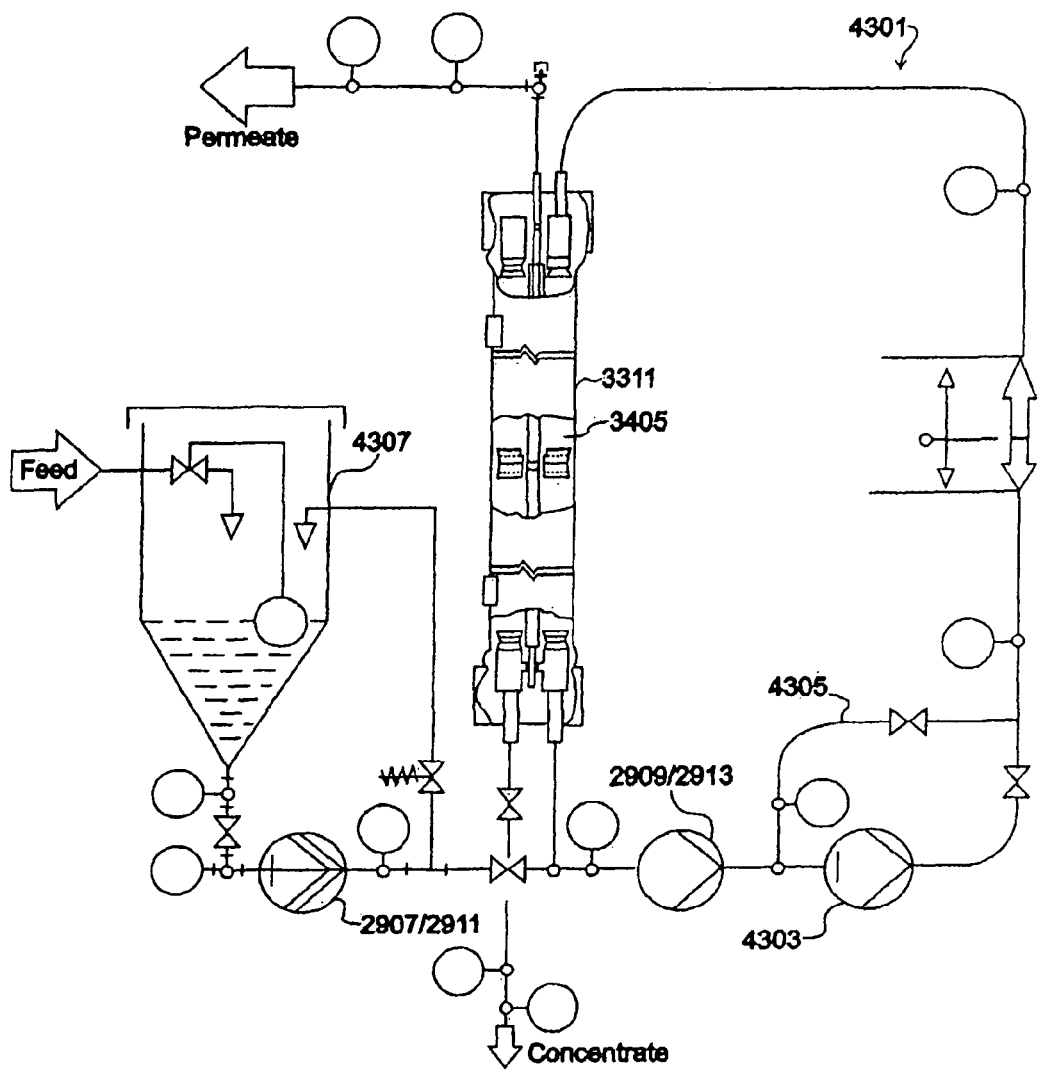
FIG. 43 is a diagram illustrating an alternative oscillatory fluid column crossflow membrane separation system utilizable in primary treatment steps at the station of this invention.
Figure 44:
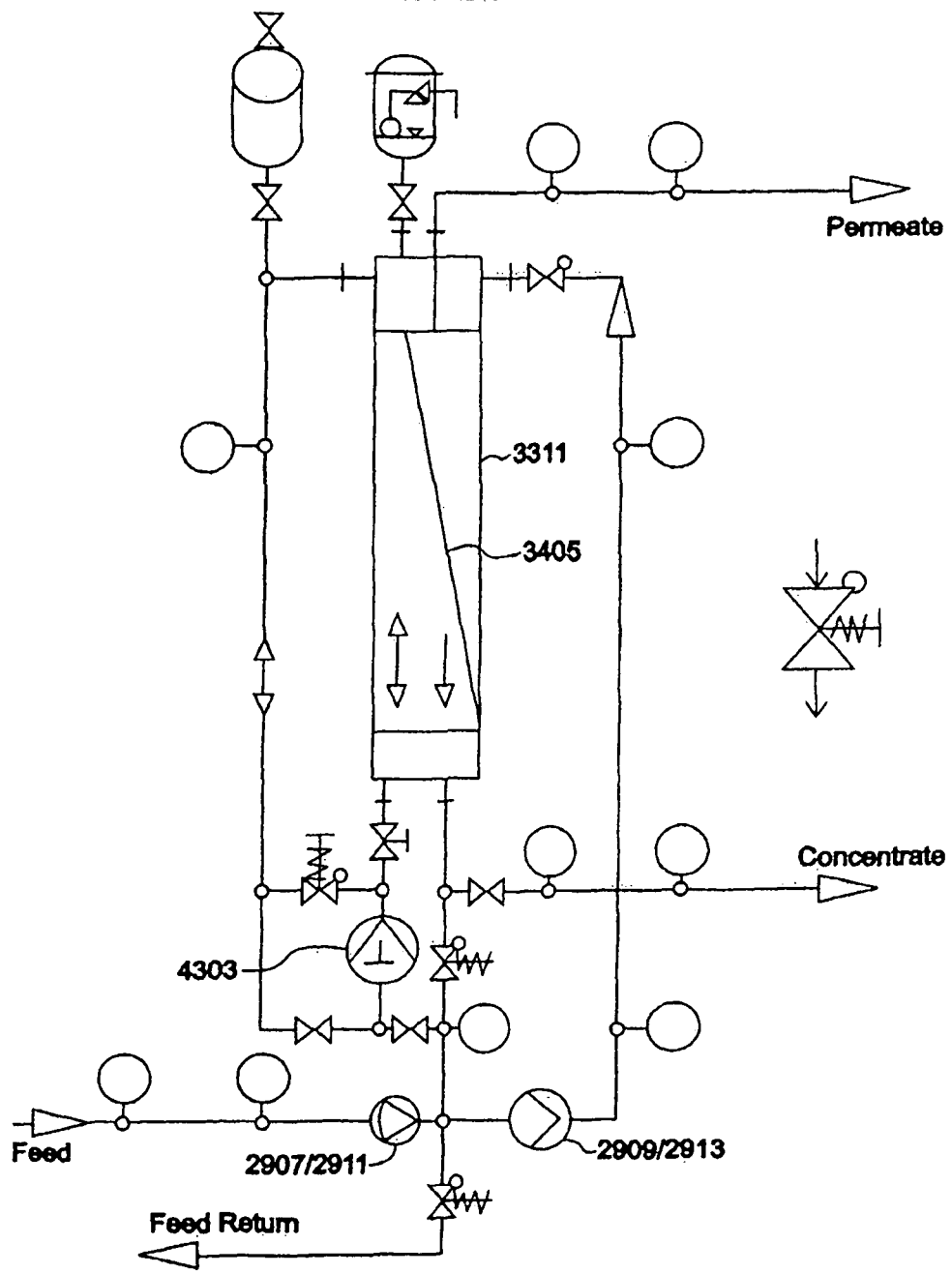
FIG. 44 is a diagram illustrating a vibratory retentate membrane separation system utilizable in primary treatment steps at the station of this invention.
Figure 45:
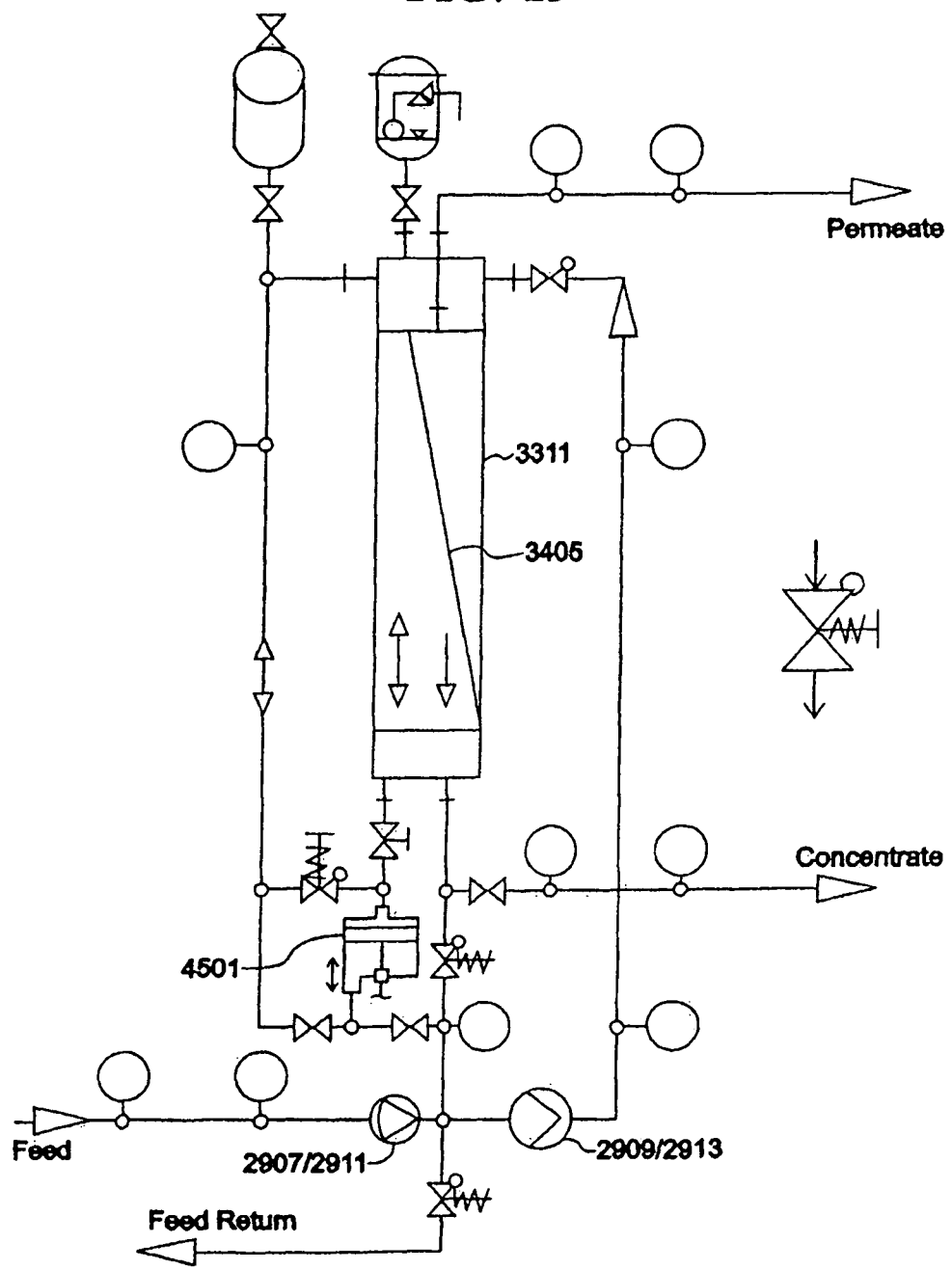
FIG. 45 is a diagram illustrating another alternative oscillating retentate membrane separation system utilizable in primary treatment steps at the station of this invention.

In accordance with another aspect of this invention, FIGS. 43 through 45 illustrate an oscillatory crossflow membrane separation apparatus and methods. The object of the apparatus and methods of this aspect of the invention is to achieve adequate shear in treatment of contaminated water to increase permeate continuity for feedwater having moderate colloidal loading. The apparatus employs vibratory membrane treatment without moving sensitive membrane elements 3405 or modules 3311 and associated components. This minimizes energy requirements while simultaneously increasing membrane longevity. Standard membrane elements 3405 and standard modules/housings 3311 may be used.

As previously discussed, thickness of the membrane boundary layer is affected by the permeate flux rate. However, oscillatory crossflow shear forces, together with a spacer introduced homogenization effect, reduces the size of the boundary layer by pulling suspended particles back. This, in turn, keeps them from settling and returns the particles to the bulk stream. The bulk stream contains the returned particles between the membrane leaves.

In apparatus/system 4301 oscillatory shear forces are provided by the pulsing crossflow medium itself, oscillatory crossflow pulsations generated by modified piston or diaphragm pump 4303 (for example, pumps from SPECK, WANNER, CAT, DANFOSS (Nessie), or others). Pump modification consists of the removal of the particular pump suction and discharge check valves.

This valveless pump 4303 provides no true pumping. Only an up and down, pulsating fluid column is generated by the valveless pump. Since valveless pump 4303 in apparatus 4301 does not function as an operational pump, it will be referred to hereinafter as a fluid oscillator. Since oscillator 4303 does not have to produce a high pressure gradient, its operating energy requirement is very low. Oscillation amplitude (height of the fluid column) depends on the relationship between the combined membrane flow channel displacement volume, geometric displacement volume of fluid column oscillator 4303, and membrane element 3405 length.

Crossflow movement of the oscillating fluid column over membrane element 3405 is provided pump 2909/2913, for example. Valve controlled bypass 4305 is located between the discharge from crossflow recirculation pump 2909/2913 and after the discharge end of oscillator 4303 for purposes of bypassing oscillator 4303 and/or fine tuning the pulsation effect. System feed pressure is provided by high pressure pump 2907/2911.

Feed pressure pump 2907/2911 provides the applied membrane pressure after adjusting for the permeate pressure and, if applicable, for the osmotic pressure. Crossflow pump 2909/2913 provides a stream of prefiltered (as heretofore discussed and indicated generally herein at 4307) feed fluid passing over the surface of membrane element 3405 which flows perpendicular to the permeate stream. Oscillator 4303 provides the pulsating shear force effect to the combined flow volume of the other two pumps and operates in series with pump 2907/2911.

The primary application for apparatus 4301 and related methods is for membrane systems having small, combined membrane flow-channel displacement volume, wherein, despite a relatively small geometric displacement volume of fluid column oscillator 4303, an adequate oscillation amplitude height producing an effective shear action to minimize the thickness of the membrane boundary layer is produced. The methods and apparatus 4301 for oscillatory crossflow membrane separation can be applied whenever a crossflow, combined with a reduced permeate flux, is otherwise insufficient to reduce the boundary layer thickness. Upgrade and maintenance situations can make particularly effective use of apparatus 4301. Apparatus 4301 would also be useful in treatment settings where the medium to be treated shows a high scale formation potential caused by high concentration of dissolved salts.

FIG. 44 shows an operating principle variation of the system shown in FIG. 43. In this embodiment, oscillator 4303 works against pump 2907/2911. This embodiment is particularly useful if the medium to be treated shows a high fouling potential caused by suspended solids of colloidal matter and organics. FIG. 45 shows yet another variation of the system shown in FIG. 43. Fluid column oscillation is provided by double-acting cylinder system 4501 with a single piston. The piston is powered by an electrical crankshaft drive. The double-acting cylinder system enhances the fluid column oscillation over the entire membrane.

In operation, during a piston upstroke in oscillator 4303/4501, the fluid column within the leaves of membrane element 3405 is accelerated upwards, The upward movement starting at the discharge end of membrane element 3405. The pneumatic accumulator of a standard membrane module 3311 acts as a hydraulic balancer in the system of this aspect of the invention. Air pressure in the accumulator acts as a weight for raising the piston by pushing the stand pipe's fluid column against the bottom side (rod side) of the piston thus assisting the column's upward movement over the entire membrane length and minimizing slip and localized hydroshock. Piston friction is reduced allowing for high oscillating frequency operation.

During a piston downstroke in oscillator 4303/4501, the fluid column within the leaves of membrane element 3405 is accelerated downward, the downward movement starting at the discharge end of the membrane. The momentary void at the lead end of membrane element 3405 is augmented by the stored energized volume from the hydropneumatic accumulator, thus providing an uninterrupted downward movement of the fluid column over the entire membrane length and minimizing slip and localized cavitation.

The pneumatic accumulator of module 3311 also serves as a water hammer and surge pressure absorber (shock dampener). The internal hydromechanical shock vibrations introduced by the oscillator 4303/4501 could cause damages to membrane element 3405. The accumulator dampens these hydromechanical shocks without reducing significantly the adequacy of hydromechanical shear to the boundary thickness layer of element 3405.

In general, apparatus 4301 works with a low crossflow velocity. In order to secure a reversal in shear direction and produce a useful shear velocity, the crossflow velocity must be lower than the fluid column oscillation velocity. The fluid column up-stroke works against the downward directed crossflow. The oscillatory axial crossflow membrane separation apparatus and method of FIGS. 43 through 45, when compared to non-oscillating conventional crossflow membrane systems operating at a standard crossflow velocity of 1 m/s, reveals that these new oscillatory apparatus produce higher shear rates by a magnitude due to motional fluid acceleration. The oscillatory crossflow membrane separation method of this invention produces approximately five times greater a shear rate with the up-stroke, and approximately 14 times greater a shear rate with the down-stroke oscillation than the conventional crossflow membrane separation systems.

Figure 46:
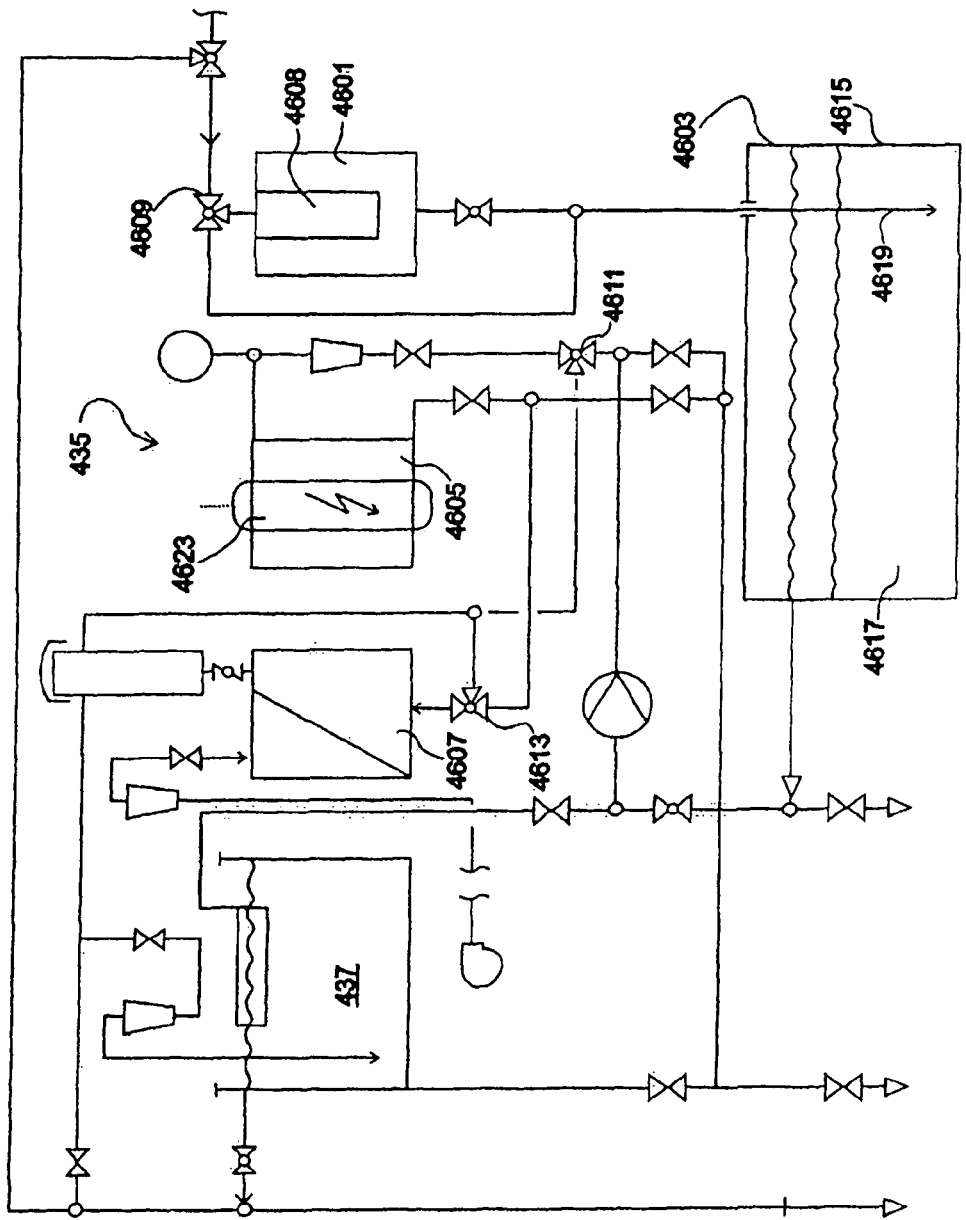
FIG. 46 is a diagram illustrating the apparatus of the post-treatment suite of the station in combination with a biomonitoring aquarium.
Figure 47:
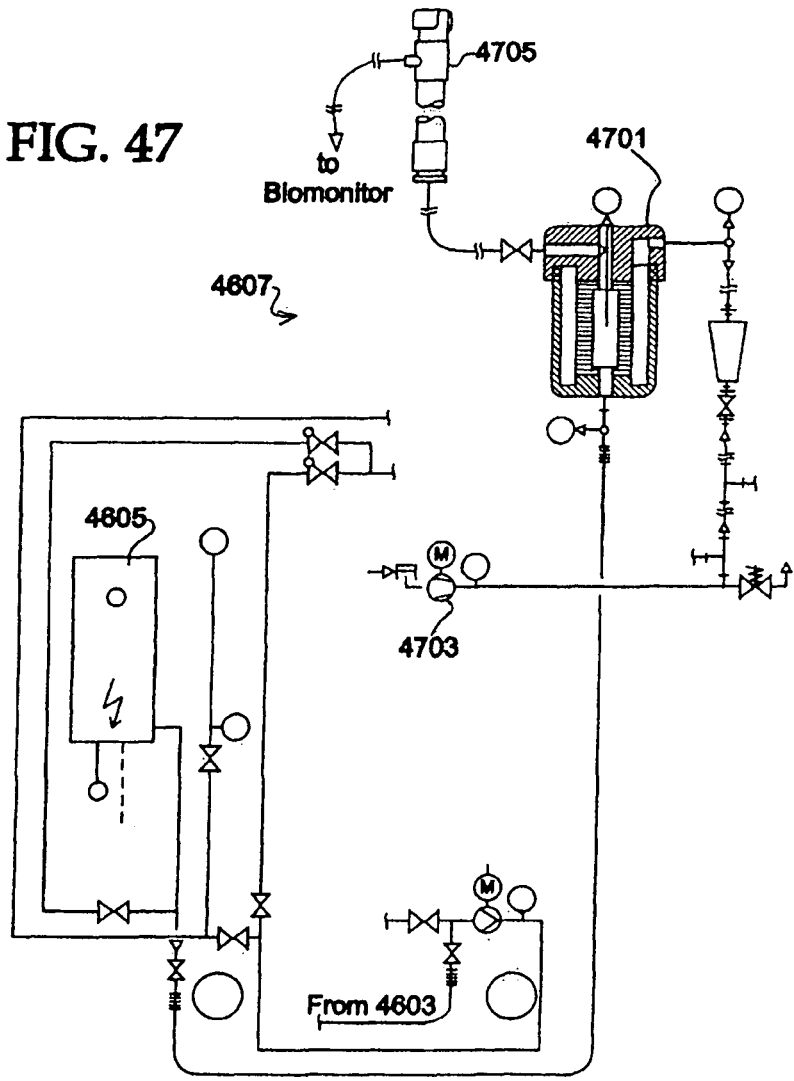
FIG. 47 is a diagram illustrating one element of the post-treatment suite of the station of this invention.
Figure 48:
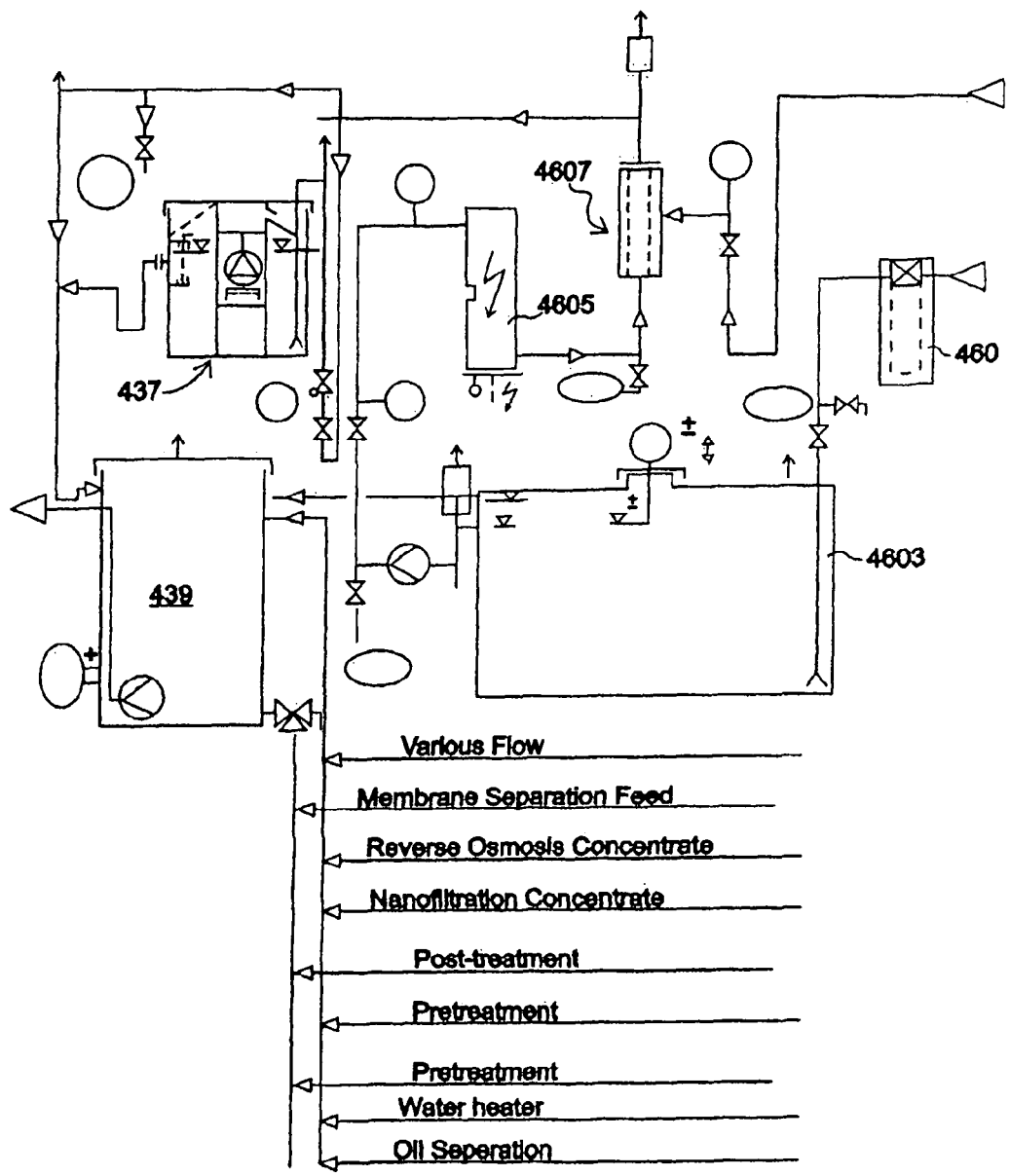
FIG. 48 is a flow diagram illustrating the post-treatment suite of FIG. 46 in combination with output drain and disposal facilities.

Turning now to FIGS. 46 through 48, post-treatment stage 435, bio-monitoring stage 437 and collection and return stage 439 will be described. As shown in FIG. 47, post-treatment stage 435 includes treatment apparatus/options 4601, 4603, 4605 and 4607. Apparatus 4601 provides an activated carbon filter 4608 for gas absorption. Valve 4609 allows bypass of this option (valves 4611 and 4613 allow other options to be bypassed).

A dolomite/marble filter for sodium absorption ratio (SAR) compensation is utilized at stage 4603. Reverse osmosis membrane treatment applied at station 101 of this invention removes up to 99% of the sodium and almost all of the calcium and magnesium ions in the treatment flow, and the produced reverse osmosis permeate may have an elevated SAR value. This may be unacceptable if the permeate is designated for surface discharge, so apparatus 4603 reintroduces SAR lowering ions.

Tank 4615 (a 300 gallon Snyder Horizontal Leg Tank, for example) is filled ¾ full with crushed white marble split 4617 into which produced permeate is introduced through pipe 4619 at the bottom of one end of the tank. The permeate exits tank 4615 at the top of the tank at its other end. The permeate with the residual $CO_2$ gas and pH around 6 will leach calcium ions out of the marble, whereby the pH will be increased to about 7.

An alternative means for SAR adjustment is by inline dosing with milk of lime. For inline mixing of milk of lime with treatment water a multi-stage static KOMAX mixer would be sufficient. The required amount of $Ca(OH)_2$ or more specific Ca depends on the residual Ca content in the treatment water and the desired sodium absorption ratio. When lime requirements are high, QuickLime CaO can be formulated in a lime slaker to convert it to the hydrated Lime $Ca(OH)_2$. An injection pump or pumps then deliver the solution into a 200 gpm slipstream, consisting of a blend of raw and treated water, which is mixed with $Ca(OH)_2$. Downstream, the calcium enriched slipstream is blended with the residual discharge stream in a static inline KOMAX mixer prior to discharge.

Ultraviolet radiation treatment apparatus 4605 employs 254 nm UV light. The 254 nm UV is employed for microbial decontamination or disinfection at bulb 4623. The most advanced theory of bacterial action of UV suggests that photochemical alteration of deoxyribonucleic acid (DNA) hinders the bacteria or microbial contaminants from reproduction (photochemical birth control). Although the bacteria or microbial contaminants are not killed, if they cannot reproduce, then their potential impact is dramatically reduced. The dosage required to inhibit population growth by 100% for a selected target organism depends on the specific organism. For a specific organism, a dosage rate is established through experimentation, since the dosage varies widely between different organisms. Therefore, initial treatment analysis on the subject treatment water includes means for determining the kind of organisms present.

The UV treatment can also be employed in the first or second pre-treatment stage herein (if the turbidity of the feed water is very low—less than 2 nephelometric turbity units) in three potential applications: for continuous sanitization of the feed water; using a 185 nm bulb, for reducing the total organic carbon of the feed water; and, in case of chlorination, for removing free chlorine, chloramines or trihalomethanes from feed water.

Apparatus 4607 is shown in FIG. 47. Apparatus 47 provide membrane aeration and $O_2$ utilizing ODE techniques discussed hereinabove. The apparatus includes microfiltration cartridge 4701 receiving air from blower 4703 and feed from UV apparatus 4605. Outflow from cartridge 4703 is received at bubble reactor 4705, the outflow from which is received at biomotoring stage 437 before receipt at concentrate collection and effluent return stage 439 (FIG. 48).

Figure 49:
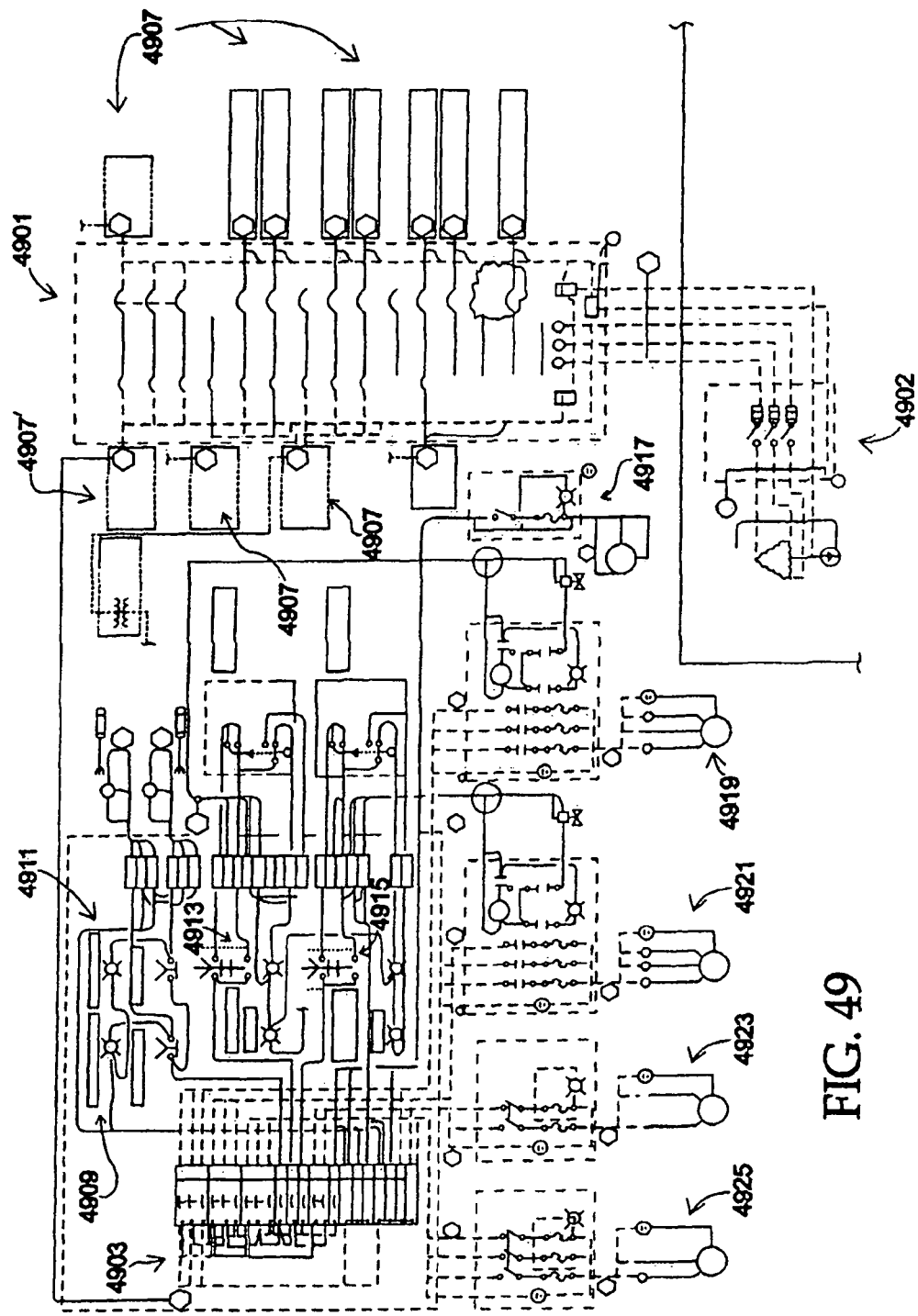
FIG. 49 is a diagram illustrating indicative treatment control and platform power wiring.
Figure 53:
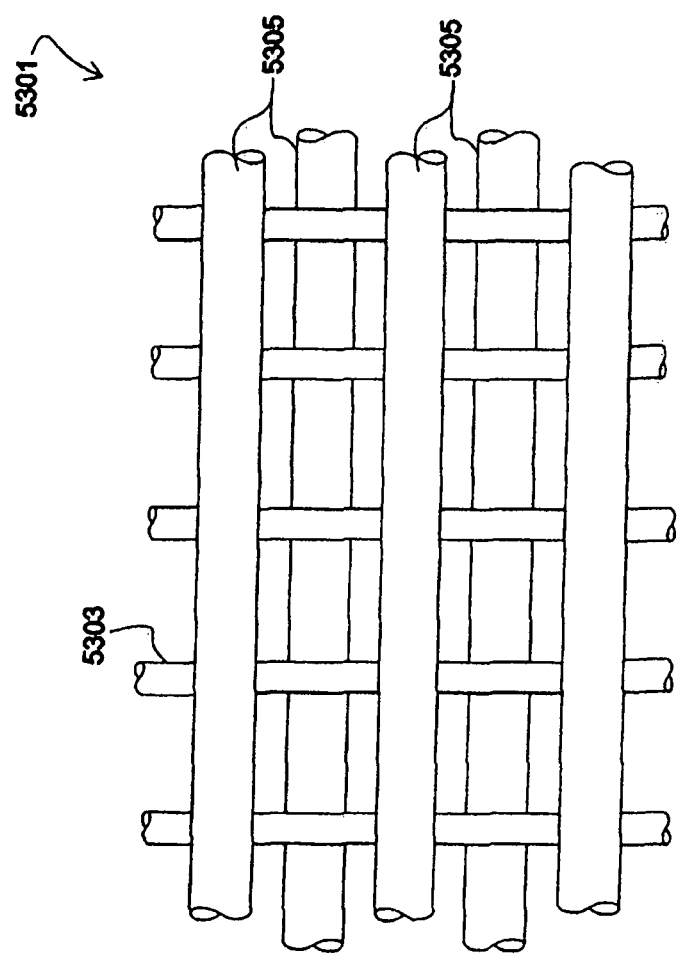
FIG. 53 shows a fourth embodiment of the spacer technology for axial vibratory membrane separation modules.

FIG. 49 shows one typical circuitry of primary unit power control and routing at station 101. The system is typical of such installations, including other installations in station 101, and includes system lighting and circuit breaker panel 4901, service disconnect 4902 and power distribution bridge 4903. Station systems can be established on panel 4901 at headers 4907 (including that shown in this FIG. 49, established at header panel 4907').

Various circuits for pump operating systems and controls are shown for a first water treatment grouping, including edge filter pump circuit 4909, aerator pump circuit 4911, supply pump circuit 4913, return and transfer pump circuit 4915, and homogenizing pump circuit 4917. Primary power to supply and return/transfer pumps 4919 and 4921, respectively, as well as to station compressor 4923 and vent blower 4925 and the various circuits is connected through bridge 4903. The other systems in station 101 follow a similar wiring logic. Communications and computing systems should be isolated to assure their integrity.

In accord with yet another aspect of this invention, improved spacers for membrane elements of axial vibratory membrane separation modules are shown in FIGS. 50 through 53. These spacers combine the known art of parallel spacer technology with the known art of diamond spacer technology in a novel spacer design. Parallel spacers require a higher energy gradient to generate turbulence than diamond spacers but have no stagnant areas. Due to a more favorable flow channel arrangement, effective membrane flushing is provided by parallel spacers. As a result, concentration polarization is avoided. On the other hand, diamond spacers require a lesser energy gradient to generate turbulence due to the obstructed, flow-altering, diamond-shaped design, but have a less favorable flow channel arrangement with stagnant areas. These stagnant areas are prone to concentration polarization.

The spacer embodiments 5001, 5101, 5201 and 5301 shown in FIGS. 50 through 53 all provide turbulence due to an obstructive, flow-altering, inner layer 5003/5103/5203/5303 of spacious material (suitable fabric materials, for example) between outer support structure (rods, for example) 5005/5105/5205/5305, thus reducing the energy gradient needed to generate turbulence. Outer support structure 5005/5105/5205/5305 on both sides of inner layer 5003/5103/5203/5303 provides enhanced flow channel clearance so that generated turbulence may effectively reduce the thickness of the boundary layer. This avoids concentration polarization. These spacers are particularly well adapted to the axial vibratory membrane separation treatment apparatus disclosed hereinabove, and can be employed in both hydraulic pressure-driven membrane separation apparatus and osmotic pressure-driven membrane separation apparatus associated with forward osmosis processes. The spacers shown in the FIGURES are all bonded spacers utilizing known bonding techniques.

As to the different embodiments, embodiment 5001 shown in FIGS. 50a through 50c utilizes flow-altering, inner layer 5003 of spacious woven material with a symmetrically opposing outer support structure 5005. Embodiment 5101 of FIGS. 51a and 51b utilizes flow-altering, inner layer 5103 of spacious woven material with a symmetrically offset outer support structure 5105. Embodiment 5201 of FIGS. 52a through 52c utilizes flow-altering, inner layer 5203 of spacious non-woven material with a symmetrically opposing outer support structure 5205. Embodiment 5301 of FIG. 53 utilizes flow-altering, inner layer 5303 of spacious non-woven material with a symmetrically offset, outer support structure 5305.

Figure 54:
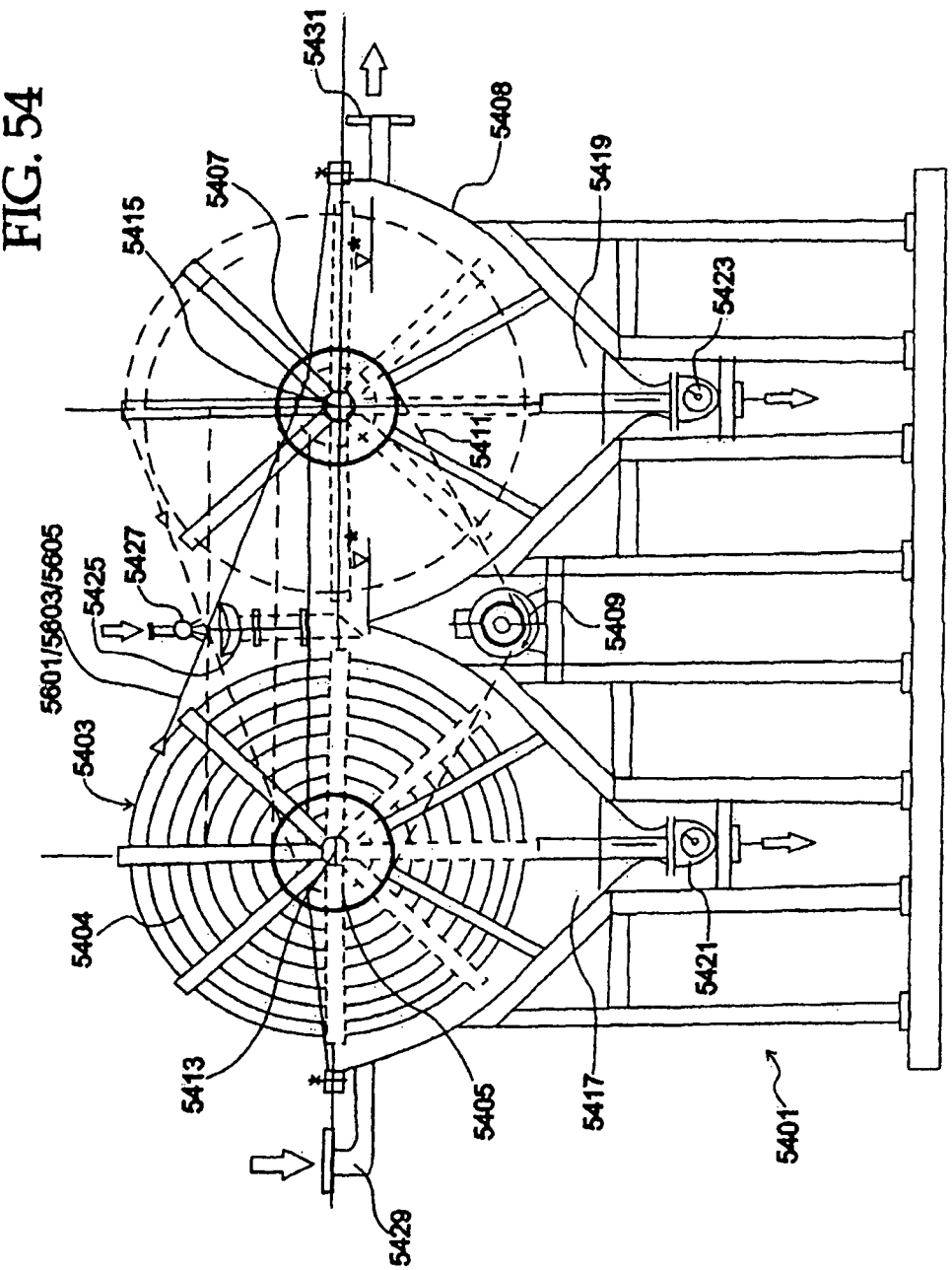
FIG. 54 is a side sectional view of a rotating biological contactor treatment assembly.
Figure 55:
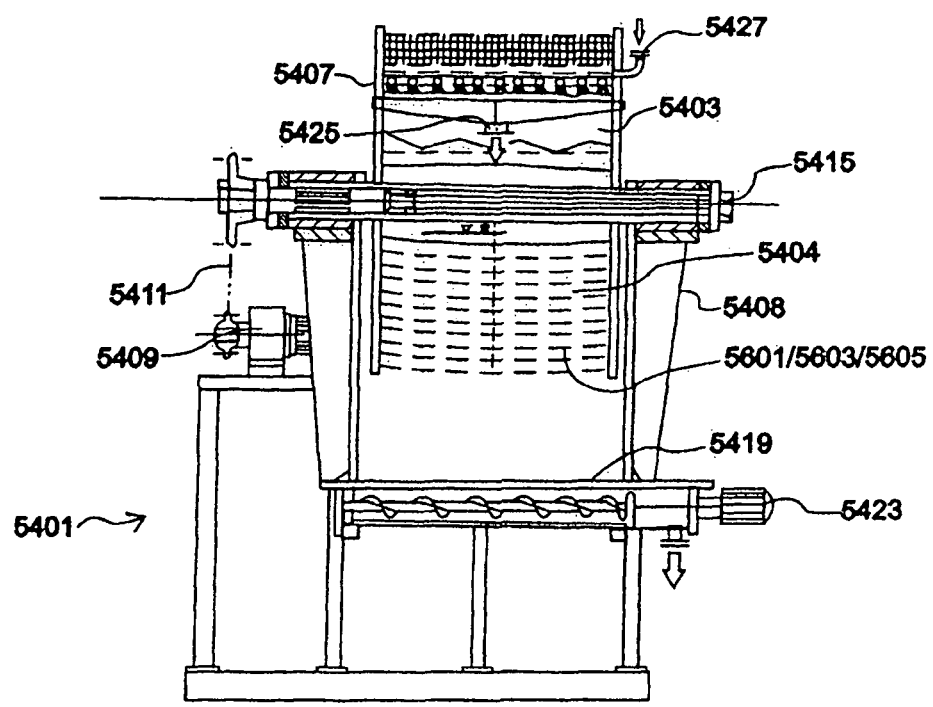
FIG. 55 is a second sectional side view of the assembly of FIG. 54.

In accord with still another aspect of this invention, FIGS. 54 through 56 illustrate apparatus 5401, an assembly for treatment of biological wastewater from station 101 utilizing a rotating biological contactor. Apparatus 5401 may be used as an additional pre-treatment step to remove contaminants such as emulsified oil/grease, anaerobic iron accepting bacteria, as well as trace amounts of dissolved iron, manganese and methane gas from the influent feed water stream.

The goal of all biological wastewater treatment systems is to remove the non-settling solids and the dissolved organic load from the wastewater by using microbial populations. The microorganisms used are responsible for the degradation of organic matter and the stabilization of organic wastes. The station of this invention may use aerobic microorganisms (i.e., microorganisms that require oxygen for their metabolism). These microorganisms use the organic content, including anaerobic iron accepting bacteria, of the wastewater as an energy source to grow.

The specific biological medium used herein consists of genetically altered aerobic microorganism cultures (e.g., *Pseudomonas aeruginosa, Bacillus lichenifonnis, Pseudomonas fluorescens, Bacillus subtilis*, etc.). The organic load of this treatment system is incorporated in part as biomass by the microbial populations, and almost all the remainder is liberated as gas (carbonated dioxide, plus methane if ODE membrane aeration apparatus 701 is used to the influent wastewater feed). Unless the cell mass formed during the biological treatment is removed from the wastewater (e.g., by sedimentation, for instance, described herein), the treatment is largely incomplete because the biomass itself will appear as organic load in the effluent and the only pollution reduction accomplished is that fraction liberated as gas.

Heretofore utilized rotating biological contactors have employed a biological film supported on a rotating plastic material disk or disks in a horizontal plane in a trough through which settled sewage flows. The disks are only partially submerged and, therefore, the biomass is subject to periodical removal from the wastewater flow (the oxygen required to permit respiration is extracted from atmospheric air). Excess biomass is continually sloughed from the support disks and treated effluent must therefore be discharged into a secondary clarifier to settle entrained solids prior to further treatment.

New Rotating Biological Contactor

Apparatus 5401 of this aspect of the invention utilizes immersed conveyor 5403 holding a coil 5404 of woven plastic fabric conveyor belt material 5601/5603/5605 in a long sheet (e.g., 1,500 m×1 m, the various embodiments of which are shown in FIG. 56. The conveyor could be coated with ZEORAP using a fluidized bed process (for example, silicon fog) prior to seeding with microbial cultures. This provides faster and stronger adherence of the seedling to the rough ZEORAP surface structure. The ZEORAP becomes a catalyst for the conversion of organic and inorganic contaminants. The coil is spirally wound (Archimedes' spiral) around drum 5405 to which the inner coil end is fastened, the other coil end fastened to take-up drum 5407. The drums are mounted side by side in tank 5408 allowing alternating coiling and uncoiling of the belt material from one drum to the other (utilizing bi-directional motor 5409 connected by belt or chain drive 5411 with each of the drums, motor 5409 connected with a sensor switch or the like for reversing direction of rotation (not shown)). The bio media rotates alternatingly perpendicular to the flow of the contaminated feed water. Drums 5405 and 5407 are carried on driven shafts 5413 and 5415, and compacted sludge draw-off at the bottom of tank cones 5417 and 5419 is conducted by screw conveyor/progressive cavity pump systems 5421 and 5423. Removal of immobilized microorganisms to control activated sludge thickness of the conveyor belt occurs at mechanism 5425, and initial seeding or reseeding of microorganisms on belt material 5601/5603/5605 is via insert 5427

Figure 56A:
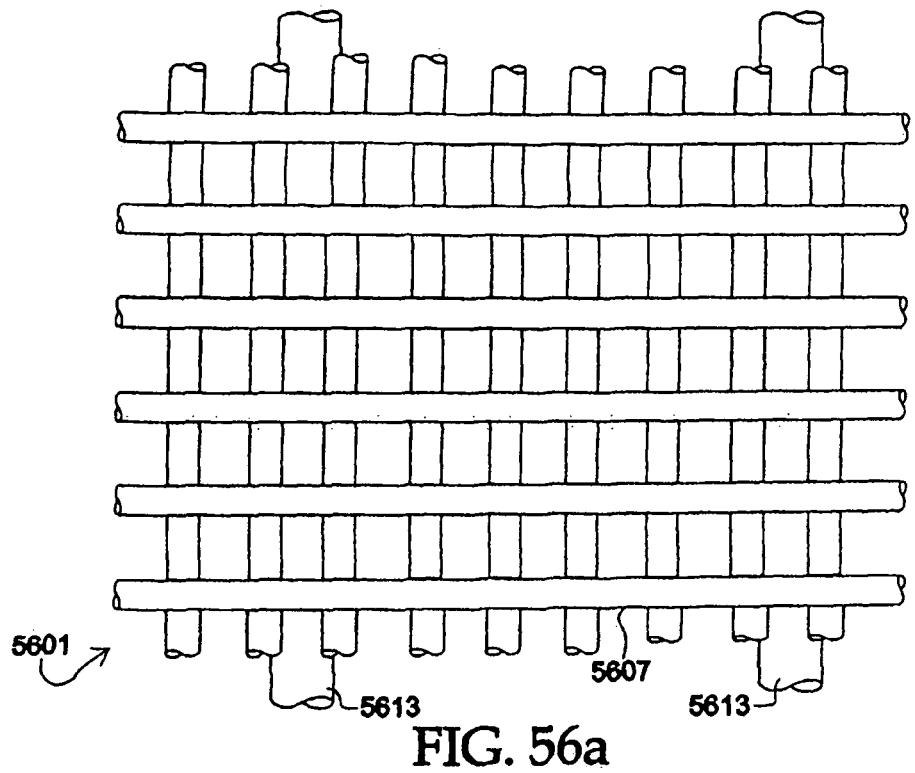
FIGS. 56a through 56c are illustrations showing various embodiments of conveyor contactor fabrics utilizable with the assembly of FIG. 54.
Figure 56B:
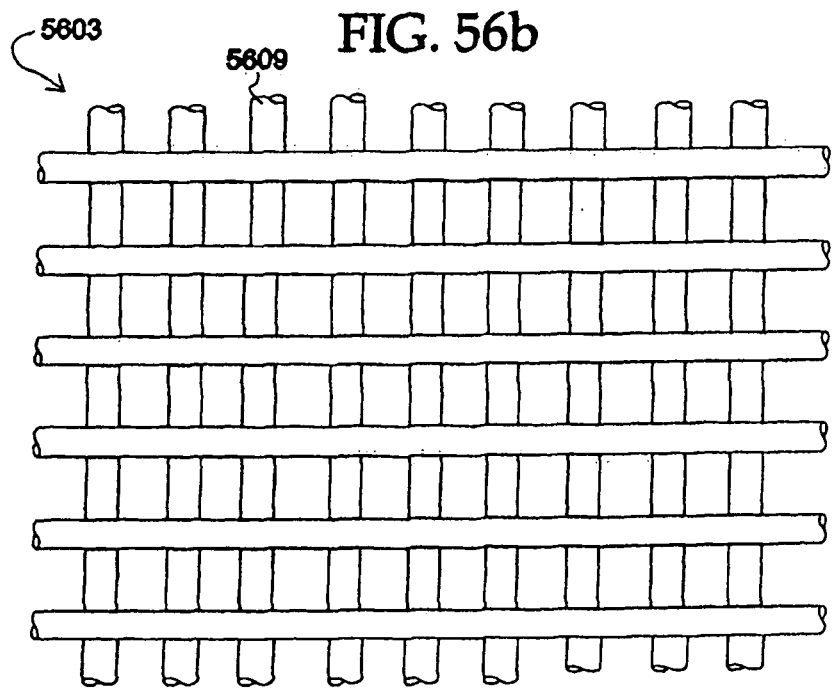
Figure 56C:
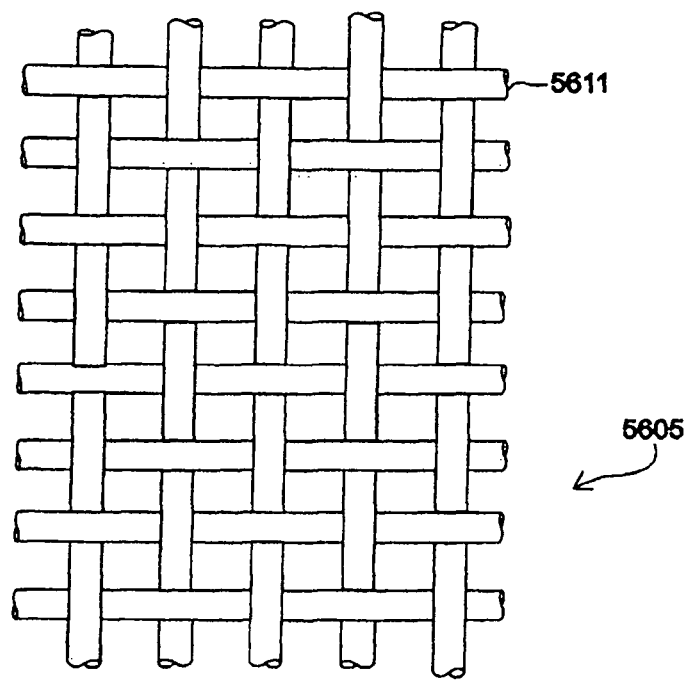

The inclined, unsupported free span of conveyor belt material between the two drums provides a place for continually sloughing off the excess biomass from the bio-sludge carrying conveyor belt material. This arrangement provides about a 40% larger active contact surface area over prior art devices, thus allowing a smaller footprint with equal or improved performance. Less energy is required by apparatus 5401 due to a lesser rotating mass. Manufacturing costs are, likewise, reduced. Because of the larger active surface area, shorter treatment contact and retention times are required. The apparatus is easy to maintain and clean Belt material 5601/5603/5605 is preferably treated with genetically altered aerobe microorganisms, and is normally made of a plastic fabric material 5607/5609/5611 (from VERSEIDAG, for example, see FIGS. 56a through 56c). Often the fabric material is supported by a welded on rod support structure 5613 as shown in FIG. 56a, while still providing gaps for proper aeration to occur. The biological growth that becomes attached to conveyor belt material 5601/5603/5605 assimilates the organic materials in the wastewater. Aeration is provided by the alternating rotation of conveyor coil 5404, which exposes about 60% of the total conveyor area to the air after wastewater contact.

The extent of wastewater treatment is related to the amount of conveyor belt surface area and the quality and volume of the influent wastewater. Conveyor speed is a function of the continuously changing coil(s) diameter. To maintain a constant conveyor 5403 speed, the rotational speed of both drums 5405 and 5407 is controlled. Automatic drum speed control may be provided, for example, by means of a digital speed regulator consisting of a pulse generator (a driver sprocket or the like) that produces pulses in proportion to motor 5409 speed. An oscillator is used as a reference. Pulse generator and oscillator counts are compared and a corresponding error signal is fed to an analog regulator. Since both drums alternatingly coil on or off and, therefore, rotate at different speeds, both drums are equipped with clutches (ratchet-type, overrunning clutches for example). The clutches alternatingly overrun while coiling off, thus allowing drums to turn at different speeds.

Motor 5409 is incorporated in an assembly including a closed coupled gear reduction unit, and is preferably a reduced voltage starting, solid state technology to protect the driven load from mechanical shock. The alternating reversal of motor 5409 is accomplished by a PLC controlled solid state relay or other means. Influent feed flow is received at inlet 5429 (also where ODE technology aerated water stream of previously clarified effluent is introduced in a closed loop mode to facilitate iron and manganese precipitation, CH4 gas liberation and further expediting the sedimentation process within apparatus 5401). Effluent is drawn off at outlet 5431 for further treatment.

Turning now to FIGS. 57 through 66 (preferred processing is disclosed), mobile station processing and control is preferably conducted using real time, nonvolatile data acquisition and processing software installed in station 101 of this invention. This system serves to provide full-size plant modeling and design tool. A growing on-site database is used in development of artificial intelligence algorithms for the purpose of specific technology selection at the station for the associated plant design. Processing and control herein utilizes a system for synthesis of synergistic permutation process tests based on a raw waste effluent (water) quality questionnaire having two parts: a laboratory analysis along selected parameters of the raw water found at the site that is to be treated; and parameters based on the desired treated water output quality (typically supplied by an end user—i.e., the treatment plant design client). Additionally the process as it proceeds is based on data acquisition on-site at the station's installed instrumentation.

These process tests for identifying optimum plant design are based mostly on a binary decision making process for all applicable treatment options. The following discussion gives an indication of the formidable number of available permutations (treatment combinations). In order to calculate the number of different combinations for each of the five stages of the process (the two pretreatment stages 411 and 413, the polishing stages subdivided into rough (stages 419 through 427) and refined (stage 429) treatments, and the post-treatment stage 435), the number of choices for each available treatment process within each stage must be considered. The number of different combinations for each stage is the product of the number of available treatment options for each process within that stage.

There are six different processes in the pretreatment rough stage (stage 411; ODE membrane aeration, fluid density reduction, modified vacuum tower degassing, air stone degassing, modified venturi gas evacuation, and fine filtration). These processes may not have any variations available, and for each process thus only the option to either use it or not. In other words we have two options for each of the six processes, making the number of different combinations for the pretreatment-rough stage (the product of the number of options for each process) 2*2*2*2*2*2=64.

Similarly, there are 9 different processes in the pretreatment-refined stage (stage 413; pH adjustment, chemical dosing, ODE mode membrane aeration, IDI mode ionized air/gas treatment, electrocoagulation, dissolved air/gas flotation, vacuum introduced cyclone separation, vacuum degassing and lamella clarifier). These processes may not have any variations. So again only the options of treatment use or treatment rejection for each process are presented, and the number of different combinations is 2*2*2*2*2*2*2*2*2=512.

For the polishing-rough stages, there are three different filtering processes available (microfiltration, ultrafiltration and nanofiltration), with each of the three having six different processing types available: standard cross flow, high speed cross flow, vibratory membrane separation, spirally-wound membrane elements, ceramic membrane elements, and rejection of filter usage. Thus, the number of different combinations for the polishing-rough stage filtering (which is the product of the number of options for each process in this stage) is 6*6*6=216.

There are three different processes available in the polishing-refined stage (distillation, ion-exchange and reverse osmosis (RO) processes). Distillation processing may not have any variations available and thus only the options of either using it or not. For ion-exchange processing, three different variations are available (cationic, anionic and rejection of ion-exchange process). For RO processing, seven different treatment variations are available (standard cross flow, high speed cross flow, vibratory membrane separation, spirally wound membrane elements, ceramic membrane elements, forward osmosis, and rejection of RO process usage). Therefore, the number of different combinations for the polishing-refined stage (the product of the number of options for each process in this stage) is 2*3*7=42.

In the post-treatment stage there are five different processes. Four of these processes (activated carbon gas adsorption, sodium adsorption ratio compensation, microbial decontamination using UV, and membrane air saturation) may not have any variations available and thus only the options of use or rejection of use. In the fifth, another ion-exchange processing stage, there are three different variations available (cationic, anionic, and use rejection). Therefore the number of different combinations for the post-treatment stage is 2*2*2*2*3=48.

The test conditions provided at the mobile station of this invention are made ideal for design and upscaling by deploying the disclosed downscaled treatment components mimicking full-scale components found only in full-sized plants. No laboratory/bench scale or substitute components are used in mobile station 101 for pilot testing of processing choices and upscaling, thus providing real world, risk-free, scalable treatment parameters and factors.

All treatment stage components in mobile station 101 have selectable, variable and redundant treatment choices, which are normally not found elsewhere. Thus up to 64*512=32,768 treatment combination possibilities in the pretreatment stages, up to 216*42=9072 possibilities in polishing treatment stages, and up to 48 possibilities in the post-treatment stage are provided. Connection of treatment categories can be altered in mobile station 101 since the different treatment categories and their respective components are not permanently fixed as in a traditional pilot study fashion, but can instead be selected individually or connected in parallel, in series, or in combination. In this way, when utilized as a design and upscaling tool, the employment of downscaled actual processing equipment has significant advantages over laboratory/bench scale or conventional pilot unit equipment by establishing real world, risk-free, real process technical parameters and conversion factors. Without these actual real parameters and factors, it would not be possible to realize an optimized water treatment/plant design for an industrial scale plant.

This process also provides for sensible selection of a plurality of technological steps into an optimized process chain, employing readily scalable real processing equipment. The downscaled equipment not only provides process technical parameters and conversion factors, but also minimizes many other technical and design problems, such as mechanical tolerances, insufficient material treatment, material fatigue, excessive material corrosion, unacceptable abrasion wear, unacceptable fouling, scaling and the like, insufficient energy transfer due to design limitations, hydromechanical and hydrodynamic limitations, ineffective CIP, and many more. Mobile station 101 under process control as taught herein is thus basically capable of providing scaled down versions of a many different full-scale plants. This minimizes the potential design and upscaling risks associated with laboratory, bench scale or traditional pilot unit equipment.

To strike a sensible balance between onsite logistics, power requirements and readily scalable downscaled plant components, mobile station 101 has a variable throughput rate of 30-100 BPD for scalable, linear processing steps and up to 200 BPD for processing steps with scalable, nonlinear reaction kinetics. The station unitizes components in modular configuration, the individual modules being relatively small in size. Hence, only a small upscaling factor is required for low risk, upscaling processes. This modular unit concept has several advantages. The modular units are employed in plurality, connected in parallel, in series or in combination of series and parallel. The parallel connection increases the throughput rate. The modular unit concept complements the changing plant throughput requirements as the water production inclines and declines over time during the development of the production play.

The series connection of modular units increases the pressure gradient. Thus the discharge pressure of a former unit is utilized as feed pressure for a later unit. As a result, the later unit has to produce only the differential pressure required to make up the full operating pressure for its proper functioning. The selected treatment train is operated in a continuous processing mode (no batching), for real time pilot testing and data acquisition for optimal plant design and upscaling process. The combination of this downsizing approach with the associated throughput rate in conjunction with the modular unit concept results in a significantly lower upscaling factor at a lower risk compared to laboratory/bench scale equipment for scale up. If compared to traditional pilot test, this processing approach results in an almost risk-free, optimized treatment design upscaling process. A mobile station 101 throughput rate of 100 BPD can easily and safely be upscaled to a 1,000 BPD production module.

Figure 58:
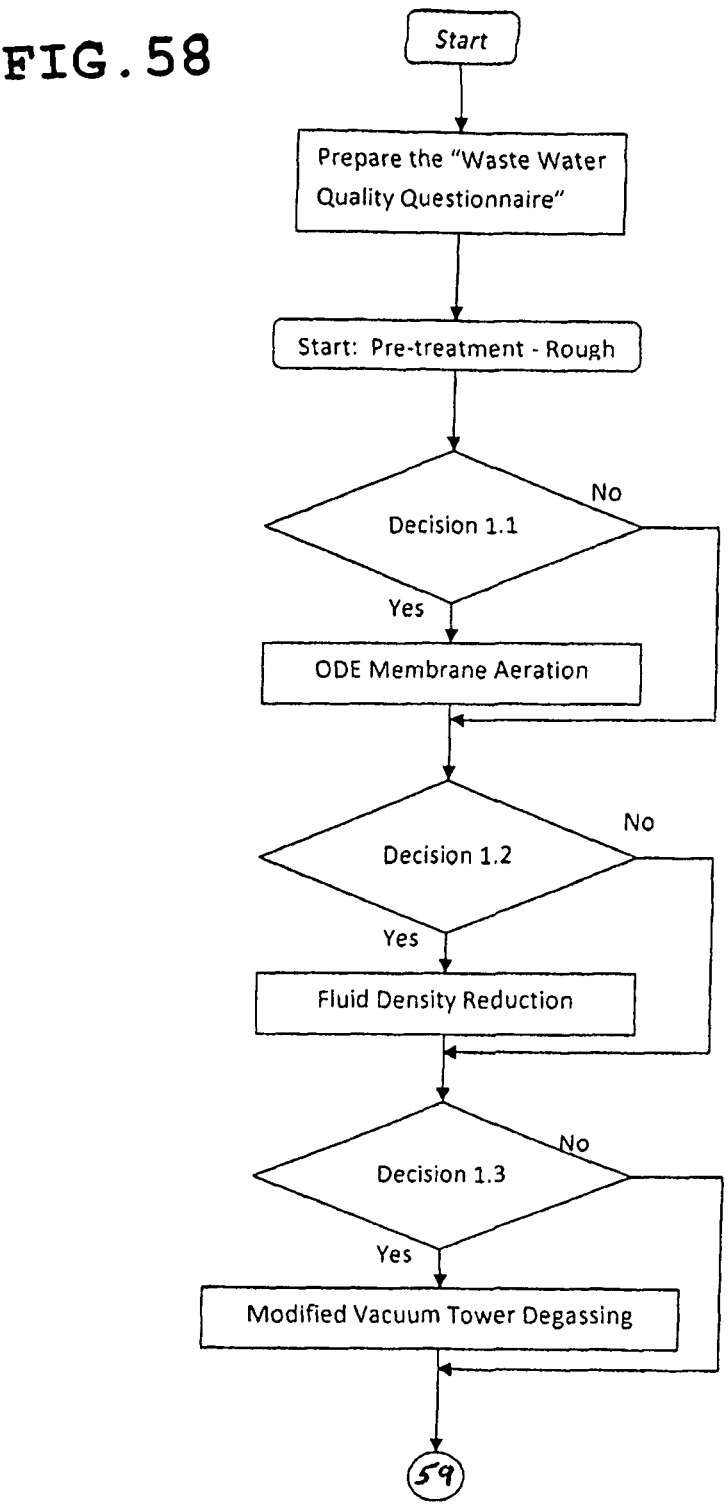
FIGS. 58 through 66 are flow diagrams illustrating mobile station operational control steps of this invention for arriving at a full-scale (or full size) treatment facility design at the specific raw water location.

Turning now to FIGS. 58 through 66, the preferred model processing and control system and methods of this invention as embodied in on-board processor(s) will be described in detail. As shown in FIG. 58, water samples are pulled, then the samples are prepared and preserves for laboratory analysis. When the lab returns the finished analysis, the results are used together with the identified full-scale plant treatment, efficiency and cost goals as well as other treatment related specifications (such as flow volume for example) to complete a waste water quality questionnaire by inserting entry values in the questionnaire fields.

The waste water questionnaire includes fields for both raw on-site water quality parameters (laboratory testing) and for desired water quality at the end of the processing (the water quality outcome desired from the full-scale plant to be built on the site), both fields having the same water quality condition entries. These condition entries include a plurality of water quality categories preferably including flow volume in m3/h, pH, temperature in °C., calcium in mg/l, magnesium in mg/l, sodium in mg/l, potassium in mg/l, iron in mg/l, total Iron in mg/l, total hardness in mg/l CaC03, barium in mg/l, chloride in mg/l, fluoride in mg/l, sulfate in mg/l, nitrate in mg/l, phosphate in mg/l, pH in standard units, bicarbonate (as CaC03) in mg/l, carbonate (as CaC03) in mg/l, total alkalinity (as CaC03) in mg/l, conductivity in uS/cm, ammonia in mg/l, total dissolved solids in mg/l, solid residue DM from evaporation (gum) in mg/l, sedimentated matter in mg/l (>1 μm after 2 hours sedimentation time after 10 μm prefiltration), turbidity (x dilution) in NTU, silt density index15*(x dilution) in %/min. (Silt Density Index $SDI_{15}=(t_2-t_1)/(15\ min\times t_2)$ [%/min}, also called Fouling Index (FI), Colloidal Index (CI), Plugging Index (PI); utilizing a micronic filter with a diameter of 50 mm having a nominal rating of 0.45 microns and a pressure differential of 30 psi., and where $t_1$ is the time in seconds required for an initial 500 milliliters of solution to pass through the membrane filter and $t_2$—after an interim period of 15 minutes and under a constant pressure of 30 psi—is the time required for an addition 500 milliliters of solution to pass through the membrane filter), sieve analysis for particle distribution in mg/l, total suspended solids in mg/l, suspended matter content>1 um in mg/l, strontium in mg/l, copper in mg/l, manganese in mg/l, silica in mg/l, arsenic in mg/l, cadmium in mg/l, chromium in mg/l, lead in mg/l, mercury in mg/l, nickel in mg/l, biological oxygen demand, chemical oxygen demand, dissolved oxygen in mg/l, total organic carbon in mg/l, hydrogen sulfide in mg/l, dissolved $CO_2$ in mg/l, aluminum in mg/l, radionuclides—Total, gross alpha, gross alpha precision (±), gross alpha MDC, gross beta, gross beta precision (±), gross beta MDC, coliform bacteria/Method IDEXX, total MPN, E. Eoli MPN, plate Count/Method: Simplate HPC, BTEX/Method 8260, benzene in mg/l, toluene in mg/l, ethylbenzene in mg/l, m,p-xylenes in mg/l, o-xylenes in mg/l, naphthalene in mg/lm, oil and grease in mg/l, diesel range organics in mg/l, and gasoline range organics in mg/l.

Regarding the following disclosure related to FIGS. 58 through 66, it should be noted that all the decision points are presented as binary decisions (i.e., with only two variations which are process selected for use or use rejected). However, as disclosed hereinabove, some these processes have more than two processing variations and so their respected decision point cover more than just the two variations. These decision points are Decision 3.1 (6 variations), Decision 3.2 (6 variations), Decision 3.3 (6 variations), Decision 4.1 (7 variations), Decision 4.2 (3 variations), and Decision 5.2 (3 variations). For the sake of simplicity of the following disclosure, the extra different variations of the processes are omitted from the flowcharts, and their respected decision points are simplified to binary decisions, it being understood that the variations are, however, included in the processing decision together with control decisions regarding use parameters (series, parallel, or combined processing, processing order, or the like) for the down-scaled treatment technologies selected at each decision point.

At decision 1.1 of FIG. 58, with regard to ODE membrane aeration processing (411, FIG. 7), the on-site raw water quality is evaluated for the presence of water contaminants, which are oxidizable with dissolved air (oxygen, ozone or other plasma gases). This evaluation looks to the entered raw water condition entries for iron (Fe) greater than 0.2 mg/l, or Manganese (Mn) greater than 0.1 mg/l, or ammonium-ion ($NH_4$) greater than 0.5 mg/l, and pH less than 7, or ammonia ($NH_3$) greater than 0.5 mg/l and pH greater than 7, or nitrate-ion ($NO_3$) greater than 50 mg/l, oxygen ($O_2$) less than 8 mg/l.

From this evaluation a decision whether or not to use this technology and if so the use parameters thereof (extent and position in the treatment order, for example) are determined and applied. This latter operation is true of each decision hereinafter addressed in the processing controls described in FIGS. 58 through 66 (where it would be applicable because technology application is involved in the decision evaluation), and will not be repeated at every evaluation discussion hereinafter.

At decision 1.2, with regard to fluid density reduction processing at unit 701, raw water is evaluated for fluid density reduction, to reduce the fluid carrying capacity for lighter solids and oil and grease, to economically expedite the separation process. Such is indicated if sieve particle is less than 0.1 μm, or distribution is greater than 0.1 mg/l, or oil and grease is greater than 0.01 mg/l.

Decision 1.3 involves modified vacuum tower degassing processing at unit 703. Raw water is evaluated for existence entrained and free gases (volatile, semi-volatile and other organics) and whether they can be economically separated by employing the technology. The condition entries used for decision making here are hydrogen sulphide ($H_2S$) greater than 0.015 mg/l and pH less than 7 and temperature greater than 20° C., or methane ($CH_4$) greater than 0.01 mg/l, or benzene, toluene, ethylbenzene, or xylenes (BTEX) greater than 0.001 mg/l AND temperature is greater than 15° C., or naphtalene greater than 0.001 mg/l and Temperature greater than 15° C., or diesel range organics greater than 0.005 mg/l and temperature is greater than 15° C., or gasoline range organics greater than 0.005 mg/l, and temperature greater than 15° C.

Figure 59:
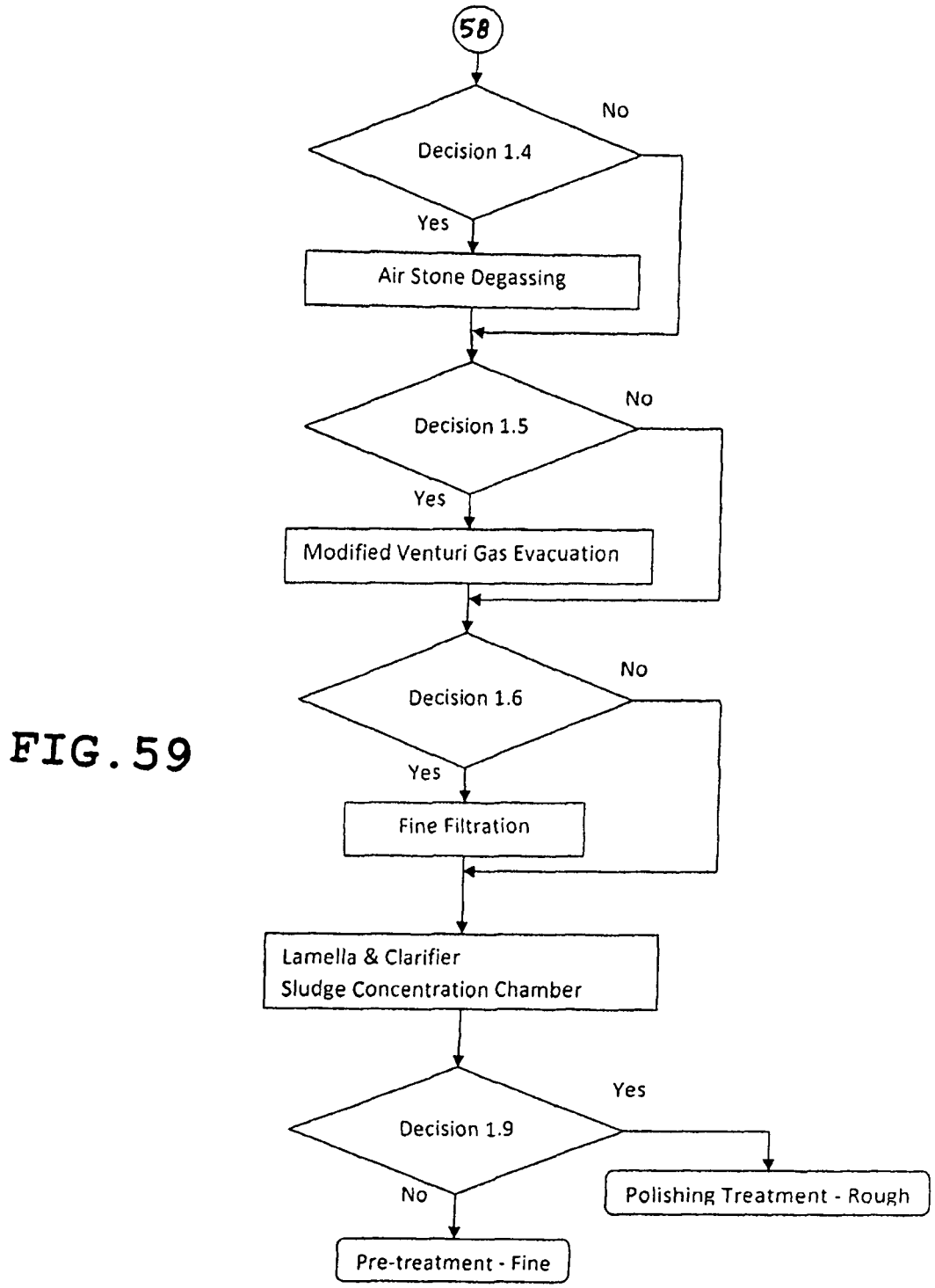

At FIG. 59, decision 1.4 involving air stone degassing processing at unit 704, raw water is evaluated for presence entrained and free gases (volatile, semi-volatile and other organics) and if this technology can be more economically employed. Condition entries which may indicate use are hydrogen sulphide ($H_2S$) greater than 0.015 mg/l and pH less than 7 and temperature greater than 20° C., or methane ($CH_4$) greater than 0.01 mg/l, or benzene, toluene, ethylbenzene, or xylenes (BTEX) greater than 0.001 mg/l and temperature greater than 15° C., or naphtalene greater than 0.001 mg/l and temperature greater than 15° C., or diesel range organics greater than 0.005 mg/l and temperature greater than 15° C., or gasoline range organics greater than 0.005 mg/l and temperature greater than 15° C.

Decision 1.5, with regard to the modified venturi gas processing at unit 703, affects evaluation of whether free gases from processing at units 703 and/or 704 can be effectively removed through a vacuum enhanced process. This will be so if hydrogen sulphide ($H_2S$) is greater than 0.015 mg/l and pH is less than 7 and temperature is greater than 20° C., or methane ($CH_4$) is greater than 0.01 mg/l, or benzene, toluene, ethylbenzene or xylenes (BTEX) are greater than 0.001 mg/l and temperature is greater than 15° C., or naphtalene is greater than 0.001 mg/l and temperature is greater than 15° C., or diesel range organics are greater than 0.005 mg/l and temperature is greater than 15° C., or gasoline range organics are greater than 0.005 mg/l and temperature is greater than 15° C.

At decision 1.6 involving whether or not processing by using fine filtration at unit 706 is desired, raw water is evaluate for quantity of suspended matter sufficient for effective filtration (particles is less than 1 μm). This is so if silica ($SiO_2$) is greater than 10 mg/l and pH is greater than 7, or if calcium carbonate ($CaCO_3$) is greater than 200 mg/l) and pH is greater than 7, or if calcium sulphate ($CaSO_4$) is greater than 50 mg/l and temperature is greater than 15° C. If not lamella clarifier and sludge concentration chamber processing is entered (at unit 707 of FIG. 7).

Figure 60:
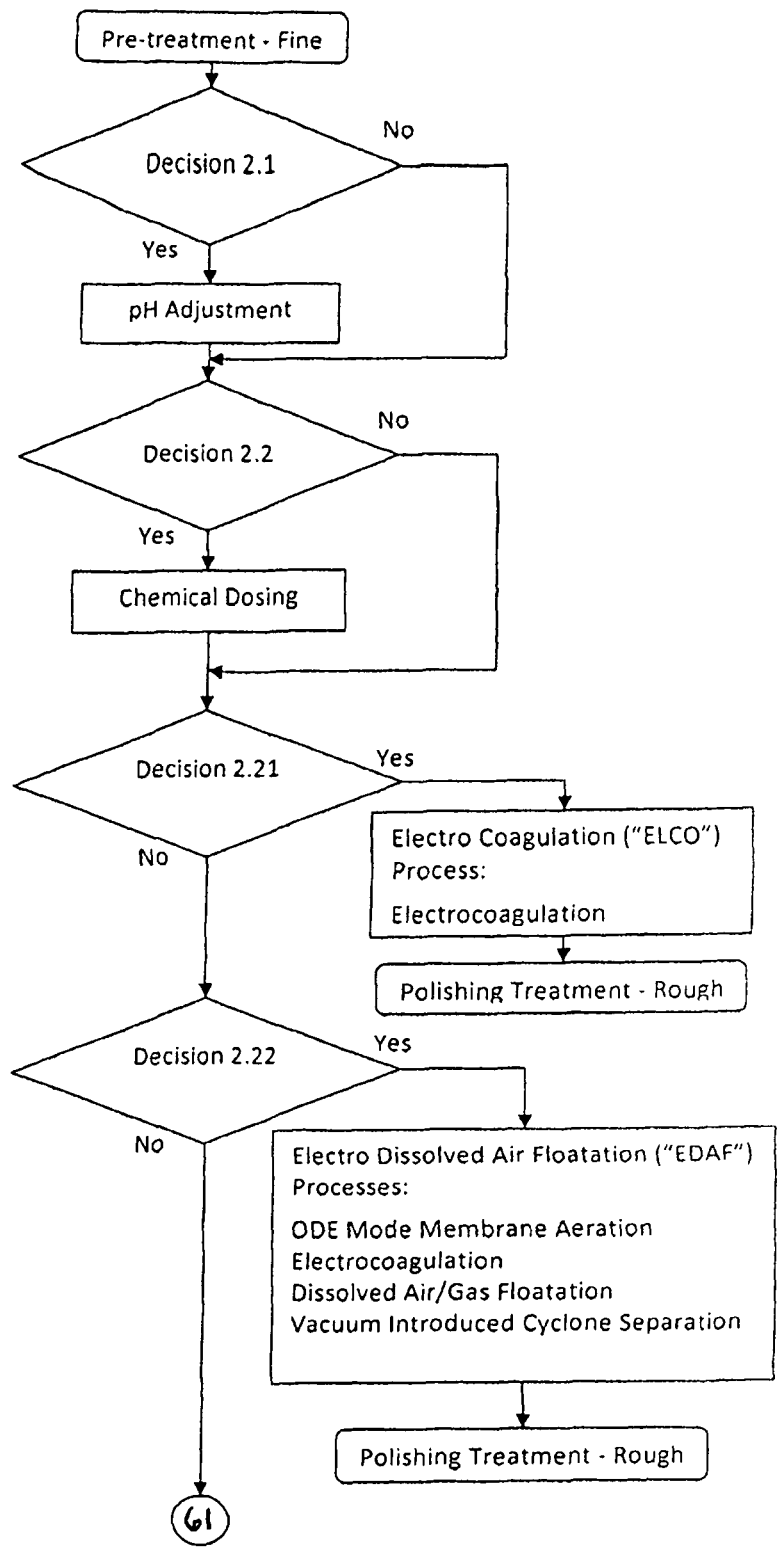

Decision 1.9 evaluate if the water quality is acceptable and fine pretreatment processing (FIG. 8 at array 413) is not required whereupon polishing treatment stage at units 205 of FIG. 2 is employed. If processing is required, the fine pretreatment array processing is entered (FIG. 60). This is so if silica ($SiO_2$) is less than 10 mg/l and pH is less than 7. And calcium carbonate ($CaCO_3$) is less than 200 mg/l and pH is less than 7, and calcium sulphate ($CaSO_4$) is less than 50 mg/l and temperature is less than 35° C., and hydrogen sulphide ($H_2S$) is less than 0.015 mg/l, and ammonium-ion ($NH_4$) is less than 0.5 mg/l.

In fine pretreatment processing, at decision 2.1 regarding pH adjustment processing raw effluent entries are evaluated to determine if pH adjustment is important. This is indicated where pH is greater than 7, or silica ($SiO_2$) is greater than 10 mg/l or calcium carbonate ($CaCO_3$) is greater than 200 mg/l, or hydrogen sulphide ($H_2S$) is greater than 0.015 mg/l, or ammonium-ion ($NH_4$) is greater than 0.5 mg/l. Decision 2.2, chemical dosing evaluation in undertaken to determine if the dosing of the chemicals processing at unit 802 will be helpful for precipitation and flocculation processes. This is indicted where silt density index (SDI) is greater than 4 and particle size is between 1 μM and 10 μm, or concentration of heavy metals (Cr, Pb, As, Ni) is greater than 0.05 mg/l.

Decision 2.21, regarding electrocoagulation processing, undertakes evaluation of whether electrocoagulation processing at unit 805 will be enough to conclude the fine pretreatment stage. This will normally be so if total organic carbon (TOC) is greater than 10 mg, or if sedimented matter concentration (SMC) is greater than 0.01 mg/l, or if oil and grease is greater than 0.01 mg/l, or if criterion 1.0 is not true. In such case processing may move to polishing treatment stage control (at 205 of FIG. 2).

Criterion 1.0, used here and elsewhere in the process control steps is defined as that state of the effluent being treated wherein aluminum is less than 0.05 mg/l, ammonium is less than 0.05 mg/l, arsenic is less than 0.01 mg/l, bacteria is less than 2000 (A2), barium is less than 1 mg/l, BOD is less than 5 mg/l, cadmium is less than 0.001 mg/l, Calcium is less than 400 mg/l, chromium is less than 0.05 mg/l, total coliform is less than 5000 col/100 ml, color removal is less than 5 NTU, copper is less than 10 WHO, cyanide is less than 0.05 mg/l, oils is less than 0.01 mg/l, Iron is less than 0.2 mg/l, lead is less than 0.05 mg/l, magnesium is less than 50 mg/l, manganese is less than 0.1 mg/l, mercury is less than 0.0005 mg/l, molybdenum is less than 0.05 mg/l), nickel is less than 0.05 mg/l, pesticides is less than 0.0025 mg/l, phosphates is less than 0.7 mg/l, silicon is less than 10 mg/l, TSS is less than 50 mg/l, silver is less than 0.01 mg/l, volatile solids (BTEX) is less than 0.001 mg/l, and zinc is less than 5 mg/l.

If electrocoagulation processing alone in determined inadequate to conclude the fine pretreatment stage, then decision 2.22 evaluates if electro dissolved air floatation processing at units 803, 805, 806 and/or 807 is enough to conclude the fine pretreatment stage. This will be so where iron (Fe) is greater than 0.2 mg/l, or manganese (Mn) is greater than 0.1 mg/l, or ammonium-ion ($NH_4$) is greater than 0.5 mg/l, or oxygen ($O_2$) is greater than 8 mg/l, or TOC is greater than 10 mg/l or suspended matter content (SMC) is greater than 0.01 mg/l, or oil and grease is greater than 0.01 mg/l, or hydrogen (H) is greater than 1 mg/l, or methane ($CH_4$) is greater than 0.5 mg/l, or hydrogen sulphide ($H_2S$) is greater than 0.015 mg/l, or $CO_2$ is greater than 0.1 mg/l, or ammonia ($NH_3$) is greater than 0.05 mg/l, or BTEX is greater than 0.0002 mg/l, or criterion 1.0 is not true. In such case processing may move to polishing treatment stage control (at 205 of FIG. 2).

Figure 61:
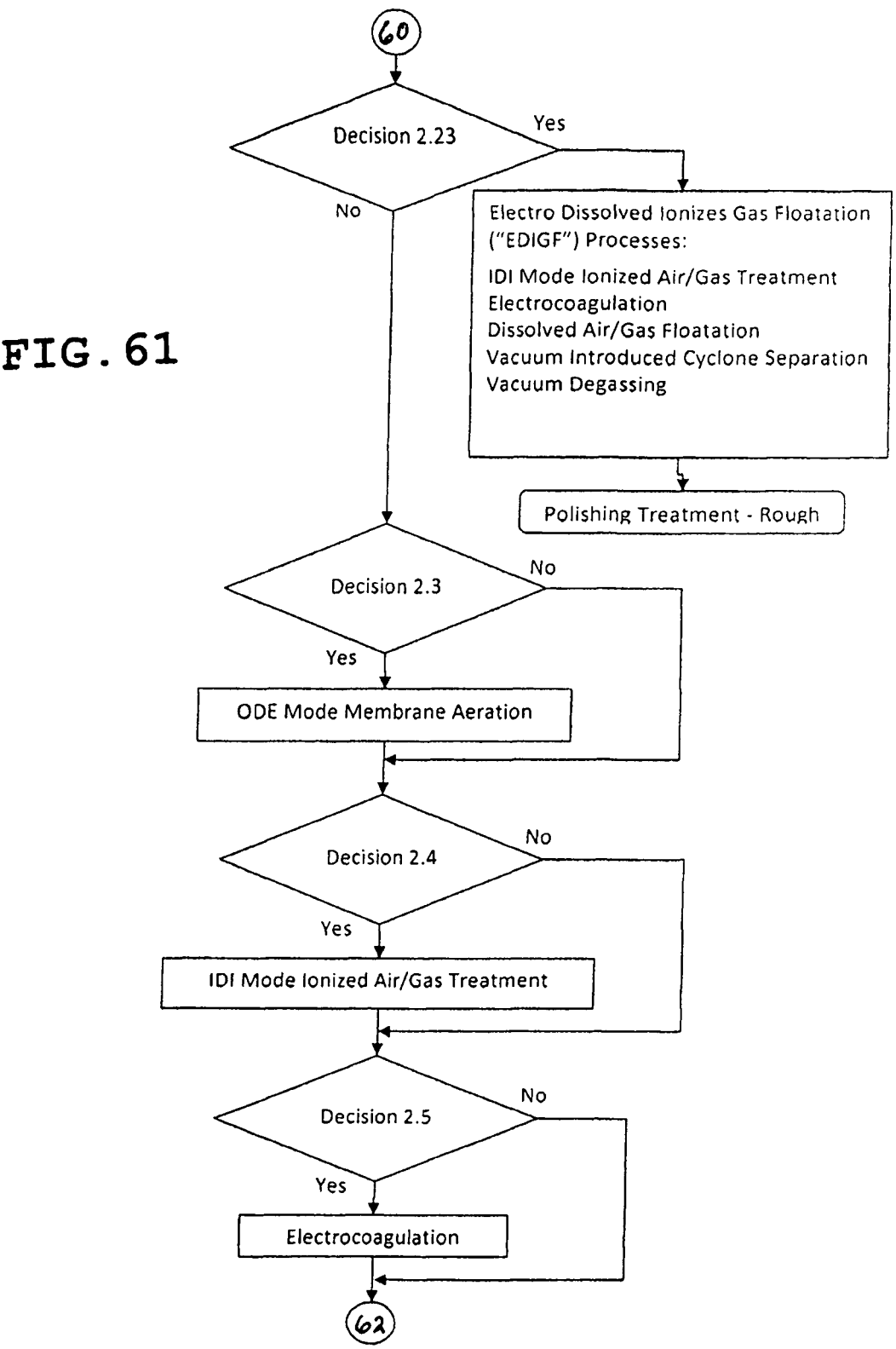

If not, decision 2.23 at FIG. 61 evaluates if electro dissolved ionizes gas floatation processes at units 803, 805, 806, 807 and/or 808 are enough to conclude the fine pretreatment stage and allow progression to polishing treatment stage control (at 205 of FIG. 2). This may occur if iron (Fe) is greater than 0.2 mg/l, or manganese (Mn) is greater than 0.1 mg/l, or ammonium-ion ($NH_4$) is greater than 0.5 mg/l, or oxygen ($O_2$) is greater than 8 mg/l, or biological oxygen demand (BOD) is greater than 5 mg/l, or chemical oxygen demand (COD) is greater than 10 mg/l, or TOC is greater than 10 mg/l, or SMC is greater than 0.01 mg/l, or oil and grease is greater than 0.01 mg/l), or hydrogen (H) is greater than 1 mg/l), or methane ($CH_4$) is greater than 0.5 mg/l, or hydrogen sulphide ($H_2S$) is greater than 0.015 mg/l, or $CO_2$ is greater than 0.1 mg/l, or ammonia ($NH_3$) is greater than 0.05 mg/l, or BTEX is greater than 0.0002 mg/l, or criterion 1.0 is not true.

If not, decision 2.3, regarding ODE mode membrane aeration (either without electrocoagulation at unit 803 or with electrocoagulation and unit 805), enters into evaluation of whether the oxidation was not affective enough at the first pretreatment stage. This is so (and further processing at ODE membrane aeration is indicated) where iron (Fe) is greater than 0.2 mg/l, or manganese (Mn) is greater than 0.1 mg/l, or ammonium-ion ($NH_4$) and ammonia ($NH_3$) is greater than 0.5 mg/l, or oxygen ($O_2$) is less than 8 mg/l.

Decision 2.4 evaluated if ODE treatment has not been sufficiently effective treated the water effectively and if the water has more than limited content at the BOD/COD, in which case IDI mode ionized air/gas treatment processing at unit 803 (with ionized gas but no electrocoagulation) may be indicated. Such would be the case where iron (Fe) is greater than 0.2 mg/l, or manganese (Mn) is greater than 0.1 mg/l, or ammonium-ion ($NH_4$) and ammonia ($NH_3$) is greater than 0.5 mg/l, or oxygen ($O_2$) is greater than 8 mg/l, or BOD is greater than 5 mg/l, or COD is greater than 8 mg/l.)

Decision 2.5 evaluates whether the load of TOC, SMC, and oil and grease are more than an established content limit indicating further processing at electrocoagulation processing unit 805. This is indicated where TOC is greater than 10 mg/l, or SMC is greater than 0.01 mg/l, or oil and grease is greater than 0.01 mg/l.

Figure 62:
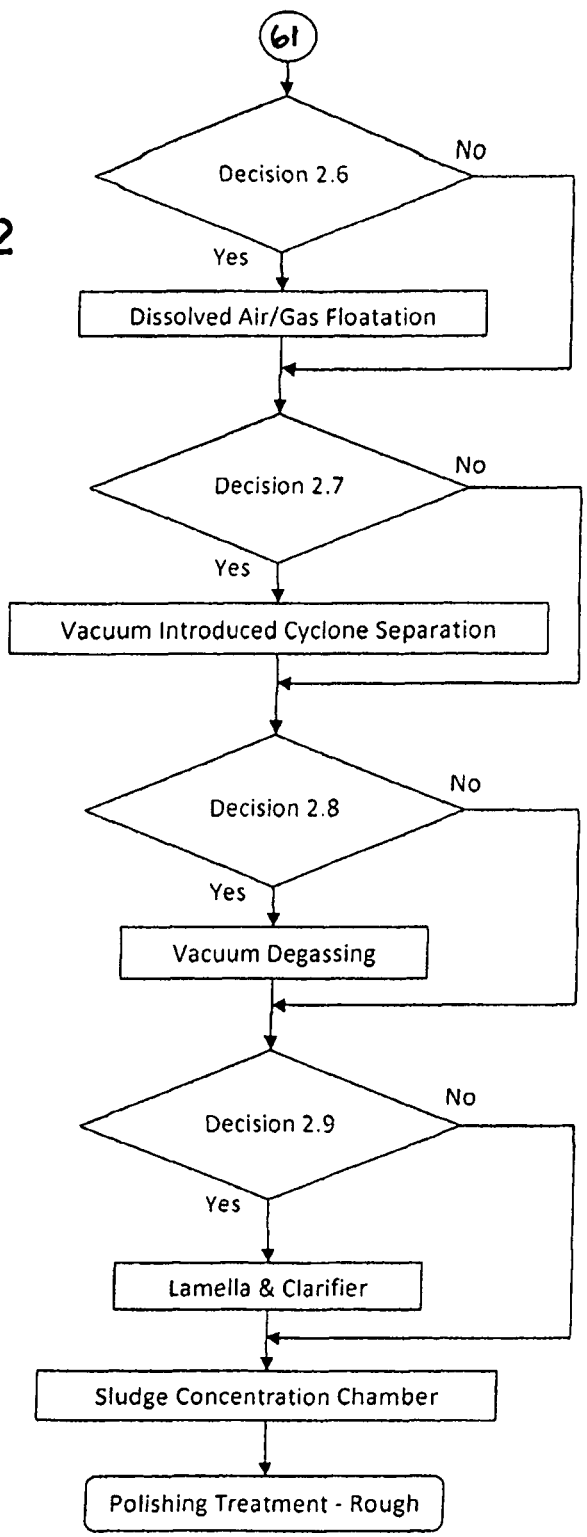
Figure 63:
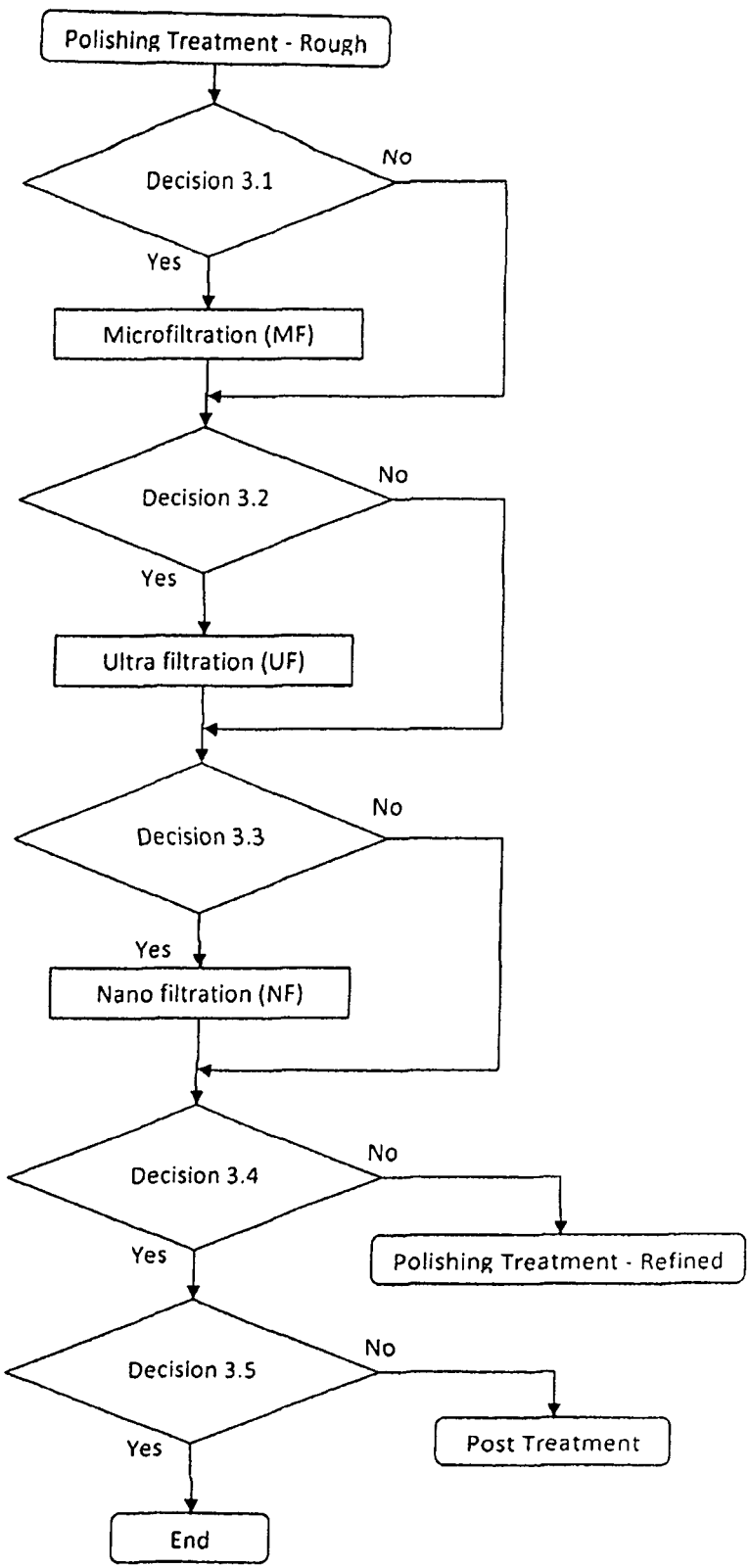

At FIG. 62, decision 2.6 undertakes whether dissolved air/gas floatation at unit 806 will be beneficial for separation of suspended solids and whether coagulated particles are greater than 1 μm. Further processing is indicated where suspended material and coagulated matter (SMC) is greater than 0.01 mg/l, Decision 2.7 evaluates if concentration of gas and vapors of hydrogen (H), methane ($CH_4$), hydrogen sulphide ($H_2S$), CO2, ammonia ($NH_3$) and BTEX are above allowable limits indicating further processing at vacuum introduced cyclone separation processing units 807. Such is indicated when hydrogen (H) is greater than 1 mg/l, or methane ($CH_4$) is greater than 0.5 mg/l, or hydrogen sulphide ($H_2S$) is greater than 0.015 mg/l, or $CO_2$ is greater than 0.1 mg/l, or ammonia ($NH_3$) is greater than 0.05 mg/l, or benzene, toluene, ethylbenzene, or xylenes (BTEX) is greater than 0.0002 mg/l.

Evaluation of whether residual amounts of gases and BTEX exceed allowable concentration indication further processing at vacuum degassing units (808) is undertaken at decision 2.8. This is so if hydrogen (H) is greater than 1 mg/l, or methane ($CH_4$) is greater than 0.5 mg/l, or hydrogen sulphide ($H_2S$) is greater than 0.015 mg/l, or $CO_2$ is greater than 0.1 mg/l, or ammonia ($NH_3$) is greater than 0.05 mg/l or benzene, toluene, ethylbenzene, or xylenes (BTEX) is greater than 0.0002 mg/l. Decision 2.9, regarding lamella clarifier processing at units 809, undertakes evaluation of whether concentration of suspended material exceeding the particle size is less than 10 µm. Further processing if beneficial where silica ($SiO_2$) is greater than 10 mg/l and pH is greater than 7, or calcium carbonate ($CaCO_3$) is greater than 200 mg/l and pH is greater than 7, or calcium sulphate ($CaSO_4$) is greater than 50 mg/l and temperature is greater than 15° C. If not indicated, sludge chamber concentration and entry to the polishing treatment stage at units 205 (FIG. 2) proceeds.

The processing control evaluations for polishing treatment processing (rough, at FIG. 63) begin with decisions 3.1 through 3.3 having to do with filtration (microfiltration, ultrafiltration and nanofiltration processes at units 423). Microfiltration is indicated where suspended micro particles are present such as solids, bacteria, pigments, humic materials, coal fines and small flux and the particles are within the range of 10-0.02 µm. Ultrafiltration processes are indicated when oil and grease emulsions, macro molecules, seed crystal materials, bacteria & viruses, colloidal material, proteins, polysaccharides, humic material and coal fines are present that are in the size range of 150 to 10 kD. Nanofiltration processing is indicated where high molecular weight multi-ionic salt solutions (such as $Ca^{++}$, $Fe^{++}$) and mono- di- and polyvalent negative ions in the range from 180 Å to 50 Å need to be removed. This is only applicable where mill-type water quality is desired. Such is indicated where iron (Fe) is greater than 0.2 mg/l, or manganese (Mn) is greater than 0.1 mg/l, or calcium (Ca) is greater than 100 mg/l, or $CO_3$ is greater than 100 mg/l, or $SO_4$ is greater than 50 mg/l, or magnesium (Mg) is greater than 50 mg/l, or barium (Ba) is greater than 1 mg/l, or strontium (Sr) is greater than 0.2 mg/l.

Figure 64:
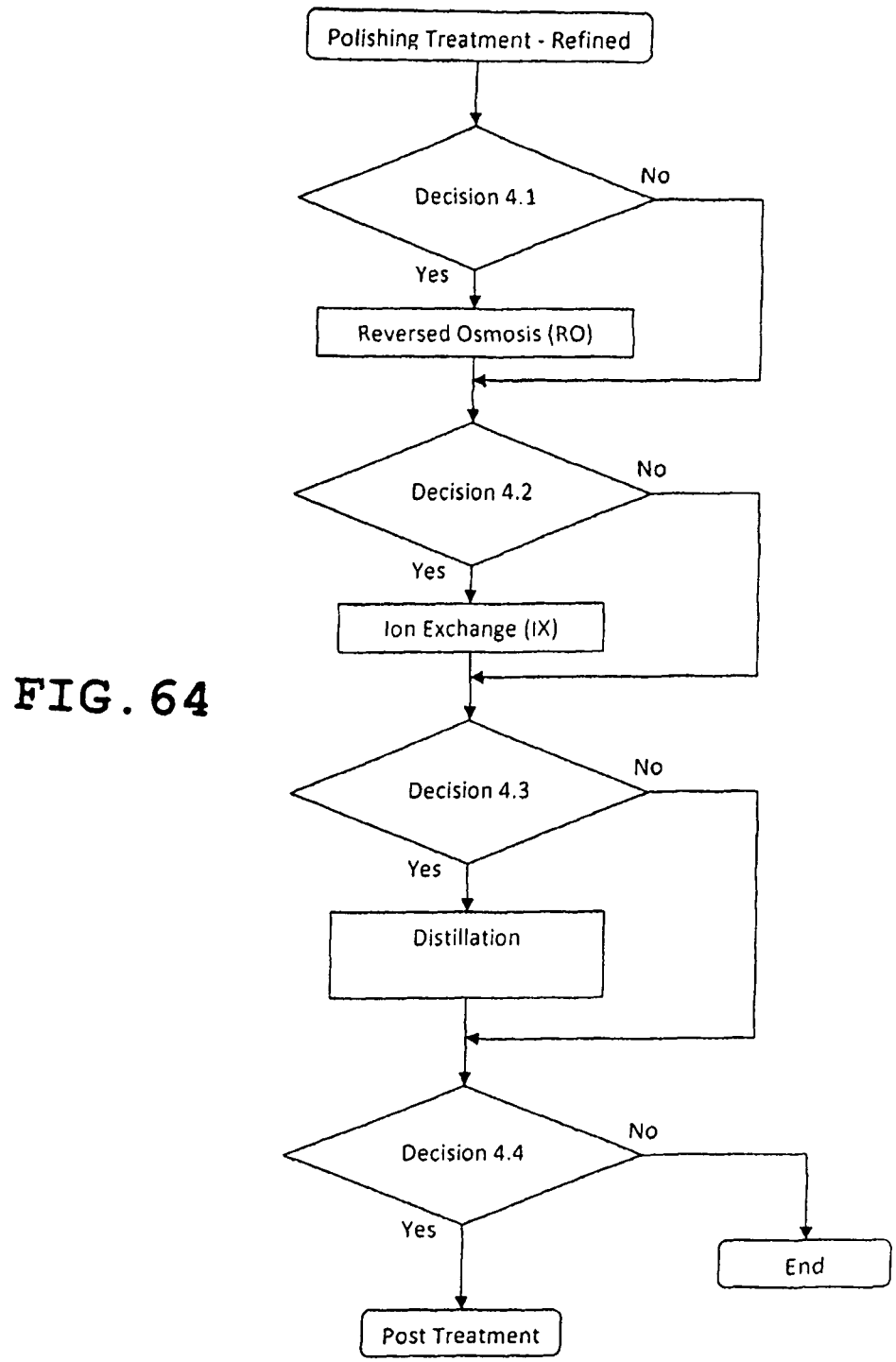

Decision 3.4 undertakes evaluation of whether the product water of the last polishing treatment (rough category) is suitable for beneficial use such of the treated water such as for frac fluid makeup water requirements or similar applications or whether further polishing treatment processing decisions (FIG. 9, units 429 through 433) should be undertaken as shown in FIG. 64. If not Decision 3.5 evaluates whether post-treatment stage processing (at 435, FIG. 10) is entered. This decision will depend on the use and the quality of the effluent desired for the full-scale plant.

If further polishing treatment is indicated, decision 4.1 evaluates if high molecular weight components and low molecular weight components are present that may benefit from reverse osmosis processing at unit 429. This will be the case where dissolved solids are in the size range of 180 Å to 10 Å. Decision 4.2, regarding ion-exchange processing at units 419, 423, 429 and 433 (FIG. 3), undertakes evaluation of whether ion exchange is the more economical refined polishing treatment for the removal of $Na^+$, $Ca^{++}$, $Mg^{++}$, $Ba^{++}$, $Sr^{++}$ and the like. This may be true where total dissolved solids (TDS) content is in the range of 2000 to 1000 mg/l. Distillation processing (an available alternative or supplemental refined polishing treatment technology) may be more economical for removal high total dissolved solid content and is evaluated in the particular design situation at decision 4.3. This might be indicated where high TDS content in the range of 30,000 to 15,000 mg/l is encountered.

Figure 65:
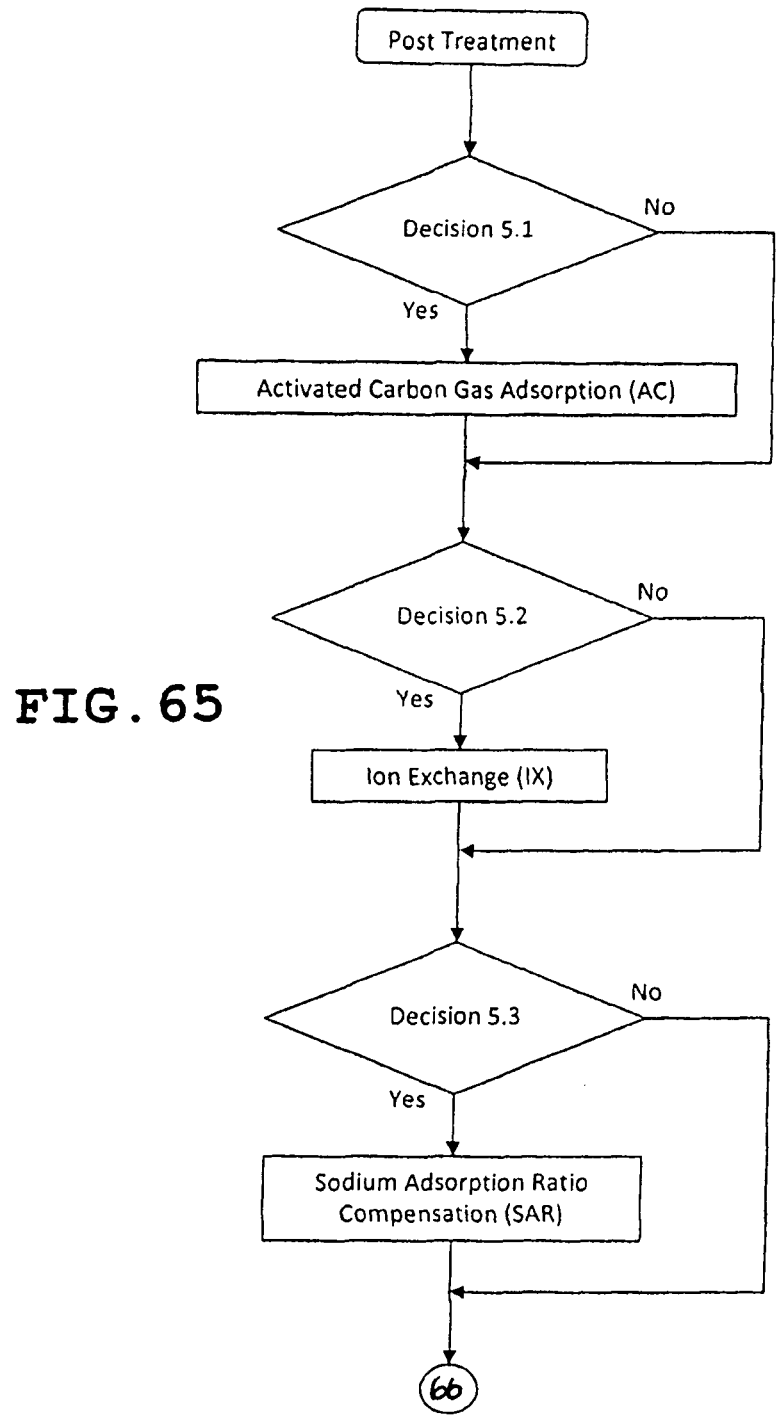
Figure 66:
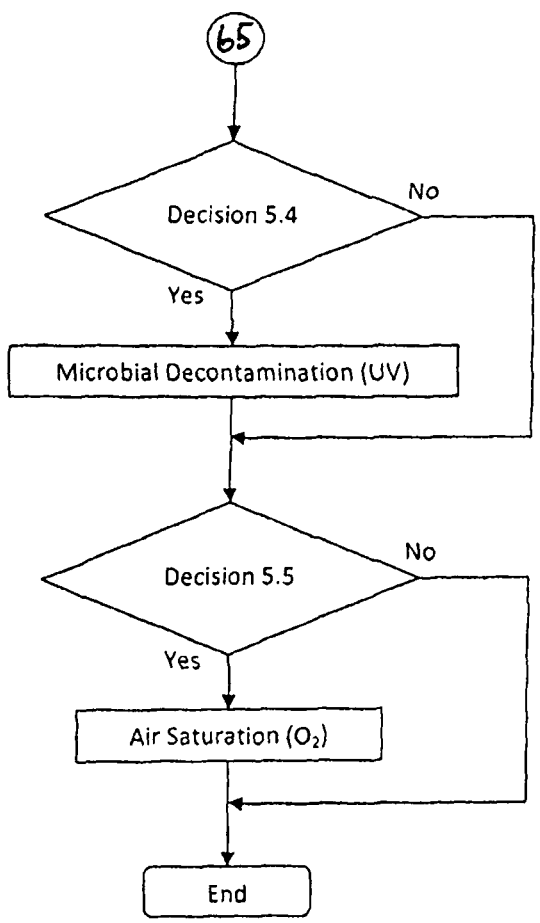

Decision 4.4 again evaluates whether post-treatment processing at units 435 of FIG. 2 is necessary in view of the end use and desired quality of the treated effluent. FIG. 65 illustrates the decision set for control of the post-treatment processing stage. Activated carbon gas adsorption processing at unit 1001 is indicated at decision 5.1 where undesirable trace amounts of residual gases are present which need to be removed. This will be indicated where any of the following concentration of gasses is present: hydrogen sulphide ($H_2S$) greater than 1 mg/l; $Cl_2$ greater than 1 mg/l; $O_3$ greater than 0.05 mg/l; methane ($CH_4$) is greater than 0.5 mg/l; BTEX greater than 0.0002 mg/l; or $CO_2$ greater than 0.1 mg/l.

Ion Exchange processing at unit 429 of FIG. 3 is evaluated for post-treatment stage processing (decision 5.2) if total demineralization of the effluent is required for its beneficial use (for example, for boiler or steam turbine feed water). This is indicated where total dissolved solids content is higher than 100 mg/l. Decision 5.3, regarding the sodium adsorption ratio compensation (SAR) processing at unit 1003, evaluates if SAR processing is required (for example, to be in compliance with the SAR ratio in the general NPDES permit for surface discharge, such as waste water disposal or augmentation or beneficial use for agriculture purposes). It will be recalled that:

$$SAR = \frac{Nae}{\sqrt{\frac{Cae + Mge}{2}}}$$

Further processing in this vein is in such cases indicated where the applicable SAR ratio is exceeded. Decision 5.4 evaluates whether beneficial use of the effluent will require microbial decontamination (UV) processing and controls at unit 1005. This is often the case where the beneficial use of the effluent is for make-up water for oil field operations, for example, and depends on whether the residual biological content exceeds the site specific makeup water requirement represented through high residual turbidity readings. The need for air Saturation ($O_2$) processing at unit 1007 is evaluated at decision 5.5 to determine whether needed to be in compliance (for example, with the general NPDES permit requirements for river discharge to sustain aquatic life form).

Figure 57:
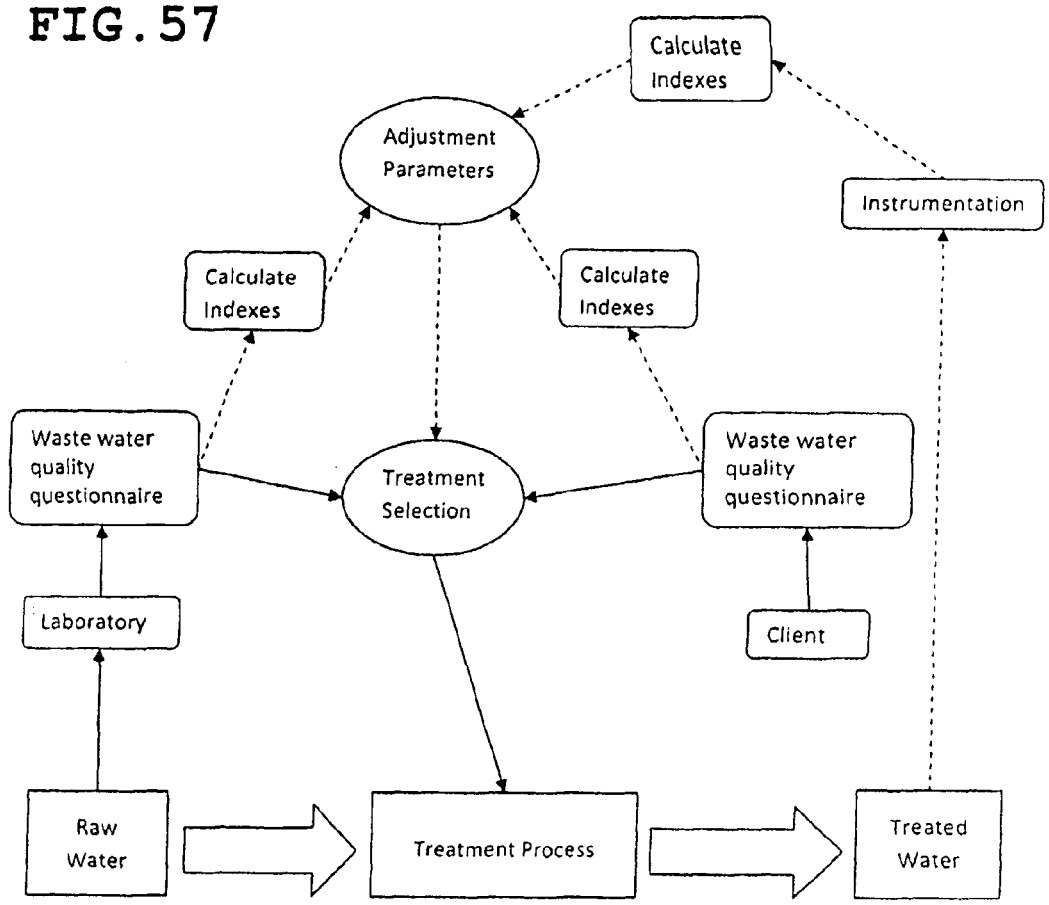
FIG. 57 is a flow diagram showing a preferred system and operational control methods of this invention for on-site modeling of full-scale effluent treatment facility requirements at a specific raw water location utilizing the mobile station of this invention.

As shown in FIG. 57, an instrumentation feedback loop process is responsible for modifying the initial treatment model for fluid effluent treatment/plant design such that the fluid is treatment model is refined to both provide better plant design/optimization and/or plant design options. The inputs of this reevaluation feedback loop are sets of indexes (dimensionless values) calculated using different parameters of the fluid to be treated at the site. All the information needed to calculate the indexes can be obtained from mobile station instrumentation and a subset of the waste water quality questionnaire (both raw water laboratory data and client treatment goals) data. The station instrumentation data provides a subset of the waste water quality questionnaire data parameters and so a subset of the questionnaire data is used for the indexes.

Three sets of indexes are used as inputs to the control process in the instrumentation feedback loop (indicated by the dotted lines). A first set is calculated using the data from the laboratory results portion of the questionnaire regarding the nature of the original raw water. A second set is calculated using questionnaire data from the client treatment goals data set. The third set is calculated using the measurements from the mobile station's onboard instrumentation. From these data, performance of the initial treatment/plant design model can be evaluated along a selected subset of water quality treatment parameters (determined by the input instrumentation), the model modified accordingly with the various equipment combinations, inclusions, operations and performance being modified in turn to responsive to the modified model. This process is dynamic and continuous and can be influenced further by changes to the second data set (thereby providing a client with optimized full-scale plant model options based on different treatment outcomes, efficiency goals and/or equipment/treatment cost considerations, for example).

The internal mechanism of this process is based on a decision making flowchart, similar to the process utilized for initial treatment model selection as discussed above. However, in this flowchart process the index values are incorporated into correlated decision making points so that each decision is influenced by the outcomes of ongoing water treatment processing at the station. Depending on the number of the sensors (instrumentation) utilized in the feedback loop process, more index data can be calculated and more decision points in the flowchart will be affected. With a low number of sensors, this flowchart will behave much like the flowchart process in the initial treatment model selection process. By employing a greater number of monitoring instruments/sensors, more index data will be generated, and in return more decision points in the flowchart will be affected. The water treatment model in such cases will be adjusted more dramatically as instrumentation inputs are increased.

At present, for real-time online measurements, ten different types of instruments/sensors in multiple stages are utilized in the mobile station to dynamically monitor and control the multi-choice processing of the 19 major treatment stages, or steps, in the four treatment categories (first and second pretreatment, polishing treatment—both rough and refined—and post-treatment) and their treatment effects/outcomes. The instrumental measurement values are used as a basis for the development of a probabilistic algorithm as a practical means of solving qualitative and quantitative treatment effect problems. This is accomplished through the development of qualitative and quantitative treatment indexes as discussed hereinbelow in the examples given for an early stage of algorithm development using the process controls of this invention.

Since the number of measured process characteristics is thus smaller than the number of all the different water characteristics listed in the waste water quality questionnaire, artificial intelligence methods may be effectively utilized to automate the control of the multi-choice processing steps in the treatment model to form a full-scale treatment facility model. As more instruments and processing data are made available, a more detail of artificial intelligence algorithm is developed.

For example, the ten different online instruments used at the mobile station are connected to a nonvolatile data acquisition system for data processing purposes. The ten instruments used measure (directly or indirectly, depending on the instrument) total organic carbon (TC in FIGS. 7 through 10), turbidity (T in FIGS. 7 through 9), conductivity (temperature compensated—C in FIGS. 7 through 9 at 913), solids density (D in FIGS. 7 through 9), and, in various ones of FIGS. 7 through 10, $CH_4$ concentration (CH), pH levels (pH), $O_2$ solubility (O2), fluid flow level (F), air flow level (A), and pressure (P).

Examples of development of qualitative and quantitative treatment indexes follow for an early stage of algorithm development using the process controls of this invention, followed by treatment train/model determination and exemplary unscaling. The required water treatment technology selected is based on specific water classifications, rheological characteristics, and the analytical water values provided with the waste water quality questionnaire. Dimensionless numerical values of the quality index ("QL") and the quantity index ("QN") to establish the efficiency value ("η") are utilized.

The mobile station and methods of this invention are optimized to treat many different fluid classes which may be encountered. An alphabetical system is used to identify the different classes and a numerical system is used for the specific subclassification index. By way of example only, Class $C_0$ may indicate a fluid that is loaded with colloids and salts, organic and inorganic colloidal solutions as well as fine disperse suspension while Class $D_0$ may indicate a fluid that is highly contaminated by organic and inorganic fluid suspensions and oil emulsions with grease, iron and gases.

Analytical values are established using the waste water quality questionnaire, and characterizing rheological characteristics, turbidity/colloids/slimes/gels, emulsions and suspensions. Measurability is standard, for example, with turbidity (T)=1-100 NTU, density $(\rho_{20C°})$=990-1010 kg/m³, pH=5-7, kinematic viscosity$(\nu_{20C°})$=1.0-1.1×10⁻⁶×m²×s⁻¹ and temperature (θ)=15-20 C.°

The quality index (QL) is established through the three dimensional membrane separation process. Microfiltration (MF), ultrafiltration (UF), nanofiltration (NF) and reverse osmosis (RO) membranes are tested. Depending on the different waste water qualities, specific membranes and different spacers are selected if applicable. The specific membranes are qualified through multiplication of different permeate quality values. The specific quality value is the quotient of the raw water quality (RW) as the dividend and the permeate water quality (P) as the divisor in a specific analytical measurement category. The analytical measurements of each category are taken hourly.

$$QL = \frac{DM_{RW}}{DM_P} \times \frac{T_{RW}}{T_P} \times \frac{C_{RW}}{C_P} \times \frac{COD_{RW}}{COD_P}$$

where DM is dry mass, T is turbidity, C is conductivity and COD is chemical oxygen demand. Thus, if:

$$QL = \frac{0.3\%}{0.03\%} \times \frac{30\ NTU}{5\ NTU} \times \frac{2000\ \mu S/cm}{200\ \mu S/cm} \times \frac{1500\ mg/L}{500\ mg/L}$$

then QL=1800.

The quantity index (QN) is a quotient of flow volume permeate per unit area and time, whereas flow at the end of the test period is the dividend $(V_{P,END})$, and flow at the time of start up is the divisor $(V_{P,START})$. During the test period, the system is operated at the maximum flow yield setting $(FY_{max})$ and flow measurements are taken hourly.

Thus, if $V_{P,START} = 40$ L/m²h, $V_{P,END} = 10$ L/m²h

Then $QN = \frac{10\ L/m^2h}{40\ L/m^2h} = \underline{0.25}$

Flow yield (FY) is a quotient of the permeate flow rate $(V_P)$ as the dividend and the feed flow rate $(V_F)$ as the divisor, whereas said flow measurements are taken hourly.

$$FY = \frac{\dot{V}_P}{\dot{V}_F}$$

-continued

If $V_P = 800$ L/h and $V_F = 1000$ L/h, then $FY = \dfrac{800 \text{ L/h}}{1000 \text{ L/h}} = 0.8$ Efficiency η is the multiplication of the flow yield (FY), the mean value of the hourly measured quality index (QL) and quantity index (QN) in relation to the test duration time $t_{END} - t_{START}$.

$$\eta = \dfrac{FY \times I \times QL \times QN}{t_{END} - t_{START}}$$

For example $$\eta = \dfrac{0.8 \times 1 \text{ h} \times 1800 \times 0.25}{12.5 \text{ h} - 8.5 \text{ h}} = 90.$$

The specific energy requirement can be expressed as $$E = \dfrac{W(Wh)}{V_P(m^3)}.$$

This is the specific energy requirement for generating the permeate volume of one m³.

For example, if the volumetric concentrate flow rate is $V_C=200$ L/h (arithmetic mean), then the volumetric permeate flow rate is $V_P=800$ L/h (arithmetic mean), and the actual operating pressure to produce the foregoing is p=5 MPa, with time at end of test=$t_{END}$=12.5 h and time at start of test=$t_{START}$=8.5 h, then the total permeate production during the test time period is $\Sigma V_P$ [m³]

so $\Sigma V_P = V_P \times (t_{END} - t_{START})$ and $\Sigma V_P = 0.8$ m³/h×(12.5 h−8.5 h)=3.2 m³

The membrane process specific energy requirement during the test time period, $E_{MP}$(Wh/m³) is thus:

$$E_{MP} = \dfrac{(\dot{V}_C + \dot{V}_P \times p)}{3600 \text{ s} \times \Sigma V_P} \times (t_{END} - t_{START})$$

$$E_{MP} = \dfrac{(0.2 \text{ m}^3/\text{h} + 0.8 \text{ m}^3/\text{h}) \times 10^6 \times 5 \text{ kg/s}^2 \times \text{m}}{3600 \text{ s} \times 3.2 \text{ m}^3} \times (12.5 \text{ h} - 8.5 \text{ h})$$

$E_{MP} = 1736$ W/m³ = 1,736 k Wh/m³

The treatment train consists of different treatment categories. These categories consist of the pre-treatment rough and refined, polishing treatment rough and refined and post treatment. Each of these different categories consists of individually selectable multi-choice treatment steps as shown. The redundancies of treatment steps within their specific treatment category allow for a formidable number of treatment permutations. In conjunction with the multi-choice operation modes of individual key steps, it provides the basis for site specific raw water treatment and concomitant plant design optimization. The selection of the treatment steps and, if applicable, their mode of operation into a complete treatment train are based on the analytical values (see the waste water quality questionnaire) and rheological characteristics of the specific waste water classification. A treatment model and full-scale plant design is thus determined from the complete treatment train and the upscaling factor. The upscaling factor is determined from the throughput of the station (in BPD) and the desired full-scale plant throughput (in BPD), and is used to determine upscaling operations of each of the treatment categories in the complete treatment train.

For the sake of simplicity, only the rheological characteristics of turbidity/colloids/slimes/gels, emulsions and suspension are addressed here in the very basic example of two specific waste water classifications. The waste water classification, Class $C_0$, is defined as a waste water class loaded with colloids and salts, such as organic and inorganic colloidal solutions as well as fine disperse suspensions. The Class $D_0$ is defined as a highly contaminated waste water class, such as organic and inorganic fluid suspensions and oil emulsions with grease, iron and gases. The examples used in the following, as well as the treatment trains and the individual treatment steps stated are merely illustrative, many treatment options being available (showing only a few treatment permutations out of many hundreds available).

TABLE 1

|   | Treatment Category | Waste Water Classification $C_0$ Conceptual Treatment Steps | Waste Water Classification $D_0$ Conceptual Treatment Steps |
|---|---|---|---|
| A |   |   |   |
| 1 | Pre-treatment Rough | $C_0$ with high Turbidity Flotation + pH Adjustment + Clarification | $D_0$ with high Turbidity Membrane Aeration + Flotation + pH Adjustment + Clarification + Backflush Filtration |
| 2 | Pre-treatment Refined |   |   |
| 3 | Polishing treatment Rough |   | Nanofiltration |
| 4 | Polishing treatment Refined | Reverse Osmosis | Reverse Osmosis |
| 5 | Post treatment | — | Activated Carbon Gas/Adsorption ("AC") |
| B |   | $C_0$ with Emulsions | $D_0$ with Emulsions |
| 1 | Pre-treatment Rough | Flotation + pH Adjustment + Clarification | Membrane Aeration + Flotation + pH Adj. + Clarification + Backflush Filtration |
| 2 | Pre-treatment Refined | Electrocoagulation + Clarification + Disposable Fabric Filtration | Electrocoagulation + Clarification + Disposable Fabric Filtration |

TABLE 1-continued

| Treatment Category | Waste Water Classification $C_0$ Conceptual Treatment Steps | Waste Water Classification $D_0$ Conceptual Treatment Steps |
| --- | --- | --- |
| 3 Polishing treatment Rough | Ultrafiltration | Ultrafiltration + NF-Vibratory Membrane Separation |
| 4 Polishing treatment Refined | Reverse Osmosis | Reverse Osmosis |
| 5 Post treatment | — | AC + Air Saturation ($O_2$) + Microbial Decontamination UV |

TABLE 2

| | | Treatment Category | |
| --- | --- | --- | --- |
| C | | Waste Water Classification $C_0$ Conceptual Treatment Steps $C_0$ with high Turbidity + Suspensions | Waste Water Classification $D_0$ Conceptual Treatment Steps $D_0$ with high Turbidity + Emulsions + Suspensions |
| 1 | Pre-treatment Rough | Flotation + pH Adjustment + Clarification + Backflush Filter | Membrane Aeration + Flotation + pH Adjustment + Backflush Filtration |
| 2 | Pre-treatment Refined | | Electrocoagulation + Clarification + DFF + BFF |
| 3 | Polishing treatment Rough | Nanofiltration | NF Vibratory Membrane Separation + Nanofiltration |
| 4 | Polishing treatment Refined | Reverse Osmosis | Reverse Osmosis |
| 5 | Post treatment | — | AC + SAR + O2 + UV |

The desired dry mass ("DM") content cannot be produced through real time on-line or off-line instrument measurements. The chemical analysis for DM uses the gravimetric method, whereby the total DM is established through oven drying for two hours at 135° C. Since it is undesirable to wait for chemical analysis laboratories prior to making required on-site treatment changes, real time measurement capabilities for on-site engineering purposes and information on an expedited basis for required treatment changes and optimization is needed. Therefore, substitution of the desired quantitative solids reduction calculation by means of DM percentage, through a density difference calculation to obtain a relative indication for the dry mass content, is utilized. Considering that water density is temperature dependent, the density difference ($\Delta\rho$) is calculated by subtracting the temperature compensated pure water density from the temperature compensated influent or effluent water density. For example, since $$\Delta\rho = \rho_{water} - \rho_{Pure\ Water}$$

if influent water temperature of $T_{IN}=4°$ C., pure water density at 4° C. is $\rho_{PWI}=1.000\ g/cm^3$, measured influent water density ($\rho_{WI}$) is 1.0034 $g/cm^3$, effluent water temperature $T_{EF}=20°$ C., pure water density at 20° C. ($\rho_{PWE}$) is 0.9982 $g/cm^3$, and measured effluent water density $\rho_{WE}=0.99854\ g/cm^3$, then:

$$\Delta\rho_I = \rho_{WI} - \rho_{PWI} = 1.0034 - 1.000 = 0.0034\ g/cm^3$$

$$\Delta\rho_E = \rho_{WE} - \rho_{PWE} = 0.99854 - 0.9982 = 0.00034\ g/cm^3$$

The revised QL is thus $$\left( QL = \frac{\Delta\rho_{INFLUENT}}{\Delta\rho_{EFFLUENT}} \times \frac{T_{INFLUENT}}{T_{EFFLUENT}} \times \frac{C_{INFLUENT}}{C_{EFFLUENT}} \times \frac{TOC_{INFLUENT}}{TOC_{EFFLUENT}} \right)$$

Where density difference $\Delta\rho$ replaces DM and total organic carbon, TOC, replaces COD. In the example values above are utilized, then $$QL = \frac{0.0034\ \frac{g}{cm^3}}{0.00034\ \frac{g}{cm^3}} \times \frac{30\ NTU}{5\ NTU} \times \frac{2,000\ \frac{\mu S}{cm}}{200\ \frac{\mu S}{cm}} \times \frac{1500\ \frac{mg}{L}}{500\ \frac{mg}{L}} = \underline{1800}$$

As may be appreciated from the foregoing apparatus and methods are provided for water treatment diagnostics, site specific treatment design and plant modeling. A station employing the apparatus and methods of this invention is mobile, adaptable, and capable of applying a variety of treatment options and models for purposes of development of a site-specific full-scale treatment proposal. A large number of treatment equipment types are provided, not all of which will ultimately be utilized in any given final treatment configuration. This treatment equipment redundancy of type and combination is provided so that raw water treatment requirements can be accurately gauged and outcomes redundantly tested using different treatment configurations at an actual operational setting. In this way, full-scale plant needs can be realistically modeled, with alternative treatment models obtainable depending on desired produced water outcomes and other considerations such as cost or physical site limitations. The mobile station utilized down-sized versions of full-scale equipment and the through flow is scaled accordingly. These down-sized versions are structurally much the same as full-scale versions, with various ones of the equipment being designed so that operational parameters can be varied for design purposes.

For example, the equipment/process redundancy of the mobile station and methods of this invention can be illustrated for in the case of produced water with low contamination such as low levels of iron, manganese, barium, strontium and sodium and with a TDS of 2,000 ppm and SAR of 20, and based on known discharge standards, the water must be reduced to TDS of 500 ppm and a location specific SAR level of 1>10. In conventional treatment plants rough filtration and aeration oxidation of iron and manganese, plus ion exchange to reduce the TDS and a marble filter to adjust SAR would typically be used. Utilizing the mobile station and methods of this invention however, rough filtration together with more refined filtration to remove more suspended solids and increase efficiency of later steps, aeration oxidation, advanced oxidation using membrane aeration technology for the molecular dispersion of air and/or plasma gas, reverse osmosis, ion exchange, a marble filter, aeration with membranes to reoxygenate (if discharge into waterways), UV radiation to kill bacteria (if for domestic use), and more refined filtration to remove the killed bacteria can all be selectively deployed. The first three steps and last seven steps would never be deployed in a full-scale treatment plant, primarily because the last seven steps are largely redundant. The availability of all ten steps in this example is not primarily for water treatment, but to assure an optimal full-scale plant design process.

In the example, the step of inclusion of more refined filtration will result in more suspended solids removal. This may or may not increase the efficiency of the reverse osmosis or ion exchange steps to a degree that would be economically justifiable in any given site-specific raw water situation. Oxidizing and removing more $Fe^{++}$ using the advance oxidation step may prolong the life of the RO membranes or ion exchange modules and/or decrease scaling in boiler, distillers and the like. This step is used, however, so that a comparison of the cost of inclusion to the cost of shorter lived membranes, and the efficiency of RO and/or ion exchange, can be evaluated. The reverse osmosis step, ion exchange step and/or distillation/evaporation step are normally not employed in a full-scale plant. This would be redundant and expensive. But in the mobile station of this invention these redundancies are necessary in order to determine which technologies, combinations and sequences will best meat treatment goals in a full-scale plant (efficiency, cost effectiveness and the like). For example, the ion exchange step may be economical in a TDS range of 1,000 to 4,000 mg/L and if only TDS is being considered. Likewise, on the TDS basis, a reverse osmosis step may be economical in a TDS range of 2,000 to 30,000 mg/L, whereas a distillation/evaporation step may be economical in a TDS range of 20,000-80,000 mg/L, and again if only the TDS parameter is being considered.

It is often the case, however, that the TDS value is not the only parameter to be considered when choosing any of the above treatment steps over the others. When choosing one treatment step over the other, the whole list of waste water contaminants must be considered, such as oil and grease, BTEX, heavy metals, biomass, crosslinked polymers, chelating agents, micro emulsions, and many others. Also, the applicable pretreatment options and their effect have to be considered when designing the most economical and optimized treatment train for a specific quality of waste water. RO generally requires more efficient pretreatment, has higher capital cost, but lower operating cost than ion exchange technology, but the latter is more forgiving of incoming water while overall having a higher operating cost due to the use of acids to recharge the modules. Both are provided by this invention to allow for design evaluation. Overall, in a typical setting, a full-scale plant design when built may ultimately make use of only four of the ten steps and related technologies used by the mobile station and methods of this invention to achieve the full-scale design.

What is claimed is:

1. A method for diagnosing and modeling site specific effluent treatment facility requirements at a mobile facility positioned at the treatment site and having a plurality of available down-scaled treatment technologies and a plurality of evaluation instrumentation therein to arrive at least at one proposed full-scale plant model optimized for the particular effluent and treatment site requirements and for full-scale plant treatment goals comprising the steps of:
   analyzing raw effluent to be treated at the site to provide a field of raw effluent condition entry values;
   determining treatment goals for said raw effluent to provide a field of treated effluent condition entry values;
   both of said fields including substantially the same entries;
   utilizing said fields to determine an initial treatment model including a selection of, and use parameters for, treatment technologies from the plurality of the available down-scaled treatment technologies at the facility;
   utilizing said fields to initially reject a selection of other treatment technologies from the plurality of available down-scaled treatment technologies at the facility; and
   treating raw effluent in accord with said model and evaluating model efficacy at the facility.

2. The method of claim 1 wherein the step of determining a treatment model includes the step of selecting pre-treatment and effluent polishing treatment stages in said regimen and utilizing selected treatment technologies at the facility selected for each said stage.

3. The method of claim 1 further comprising establishing an altered treatment model based on results of evaluating model efficacy, including reevaluating previously selected treatment technologies or treatment technology use parameters of said initial treatment model, and treating the effluent in accord therewith.

4. The method of claim 3 further comprising deselecting ones of said previously selected treatment technologies of said initial treatment model and selecting ones of said other treatment technologies initially rejected for inclusion in said altered treatment model.

5. The method of claim 1 wherein the step of evaluating model efficacy includes utilizing selected ones of the evaluation instrumentation at the facility to provide data for evaluating treatment model efficacy.

6. The method of claim 5 further comprising establishing a first set of indexes comprising a subset of said raw effluent condition entry values related to said data, a second set of indexes comprising a subset of said treated effluent condition entry values related to said data, and a third set of indexes comprising said data from said selected ones of the evaluation instrumentation, and using said sets of indexes as inputs to arrive at an altered treatment model.

7. The method of claim 6 further comprising treating the effluent in accord with said altered model and continuously dynamically reevaluating model efficacy.

8. The method of claim 1 wherein said selection of treatment technologies and said selection of other treatment technologies comprise technology selections from the available down-scaled technologies at the facility including on-line diffusive effect membrane aeration, fluid density reduction, modified vacuum tower degassing, air stone degassing, modified venturi gas evacuation, fine filtration, lamella plate clarification and sludge chamber concentration, pH adjustment, chemical dosing, inline diffusive ionization membrane aeration, ionized air/gas treatment, plural electrocoagulation technology types, dissolved air/gas flotation, vacuum introduced cyclone separation, vacuum degassing, ion-exchange treatment, microfiltration, nanofiltration, ultrafiltration, antifouling and antiscaling chemical treatments, reverse osmosis membrane treatment, plate distiller treatment, electrodialysis treatment, carbon filtration, sodium absorption ratio compensation, UV treatment, modified and supplemented membrane aeration, and bio-monitoring and sterilization.

9. A method for diagnosing and modeling site specific effluent treatment plant requirements at a mobile facility having a plurality of down-scaled treatment technologies and a plurality of evaluation instrumentation therein to arrive at least at one proposed full-scale plant model optimized for the particular effluent and treatment site requirements and for full-scale plant treatment goals comprising the steps of:
 analyzing raw effluent to be treated at the site to provide a field of raw effluent condition entry values;
 determining treatment goals for said raw effluent to provide a field of treated effluent condition entry values, both of said fields including substantially the same entries;
 utilizing said fields to determine an initial treatment model including a selection of, and use parameters for, treatment technologies from the plurality of the down-scaled treatment technologies at the facility;
 treating raw effluent at the facility in accord with said model;
 utilizing selected ones of the evaluation instrumentation at the facility to continuously provide data regarding raw effluent treatment related to a subset of said entry values of said fields;
 determining from said data and from said subset of said entry values of said fields when said treatment goals are not met by said initial treatment model and continuously establishing revised treatment models during ongoing effluent treatment including another selection of, and use parameters for, the plurality of the down-scaled treatment technologies at the facility; and
 when treatment goals are met by any one of said models, establishing a proposed full-scale plant model.

10. The method of claim 9 wherein the step of continuously establishing revised models includes continuously revising said selection of, or said use parameters for, treatment technologies from the plurality of down-scaled treatment technologies at the facility, so that treatment combinations, inclusions, operations and performance are dynamically modified.

11. The method of claim 10 further comprising the step of establishing an alternative treatment model by modifying treatment goals for said raw effluent to provide a different field of treated effluent condition entry values and thereby arriving at an alternative proposed full-scale plant model.

12. The method of claim 9 further comprising the step of utilizing said fields to initially reject selection of other treatment technologies available from the plurality of down-scaled treatment technologies at the facility.

13. The method of claim 9 wherein potential available treatment combinations in said models tested at the facility are representable by a binary decision making process applied to all of the plurality of down-scaled treatment technologies at the facility, wherein two pretreatment stages, two polishing treatment stages and one post-treatment stage having a total of at least twenty-six total treatment options across all stages are made available by the plurality of down-scaled treatment technologies at the facility.

14. The method of claim 13 wherein at least some of said total treatment options each have a plurality of available treatment variations represented in the plurality of down-scaled treatment technologies at the facility thereby providing thousands of said potential treatment combinations.

15. The method of claim 13 wherein the number of said potential treatment combinations is multiplied by said use parameters.

16. The method of claim 9 wherein the step of establishing a proposed full-scale plant model includes applying an upscaling factor based on effluent throughput of the facility and effluent throughput desired in a proposed full-scale plant for upscaling each treatment category to be included in said proposed full-scale plant model.

17. A method for diagnosing and modeling site specific water treatment facility requirements to arrive at a proposed commercial plant model optimized for the particular water/site requirements comprising the steps of:
 obtaining an analysis of feed water to be treated at the site;
 locating a temporary facility at the site, said facility having a plurality of available treatment technologies located therein;
 establishing a preliminary treatment model at said facility based on said analysis and treatment goals;
 selecting a treatment regimen utilizing selected ones of said plurality of available treatment technologies at said facility and in accord with said treatment model;
 treating the feed water at said facility in accord with said regimen;
 compiling data at said facility related to feed water treatment and reporting treatment efficacy;
 determining at said facility when treatment goals are not met by said preliminary treatment model and establishing a revised treatment model and regimen utilizing selected ones of said plurality of available treatment technologies at said facility and in accord with said revised treatment model; and
 when treatment goals are met by any one of said models, establishing the proposed commercial plant model.

18. The method of claim 17 wherein the step of establishing the proposed commercial plant model includes at least any one of establishing facility design, construction cost estimates and treatment cost estimates.

19. The method of claim 17 wherein the steps obtaining and analysis of feed water and compiling data at said facility related to feed water treatment include the step of establishing an automated multi-stage water quality testing and reporting regime.

20. The method of claim 17 wherein the step of selecting a treatment regimen includes the step of selecting pre-treatment, water polishing treatment and post-treatment stages in said regimen.

21. The method of claim 20 wherein said step of selecting a pre-treatment stage includes the step of selecting from a suite of selectably actuatable pre-treatment apparatus housed by said temporary facility.

22. The method of claim 20 wherein said step of selecting a water polishing treatment stage includes the step of providing at least one of ion-exchange, nanofiltration and reverse osmosis treatments.

23. The method of claim 20 wherein said step of selecting a post-treatment stage includes the step of selecting from a suite of selectably actuatable post-treatment apparatus housed by said temporary facility.

24. The method of claim 17 further comprising the step of deselecting available treatment technologies at the facility for inclusion in said treatment regimen based on said treatment model.

* * * * *